United States Patent [19]

Krishnamoorthy et al.

[11] Patent Number: 5,541,914

[45] Date of Patent: Jul. 30, 1996

[54] PACKET-SWITCHED SELF-ROUTING MULTISTAGE INTERCONNECTION NETWORK HAVING CONTENTION-FREE FANOUT, LOW-LOSS ROUTING, AND FANIN BUFFERING TO EFFICIENTLY REALIZE ARBITRARILY LOW PACKET LOSS

[76] Inventors: Ashok V. Krishnamoorthy, 11188 Caminito Rodar, San Diego, Calif. 92126; Fouad Kiamilev, c/o UNC Charlotte, Dept. of EE, Smith Hall Room 332, Charlotte, N.C. 28223

[21] Appl. No.: 184,551

[22] Filed: Jan. 19, 1994

[51] Int. Cl.$^6$ .................................................. H04J 14/00
[52] U.S. Cl. ........................ 370/56; 370/94.3; 359/117
[58] Field of Search .............................. 370/56, 60, 60.1, 370/85.6, 94.1, 94.2, 94.3; 359/115, 117

[56] References Cited

U.S. PATENT DOCUMENTS 4,868,813  9/1989  Suzuki .................................. 370/56 X
5,008,878  4/1991  Ahmadi et al. .................. 370/94.3 X
5,256,958  10/1993  Eng et al. ................................ 370/56

*Primary Examiner*—Melvin Marcelo
*Attorney, Agent, or Firm*—William C. Fuess

[57] ABSTRACT

A new class of packet-switched extended generalized-shuffle self-routing multistage interconnection networks provides a continuous performance-cost tradeoff between, on the one hand, the knockout switch or buffered crossbar and, on the other hand, the tandem banyan network. Multiple copies of the new networks may be serially cascaded back-to-back, and connected in parallel. A particular concentrator circuit in the network concentrates active communications packets randomly distributed on many lines onto selected lines. Another, second, network communicates synchronization information communicable point-to-point and multi-point while performing arithmetic and logical operations on the synchronization information so communicated. A hybrid parallel combination of both the first and second networks serves to efficiently communicate information point-to-point while simultaneously communicating synchronization information both point-to-point and multipoint.

25 Claims, 70 Drawing Sheets

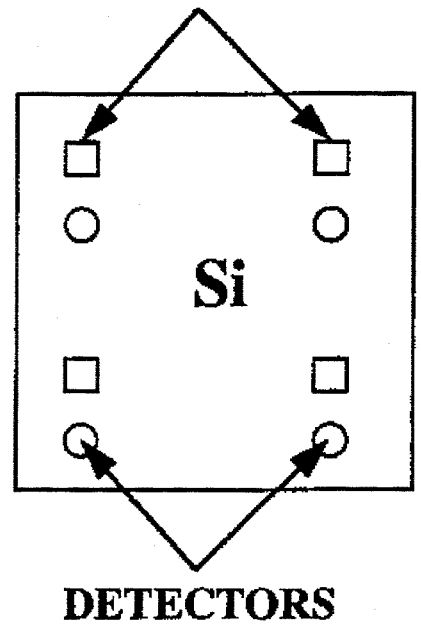
FIGURE 23a
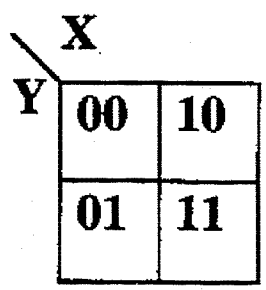 IS EQUIVALENT TO 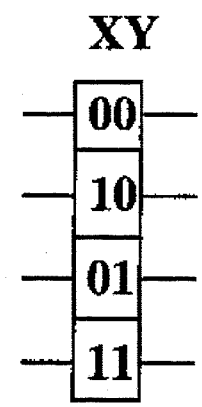
FIGURE 23b

EXAMPLE: FROM ANY SOURCE IF DESIRED ADDRESS IS X1X2Y1Y2=0111
THEN X1Y1=10 AND $\overline{X2Y2}$=11 (PATH IS SHOWN FROM 0100)

DESTINATION ADDRESS: X1 X2 Y1 Y2

RULES :
X1 AND Y1 SET 1ST SWITCH OUTPUT
X2 AND Y2 SET 2ND SWITCH OUTPUT
XN AND YN SET NTH SWITCH OUTPUT
STARTING FROM MOST SIGNIFICANT BITS, FLIP ALTERNATE ADDRESS BITS

| | |
|---|---|
| $A_{2d}$ | Footprint area for optoelectronic network |
| $A_{ba}$ | Area of the VLSI chip |
| $A_d$ | Area of the detector |
| $A_{da}$ | Area detector amplifier (receiver) |
| $A_{dd}$ | Area of the receiver circuit |
| $A_m$ | Area of the modulator |
| $A_{md}$ | Area of the modulator driver circuit |
| $A_{oeic}$ | Area of the optoelectronic chip |
| $A_o$ | Area per transistor in $\lambda_e$ units |
| $B_{2d}$ | Bandwidth of optoelectronic network |
| $B_{ba}$ | Bandwidth of VLSI network |
| $C_{int}$ | Interconnect capacitance per unit length |
| $C_m$ | Modulator capacitance |
| $C_o$ | Capacitance of a minimum sized inverter |
| $\Delta$ | Center-center modulator spacing |
| $\delta$ | Modulator width |
| $S_{2d}$ | Power density for VLSI network |
| $S_{ba}$ | Power density for optoelectronic network |
| $D_T$ | Total aperture of the 2D shuffle optics |
| $d_{mfs}$ | Min. feature size of EBeam |
| $\Phi$ | Number of phase level in CGH |
| f/# | Focal number for optical elements |
| $F_{ba}$ | Clock speed for VLSI network |

FIGURE 25A

| | |
|---|---|
| $F_{2d}$ | Clock speed for optoelectronic network |
| $\eta_d$ | Diffraction efficiency for optical elements |
| $\eta_{det}$ | Detector efficiency |
| $\eta_m$ | Modulator efficiency |
| $\eta_o$ | Optical efficiency |
| $\eta_{wc}$ | Worst case lens system efficiency |
| $K_l$ | Duty cycle for operation |
| $K_s$ | % of gates switching in 2x2 switch |
| $\lambda$ | Optical wavelength |
| $\lambda_e$ | VLSI technology minimum feature size |
| M | Number of transistors in a 2x2 switch |
| N | Network size (# of input/output channels) |
| $P_{da}$ | Receiver power consumption |
| $P_{md}$ | Modulator driver power consumption |
| $\theta$ | Diffraction angle for the modulator |
| $R_{int}$ | Interconnect resistance per unit length |
| $R_o$ | Output resistance of minimum inverter |
| $V_e$ | Electronic power supply voltage |

FIGURE 25B

■ MODULATOR

□ DETECTOR

| | |
|---|---|
| CMOS Process technology | 1.2 μm with 2 level metal |
| Minimum feature size ($\lambda_e$) | 0.6 μm |
| Supply voltage ($V_e$) | 5 VOLTS |
| Wire pitch (W) | 2.4 μm |
| Wire capacitance ($C_{int}$) | 2 pF per cm |
| Wire resistance ($R_{int}$) | 375 ohms per cm |
| Gate capacitance ($C_o$) | 8 fF |
| Gate resistance ($R_o$) | 8000 ohms |
| Duty cycle ($K_I$) | 50% |
| Max. Clock speed ($F_{pe}$) | 100MHZ |
| Devices/switching element (M) | 142 |
| Area/device | 20 μm x 10 μm |
| % gates switching ($K_s$) | 25% |

FIGURE 31

| | |
|---|---|
| Process technology | Transmission mode MQW integrated with 1.2 μm CMOS and Si PIN detectors |
| CGH Technology | EBeam fabricated CGH |
| EBeam min. feature size ($d_{mfs}$) | 0.5 μm |
| Optical wavelength ($\lambda$) | 850nm |
| No. of CGH phase levels ($\Phi$) | 4 |
| CGH efficiency ($\eta_d$) | 81% |
| MQW modulator size ($\delta$) | 5 μm x 5 μm |
| MQW drive voltage ($V_m$) | 5 VOLTS |
| MQW capacitance ($C_m$) | 20fF |
| MQW efficiency ($\eta_m$) | 40% |
| Min. detector power ($P_{det}$) | 40 μW @ 100Mhz |
| Detector size ($2\delta$) | 20μm x 20μm |
| Detector Efficiency ($\eta_{det}$) | 80% |
| Receiver bias current ($I_{bias}$) | 20 μA |
| Receiver area ($A_{da}$) | 4000 μm$^2$ |
| Receiver power ($P_{da}$) | 100 μW |

FIGURE 37

| PARAMETER | Unit | K=2 | K=4 |
|---|---|---|---|
| grain-type | | ROUTER | ROUTER |
| #input channels | | 4096 | 4096 |
| system bw | Gbit/s | 93 | 93 |
| system power | w | 42 | 24 |
| system volume | cm$^3$ | 29 | 28 |
| system footprint area | cm$^2$ | 32 | 24 |
| system clock speed | Mhz | 100 | 100 |
| #gates/modulator | | 65 | 130 |
| #optical stages | | 11 | 5 |
| electrical power/stage | w | 1.4 | 2.1 |
| optical power/stage | w | 2.3 | 2.3 |
| on-chip power density | w/cm$^2$ | 4.0 | 3.0 |
| optical efficiency | | 0.27 | 0.27 |
| oe chip width | cm | 0.9 | 1.2 |
| optical system aperture | cm | 0.9 | 1.2 |
| optical sys. length/stage | cm | 3.2 | 4.1 |
| modulator spacing | μm | 142 | 183 |

FIGURE 41a

| PARAMETER | Unit | K=16 | K=64 | K=4096 |
|---|---|---|---|---|
| grain-type | | ROUTER | ROUTER | ROUTER |
| #input channels | | 4096 | 4096 | 4096 |
| system bw | Gbit/s | 93 | 93 | 27 |
| system power | w | 16 | 15 | 13 |
| system volume | cm$^3$ | 24 | 20 | 0 |
| system footprint area | cm$^2$ | 15 | 10 | 13 |
| system clock speed | Mhz | 100 | 100 | 28 |
| #gates/modulator | | 260 | 390 | 780 |
| #optical stages | | 2 | 1 | 0 |
| electrical power/stage | w | 4.0 | 6.8 | 13 |
| optical power/stage | w | 2.1 | 1.9 | 0 |
| on-chip power density | w/cm$^2$ | 2.3 | 2.1 | 1.0 |
| optical efficiency | | 0.29 | 0.34 | 0 |
| oe chip width | cm | 1.6 | 2.0 | 3.6 |
| optical system aperture | cm | 1.6 | 2.0 | 3.6 |
| optical sys. length/stage | cm | 4.7 | 5.2 | 0 |
| modulator spacing | μm | 250 | 308 | 556 |

FIGURE 41b

[16,16,1] Network $$2^{\left[\frac{\log N}{2}\right]} = \sqrt{N}$$

[16,16,1] Network w/ 4x4 X-BARs $$K^{\left[\frac{\log_K N}{2}\right]} = \sqrt{N}$$

PACKET-SWITCHED SELF-ROUTING MULTISTAGE INTERCONNECTION NETWORK HAVING CONTENTION-FREE FANOUT, LOW-LOSS ROUTING, AND FANIN BUFFERING TO EFFICIENTLY REALIZE ARBITRARILY LOW PACKET LOSS

Certain of the inventions contained herein, and parts of the work represented in this specification, were made by support of the U.S. Government acting through the Air Force Office of Scientific Research under its contract AFSORF-44620-93-1-0059 with the Regents of the University of California. The U.S. Government has certain rights in parts of this invention.

REFERENCE TO RELATED PATENT APPLICATIONS

The present patent application is related to U.S. patent application Ser. No. 07/846277 filed Mar. 2, 1992 for a DUAL-SCALE TOPOLOGY OPTOELECTRONIC MATRIX ALGEBRAIC PROCESSING SYSTEM, issued as U.S. Pat. No. 5,321,639, Jun. 14, 1994, to selfsame Ashok Krishnamoorthy who is a co-inventor of the present application, and also to Gary Marsden, Joseph Ford and Sadik Esener.

The present patent application is further related to U.S. patent application Ser. No. 07/785,742 filed Oct. 31, 1991, for a MOTIONLESS PARALLEL READOUT HEAD FOR AN OPTICAL DISK RECORDED WITH ARRAYED ONE-DIMENSIONAL HOLOGRAMS, issued as U.S. Patent No. 5,28438, on Feb. 8, 1994, to Philippe Marchand and also to Pierre Ambs, Kristopher Urquhart, Sadik Esener, Sing Lee and the selfsame Ashok V. Krishnamoorthy who is a co-inventor of the present application.

The present patent application is still further related to U.S. patent application Ser. No. 07/785,408 filed Oct. 31, 1991, for an OPTOELECTRONIC ASSOCIATIVE MEMORY USING PARALLEL-READOUT OPTICAL DISK STORAGE, issued as U.S. Patent No. 5,412,592, on May 2, 1995, to the selfsame Ashok V. Krishnamoorthy who is a co-inventor of the present application and also to Philippe J. Marchand, Gokce Yayla and Sadik C. Esener.

The present patent application is still further related to U.S. patent application Ser. No. 07/909,563 filed Jul. 6, 1992, for an ARTIFICIAL NEURON WITH SWITCHED CAPACITOR SYNAPSES USING ANALOG STORAGE OF SYNAPTIC WEIGHTS, issued as U.S. Pat. No. 5,343,555, on Aug. 30, 1994, to Gokce Yayla and also to Sadik Esener and the selfsame Ashok V. Krishnamoorthy who is a co-inventor of the present application.

The contents of the related applications are incorporated herein by reference.

BACKGROUND OF THE INVENTION

1. Field of the Invention

The present invention generally concerns interconnection networks, packet switching and photonic switching.

The present invention particularly concerns a new class of packet-switched extended generalized-shuffle self-routing multistage interconnection networks (called "Stretch" networks) providing a continuous performance-cost tradeoff between the knockout switch or buffered crossbar and the tandem banyan network.

The Stretch networks are characterized by a number of parameters: N,M,F,K,P,R, and T. N and M denote the number of input and output channels respectively. F is the maximum of the fanout $F_o$ or the fanin $F_i$. K is the number of input/outputs of the switching element used in the switching and routing stages. P is the number of packet buffers per output channel. R is the number of back-to-back replications of the unipath Stretch [N,M,F,K,P] network, and T is the number of tandem Stretch [N,M,F,K,P,R] networks used in parallel.

2. Background of the Invention

This section describes how free-space optoelectronic technology can be used to achieve high-performance networks for neurocomputing, parallel processing, and broadband switching applications. All these applications are characterized by a need for parallel systems with global communication requirements. The present invention will be seen to deal with the design, analysis, and implementation of application-specific optoelectronic networks from a systems viewpoint, and a new class of networks so derived.

This section further describes the basic concept of a free-space optoelectronic system and its advantages over a VLSI system. Section 2.1 discusses the need for parallel systems and reviews previous work that compares optoelectronic and VLSI technologies at the component level. Section 2.2 briefly outlines the present state of the art basic components of a free-space optoelectronic system. Section 2.3 presents a summary and introduces the design methodology used in the derivation of the networks that are the subject of the present invention.

2.1. The Raison D'être for Parallel Optoelectronic Systems

2.1.1 The Need for Parallel, Globally-Interconnected, Networks

The need for parallel, globally interconnected networks is based on the evolving requirements of digital computing. Since the earliest days of digital computers, there has been an ever-increasing demand for more computing power. There are essentially two ways of building a more powerful computer. The first is to use faster components; the second is to use concurrence.

The last two decades have seen a tremendous improvement in the performance and cost of the sequential "Von-Neumann" computer See W. Aspray and A. Burks, eds., *Papers of John Von Neumann on computing and computer theory*, MIT Press, 1987. Performance improvements in silicon logic device technology in terms of switching energies, switching speeds, and device density, and the use of architectural techniques such as instruction pipelining and reduced instruction set (RISC) computing, have led to faster processors with higher clock speeds. However, it has become evident that uniprocessor performance is reaching a performance "plateau"; as device, architectural, and system limits are approached. See C. L. Seitz, "Engineering limits on computer performance," *IEEE Trans. Comput.*, vol. C-33, no. 12, pp. 1247–1265, December 1984. Improvements to the cycle times of uniprocessor machines will be constrained by fundamental limits in the switching speeds and minimum geometry of MOSFET logic devices. See A. Reisman, "Device, circuit, and technology scaling to micron and submicron dimensions," *Proc. of IEEE*, vol. 71, pp. 560–565, May 1983; also see J. D. Meindl, "Ultra-large scale integration," *IEEE Trans. Electron Devices*, vol.

ED-31, no. 1, pp. 1555–1561, 1983. A further limitation of uniprocessor machines results from insufficient processor-memory bandwidth, or the so-called Von-Neumann bottleneck. For many applications, peak throughput is limited not by processing power, but by the processor-to-memory communication capability, i.e. how fast new data and instructions can be accessed by the processor. Although the use of larger word sizes and high speed caches can help mitigate this effect to a certain extent, technological limits on the speed of a memory device, and the inherent technological tradeoff between the capacity of a memory device and its data bandwidth, represent unavoidable bottlenecks for memory intensive applications. See R. W. Keyes, *The Physics of VLSI Systems,* Addison-Wesley, 1987; see also H. E. Maes et al. "Trends in semiconductor memories", *Microelectronics* vol. 20, pp. 9–57, 1989. A final and most imposing obstacle to improved uniprocessor performance stems from communication delays due to interconnection lines. As feature sizes decrease and chip sizes increase, the delay per unit length of an interconnect in fact, increases. See H. B. Bakoglu, *Circuits, Interconnections, and Packaging for VLSI,* Addison-Wesley, 1990. Thus, a communications crisis is inevitable. See J. W. Goodman, F. J. Leonberger, S. Y. Kung, and R. A. Athale, "Optical interconnections for VLSI systems," *Proc. of IEEE,* vol. 72, no. 7, pp. 850–866, July 1984. Further improvements in processor speeds will be masked by unwanted interconnect delay. See K. C. Saraswat and F. Mohammadi, "Effect of scaling of interconnections on the time delay of VLSI circuits," *IEEE J.. Solid State Circuits,* vol. SC- 17, no. 2, pp. 275–280, 1982.

It is widely believed that the most promising option to sustain long-term improvements in system performance and cost is to use large-scale parallel processing techniques. See C. L. Seitz, "Concurrent VLSI architectures," *IEEE Trans. Comput.* vol. C-33, no. 12, pp. 1247–1265, December 1984; S. K. Tewksbury and L. A. Hornak, "Communication network issues and high-density interconnects in large-scale distributed computing systems," *IEEE Journal Selected Areas Communication,* vol. 6, no. 3, pp. 587–609, April 1988; H. T. Kung, "Why systolic architectures," *IEEE Computer Mag.,* pp. 37–46, January 1982; and K. Hwang and D. Degroot, eds., *Parallel Processing for Supercomputers and Artificial Intelligence,* McGraw-Hill, 1989. Of course, a parallel processing system, consisting of multiple processing elements (PEs) and multiple memory modules, is itself not immune to the technology limitations mentioned above. The challenge is not in providing individual PEs with sufficient computational power or individual memory modules with sufficient bandwidth, but in ensuring that information can flow to and from these elements at sufficiently high rates. In fact, processor-memory and interprocessor bandwidth requirements pose an even greater problem for parallel systems than for sequential computers. The critical issue is to balance the computational bandwidth of a PE ($C_B$) to its communication or I/O bandwidth. See H. T. Kung, "Memory requirements for balanced computer architectures," *Journal of Complexity,* vol. 1, pp. 147–157, 1985.

For operations that are characterized by a high ratio of computations-to-communications, i.e. compute-bound operation, the processor-memory bandwidth requirements can be alleviated by using local cache memories at each PE, where instructions and frequently used data may be stored. For such operations, when the ratio of processing power to communication bandwidth is increased, ($C_B/IO_B$ is increased) the PE can be re-balanced by increasing the size of the local memory. See H. T. Kung, 1985, supra. For instance, matrix-matrix multiplication is a compute-bound task, since each element of one matrix must be multiplied by all the elements of a row or column of the other matrix. Other examples of compute-bound operations include sorting, FFT, and d-dimensional grid operations. Such operations are amenable to concurrent computing techniques such as systolic processing. See H. T. Kung, 1982, supra. However, several important operations such as matrix addition, matrix loading, and matrix-vector multiplication are I/O bound. For these problems, it is impossible to re-balance the PE simply by increasing the size of local memory; an increase in $C_B$ must be accompanied by a comparable increase in the I/O bandwidth to maintain an efficient, balanced PE. See H. T. Kung, 1985, supra.

Thus, pipelined systolic-array parallel processors with local mesh-type connections are only suitable for compute-bound operations where multiple operations must be performed on the data repetitively; they cannot be efficiently applied to I/O-bound operations. See H. T. Kung, 1982, supra. This has resulted in a need for high-performance communication networks with large I/O bandwidths. The next issue is the topology of the network. A global interconnection pattern, such as the perfect shuffle provides a useful and efficient form of communication with minimized delay. See H. S. Stone, "Parallel processing with the perfect shuffle," *IEEE Trans. Comput.,* vol. C-20, pp. 81–89, 1971. For instance, an N-processor perfect shuffle can simulate any wraparound-mesh interconnection in $O(\text{Log } N)$ steps, whereas the converse takes at least $O(\sqrt{N})$ steps. See H. J. Siegel, "A model of SIMD machines and comparison of various interconnection networks," *IEEE Trans. Comput.,* vol. C-28, pp. 907–917, 1979.

These arguments suggest that a space-division interconnection network that provides fast, global communication between processors and memory modules is a crucial component of any high-performance parallel processing system for I/O bound operations. In fact, such a network has applications in a number of fields. For instance, matrix update and matrix-vector operations are the fundamental operations required in an artificial neural network. Another important application is in the area of telecommunications switching. The advent of high-bandwidth fiber-optic data transmission has created a need for switching networks with aggregate throughput of up to a terrabit-per-second. Parallel interconnection networks are presently the only feasible method of approaching this requirement. The global connectivity requirement is manifest; each input port must be able to communicate to all output ports.

In summary, the ever increasing need for more powerful computers, the advent of very high bandwidth transmission capabilities and the emergence of massively parallel computational paradigms such as artificial neural networks have created a need for a parallel interconnection system with fast, global communication requirements. The following section 2.1.2 discusses why free-space optoelectronic technology may be well-suited to implement such a system.

2.1.2 Advantages of Free-Space Optoelectronic Technology

It is widely recognized that the performance of very large scale integrated circuit (VLSI) systems is limited by their planar nature. VLSI systems suffer from severe electrical interconnect limitations which make them ill-suited to implement globally connected parallel computing architectures. See J. W. Goodman, et al., supra. See also M. R.

Feldman, S.C. Esener, C. C. Guest, and S. H. Lee, "Comparison between optical and electrical interconnects based on power and speed considerations," Appl. Opt., vol. 27, no. 9, May 1, 1988; and F. Kiamilev, P. Marchand, A. V. Krishnamoorthy, S. Esener and S. H. Lee, "Performance comparison between optoelectronic and VLSI multistage interconnection networks," *IEEE/OSA J. Lightwave Tech.*, vol. 9, no. 12, pp. 1674–1692, 1991. Communication is expensive with VLSI in terms of power dissipation, delay, and chip area. Chip designs are often optimized for minimizing interconnection lengths, leading to localized on-chip communication. Communication in sending signals between chips is even more costly due to pinout limitations and the increased delay and power dissipation of the package, while wafer-scale integrated systems suffer from lower yields. Consequently, with present VLSI technology, only locally interconnected and/or nonscalable globally-connected computing architectures with a limited number of PEs can be implemented. See A. Masaki, Y. Hirai, and M. Yamada, "Neural Networks in CMOS: A Case Study," *IEEE Circuits and Devices*, pp. 13–17, 1990; also J. Bailey and D. Hammerstrom, "Why VLSI implementations of associative VLCNs require connection multiplexing," *Proceedings of IJCNN* 1988, vol. II, pp. 173–180.

The cost of communication in VLSI must be minimized in order to implement large-scale, globally connected systems. In this section, the advantages of optoelectronic systems over purely electronic ones are reviewed. The basic premise is that an efficient, scalable parallel distributed processing system will use both optical and electronic technologies to meet the functional and connectivity requirements. This is done by augmenting local electronic processing and interconnections with global optical interconnections. The arguments are based on topological suitability, achievable interconnection density, power dissipation, susceptibility to scaling, and fault tolerance. Specifically, the next two sections 2.1.2.1 and 2.1.2.2 discuss how the pin-out restriction limitation is removed by using the third dimension for optical input/output, and how the power-delay product is reduced due to the lower interconnection capacitances and time constants. It should be noted that the discussion is limited to systems where optics is used only for fixed, nonadaptive-interconnection, and where all processing is performed electronically.

2.1.2.1 Topological Considerations and Interconnection Density

To achieve higher performance neural nets with VLSI, and to enhance the ability to scale interconnection systems, local electrical interconnections must be augmented by an efficient means of global communication. The connectivity and pin-out restrictions of VLSI can be alleviated by introducing optical inputs and outputs via the integration of optical transmitters and receivers onto a VLSI chip. An optoelectronic system consists of three basic components: an integrated array of optoelectronic processing elements that have local electrical interconnects, a free-space optical medium that establishes the global optical interconnects in the third dimension, and a parallel-access optical memory. See FIG. 1. The inherent superiority of this approach stems from its 3-D topology. By using the third dimension normal to the processing plane where the processing elements (PE) reside, free-space optical interconnects offer the advantage of high speed parallel and global interconnections between different PEs. See J. W. Goodman, et al., supra. No crosstalk occurs between intersecting light beams. This is in contrast to a multi-chip electronic module where the interconnections are distributed in many planar interconnection layers, with vias allowing for vertical communication between layers only at distinct regions.

Free space interconnects are immune to the crossover constraints of planar interconnection technologies, allowing denser interconnection topologies. It can be shown that the area taken in an holographic medium to implement highly interconnected architectures such as a crossbar is considerably less than the area taken by the electrical interconnects on a VLSI chip. See M. R. Feldman, C. C. Guest, T. J. Drabik, and S. C. Esener "Comparison between electrical and free-space optical interconnects based on interconnect density capabilities" *Appl. Opt.*, vol. 28, no. 18, p. 3820, September 1989. In a VLSI-based 2-D system, the number of communication channels N, is governed by a 1-D communication bissectrice, which grows in proportion to the side of the chip. That is $N=O(\sqrt{A})$ where A is the chip area. In the case of the 3-D system as shown in FIG. 1 the communication takes place through a planar bissectrice of area A ($N=O(A)$) rather than a 1-D bissectrice. As a result, the communication capacity of an optoelectronic system asymptotically exceeds that of an electronic system. See R. Bakarat and J. Reif, "Lower bounds on the computational efficiency of optical computing systems," *Appl. Opt.*, vol. 26, no. 6, March 1987. The above argument suggests that 3-D optoelectronic systems are better suited to implement connection systems and that their advantage over purely electronic modules will improve as the number of communication channels grow.

2.1.2.2 Interconnect Delay and Energy Considerations

In order to demonstrate the scaling of optoelectronic systems, several researchers have compared the energy dissipation of an optical interconnect to that of an electrical interconnect and demonstrated that for interconnections longer than a certain break-even length, free space optical interconnects consume less energy and are faster than their electrical counterparts. See R. K. Kostuk, J. W. Goodman, and L. Hesselink, "Optical imaging applied to microelectronic chip-to-chip interconnections," *Appl. Opt.*, vol. 24, no. 17, pp. 2851–2858, September 1985; also M. R. Feldman, S.C. Esener, C. C. Guest, and S. H. Lee, "Comparison between optical and electrical interconnects based on power and speed considerations," *Appl. Opt.*, vol. 27, no. 9, May 1, 1988 For architectures with high minimum bisection widths, this can lead to lower cost, higher throughput systems. See F. Kiamilev, et al., supra. It can be shown that the delay of an interconnection line of length L (without repeaters) can be approximated as $$T_{90\%}=2.3\ (R_o C_{int} L + R_o C_o + R_{int} C_o L) + R_{int} C_{int}\ L^2$$

where $R_o$ and $C_O$ are the output resistance and load capacitance of a minimum size gate, and $R_{int}$ and $C_{int}$ are the resistance and capacitance per unit length of the wire respectively. See H. B. Bakoglu, supra. The second term on the right is small for typical on-chip wire lengths, and therefore the delay grows approximately linearly with interconnection length. According to equation 1.1, any further increase in the interconnection complexity (i.e. the length of interconnection lines) of the chip must be accompanied by a decrease in the resistance and the capacitance of the interconnects to keep the delay constant. This is in contrast to optical interconnects, where the interconnect delay is independent of the interconnect length for typical line lengths and switching speeds. It follows that for highly interconnected network architectures, the use of optical interconnects can lead to systems that have lower delays and higher throughput.

It can also be shown that the ratio of the energy dissipated in an optical link connecting a light transmitter to a light detector, to that dissipated in an electrical interconnect is given by:

$$\frac{E_o}{E_e} = \frac{h\nu}{qV} \frac{C_o}{\eta C_e(L)} + \frac{2P_{th}}{\tau^{-1}C_e(L)V^2}$$

here hv is the photon energy, q is the electronic charge, V is the power supply voltage, $\eta$ is the optical link efficiency, L is the electrical interconnection length, $\tau^{-1}$ is the speed of operation and Pth is the threshold power (for lasers only). $C_o$ and $C_e$ are the capacitances associated with the optical and electrical interconnects, respectively. In a system, $C_o$ would be the sum of the transmitter and detector capacitances in the link, and $C_e$ would include the electrical line capacitance as well as the input and output capacitance of electronic inverters. In equation 1.2, the first term is the ratio of the capacitances associated with electrical and optical interconnections. This term also takes into account the efficiencies of the detector, the optical interconnection, and the optical transmitter. The second term is associated with light transmitters such as laser diodes which exhibit a threshold. This term dominates at low speeds. For light modulators, this term vanishes. Note that the communication energy overhead associated with electronics grows with increasing interconnection length, while the overhead associated with optical interconnects is independent of the length of the interconnection. At the board or module level, the high capacitance of the pins and the board level interconnections further increase $C_e$, thereby increasing the energy advantage of optics.

The effective number and size of PEs that can be achieved is governed by the fabrication yield of the particular technology. Assuming that the device yield is governed by random defect densities, it is expected that the PE yield will decrease (exponentially) with larger PE sizes. Note that the use of optical interconnects releases active silicon area (otherwise used for wires) allowing a larger array of processing elements. The number of defective interconnection links can be minimized due to the distributed nature of holography. The optical interconnections can also be reprogrammed to avoid faulty PEs. This may enhance the PE yield to a level where it is possible to wafer-scale integrate large optoelectronic modules.

In summary, the connectivity and pin-out restrictions of VLSI can be alleviated by introducing optical input and output to a VLSI chip. The use of optical interconnects releases active area (otherwise used for wires) allowing the silicon real estate to be more effectively used to host a large and dense array of PEs. By using the third dimension, normal to the neuron planes, optical interconnects offer the advantage of parallel and global interconnection between neurons. At the wafer level, optical interconnects can provide lower energy, higher bandwidth communication between processing elements than electrical interconnects if efficient optical systems can be designed. Free-space optical interconnects are also free from mutual interference effects. Finally, optical interconnects provide fault tolerance, enabling wafer-scale integration, since communication and processing can be decoupled. 3-D optically interconnected systems therefore seem better suited to implement massively parallel globally connected network architectures.

2.2 Enabling optoelectronic technologies

In this section, the optoelectronic components required for implementing free-space optoelectronic systems are briefly described, and some of the considerations involved in selecting suitable technologies for parallel distributed processing systems are summarized. These include smart-spatial light modulators (S-SLMs), free-space diffractive optical interconnects, and parallel access optical memories.

2.2.1 Smart-Spatial Light Modulators (S-SLMs)

One of the key components of optoelectronic computing modules are S-SLMs, otherwise known as "smart pixels." See S. C. Esener, "Silicon based smart spatial light modulators technology and application to parallel computers," *Critical Review of Optical Science and Technology: Digital Optical Computing*, vol. CR-35, R. Athale, ed., SPIE Optical Engineering Press, pp. 100–125, 1990. S-SLMs can be regarded as an evolution of conventional electro-optic spatial light modulators (SLMs). See J. A. Neff, R. A. Athale, and S. H. Lee, "Two-Dimensional Spatial Light Modulators: A Tutorial," *Proc. of IEEE*, vol. 78, pp. 826–855, May 5, 1990. Conventional SLMs are devices in which one two-dimensional optical field modulates a certain characteristics of another two-dimensional optical field (usually phase, polarization or intensity). In most SLMs, however, the interaction between the two optical fields requires optical to electrical and electrical to optical energy conversions. An important class of electro-optic SLMs are spatially segmented. In such SLMs the input and output optical fields are pixellated. Smart-SLMs or smart pixels differ from conventional spatially segmented SLMs in that some information processing can be carried out electronically in each pixel of the SLM. As shown in FIG. 1, an S-SLM consists of a large array of optoelectronic PEs. In each PE, incoming optical data is sensed by light detectors. These detectors convert the data into electronic form that is then fed to an electronic circuit for local processing. The control signals for the electronic circuit can also be received optically. In principle, the electronic circuit of the PE can be as simple as a logic gate with a few transistors or as complex as a programmable processor with a several thousand logic gates. Information processing in each PE can be carried out in a digital as well as analog fashion. At the output of the PE, the processed data is converted back into optical form via light transmitters (sources or modulators), and is then routed to another PE with free space interconnection optics. It should be noted that the optoelectronic data conversions in the operation of an S-SLM do not need to be as frequent as in a conventional SLM. The data in an S-SLM remains in electronic form while it is processed locally. It is in the optical form only when global transmission to other PEs is necessary. This considerably reduces the rate of energy conversions and allows the optoelectronic parallel computers to out-perform all "electronic" and very fine grain "optical" parallel computers.

S-SLMs employ materials with widely different properties for logic, light detection and light transmission. Various S-SLM technologies are presently under development. Most S-SLMs are based on substrates such as silicon, silicon-on sapphire, Gallium Arsenide, Indium Phosphide or ferroelectric substrates. See Esener, supra. The contemplated logic technologies vary from silicon CMOS to III-V MESFETS. Various light detectors and detection circuits have also been proposed. Similarly, several light transmitter device technologies have been suggested for usage in S-SLMs. In the following section, we summarize some of the considerations involved in selecting suitable S-SLM technologies for neural network applications.

2.2.1.1 Choice of Light Transmitter Technology

A key factor in determining the suitability of an S-SLM to a given application is the light transmitter technology that is adopted. Two main approaches are presently under investigation: light sources and light modulators. The light source approach has a major advantage in that active light sources such as laser diodes are fast (sub-nanosecond) and provide large dynamic range. Also, surface emitting laser diodes that can efficiently direct the laser beam out of the SLM plane have been developed. See J. L. Jewell, K. F. Huang, K. Tai, Y. H. Lee, R. J. Fischer, S. L. McCall, and A. Y. Cho, "Vertical Cavity Single Quantum Well Laser," *Appl. Phys. Lett.*, vol. 55, pp. 424–426, 1989; also R. Geels, S. Corzine, and L. Coldren "InGaAs Vertical-Cavity Surface Emitting Lasers", *IEEE Journal of Quantum Electronics*, vol. 27, no. 6, June 1991.

The potential benefits of lasers are, to a certain extent, outweighed by their relatively large threshold currents ($\approx 1$ mA) and large on-chip power dissipation when operating with large fan-out. By the end of this decade, it is expected that threshold currents will be reduced by an order of magnitude making laser diodes more attractive for large, highly integrated optoelectronic systems.

Light Emitting Diodes (LEDs) can presently be integrated on a large scale with GaAs logic. Like semiconductor lasers, they benefit from large dynamic ranges. Furthermore, their power dissipation at low speeds and low powers is considerably lower then laser diodes. Their main limitations is the large spectral width of their emission making them difficult to use with holographic optical interconnects. Another consideration is their high on-chip power dissipation when operating with large fan-out. Like lasers, LEDs are best suited for application that require relatively low fanouts. Section 2 of the Description of the Preferred Embodiment section of this specification will present a class of architectures whose fanout can be tailored to suit such devices.

The electro-optic light modulator approach has significant near-term advantages over lasers diodes and LEDs. There exists a larger variety of materials capable of light modulation. Compared to laser diode fabrication, modulator fabrication processes are simpler and more consistent with logic technology. Light modulators are capacitive and require little current and reduce the on-chip dissipated power. The excess heat dissipation, arising from inefficiencies associated with electrical-to-optical conversion in the lasers, is removed from the SLM substrate. This is especially important for implementing architectures that require high fan-out.

Several modulator materials have been proposed for S-SLMs. These include multiple a quantum well (MQW) absorption modulator. See D. A. B. Miller, D. S. Chemla, T. C. Damen, A. C. Gossard, W. Wiegmann, T. H. Wood, and C. A. Burrus, "Novel hybrid optically bistable switch: The quantum well self-electro-optic effect device," *Appl. Phys. Lett.*, vol. 45, no. 1, pp. 13–15, 1984. These also include a ferroelectric liquid crystal. See T. J. Drabik, L. K. Cotter, and M. A. Handschy, "Ferroelectric liquid crystal/silicon VLSI spatial light modulator", *OSA Annual Meeting '89*, paper ThS3, (Orlando, Fla.), October, 1989; also K. M. Johnson, M. A. Handschy, and L. A. Pagano-Stauffer, "Optical computing and image processing with ferroelectric liquid crystals", *Opt. Eng.*, vol. 26, no. 5, pp. 385–391, 1987. Finally, these include PLZT modulator-based S-SLMs. See S. H. Lee, S. C. Esener, M. A. Title, and T. J. Drabik, "Two-dimensional silicon-PLZT spatial light modulators," *Opt. Eng.*, vol. 25, p. 250, 1986; also T. H. Lin, A. Ersen, J. H. Wang, S. Dasgupta, S. C. Esener, and S. H. Lee, "Two-dimensional spatial light modulators fabricated in Si/PLZT," *Appl. Opt.*, vol. 29, pp. 1595–1603, April 1990.

For MQW and PLZT modulators, the switching speed is limited by electronic effects; that is, they can operate at high speeds if enough drive power can be provided. For instance, multiple Quantum Well (MQW) absorption modulators can now be modulated at GHz rates. For PLZT modulators, rise times of 10 nsec have been measured. See B. Mansoorian, D. Shih, C. Fan, V. Ozguz, and S. Esener, "Application of flip-chip bonding techniques for Si based smart pixels," *OSA Annual Meeting '92*, paper ThDD6, (Albuquerque N.M.), September 1992. On the other hand, Ferro-electric Liquid Crystal (FLC) modulators can only switch at about a microsecond, which severely limits their span of applications. In terms of switching energy, MQW modulators are clearly the best. Unfortunately, the small switching energy is achieved at the expense of narrow spectral bandwidth, small dynamic range and strong dependence on temperature variations. See T. Y. Hsu, U. Efron, W. Y. Wu, J. Schulman, I. D'Haenens, and Y. C. Chang, "Multiple quantum well spatial light modulators for optical processing applications", *Optical Engineering*, vol. 5, no. 27, May, 1988. It is expected that some of these issues can be resolved with a proper system design approach. An important consideration for MQW modulators is that their on-chip power dissipation increases with fan-out. This makes them best-suited for applications that require a dense array of high-speed devices with low fanout. Sections 3 and 4 of the Description of the Preferred Embodiment section of this specification will discuss a packet-switched interconnection network with these propertied.

Both FLC and PLZT polarization-based modulators can provide large fan-out due to their non-absorptive nature. On-chip power dissipation is essentially independent of the input optical power. The major difference between FLC and PLZT modulators is in their speed of operation (in favor of PLZT) and in the required drive power (in favor of FLCs). Hence, for applications that require slow but dense arrays of light modulators, FLC based S-SLMs are preferable; otherwise PLZT based S-SLMs are preferable.

2.2.1.2 Choice of Electronic Logic Technology

The second consideration in the choice of an S-SLM for neural network implementations is the electronic technology. Presently, the electronic chip market is shared by various electronic logic families. However, the consumer market is dominated by silicon CMOS devices which have a wide range of applications. Other technologies are expected to remain limited to specific niche applications. CMOS gates have negligible static power dissipation, large noise margins, and can operate with high reliability. This technology also allows for high device density and speed of operation. Consequently, CMOS technology has become universal and there are also strong indications that the CMOS and related technologies such as BiCMOS will continue to dominate. It is expected that by the end of this decade, MOSFET feature sizes will continue to be reduced, possibly down to 0.1 µm, further increasing device densities and achievable circuit complexities by a factor of 100.

CMOS technology suffers most from interconnection problems in comparison to other existing logic families precisely because of its high level of integration. As previously discussed, this limitation of CMOS is expected to become more severe with the scaling-down of device dimensions. Thus, CMOS is a logic technology that is naturally suited for parallel optoelectronic networks using silicon-based S-SLMs (SS-SLMs). Furthermore, MOSFETs possess useful physical characteristics (e.g. sub-threshold operation that exactly match the needs of applications such as neural networks. See C. Mead, *Analog VLSI and Neural Systems,* Addison-Wesley, 1989. In fact, much of the pioneering experimental research on neural network implementations has been carried out in CMOS VLSI, making it a valuable technology for designing free-space optoelectronic neural systems.

2.2.1.3 Choice of Integration Method

S-SLMs employ materials with widely different properties for logic, light detection, and light modulation. Two integration approaches are currently being investigated for the development of these S-SLMs. The approaches can be classified as hybrid and monolithic.

A straight forward approach is to use a hybrid integration technique, such as flip-chip bonding. Flip-chip bonding, currently used for silicon packaging, is a mature and well developed technique that can also be used advantageously to realize S-SLMs. See, for example, D. P. Seraphim, *Principles of Electronic Packaging,* McGraw Hill 1989. This technique has been studied with different materials and devices for hybrid conventional SLMs. See S. Esener, J. Wang, T. Drabik, M. Title, and S. H. Lee,"One-dimensional silicon/PLZT spatial light modulators," *Opt. Eng.* vol. 26, no. 5, pp. 406–413, May 1987. For instance this approach is well suited to a hybrid silicon/PLZT modulator S-SLM. See C. Kirkby, M. Goodwin, and A. Parsons, "PLZT/silicon hybridized spatial light modulator array—design, fabrication, and characterization," *Intl. Journal of Optoelectronics,* vol.5, no. 2, pp.169–178, 1990; also ,B. Mansoorian, D. Shih, C. Fan, V. Ozguz, and S. Esener, "Application of flip-chip bonding techniques for Si based smart pixels," *OSA Annual Meeting '92,* paper ThDD6, (Albuquerque N.M.), September 1992. The modulator is used in a reflective configuration and is connected electrically using flipchip bonding to the output of the silicon circuit in the PE with an indium bump. It is expected that 32×32 arrays of S-SLMs with a relatively large PE complexity can be readily produced with this hybrid integration technique. See S. C. Esener 1990, supra. The flipchip bonding technique can also be used for integrating MQW modulators, LED as well as VCSELs with silicon circuits.

The performance of S-SLMs can be improved with monolithic integration techniques. Monolithic integration will ensure the availability of large sized S-SLMs at lower cost than the hybrid approach. In addition to this consideration, the parasitic capacitances associated with the hybrid approach can also be eliminated. The major concern for monolithic integration is to grow or deposit the desired optical materials on an appropriate substrate (silicon, sapphire or Gallium Arsenide). Presently, most of the research efforts on monolithic S-SLMs are focused on growth techniques for optical materials. Among the most promising optical materials for monolithic realization of S-SLMs are III-V MQW compounds (see D. A. B. Miller, et al., supra.), and PLZT (see S. H. Lee, et al., and T. H. Lin, et al., supra).

2.3 Free-Space Optical Interconnects

Interconnections among the PE's of the S-SLMs are one of the most important components of a globally-connected optoelectronic system, since they can govern its cost in terms of area, volume, and power. The choice of the connection topology and technology is therefore critical. Free-space interconnection topologies can be classified in terms of their regularity (or space-variance), density (fan-out, fan-in) and also by the degree to which they can be reconfigured. The simplest systems are fixed, with a single, built-in connection pattern. More general systems are reprogrammable interconnections systems, which can interrupt processing and reset to any desired connection pattern. Depending on the technology, the time required to change patterns can be small. Finally, there are adaptive systems, in which the connection patterns are continuously changing as the system operates. In general, the choice of the appropriate free-space optical interconnect technology is strongly dependent on the requirements of the particular system and application. The systems discussed in this specification use fixed, space-invariant (regular) optical interconnects and perform all processing and adaptation functions electronically.

Fixed, optical interconnects can be implemented via either refractive components (such as lenses, prisms, etc.) or holographic components. When the connection pattern required by the optoelectronic system is fixed, the necessary hologram can be generated off-line by computer, and fabricated using e-beam lithography methods that are fully compatible with VLSI in terms of fabrication characteristics and physical dimensions. See K. S. Urquhart, S. H. Lee, C. C. Guest, M. R. Feldman, and H. Farhoosh, "Computer aided design of computer generated holograms for electron-beam fabrication," *Applied Optics,* vol. 28, p. 3387, 1989. The advantage of this method is the ability to directly write holograms with large space-bandwidth products at submicron resolution. Computer generated holograms may require long and sometimes expensive computation, but can be made with lower aberration and higher diffraction efficiency (by using multi-level phase elements) than thin optical holograms. Limitations in the fabrication technology, such as writing resolution and data storage capacity determine the quality of reconstruction in terms of the image bandwidth, signal-to-noise ratio, and diffraction efficiency, which in turn determine maximum interconnection distance, interconnection density, and complexity. For instance, a connection density of up to $10^6$ connections/cm$^2$ is possible using an e-beam fabricated CGH with 0.5 µm feature size and 16 phase levels. In general, it is not possible to maximize all the performance measures simultaneously, and a particular hologram encoding method should be chosen according to the requirements of the application. See G. J. Swanson, "Binary optics technology: the theory and design of multilevel diffractive optical elements," *DARPA Technical report,* vol. 854, 1989. Unlike electronic, fiber optic, or integrated-optics connections, the hologram distributes the interconnection information throughout the media, so that a local defect does not destroy the connection. This increases the fault tolerance of the network's connection system.

2.4 Parallel Accessed Optical Storage Devices

As discussed in Section 2.3, the quest for more powerful computers will bring about a need not only for massively parallel processing systems but also for storage systems with enormous capacities and memory bandwidths. Progress in optoelectronic S-SLM technology now allows large arrays of highly integrated and very high speed computing devices for parallel processing to be built. This has created a demand for low cost, high capacity, and high bandwidth memory sub-systems that are compatible with optoelectronic systems. Existing semiconductor or magnetic memory technologies, being essentially serial or semi-parallel in nature, cannot meet this demand without having the memory subsystem dominate the processors themselves in terms of overall cost, power consumption, and volume. The need for low cost, high performance memories and compatibility with optical interconnections can best be satisfied by parallel accessed optical storage devices.

The parallel accessed optical storage system may be either binary or analog depending on the particular optoelectronic architecture. For instance, in an artificial neural system, if electronic synapses are used for the multiplication and summation operations, binary bit planes from the optical storage device may be used to load new connection weights in parallel, whereby a weight with K grey levels can be implemented using Log K bits. This effectively increases the connection capacity of the network and enables larger networks to be emulated by the parallel hardware. On the other hand, if the synaptic function is implemented optically, analog optical storage devices, such as photorefractive media, can provide the interconnection and weighing operations simultaneously. See D. Psaltis, D. Brady, X. G. Gu, and K. Hsu, "Optical implementation of neural computers," in *Optical Processing and Computing*, H. Arsenault, T. Szoplik, and B. Macukow, eds., Academic Press, (San Diego), 1989. Various schemes for parallel accessed memories are presently being developed. These include both planar media such as optical disks as well as volume media such as 2-photon and photorefractive materials.

A near-term solution to parallel accessed optical storage are optical disks systems modified for parallel readout. Optical disks are good candidates for this application because they combine reasonably high capacity (900 Mbytes for a 5.¼" diameter disk), low cost, and robustness (no head-crash risk). It has been shown that optical disks can be accessed in parallel, and several parallel readout systems have been proposed. See K. Kubota, Y. Ono, M. Kondo, S. Sugama, N. Nishida, and M. Sakaguchi, "Holographic disk with high transfer rate: its application to an audio response memory," *App. Opt.*, vol. 19, no. 6, pp. 944–951, March 1980; also A. Mikaelian, E. Gulanian, Y. Vynokurov, A. Burgomistrov, B. Kretlov, and K. Musatov, "Digital signal recording and readout system using one-dimensional hologram technology," *Internat. Jour. Optical Computing*, vol. 1, pp. 93–100, 1990; also D. Psaltis, M. Neifeld, A. Yamamura, and S. Kobayashi, "Optical memory disk in optical information processing," *App. Opt.*, vol. 29, no. 14, pp. 2038–2057, May 1990; also J. Rilum and A. Tanguay, "Utilization of optical memory disk for optical information processing," *OSA Annual Meeting '88*, paper M15, 1988; and P. J. Marchand, A. V. Krishnamoorthy, K. S. Urquhart, P. Ambs, J. Gresser, S. C. Esener, and S. H. Lee, "Motionless-head parallel readout optical disk system," *Applied Optics*, vol. 32, no. 2, Jan. 10, 1993.

To meet increasing demands on storage systems, researchers have been seeking three-dimensional (3-D) optical memory devices as an alternate means to achieve low cost, high performance memory systems. See S. Esener, "3-D optical memories for high performance computing," *SPIE Critical Reviews*, vol. 1150, p. 113, August 1989. Present memory devices store information in a two-dimensional area. A 3-D memory is a single memory unit where three independent coordinates are used to specify the location of the information. Such a device would allow the storage of two-dimensional information (bit-planes) throughout the volume, thereby achieving higher theoretical storage capacities. One memory I/O operation is performed on the entire plane of bits, thus achieving a tremendous memory bandwidth increase over conventional bit oriented serial memories. These considerations make 3D memories very compatible to the needs of free-space optoelectronic systems and in the long term a strong competitor to parallel accessed optical disks.

3-D memories are generally classified as bit-plane oriented and holographic. Bit oriented memories generally use amplitude recording media. In bit-oriented 3-D memories, each bit occupies a specific location. The coordinates that specify the location of the information can be spatial, spectral, or temporal giving rise to a variety of 3-D memory concepts that use different materials with different properties. For example, materials that exhibit 2-photon absorption, which refers to the excitation of a molecule to an electronic state of higher energy by simultaneous absorption of two photons of different energy, can provide 3-D storage capability. See S. Esener, "3-D optical memories for high performance computing," *SPIE Critical Reviews*, vol. 1150, p. 113, August 1989. Two optical beams must temporally and spatially overlap in order for two-photon absorption to result. This allows true volume storage, since the beams can penetrate the material to record, read, or erase information without affecting it except in the regions where they overlap. In contrast, materials wherein spectral holes can be burnt can provide spectral/spatial storage, while materials that exhibit photon echo effect could, in principle, provide temporal/spatial storage. See U. P. Wild, S. E. Bucher, and F. A Burkhalter, . "Hole burning, Stark effect, and data storage," *Appl. Opt.*, vol. 24, p. 1526, 1985; and N. W. Carlson, L. J. Rothberg, and A. G. Yodh, "Storage and time reversal of light pulses using photon echoes," *Optics Letters*, vol. 8, p. 483, 1983.

3-D holographic storage differs from bit-plane oriented memories in that the information associated with the stored bits are distributed throughout the memory space, and therefore is tolerant to point defects in the storage medium. The component holograms can be multiplexed in several ways. Each can be given a separate area or volume, or they can be superimposed in the same area or volume; a combination of both methods can be used. To choose among the set of pre-stored holograms, the proper angle, phase code or wavelength can be selected. As many as 500 holograms have been stored in a $LiNO_3$ crystal. See F. Mok, M. Tackitt, and H. Stoll, "Storage of 500 high-resolutions holograms in a $LiNbO_3$ crystal," *Opt. Letters*, vol. 16, No. 8, pp. 605–607, Apr. 15, 1991; also D. L. Staebler, W. J. Burke, W. Phillips, and J. J. Amodei, "Multiple storage and erasure of fixed holograms in Fe-doped $LiNbO_3$," *Appl. Phys. Lett.*, vol. 26, no. 4, pp. 182–184, Feb. 15, 1989.

2.4 Summary of the Background of the Invention, and Discussion

The ever increasing need for more powerful computers, the advent of very high bandwidth transmission capabilities and the emergence of massively parallel computational paradigms such as artificial neural networks have created a need for a parallel interconnection system with fast, global communication requirements. It is also clear that the connectivity and pinout restrictions of VLSI technology makes it ill-suited to implement such networks. By introducing optical input and output to a VLSI chip, global interconnects and large numbers of pinout can be obtained. As will become evident in the following chapters, optical inputs and/or outputs also allow the use of higher performance two-dimensional layout techniques. 3-D optically interconnected systems therefore seem better suited to implement massively parallel globally connected network architectures.

It should be noted that free-space optoelectronic systems are still at an infantile stage of development. While individual component behavior is quite well understood, and fundamental limits of optical systems have also been studied, relatively little effort has gone into the bottom-up design and optimization of application-specific systems. There is also a lack of working prototypes, although notable examples have recently emerged. See F. McCormick, F. Tooley, T. Cloonan, J. Brubaker, A. Lentine, R. Morrison, S. Hinterlong, M. Herron, S. Walker, and J. Saisan, "Experimental investigation of a free-space optical switching network using symmetric self-electro-optic-effect devices," *Appl. Opt.*, vol. 31, no. 26, pp. 5431–5446, September 1992; and D. Psaltis, H. Y. Li, Y. Qiao, and A. Grot, "Optical neural network for real-time face recognition," *OSA Annual Meeting '92*, paper MT5, (Alburquerque, N.M.), September 1992. Because building prototype systems is an expensive and time-consuming process, it is important to allow the architectural and technological aspects of the design to be optimized first.

This specification is concerned with the design and implementation of hardware-efficient free-optoelectronic networks, i.e. networks with a high performance-cost index. The performance and cost of the system can usually be quantified in terms of certain measurable quantities such as capacity, bandwidth, area, power, volume, etc., but may also have to take into account certain other factors such as the applicability of the system, the system complexity, and the availability and convenience of using certain components. For instance, one of the crucial issues in a free-space optoelectronic is the number of transistors per optical I/O or the "grain-size" of the system. For certain applications, the grain size is driven by the required functionality of the processing elements, and only very broad architectural choices are available (e.g. optical fanin versus electronic fanin). In other cases, the grain-size parameter can be optimized without affecting the system functionality. The methodology adopted in this thesis is to design the system according to application requirements and device restrictions, and to determine suitable performance-cost metrics; then to optimize the system with respect to these metrics; and finally to use simulations and/or experimental data from prototype systems to test the designs.

Section 2 of the Description of the Preferred Embodiment will be seen to present a new class of generic, globally connected space-division networks, called [N,M,F] networks that are well suited to implementation using optoelectronic integrated circuits and free-space optical interconnects. Section 3 of the Description of the Preferred Embodiment will be seen to discuss the application of the [N,M,F] network concept to a content-addressable memory system that achieves associative recall on two-dimensional images retrieved from a parallel-access optical memory. Reference is then made to the design and implementation of a scalable free-space optoelectronic [N,M,F] neural system as is taught in a co-pending patent application. Sections 3 and 4 of the Description of the Preferred Embodiment will be seen to present the design, analysis, and optimization of an [N,N,F] self-routing, packet-switched multistage interconnection network. In each case, the network designs are optimized for the given application and technology, and provide superior performance-per-cost to existing systems. Section 5 of the Description of the Preferred Embodiment will be seen to summarize the teaching of this specification and to suggest applications.

SUMMARY OF THE INVENTION

The present invention contemplates (i) a new class of packet-switched extended generalized-shuffle self-routing multistage interconnection networks—called "Stretch" networks—providing a continuous performance-cost tradeoff between the knockout switch or buffered crossbar and the tandem banyan network; (ii) multiple copies of the new networks serially cascaded back-to-back, (iii) multiple copies of the new networks connected in parallel, (iv) a particular concentrator circuit useful in the new networks.

Although the "Stretch" networks are the predominant teaching of this particular specification, the present invention further contemplates (iv) another new network—called a "Smart" network—particularly for communicating synchronization information communicable point-to-point and multipoint while performing arithmetic and logical operations on the synchronization information so communicated; and (v) a parallel combination of a Stretch network communicating information point-to-point and a Smart network simultaneously communicating synchronization information point-to-point and multipoint.

1. Philosophy of the Present Invention

The present invention contemplates that parallel, globally connected, communication networks can, and will, become so large that there will not be enough hardware on the planet, whether electronic or optoelectronic, so as to connect everything to everything without loss or blocking in the manner of a crossbar switch. It will become insane to design a large parallel interconnection network so as to be absolutely non-blocking if the network is thus so over-designed as to be (i) less likely of losing an individual packet of data communicated between network-interconnected devices than are the devices so communicating themselves, or (ii) so large that the functional reliability of the network causes more packet data to be lost by incipient failure(s) than by limitations of design.

It is a premise of the present invention that a noncommunication of data packets due to conflicts may be countenanced at a certain predetermined loss probability level. Packet loss can be controlled by error checking and other schemes (with attendant time overhead for up to the entire network), with the retransmittal of lost data packets (with attendant time overhead for any such devices as, upon a certain communications cycle, failed to communicate). Once it is accepted that there will be some finite probability of packet loss, howsoever arbitrarily low (e.g., one part in $10^{15}$ or $10^{18}$), the only question becomes how to design parallel, globally-connected, communications networks that make the best, and most cost- and performance-effective, use of hardware and of time resources.

The present invention contemplates, and the present disclosure teaches, a new methodology of designing a multistage interconnection network (MIN) to cost and time performance requirements, and a new class of MINs so designed.

2. A New Class of Multistage Interconnection Networks (MINs) Called "Stretch" Networks, And The Relationship of Stretch Networks to Previous MINs In one of its aspects the present invention is embodied in a new class of multistage interconnection networks (MINs) called "Stretch" networks. The Stretch networks are characterized by a number of parameters: N,M,F,K,P,R, and T. N and M denote the number of input and output channels respectively. F is the maximum fanout or fanin. K is the number of input/outputs of the switching element used in the switching and routing stages. P is the number of packet buffers per output channel. R is the number of back-to-back replications of the unipath Stretch network, and T is the number of tandem Stretch [N,M,F,K,R] networks used in parallel.

The new class of self-routing multistage interconnection networks, or "Stretch" networks, provide a continuous performance-cost tradeoff in the region between, at a one extreme, the tandem banyan network, and, at the other extreme, the knockout switch or buffered crossbar. The previous tandem banyan network is about thirty years old whereas the previous knockout switch is considerably more recent. "Degenerate" forms, meaning extreme parameterizations, of the Stretch networks of the present invention actually reduce, at one extreme, to the tandem banyan network and, at the opposite extreme, to the knockout switch. Such a relationship is not surprising because the Stretch networks of the present invention, which purport to be very effective, might well be expected to have some relationship with those MINs heretofore known to be most effective, and those MINs heretofore most widely acclaimed.

Stretch networks incorporate fanout stages similar to extended generalized shuffle (EGS) networks. EGS networks are explained, inter alia, by T. J. Cloonan, G. W. Richards, F. B. McCormick, and A. Lentine in "Architectural considerations for an optical extended generalized shuffle network based on 2-modules," Technical Digest, *OSA Topical Meeting on Photonic Switching*, Salt Lake City, March 1991.

Stretch networks use concentrating fanin stages similar to the knockout switch. See, for example, Y-S. Yeh, M. G. Hluchyj, and A. S. Campora, "The knockout switch: a simple modular architecture for high-performance packet switching," *IEEE Journal Selected Areas Communication*, Vol. 5, No. 8, pp. 1274–1282, October, 1987.

Stretch networks can be configured as cascaded back-to-back networks similar to the tandem banyan network. See F. A. Tobagi, T. Kwok, and F. M. Chiussi, "Architecture, performance, and implementation of the tandem banyan fast packet switch," *IEEE Journal Selected Areas Communication*, Vol. 9, No. 8, pp. 1173–1193, October, 1991.

The fanout stages of the Stretch networks (i) enable partial contention-free routing. The fan-in stages (ii) provide buffering and concentration of outgoing packets. The back-to-back extended banyan networks (iii) provide low contention routing.

Importantly, Stretch networks (iv) use simple destination tag routing. This means that a portion of the bits, or a header, to each message (information) packet routed by the network contains the destination information. The Stretch network responds to this routing information in real time to route each, and all, packets to its and to their proper destinations (within the limits of conflicts). A Stretch network is thus desirably "self-routing", meaning that no external agency needs configure or reconfigure the network for message passing, which is an inherent network response to the destination tag routing.

Importantly, Stretch networks can be designed to (v) achieve low delay and (vi) arbitrarily low blocking probabilities for random, permutation, and non-uniform traffic (vii) without using internal buffers in the switches.

These qualities make Stretch networks ideally suited for both fast packet switching and multiprocessor architectures, and facilitate efficient VLSI and optoelectronic implementations.

2. General Construction of the New Class of Multistage Interconnection Networks (MINs)

As previously stated, Stretch Networks are characterized by a number of parameters: N,M,F,K,P,R, and T. As previously stated, N and M denote the number of input and output channels respectively. F is the maximum fanout or fanin. K is the number of input/outputs of the switching element used in the switching and routing stages. P is the number of packet buffers per output channel. R is the number of back-to-back replications of the unipath Stretch [N,M,F,K] network, and T is the number of tandem Stretch [N,M,F,K, R] networks used in parallel.

At the heart of all Stretch networks is a unipath Stretch [N,M,F] network that allows a continuous performance/cost tradeoff between a knockout switch and a multistage interconnection network. At the one extreme of the Stretch network, the knockout switch is fully connected and contention-free. However, for large numbers of interconnected channels and devices, the knockout switch makes a lavish use of hardware resources. At the other extreme of the Stretch network, a regular Banyan network achieves maximum connection multiplexing. However, the Banyan network suffers a high degree of internal link contention.

Unipath Stretch networks have (i) intermediate values of the fanout F while (ii) providing low(er) contention by increasing the bisection width of the network. The number of logical routing stages remains the same ($Log_2$ F+$Log_2$(N/ F)=$Log_2$ N) regardless of the fanout; this permits simple destination-based routing techniques to be used. These unipath Stretch networks may then be cascaded back-to-back or in parallel to achieve low contention and tolerance to faults. Output port contention is alleviated using a finite number of buffers at each output channel, according to the knockout principle. (See Y. S. Yeh, M. G. Hluchyj, and A. S. Campora, "The knockout switch: a simple modular architecture for high-performance packet switching," *IEEE Journal Selected Areas Communication*, Vol. 5, No. 8, pp. 1274–1282, October, 1987.)

The common feature of all Stretch networks—no matter what values of F, K, P, R, or T are chosen—is that each stage of the networks uses a simple perfect-shuffle interconnection, or any of the topologically equivalent connection patterns. See L. Bhuyan and D. Agrawal, "Generalized shuffle networks," *IEEE Transactions on Computers*, Vol. C-32, No. 12, December 1983.

The parameterization of a Stretch network in any of [N,M,F], or [N,M,F,K], or [N,M,F,K,R], is dictated solely by technology cost considerations. Thus, Stretch networks can be tailored to a variety of technologies, including VLSI and photonic technologies.

This patent application contains the complete design of the Stretch networks, including a novel concentrator switch design. The performance of the Stretch network is demonstrated via mathematical analysis and simulation, and is compared to several well-known network architectures. A system-level design of the Stretch networks is performed, and performance/cost behavior of these networks is determined. An optoelectronic implementation of a Stretch network is discussed.

3. Particular Construction of an [N,M,F] Embodiment of the New Class of Multistage Interconnection Networks (MINs)

A Stretch network is an [N,M,F] multistage interconnection network where N is the number of logical input channels to the network, M is the number of output channels, and F is the fanning parameter, the multistage interconnection network. Such a network includes a fanout stage having N fanout modules with fanout of $F_o$ each where $F_o$ is greater than one and $F_o$ less than M. Each fanout module serves to route a packet received on a corresponding one of the N input channels to a one of its $F_o$ output channels.

The Stretch network further includes $\log_K[N/F]$ switching stages—$\log_K[N/F]$ being an integer—with each stage having NF/K K×K switches. Each switch of a first switching stage routes packets received on its K input lines from K of the fanout modules. Each switch of stages subsequent to the first routes packets received on its K input lines from K of the switches of the previous switching stage. The routings are to the K output lines of the switch based on $\log_K$ bits of routing information contained in each packet. (This is called "self-routing".)

The Stretch network still further includes a fanin stage having M fanin modules with fanin of $F_i$ each, $F_i$ being greater than one and $F_i$ less than N. Each fanin module concentrates packets received on its $F_i$ input lines from $F_i$ switches of the final switching stage into P packets output on a corresponding one of the M output channels.

In a Stretch network F is the maximum of $F_o$ and $F_i$, and $2 \leq F_i \leq N-1$.

If $F_i$ was to equal 1 ($F_i=1$), then the Stretch network would reduce to the tandem Banyan network. If $F_i$ was to equal N ($F_i=N$) then the Stretch network would become a knockout switch. Quite miraculously for a network configuration, and design, that both (i) bridges two extremely useful previous network forms, and, indeed, (ii) reduces to these previous forms in any variation of but a single one of its parameters of construction by but the modest difference of plus or minus one, to the best knowledge of the inventors an intermediary form Stretch network has never heretofore been replicated, let alone recognized to be a member of a useful new class of network spanning prior forms.

Commonly in the Stretch [N,M,F] multistage interconnection network N times $F_o$ equals M times $F_i$. Commonly the $\log_K[N/F]$ switching stages consist of $\log_2[N/F]$ switching stages, with each of these switching stages consisting of NF/2 2×2 switches.

Commonly in the Stretch [N,M,F] multistage interconnection network each fanout module of the fanout stage is a tree having $\text{Log}_K F$ stages of K×K switches, and is more commonly a tree having $\text{Log}_2 F$ stages of 2×2 switches.

Likewise commonly in a Stretch [N,M,F] multistage interconnection network used for data communication each fanin module of the fanin stage is commonly a tree having $\text{Log}_K F$ stages of K×K switches, and is more commonly a tree having $\text{Log}_2 F$ stages of 2×2 switches. In this case, however, each 2×2 switch of the tree may also include a buffer.

More particularly, each fanin module of the fanin stage may include a concentrator concentrating P input packets received on P of the $F_i$ input lines onto P output lines, and also a buffer for buffering packets upon the P concentrator output lines, and demultiplexing these packets onto a one of the M output channels.

Alternatively, a Stretch [N,M,F] multistage interconnection network can be configured for both communications interconnection and processing. For example, see the neural network taught in the aforementioned patent application Ser. No. 07/846277 filed Mar. 2, 1992 for a DUAL-SCALE TOPOLOGY OPTOELECTRONIC MATRIX ALGEBRAIC PROCESSING SYSTEM. For example, see the associative memory circuit taught in the aforementioned patent application U.S. patent application Ser. No. 07/785, 408 filed Oct. 31, 1991, for an OPTOELECTRONIC ASSOCIATIVE MEMORY USING PARALLEL-READOUT OPTICAL DISK STORAGE. The parameterization of the [N,M,F] network of the present invention to perform both interconnection and processing is by (i) the judicious choice of parameters N, M and F, and (ii) by incorporation of appropriate arithmetic and/or logical functions in the fanning units.

4. Particular Construction of an [N,M,F,R] Embodiment of the New Class of Multistage Interconnection Networks (MINs)

An [N,M,F] multistage interconnection network may be series-replicated R times, forming thereby an [N,M,F,R] multistage interconnection network.

Such an [N,M,F,R] multistage interconnection network for connecting N input channels to M output channels starts with a fanout stage for routing live, meaning carrying useful information to be routed, and also dead, meaning carrying no presently useful information, input packets received on N input channels according to routing information contained in each packet.

A first network switching stage routes as is best possible all live packets received from the fanout stage towards their intended destinations while changing the code identification of packets that are un-routable due to contention to be zombie, meaning unsuccessfully-routed, packets.

A first minor fanin stage, receiving all packets from the first network switching stage, concentrates and passes on all successfully routed live packets while ignoring dead and zombie packets.

The [N,M,F,R] multistage interconnection network further includes at least one repetition of several, plural, interconnected stages. These repeated stages consist of a judgement stage, which judgement stage also receives in parallel with the first minor fanin stage all packets from the first network switching stage, that (i) re-identifies zombie packets to be live packets, (ii) reidentifies live packets to be dead packets, and (iii) maintains dead packets as dead packets. A successive, next network switching stage routes as is best possible all live packets received from the judgement stage towards their intended destinations while changing the code identification of packets that are un-routable due to contention to be zombie, meaning unsuccessfully-routed, packets. Finally among the repeated stages, a minor fanin stage associated with each successive network switching stage receives all packets from the associated network switching stage and concentrates and passing on all successfully routed live packets while ignoring dead and zombie packets.

A summary, major, fanin stage serves to concentrate live packets received from all minor fanin stages onto the M output channels.

The concept of these R replicated and series-connected [N,M,F] multistage interconnection networks, or this [N,M, F,R] multistage interconnection network, is simple. Packets that can be routed completely to their destinations in a first [N,M,F] network are so routed. Other packets that cannot be so routed do to contention are held in abeyance as "zombie", or unsuccessfully routed, packets, and are sent on to a next successive, second, [N,M,F] network. As many of the packets as can be successfully routed in each of successive [N,M,F] networks are so routed. The hardware resource of at least earlier ones of the R series-replicated [N,M,F] networks works as hard, and as effectively, as is possible. As successive ones of the R series-connected networks are passed the probability that a packet will not have become successfully routed falls off rapidly.

In the [N,M,F,R] multistage interconnection network the fanout stage is commonly routing packets received on the N input channels to associated ones of N replications of $F_o$ output lines according to $\log_2 F_o$ bits of routing information contained in each packet. The first network switching stage routes by use of other, additional, $\log_2(M/F_o)$ bits of information contained in each packet all live packets received from the fanout stage on the $N_xF_o$ lines towards their destinations as best as is possible in consideration of conflicts. In detail, it normally so routes packets by the $\log_2 (M/F_o)$ bits of information in $\log_K (M/F_o)$ steps, each step using $\log_2 K$ bits of routing information, onto $N\times F_o$ lines. The first minor fanin stage receives the packets from the first network switching stage on the $N\times F_o$ lines, partitioned now as $M\times F_i$ input lines where N times $F_o$ equals M times $F_i$, and concentrates all successfully routed live packets onto M lines.

Among the repeated plural stages the judgement stage receives all packets from the first network switching stage on the $N\times F_o$ lines, and passes all packets on $N\times F_o$ lines. The successive next network switching stage routes received packets by the same $\log_2(M/F_o)$ bits of information, commonly in $\log_K(M/F_o)$ steps, each step using $\log_2 K$ bits of routing information, onto $N\times F_o$ lines. Finally the minor fanin stage is receives the packets from the associated network switching stage on the $N\times F_o$ lines—partitioned now as $M\times F_i$ input lines where N times $F_o$ equals M times $F_i$—and is concentrates all successfully routed live packets onto M lines.

Accordingly, the major fanin stage concentrates live packets received from R minor fanin stages on R×M lines onto the M output channels.

4. Particular Construction of an [N,M,F,R,T] Embodiment of the New Class of Multistage Interconnection Networks (MINs)

An [N,M,F,R] multistage interconnection network may be replicated in parallel times, forming thereby an [N,M,F,R,T] multistage interconnection network.

Such an [N,M,F,R,T] multistage interconnection network, may be configured, and may operate, in two slightly different versions.

One [N,M,F,R,T] multistage interconnection network includes an input circuit serving to receive on each of N input channels a packet that is live or dead, and to make T copies of the packet received on each input channel. Then, if a received packet on a one channel is live the input circuit will maintain only an arbitrary one of the T live copies to be live and will set all remaining copies to be dead. However, if a received packet on a one channel is dead the input circuit will maintain all copies to be dead.

Next in sequence T tandem-parallel [N,M,F,R,T] multistage interconnection networks, connected in parallel, each receive packets, up to N of which are live, from the input means on its N input channels. Live packets are routed to M output lines as best as is possible considering contention.

Finally in sequence an output circuit serves to concentrate live packets received from each of the T tandem-parallel [N,M,F,R,T] multistage interconnection networks onto N output channels.

Another, related, version of the [N,M,F,R,T] multistage interconnection network functions commensurately save for the copying performed by the input circuit. In this version the input circuit maintains an arbitrary number, and not just one, of the T copies to be live, while setting all remaining copies to be dead, in the event that a received packet on a one channel is live. In the event that a received packet on a one channel is dead then all copies are also maintained to be dead, as before.

6. A Concentrator

The present invention includes a new concentrator usable in a packet-switched communications network.

The concentrator serves to concentrate F input packets, of which at most P packets are live (meaning carrying useful information to be routed) and of which (F-P) packets are dead (meaning carrying no presently useful information), received on F input channels, $P\leq N\leq F$, to P output channels so that the P live packets as are distributed anywhere among the F input channels are distributed to an uppermost P among N output channels.

The concentrator is constructed as several hierarchically-series-connected concentrating stages. Each stage functions to (i) operate on all F input packets received on F input channels, and to (ii) concentrate all F packets onto P output channels so that P live ones of said packets are distributed to a upper P of N total output channels. This ordered distribution is called "concentrating".

The several hierarchically-series-connected concentrating stages commence with an integer F/2 of first-stage 2×2 concentrator switches. Each first-stage 2×2 concentrator switch receives packets on an associated two of the N input lines and concentrates these packets onto two output lines. (Remembering the definition of the concentrating function, this means that one only live packet received, no matter on which of the two input lines, is output on a most significant, uppermost, one of two output lines. If two live packets, or two dead packets, are received then both are output.

The next, second, stage consists of an integer F/4 of 4×4 concentrator switches. Each second-stage 4×4 concentrator switch includes two, an upper and a lower, 2×2 concentrator switches connected in parallel. The parallel-connected 2×2 concentrator switches receive, in order from uppermost to lowermost, the (i) the upper, first, output line of a first, relatively more uppermost, previous 2×2 concentrator switch, (ii) the upper, first, output line of a second, relatively more lowermost, previous 2×2 concentrator switch, (iii) the lower, second, output line of said first previous 2×2 concentrator switch, and (iv) the lower, second, output line of said second previous 2×2 concentrator switch, plus This same second stage further includes an additional, final, 2×2 concentrator switch connected for concentrating packets received from the lower output line of the upper 2×2 concentrator switch and the upper output line of the upper 2×2 concentrator switch. Accordingly, the four signal lines communicating concentrated packets from the second-stage 4×4 concentrator switch are ordered from uppermost to lowermost as (i) the upper, first, output line of the upper 2×2 concentrator switch, (ii) the upper and the lower, the first and the second, output lines of the final 2×2 switch, and (iii) the lower, second, output line of the lower 2×2 concentrator switch.

The next, third, stage consists of an integer F/4 of 4×4 concentrator switches. Each if these third-stage 8×8 concentrator switches includes two, an upper and a lower, 4×4 concentrator switches connected in parallel. The two parallel-connected 4×4 concentrator switches receive, in order from uppermost to lowermost, the (i) the upper, first, output line of a first, relatively more uppermost, previous 4×4 concentrator switch, (ii) the upper, first, output line of a second, relatively more lowermost, previous 4×4 concentrator switch, (iii) the second output line of said first previous 4×4 concentrator switch, (iv) the second output line of said second previous 4×4 concentrator switch, (v) the third output line of said first previous 4×4 concentrator switch, (vi) the third output line of said second previous 4×4 concentrator switch, (vii) the lower, fourth, output line of said first previous 4×4 concentrator switch, and (viii) the lower, fourth, output line of said second previous 4×4 concentrator switch.

This same third stage further consists two additional, final, 2×2 concentrator switches connected in parallel. These parallel-connected 2×2 concentrator switches serve to concentrate, in uppermost to lowermost order of their combined four input lines, packets received from (i) the third output line of the upper 4×4 concentrator switch, (ii) the upper, first, output line of the lower 4×4 concentrator switch, (iii) the lower, fourth, output line of the upper 4×4 concentrator switch, and, finally, (iv) the second output line of the lower 4×4 concentrator switch.

Further stages of identical organization ensue until the output lines of a final-stage concentrator switch equal in number the F output channels.

By this structure P active packets as are distributed anywhere among the F input channels are distributed to uppermost P of N output channels.

Notably, this concentrator may be abbreviated and condensed, meaning that it may use less hardware to perform the same function, when P≦N<F. In other words, if it is know that no greater than P of the input channels may at any one time offer up live packets, then the concentration of these live packets may be to P only outlet lines. The abbreviated concentrator includes only so much of each and every of the plurality of hierarchically-series-connected concentrating stages as permits the final-stage concentrator switches to have only P output lines, which P output lines serve as the P output channels and on which P output lines appear the P live packets. In particular, the several hierarchically-series-connected concentrating stages of the abbreviated concentrator are themselves abbreviated and condensed so as to include all of first-stage, and of subsequent stage, concentrator switches up to and including the 2N×2N concentrator stage. However, only F/2N 2N×2N concentrator switches are included in all remaining stages, including the final-stage.

These and other aspects and attributes of the present invention will become increasingly clear upon reference to the following drawings and accompanying specification.

BRIEF DESCRIPTION OF THE DRAWINGS

FIG. 23, consisting of FIGS. 23a and 23b, is a schematic diagram of a switch with grain size K=4; both a 2-D functional representation and its 1-D equivalent are shown.

FIG. 25, consisting of FIG. 25a and FIG. 25b, contains a Table 3.1 listing a summary of symbols and definitions.

Figure 26:
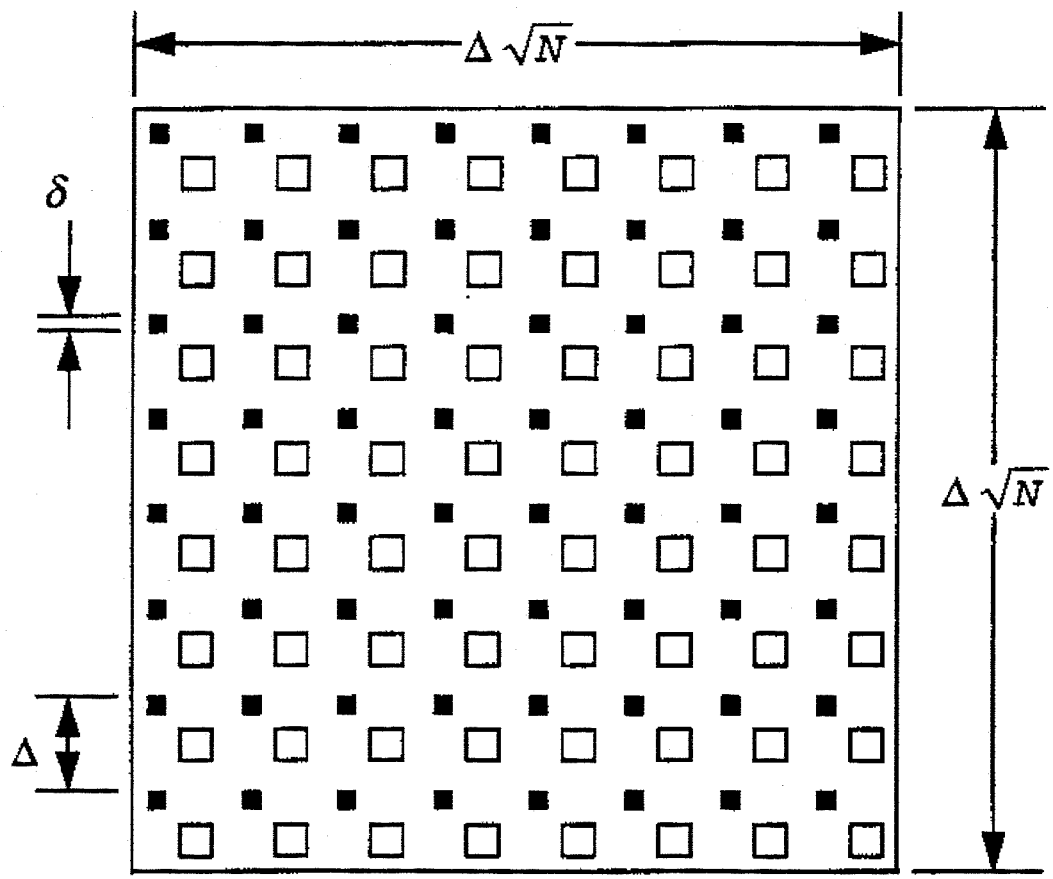

FIG. 26 shows a preferred optoelectronic chip layout for one layer of a 2-D shuffle-exchange network; detectors and modulators are uniformly spaced in the 2-D plane.

Figure 27:
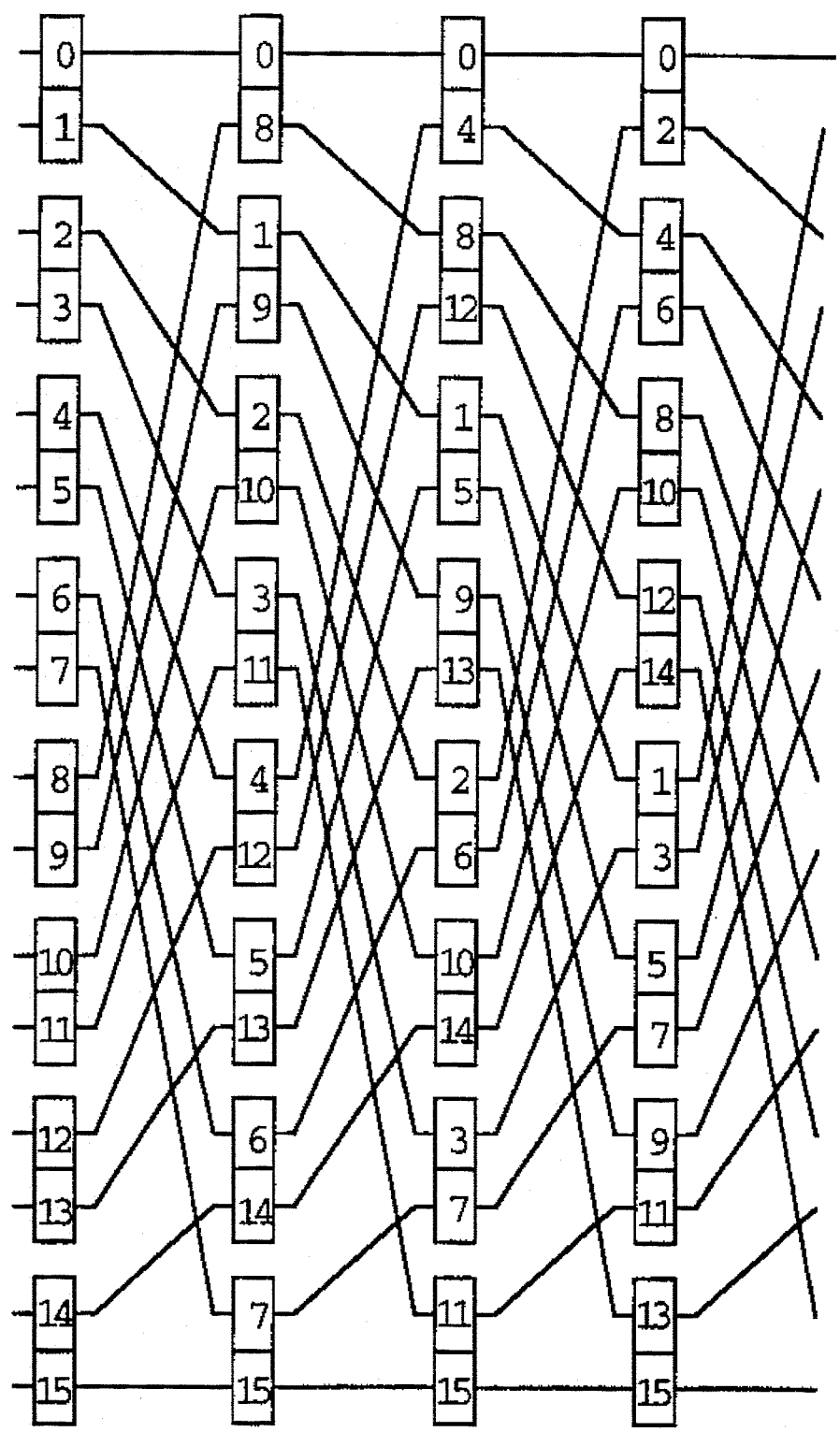

FIG. 27 shows a traditional 1-D 16×16 shuffle-exchange layout; this layout places inputs and outputs on the periphery of the network.

Figure 28:
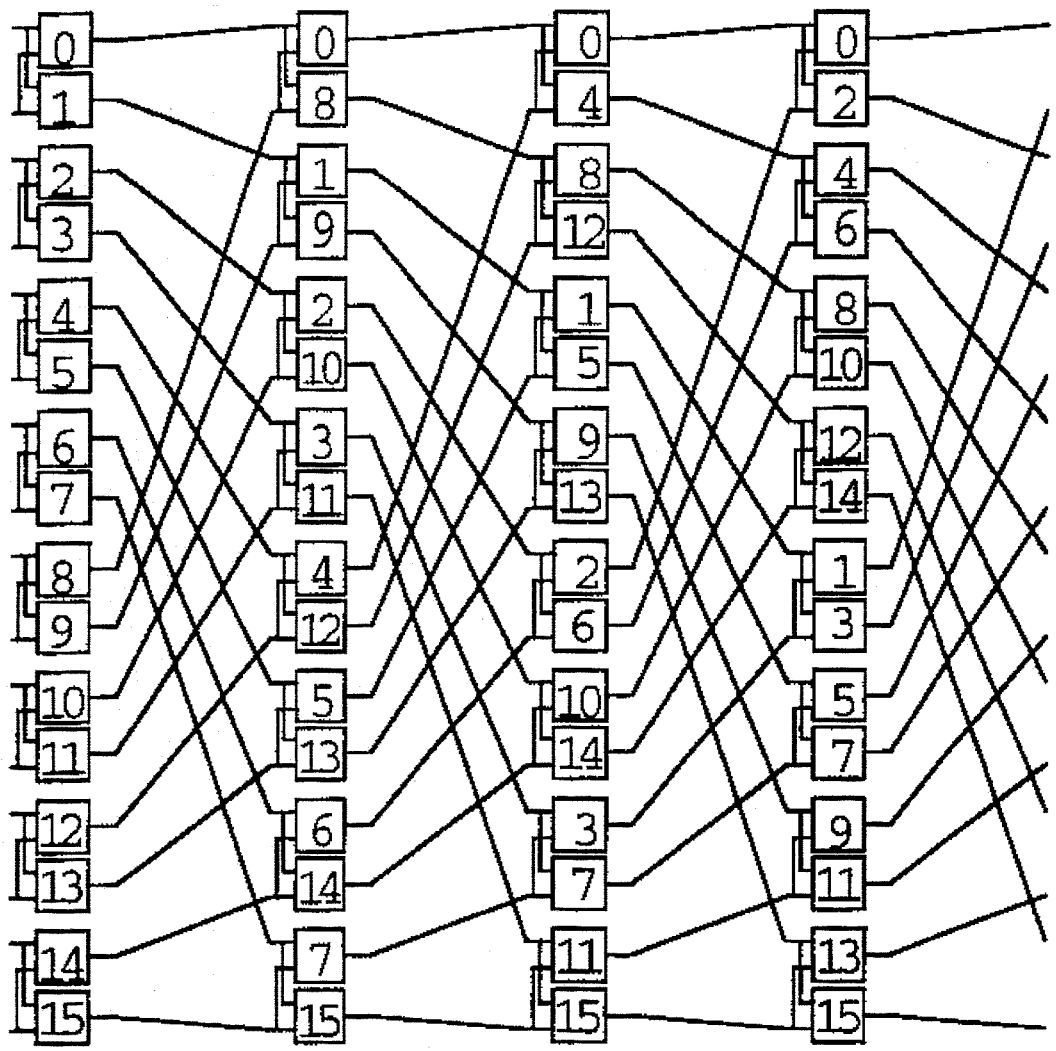

FIG. 28 shows a 16×16 shuffle-exchange network with standard 2×2 switches partitioned into half-switches.

Figure 29:
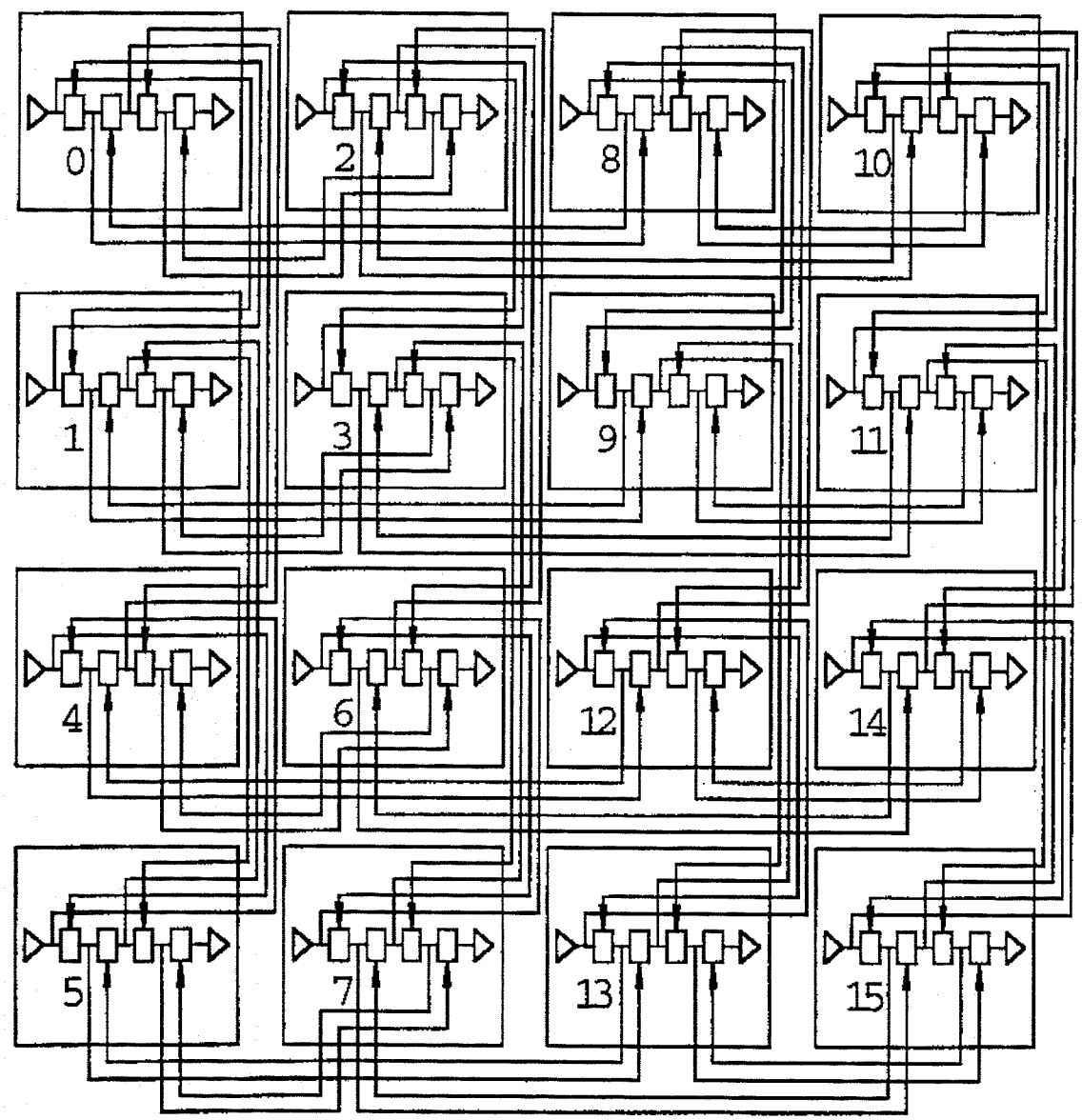

FIG. 29 shows a 2-D layout for the 16×16 shuffle-exchange switch; modulators and detectors are uniformly distributed within the 2-D grain.

Figure 30:
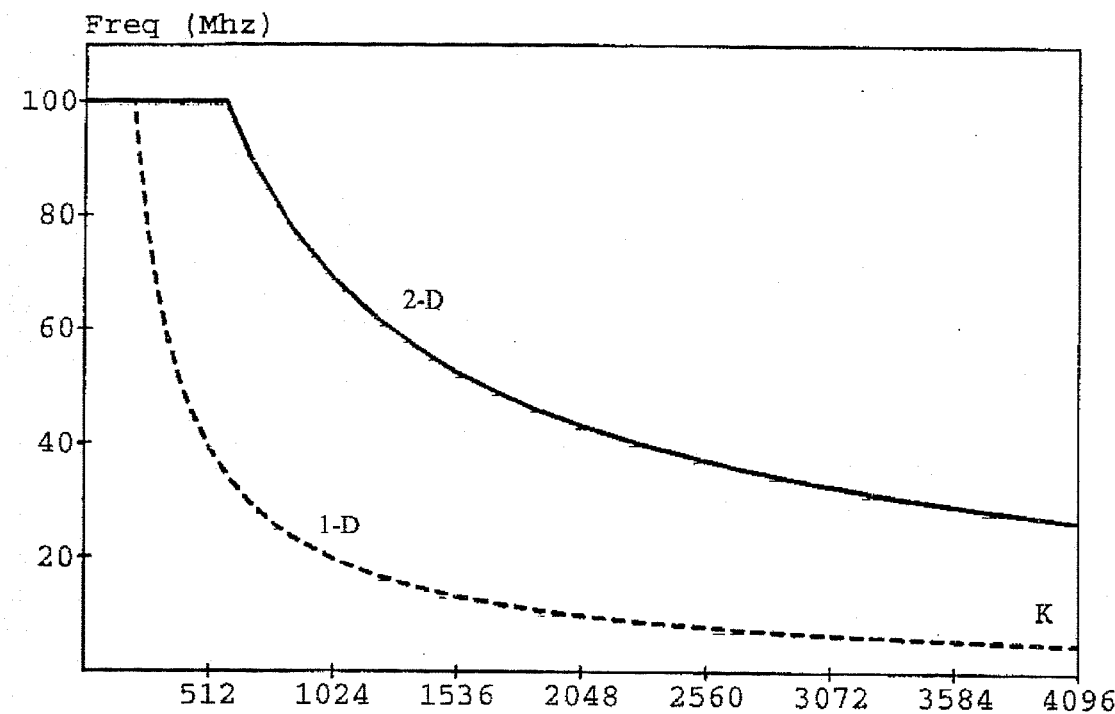

FIG. 30 shows a clock speed comparison of 2-D layout (solid line) with conventional 1-D VLSI layout (dashed line) versus grain size K.

FIG. 31 contains a Table 2 listing VLSI technology parameters.

Figure 32:
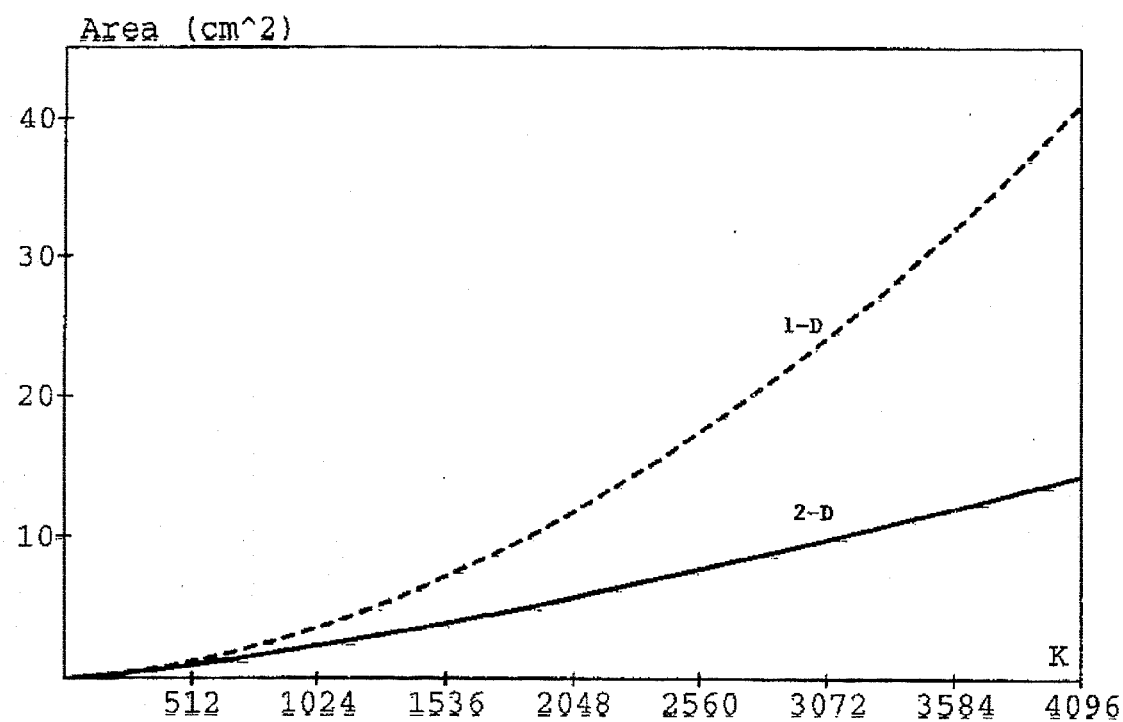

FIG. 32 shows an area comparison of 2-D layout (solid line) with conventional 1-D VLSI layout (dished line) versus grain size K.

Figure 33:
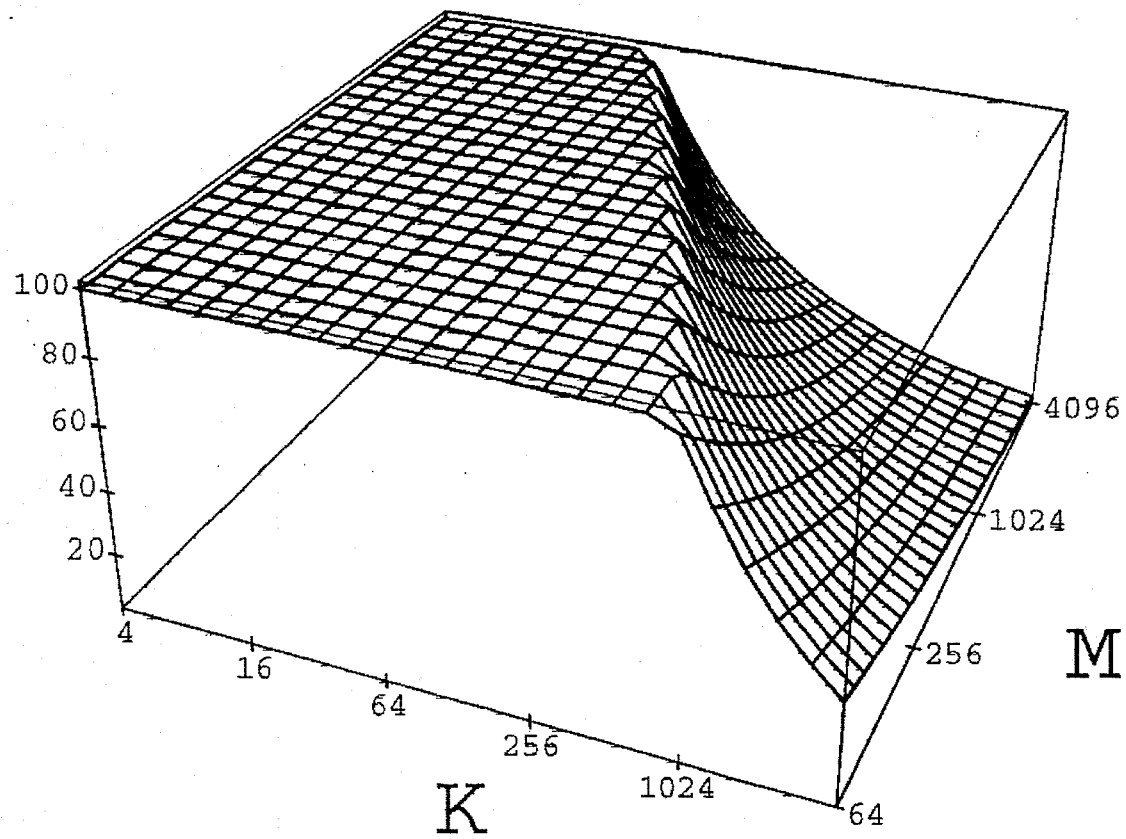

FIG. 33 shows a clock speed of 2-D layout versus device count (M) of 2×2 bypass-exchange switch and grain size K.

Figure 34:
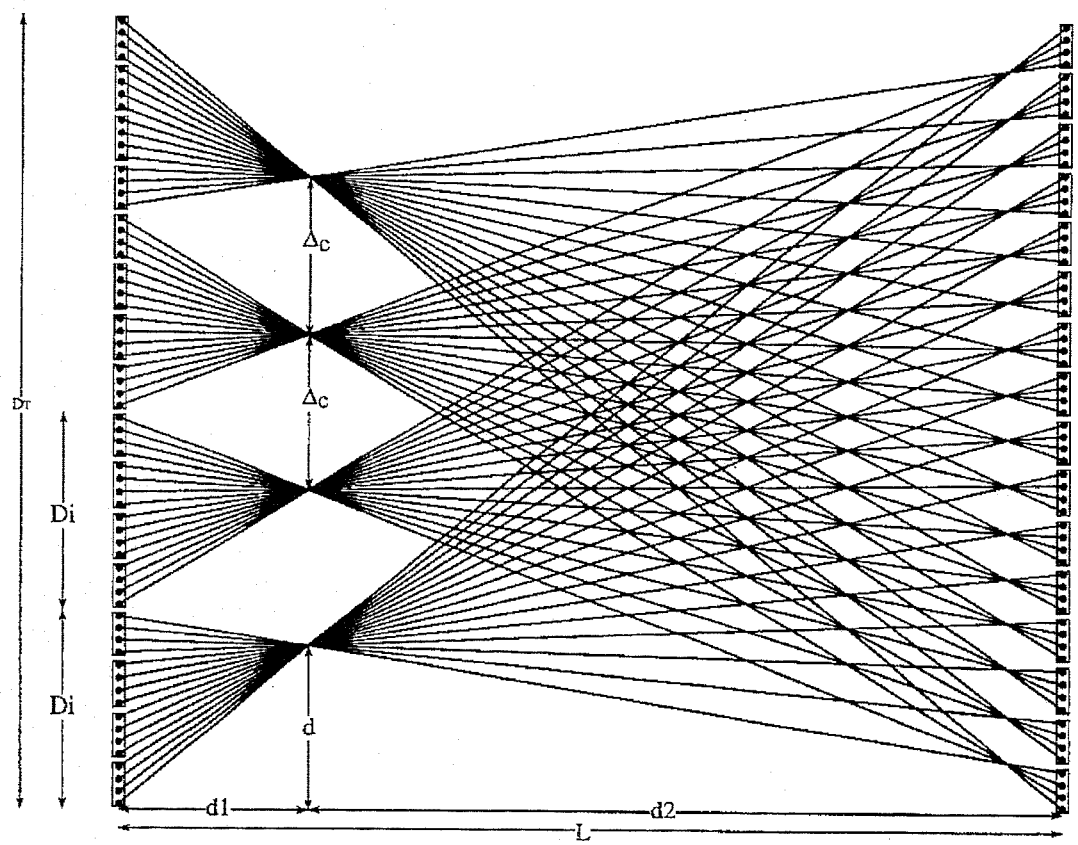

FIG. 34 shows a one dimensional view of a 16-shuffle interconnection with N=4096 and K=16, showing the positions of the centers of the imaging lenses.

Figure 35:
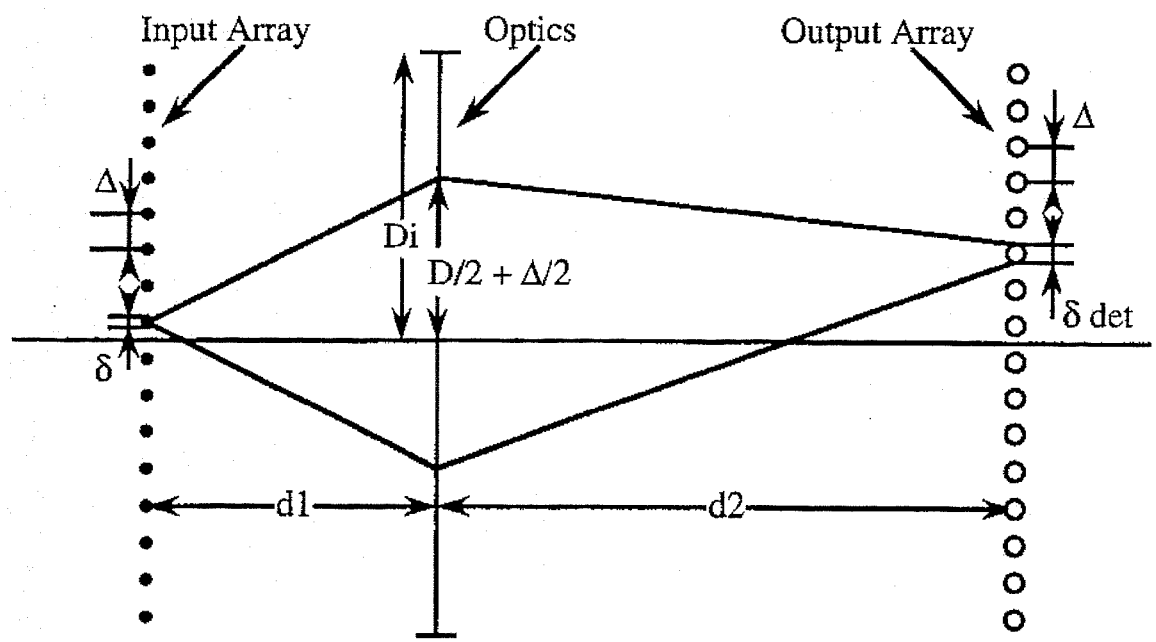

FIG. 35 shows an example of the under-illumination of the dedicated lens of one of the edge modulators.

Figure 36:
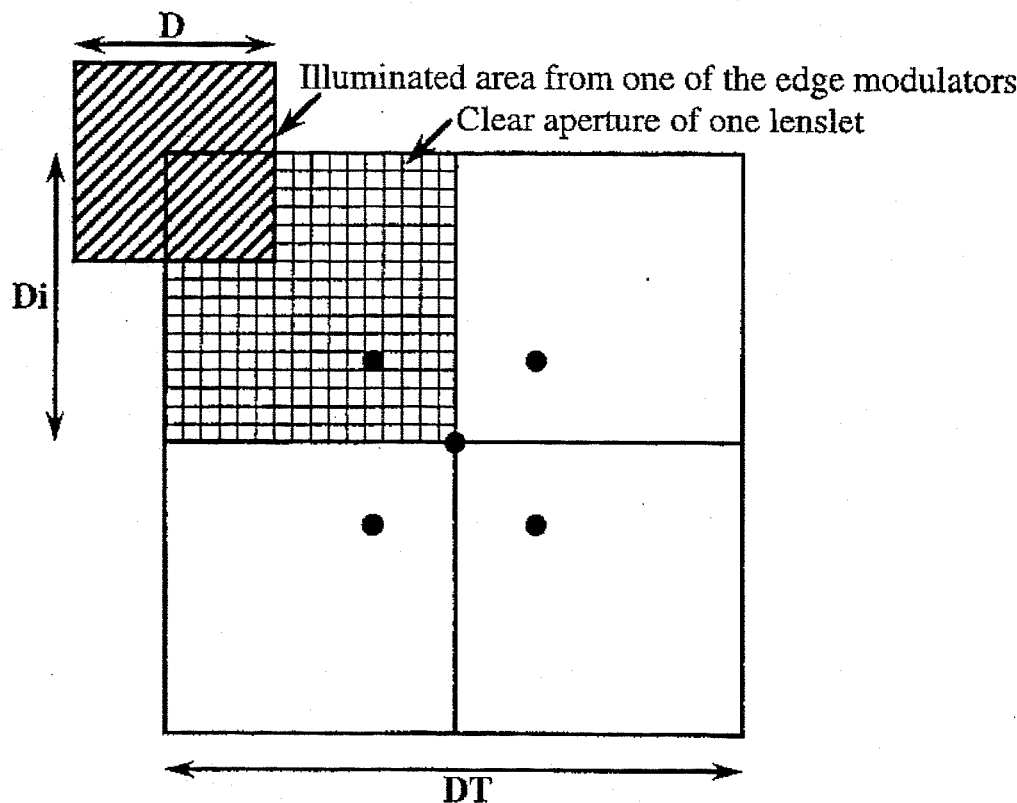

FIG. 36 shows a geometric approximation for determining the worst-case optical efficiency of the 2-D K-shuffle for an edge modulator.

FIG. 37 contains a Table 3 listing Optoelectronic technology parameters.

FIG. 38, consisting of FIGS. 38a–38d, respectively shows the system power, system bandwidth, system area, and system volume versus grain size K, and system size N; each graph being valid for integer values of N, K when $N=2^{(K/2)i}$ for i=1,2,3, . . .

Figure 39A:
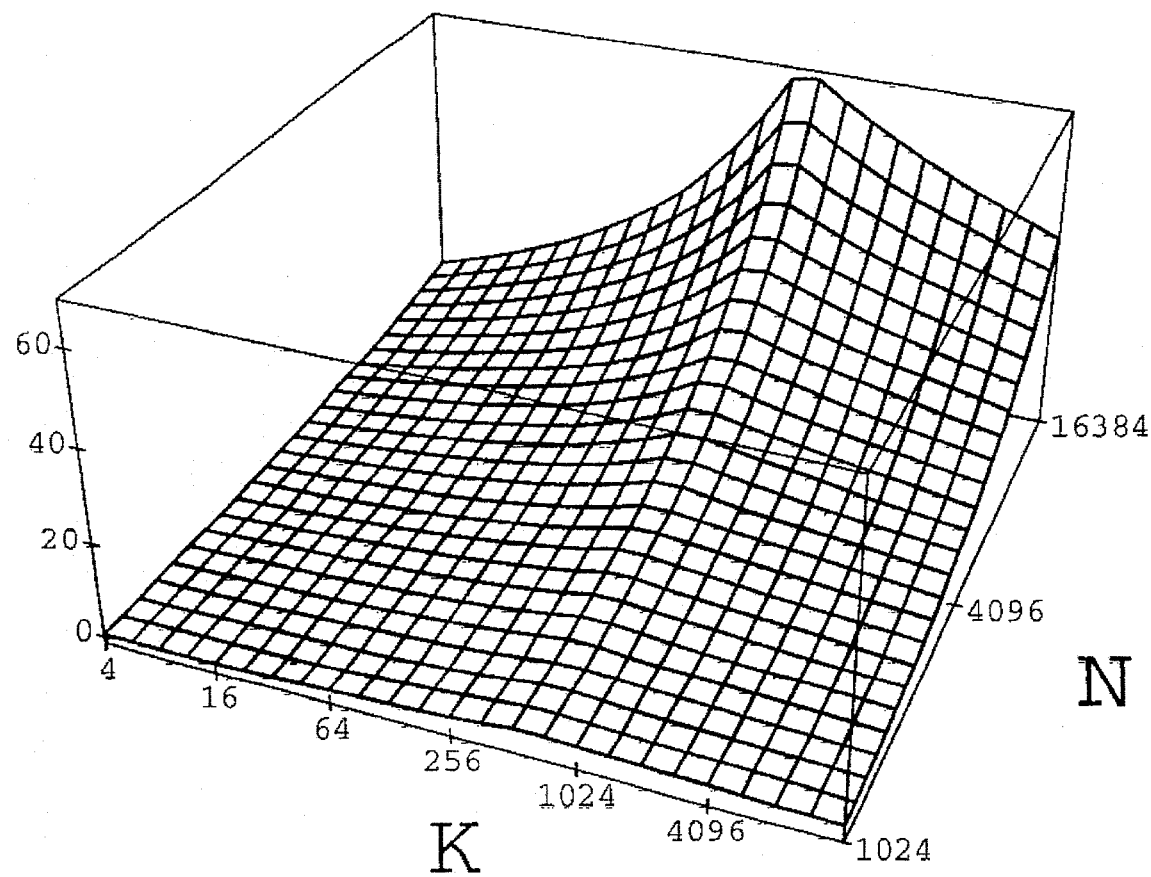

FIG. 39a shows the electrical power per stage (Watts) versus grain size K, and system size N.

Figure 39B:
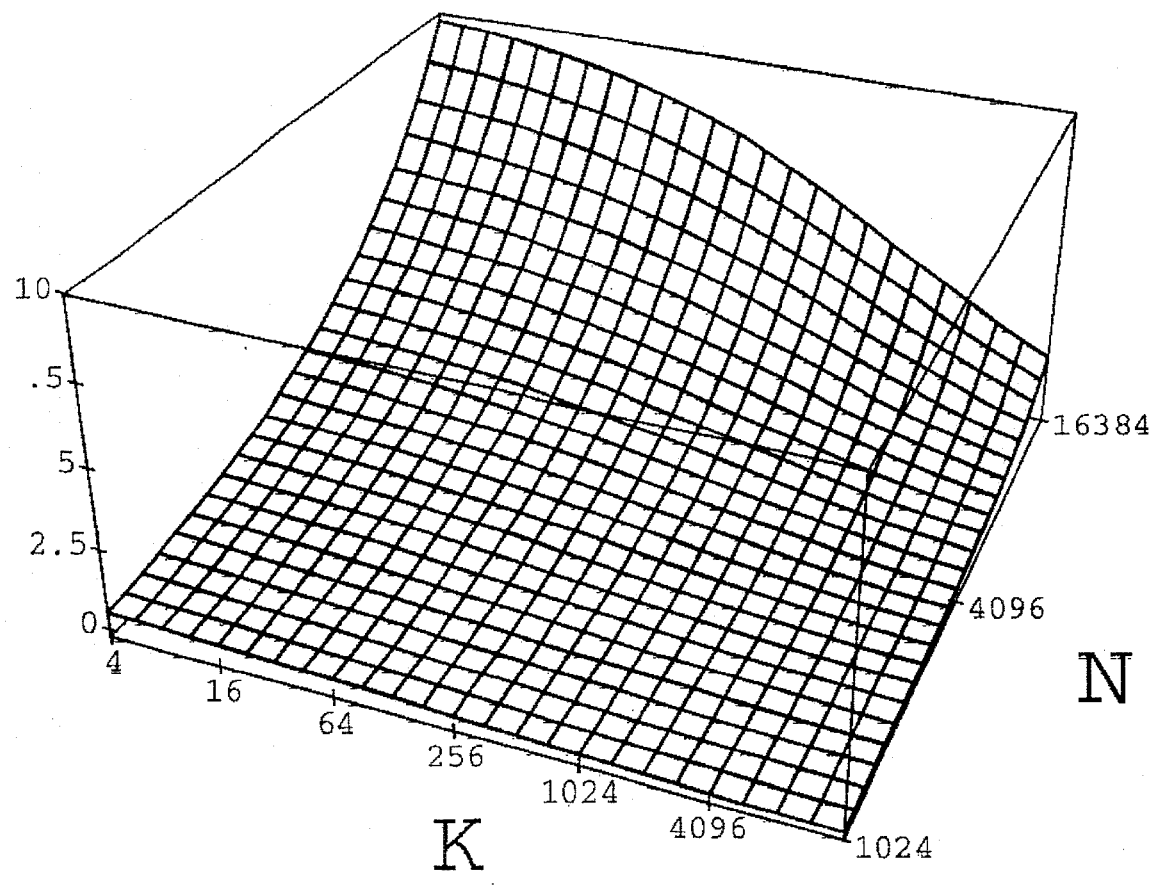

FIG. 39b shows the optical power per stage (Watts) versus grain size K and system size N.

Figure 39C:
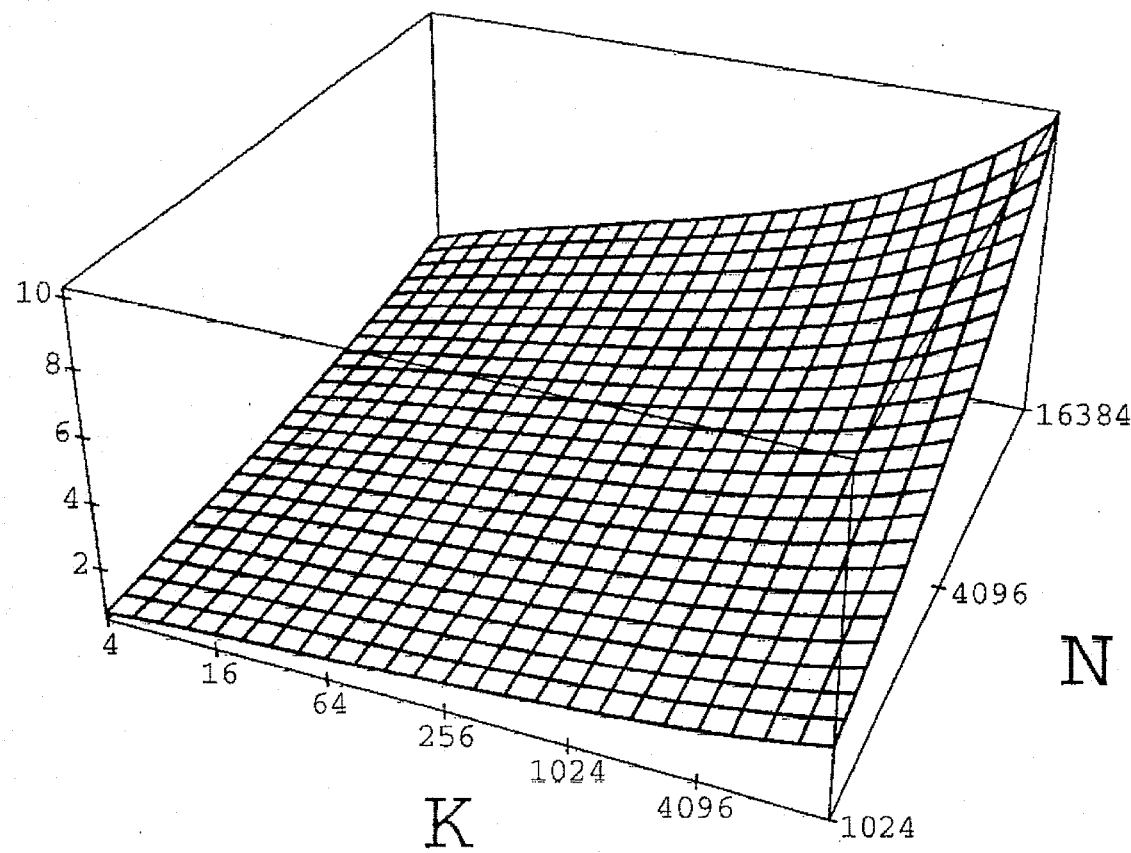

FIG. 39c shows the width of optoelectronic chip (cm) versus grain size K, and system size N.

Figure 39D:
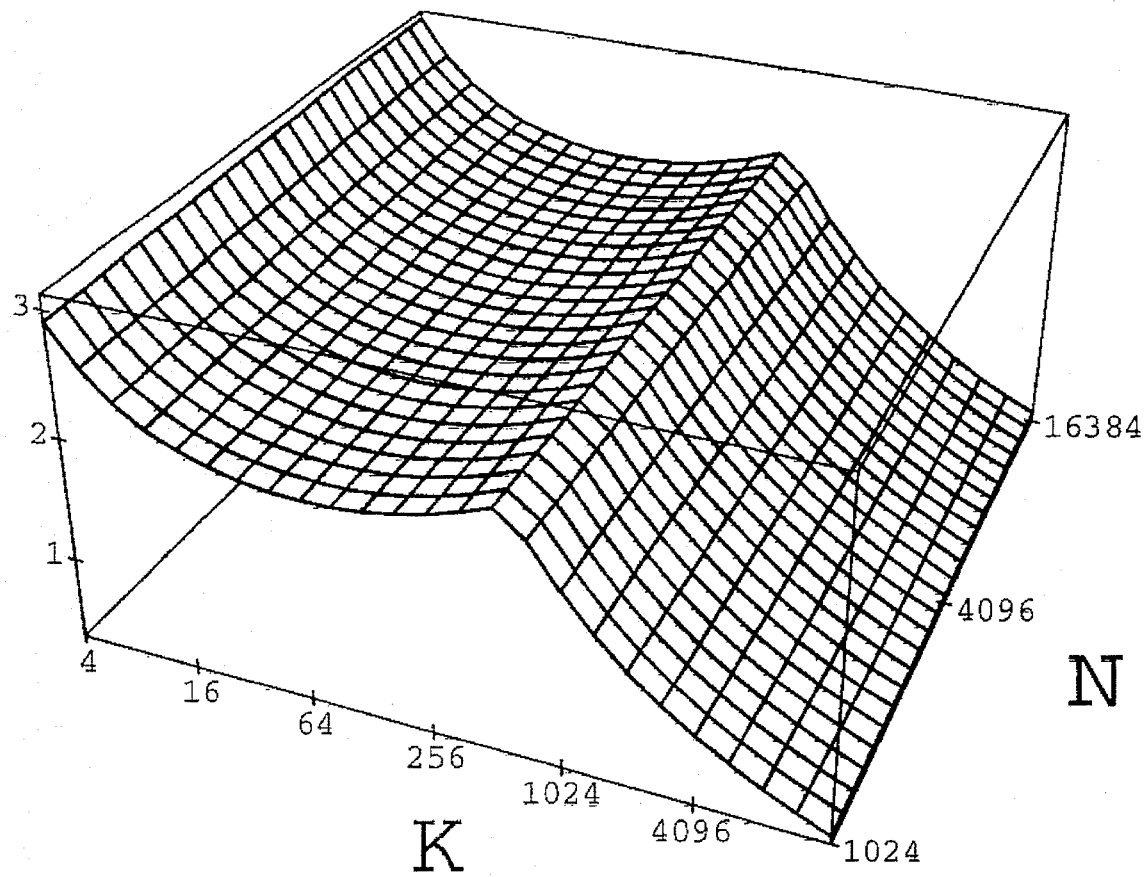

FIG. 39d shows the on-chip power density (Watts/cm$^2$) versus grain size K, and system size N.

Figure 40A:
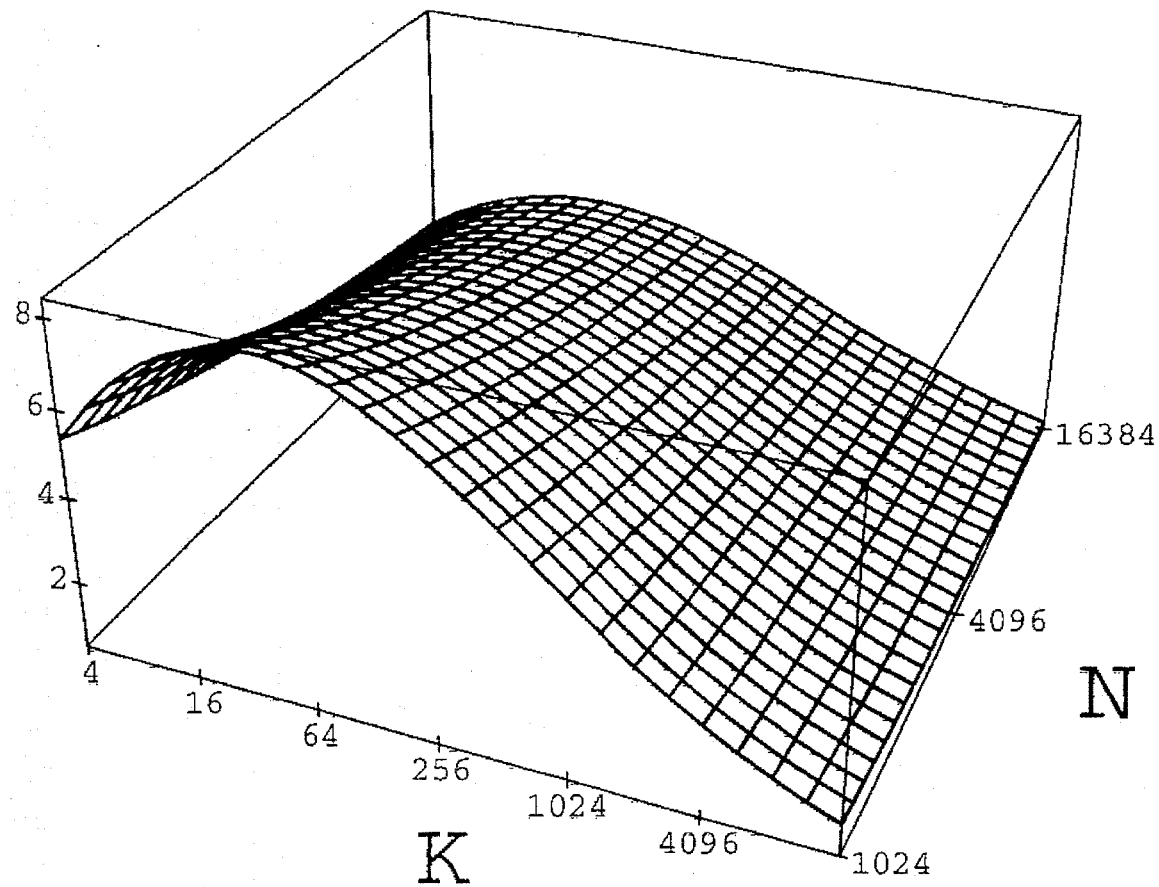

FIG. 40a shows the bandwidth/Power (Gbit/sec/Watt) versus grain size K, and system size N.

Figure 40B:
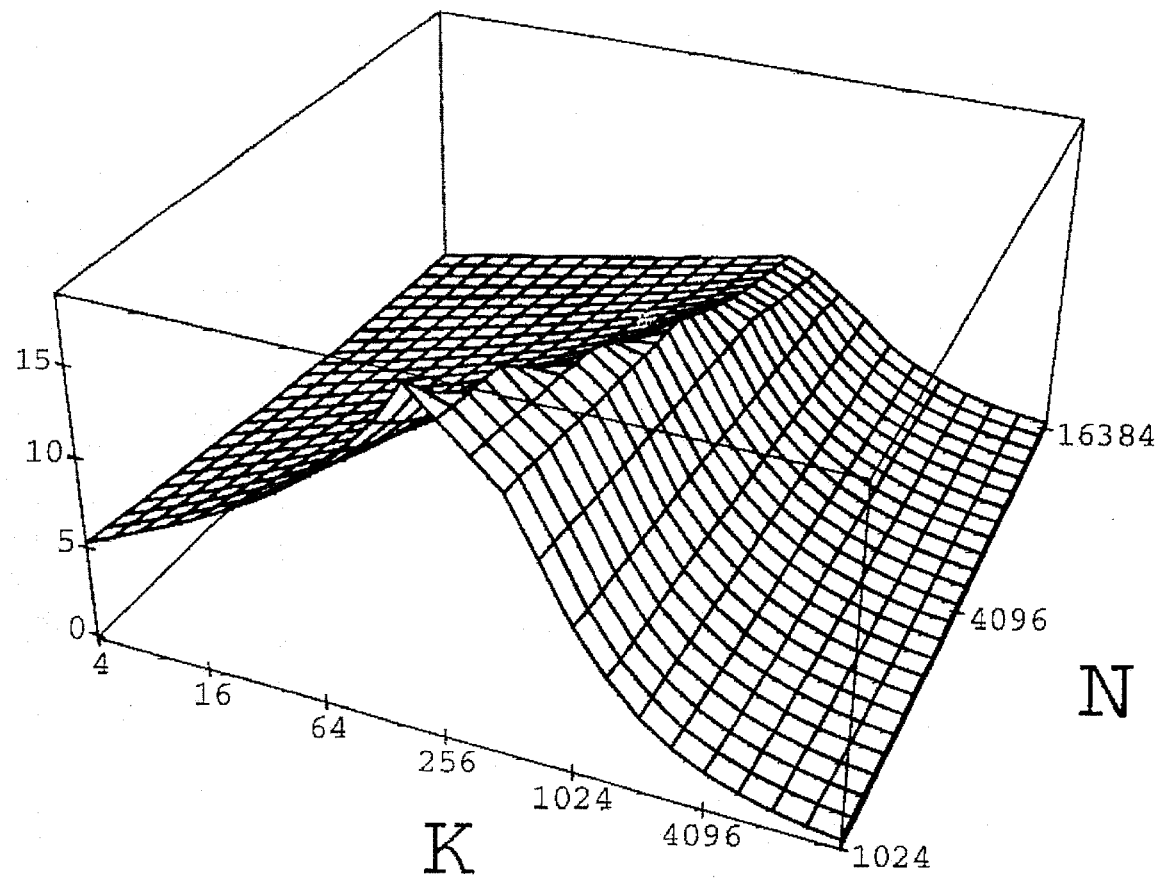

FIG. 40b shows the bandwidth/Area (Gbit/sec/cm$^2$) versus grain size K, and system size N.

FIG. 41, consisting of FIG. 41a and FIG. 41b, contains a Table 4 showing the results of basic grain size optimization study.

Figure 42A:
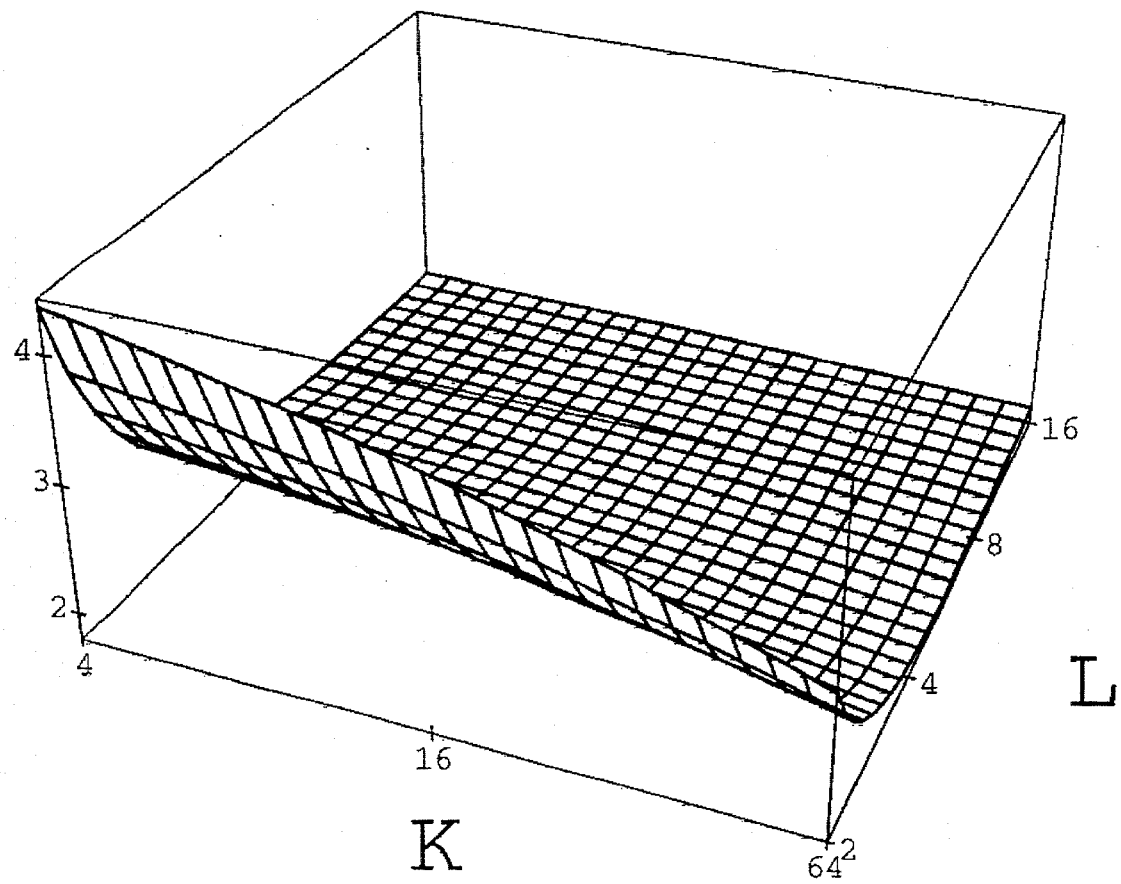

FIG. 42a shows the optical power per stage (Watts) versus number of hologram phase levels L and grain size K.

Figure 42B:
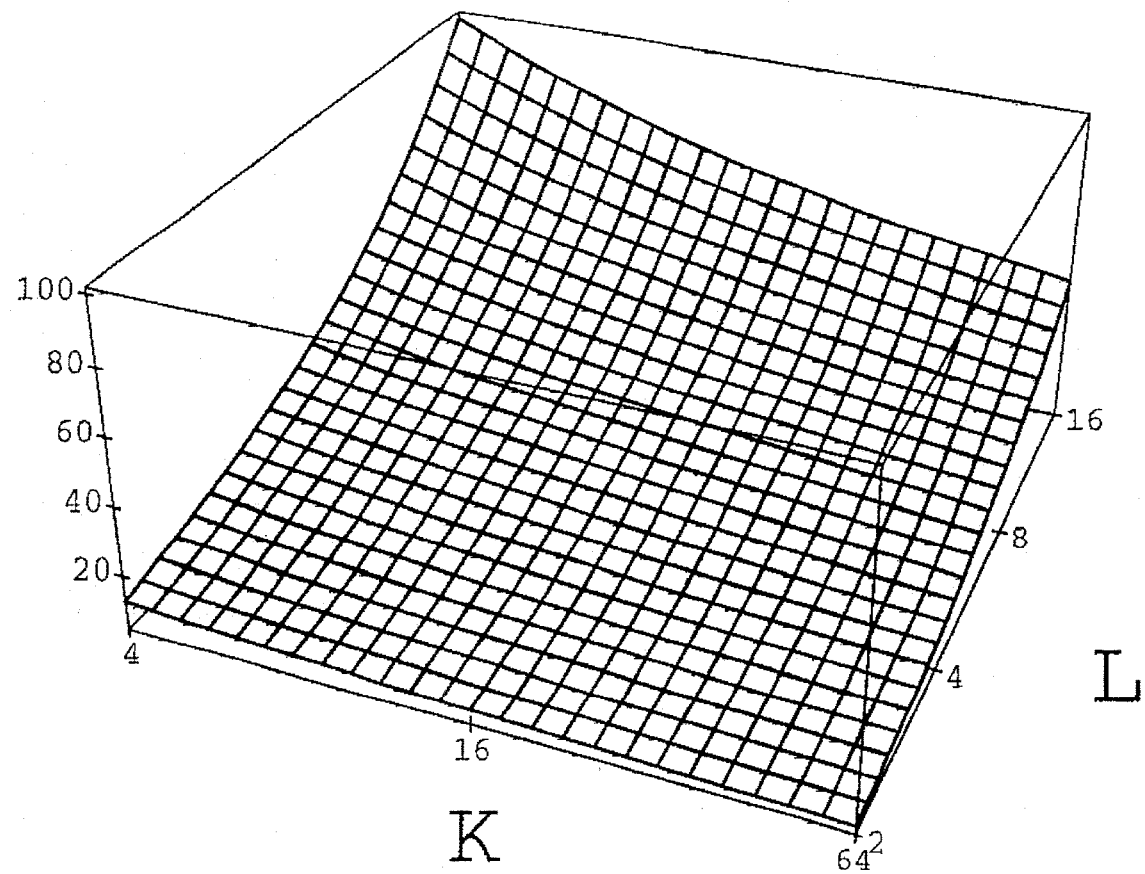

FIG. 42b shows the system area (cm$^2$) versus number of hologram phase levels L, and grain size K.

Figure 43A:
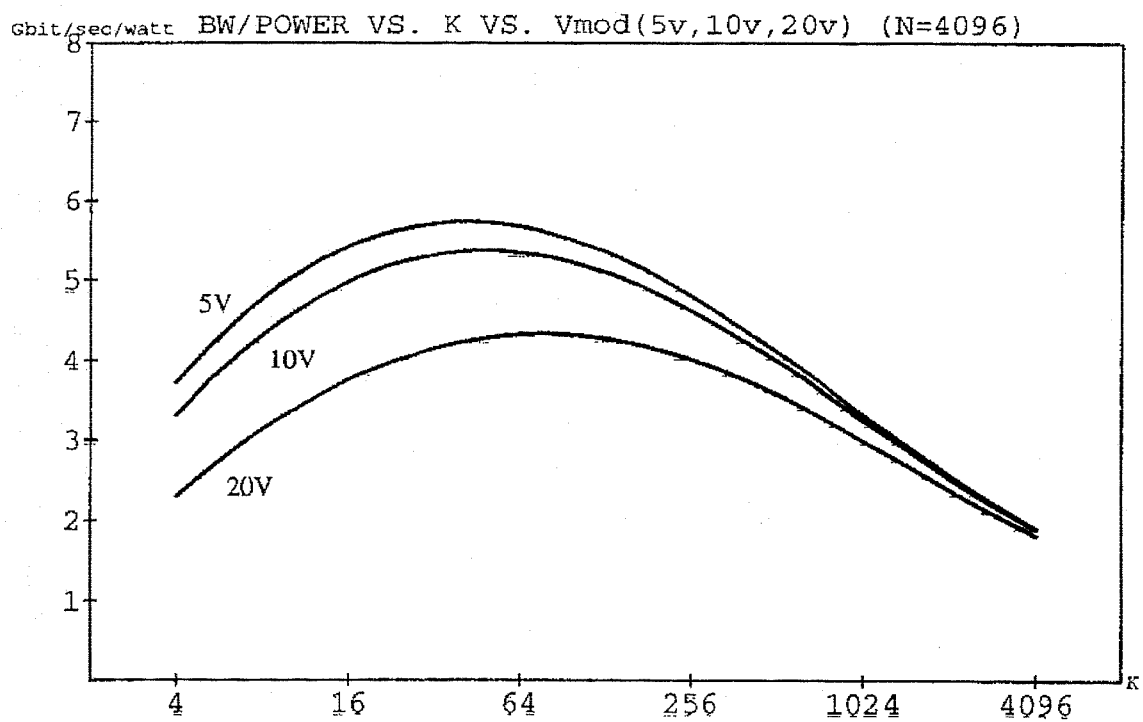

FIG. 43a shows the bandwidth/Power (Gbit/sec/Watt) versus grain size K, for various modulator driving voltages (N=4096 channels).

Figure 43B:
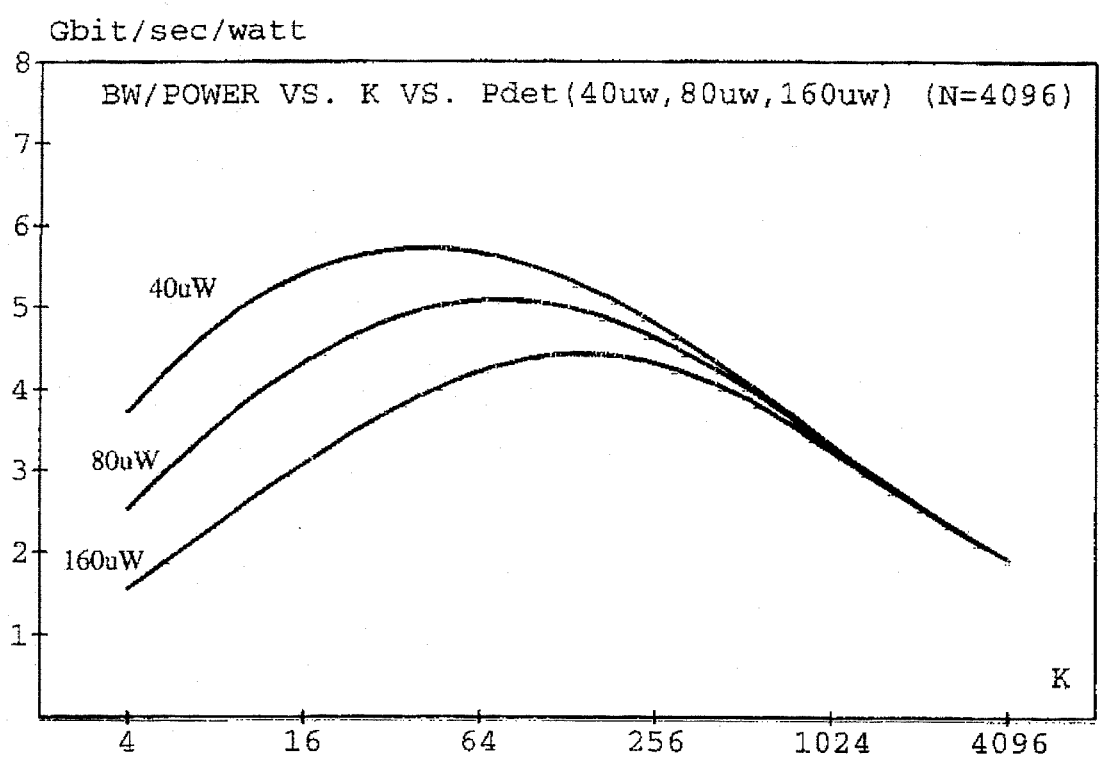

FIG. 43b shows the bandwidth/Power (Gbit/sec/Watt) versus grain size K, for various detector powers (N=4096 channels).

Figure 43C:
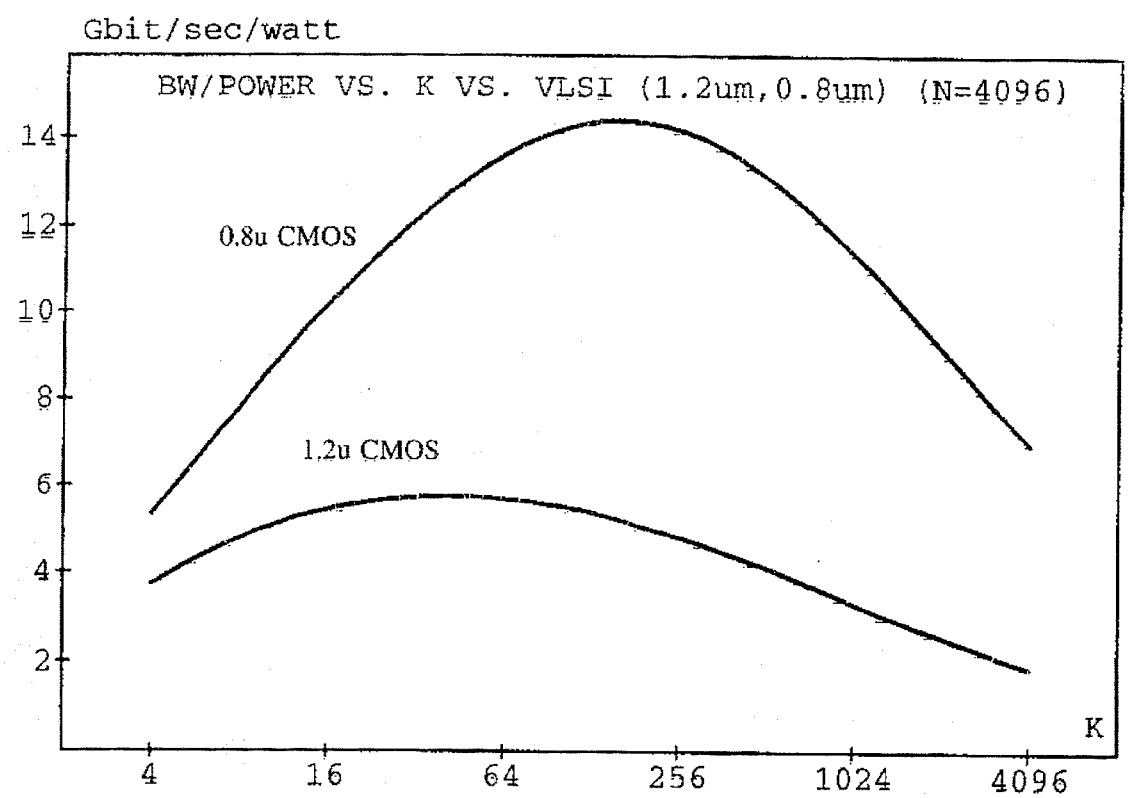

FIG. 43c shows the bandwidth/Power (GBit/sec/Watt) versus grain size K, for different VLSI minimum feature sizes (N=4096 channels).

Figure 43D:
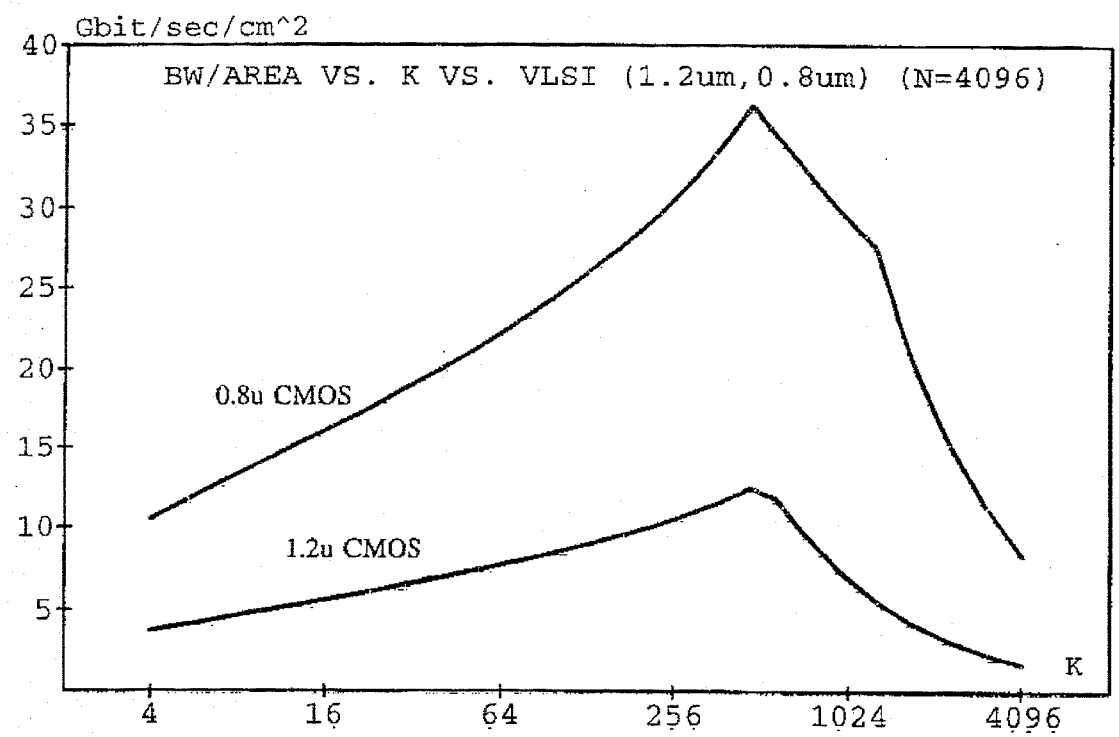

FIG. 43d shows the bandwidth/Area (GBit/sec/cm$^2$) versus grain size K for different VLSI minimum feature sizes (N=4096 channels).

Figure 44:
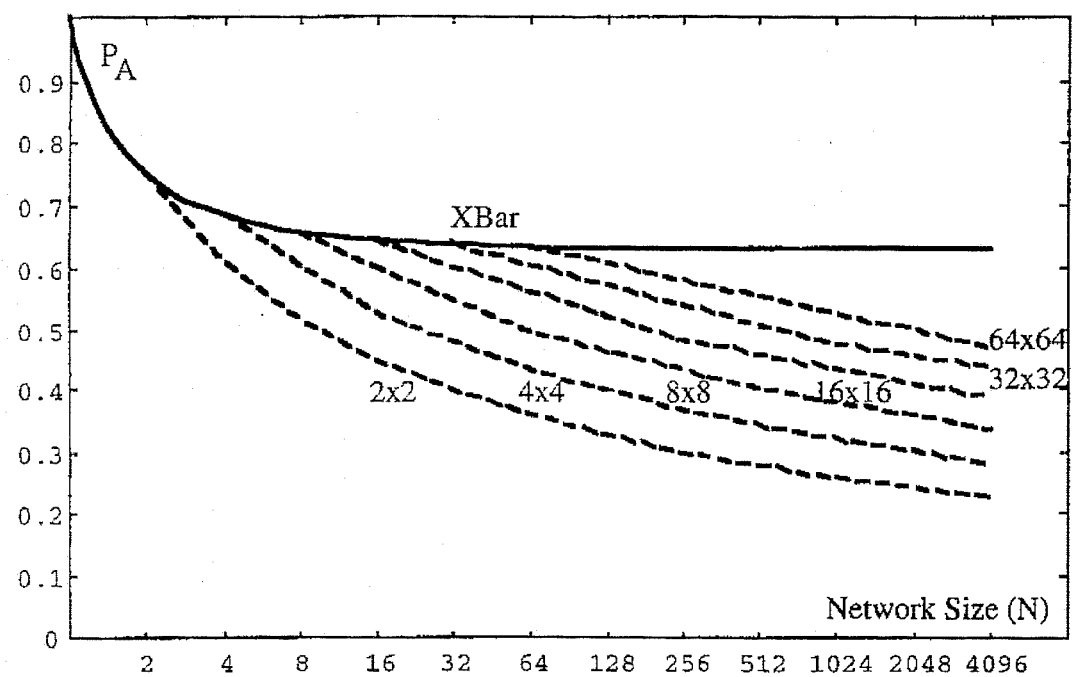

FIG. 44 shows the behavior of the probability of acceptance versus network size, for various values of K.

Figure 45:
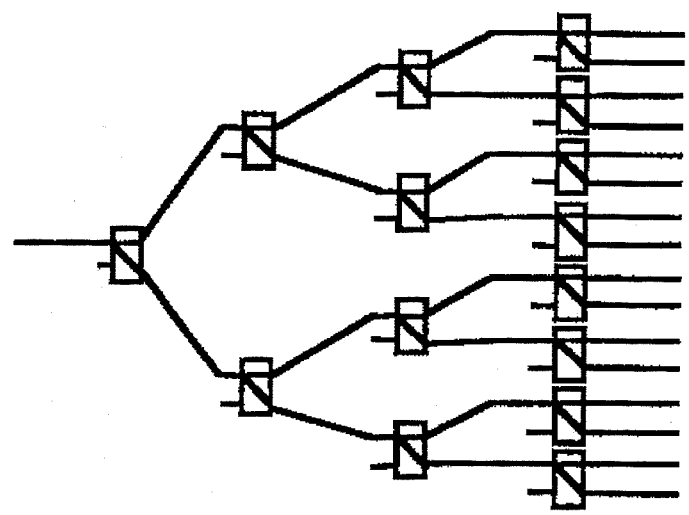

FIG. 45 shows the design of a fanout tree using 2×2 switches.

Figure 46:
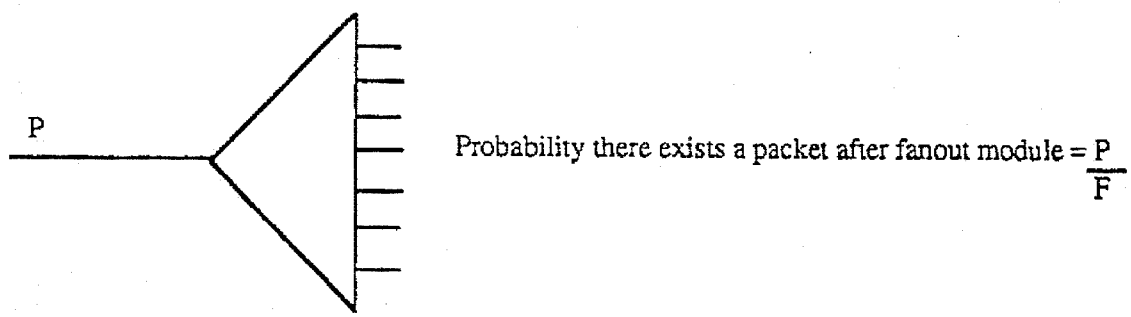

FIG. 46 shows a model of a fanout module under the random traffic assumption.

Figure 47:
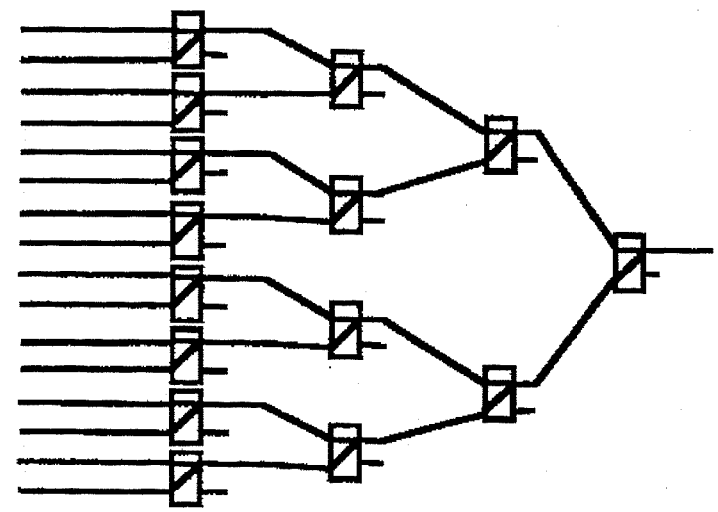

FIG. 47 shows the design of a fanin tree using 2×2 switches.

Figure 48:
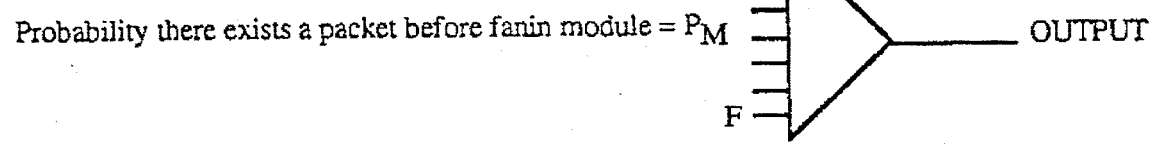

FIG. 48 shows a model of a fanin module under the random traffic assumption.

Figure 49:
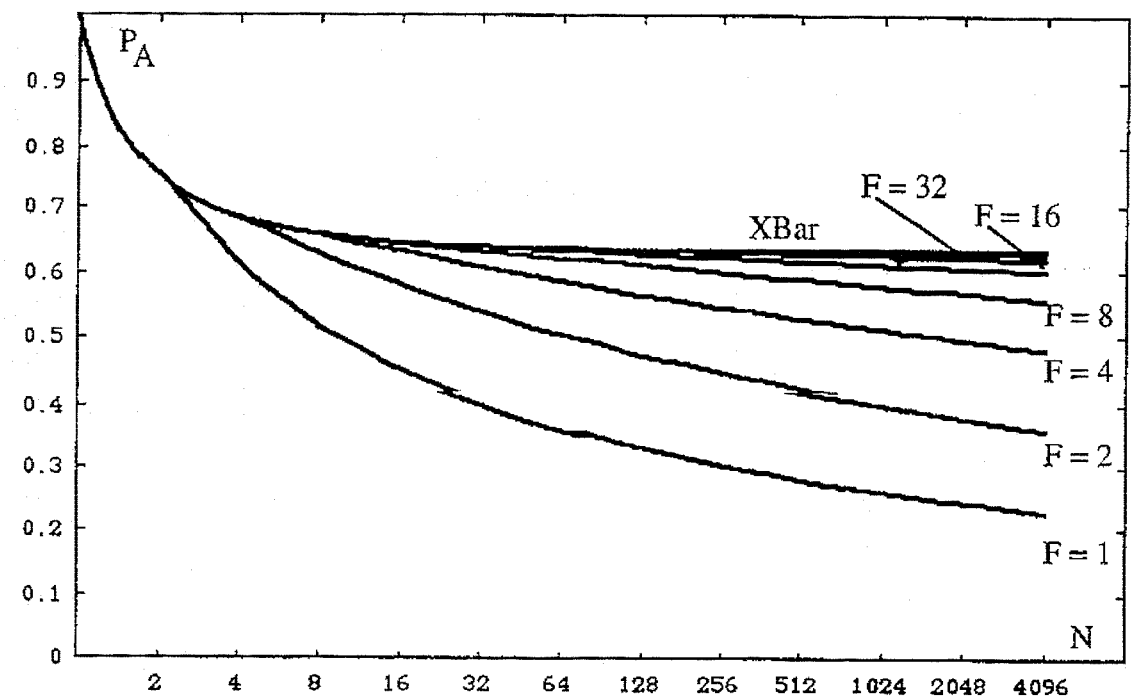

FIG. 49 is a graph showing the probability of acceptance of a un-buffered [N,N,F] networks versus N.

Figure 50A:
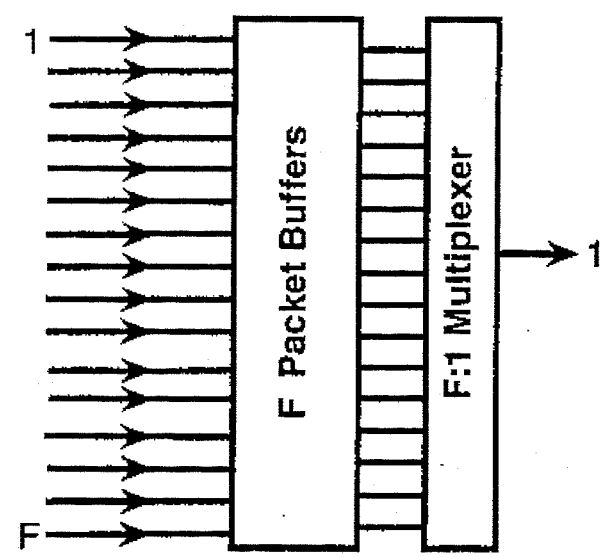

FIG. 50a shows the design of a fanin module with F packet buffers.

Figure 50B:
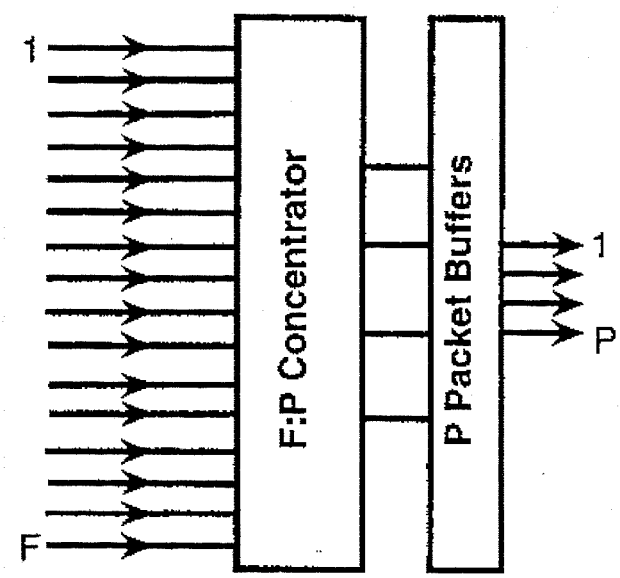

FIG. 50b shows the design of a concentrator fanin module with P≦F packet buffers.

Figure 51:
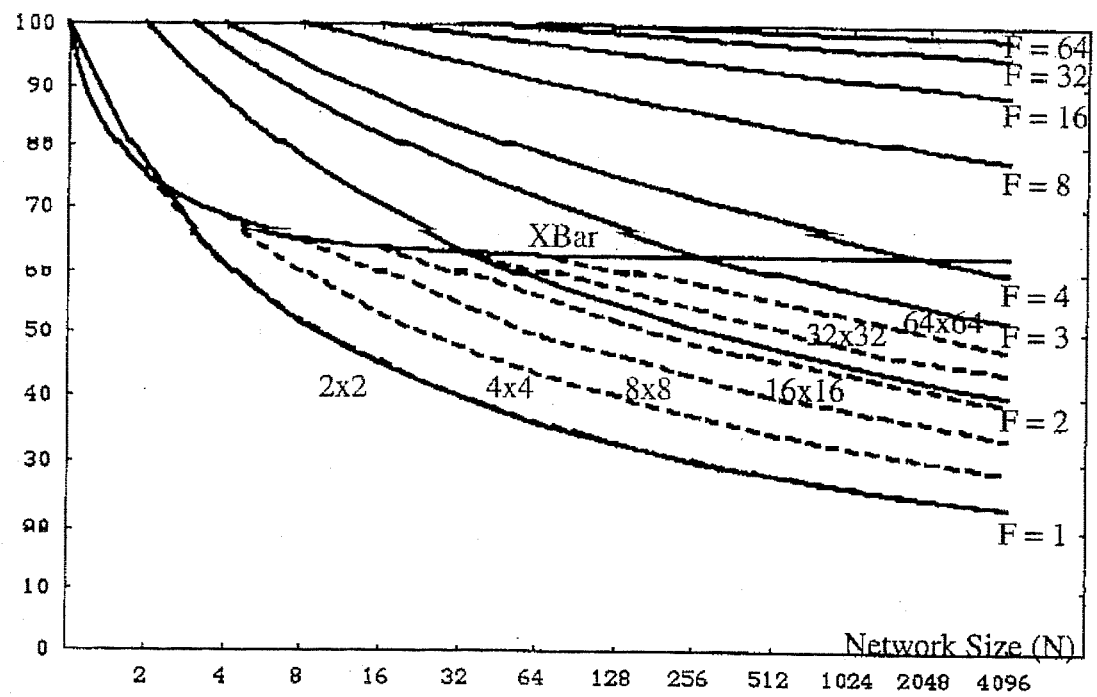

FIG. 51 shows the percentage of routed traffic of [N,M.F] networks versus network size for several different [N,N,F] networks —i.e., for F=1,2,3,4,8,16,32 and 64—with multiple-accepting modules; results for a crossbar and for K×K MIN's are also shown for comparison.

Figure 52:
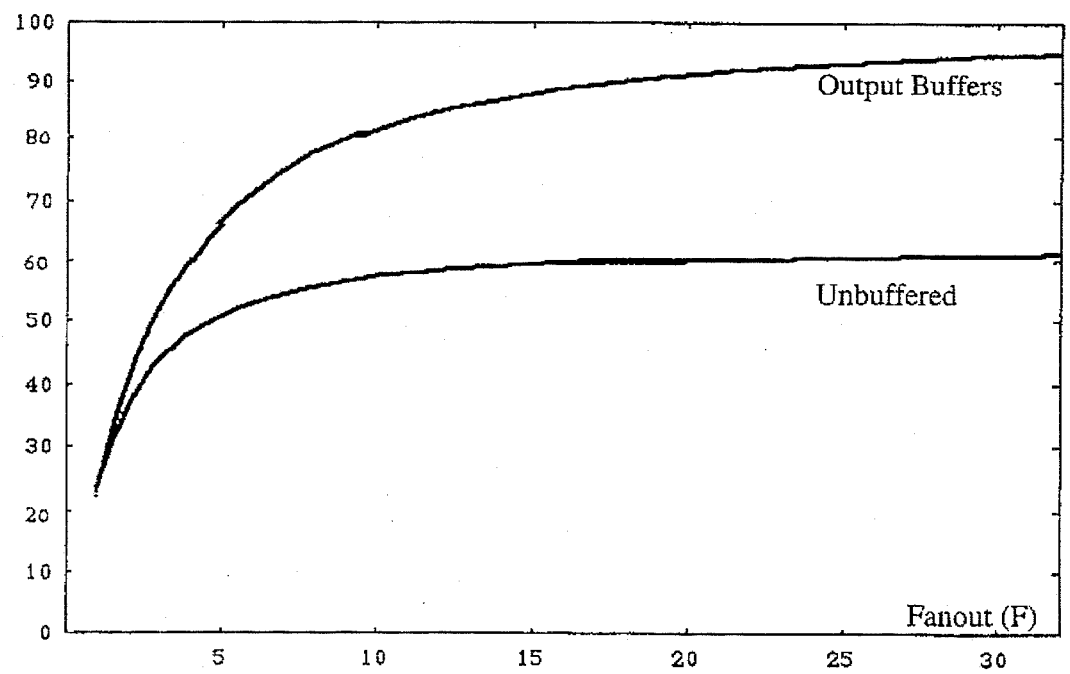

FIG. 52 is a graph showing the percentage of routed traffic of an un-buffered [4096,4096,F] network with single-accepting and multiple-accepting modules, versus the fanout F.

Figure 53:
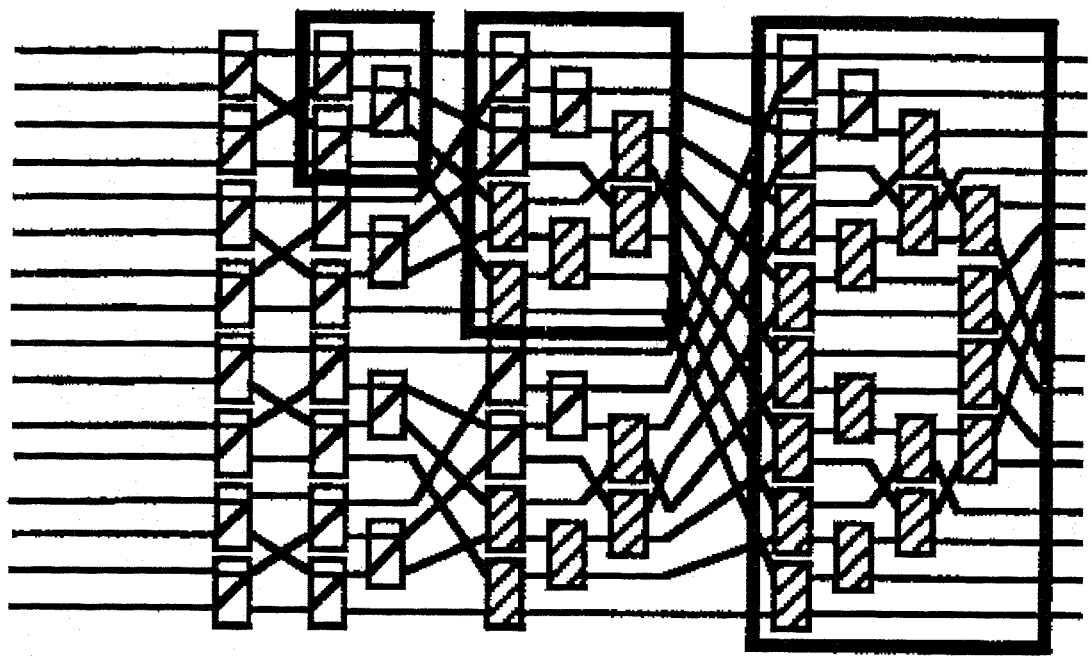

FIG. 53 shows the design of the concentrator fanin module using 2×2 switches for P=F=16; when P=2 the shaded boxes can be omitted.

Figure 54:
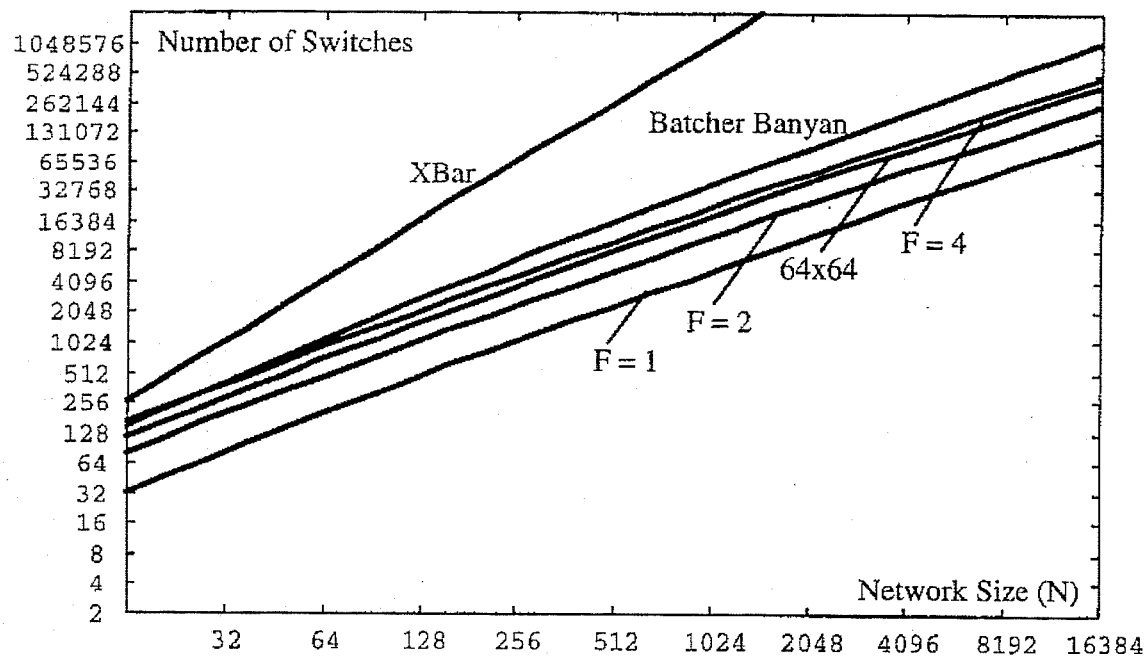

FIG. 54 is a graph showing the total number of switches versus network size N for [N,N,F] networks with F=1,2 and 4; the corresponding curves for a crossbar network, for a K×K MIN with K=64, and for a Batcher-Banyan network are also shown for comparison.

Figure 55:
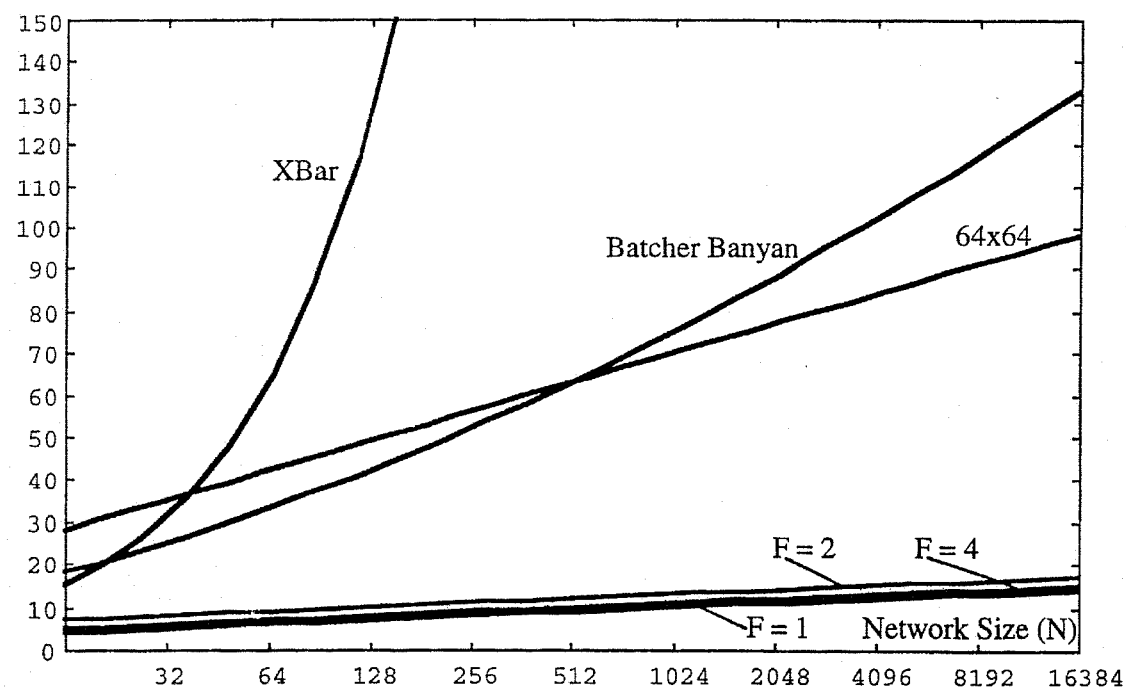

FIG. 55 is a graph showing the delays of various networks having differing numbers of stages versus N (F=1,2 and 4); the corresponding curves for a crossbar network, for a K×K MIN with K=64, and for a Batcher-Banyan network are also shown for comparison; the [N,N,F] network has a much lower delay than the other architectures for large N!

Figure 56:
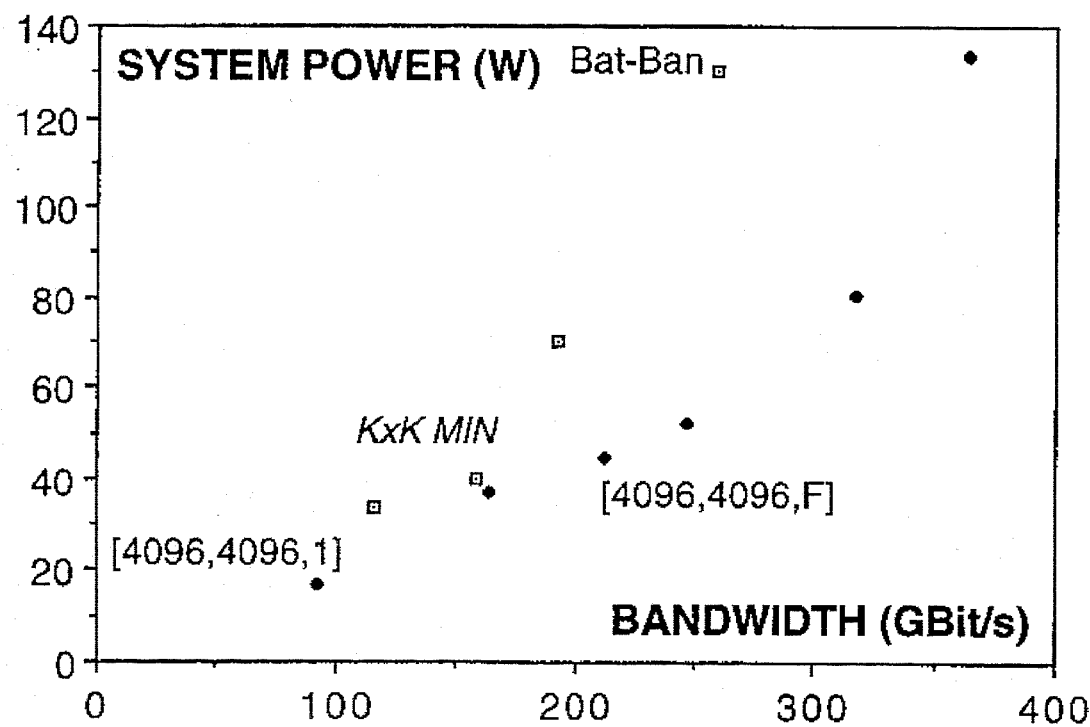

FIG. 56 is a graph showing the power-bandwidth relationship of a 4096 size [N,M.F] network of the present invention (F= 1,2,3,4,8 and 16); the corresponding points for a K×K MIN with K=64, and for a Batcher-Banyan network, are also shown for comparison.

Figure 57:
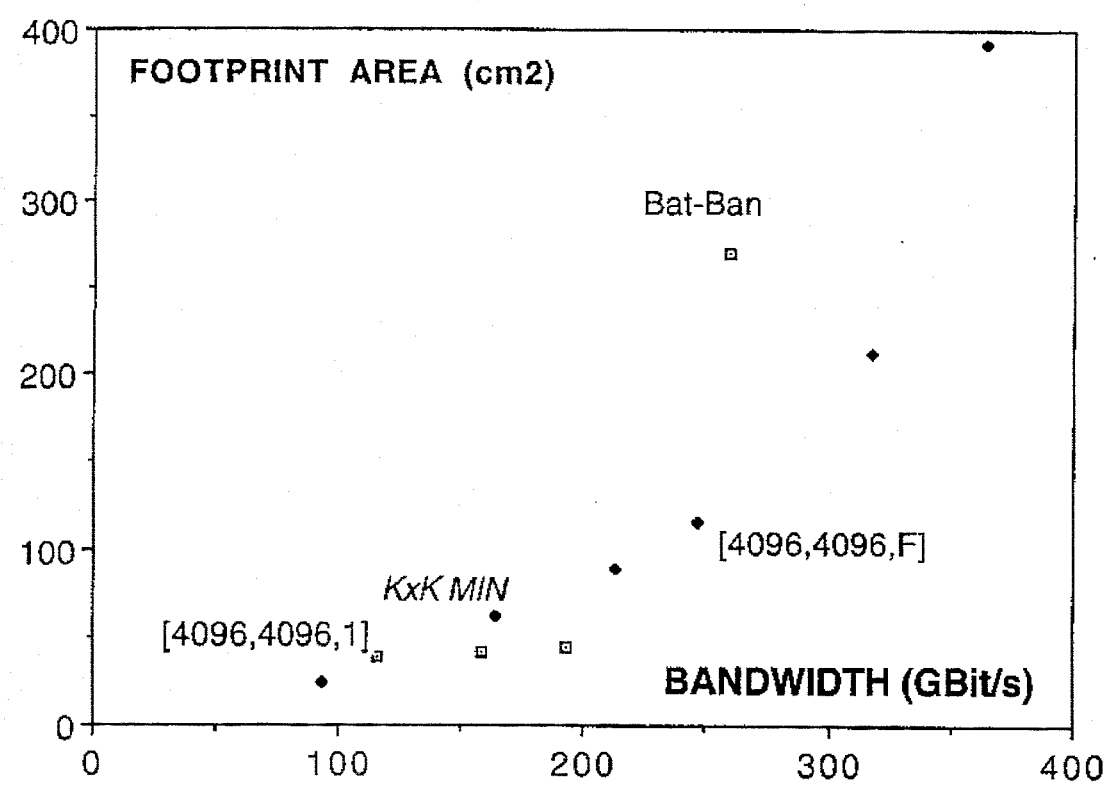

FIG. 57 is a graph showing the area-bandwidth relationship of a 4096 size [N,M.F] network of the present invention (F=1,2,3,4,8 and 16); the corresponding points for a K×K MIN with K=64, and for a Batcher-Banyan network, are also shown for comparison.

Figure 58:
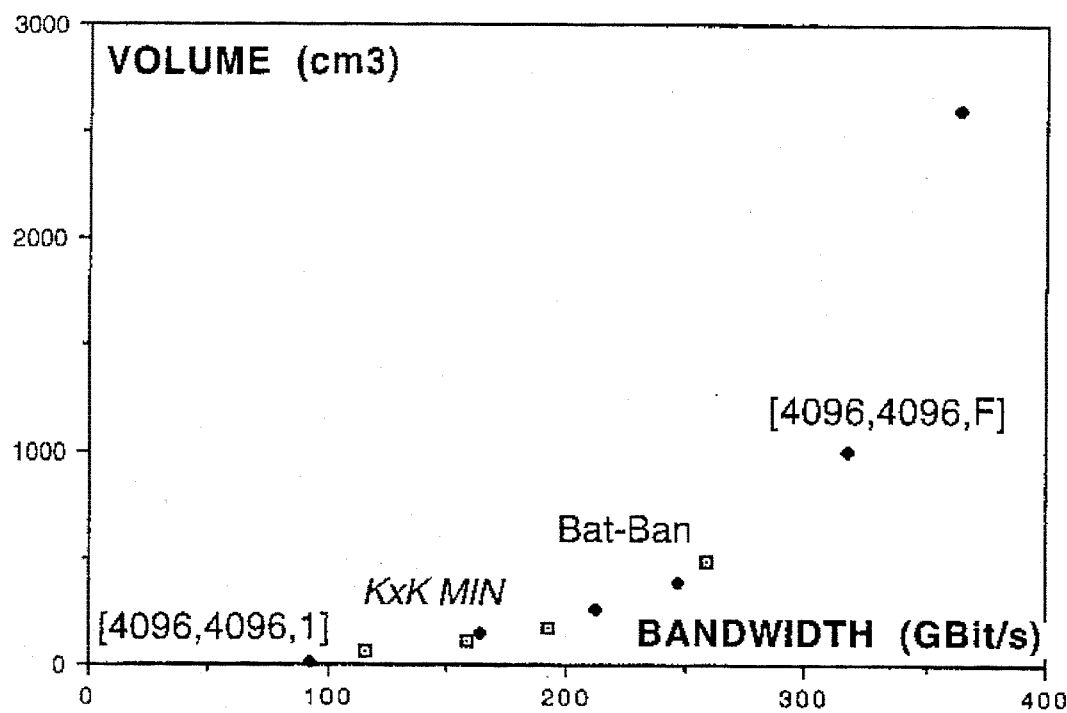

FIG. 58 is a graph showing the volume-bandwidth relationship of a 4096 size [N,M.F ] network of the present invention (F=1,2,3,4,8 and 16); the corresponding points for a K×K MIN with K=64, and for a Batcher-Banyan network, are also shown for comparison.

Figure 59A:
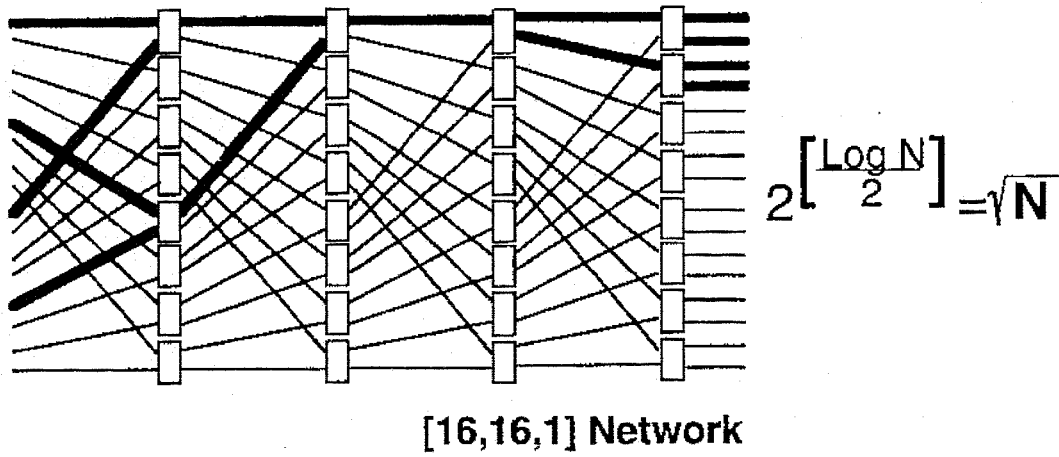

FIG. 59a is a representation of the worst-case bandwidth for a standard [16,16,1] routing network in accordance with the present invention; $O(2^{Log[N]/2})=O(\sqrt{N})$ packets must traverse each link for the transpose permutation (shown in bold).

Figure 59B:
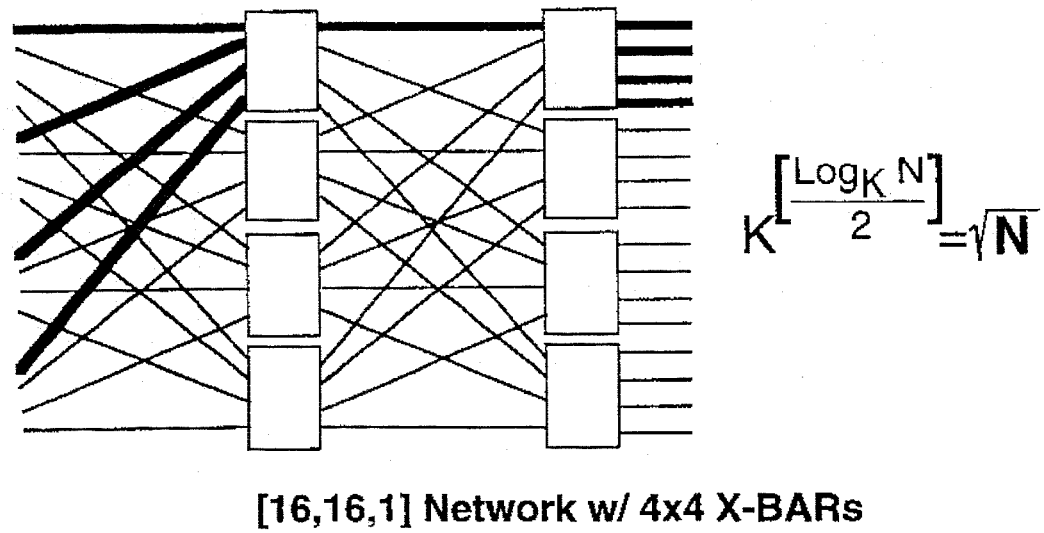

FIG. 59b is a representation of the worst-case bandwidth for a K×K MIN (K=4, N=16) routing network where O(√N) packets must traverse each link for the transpose permutation (shown in bold).

Figure 60:
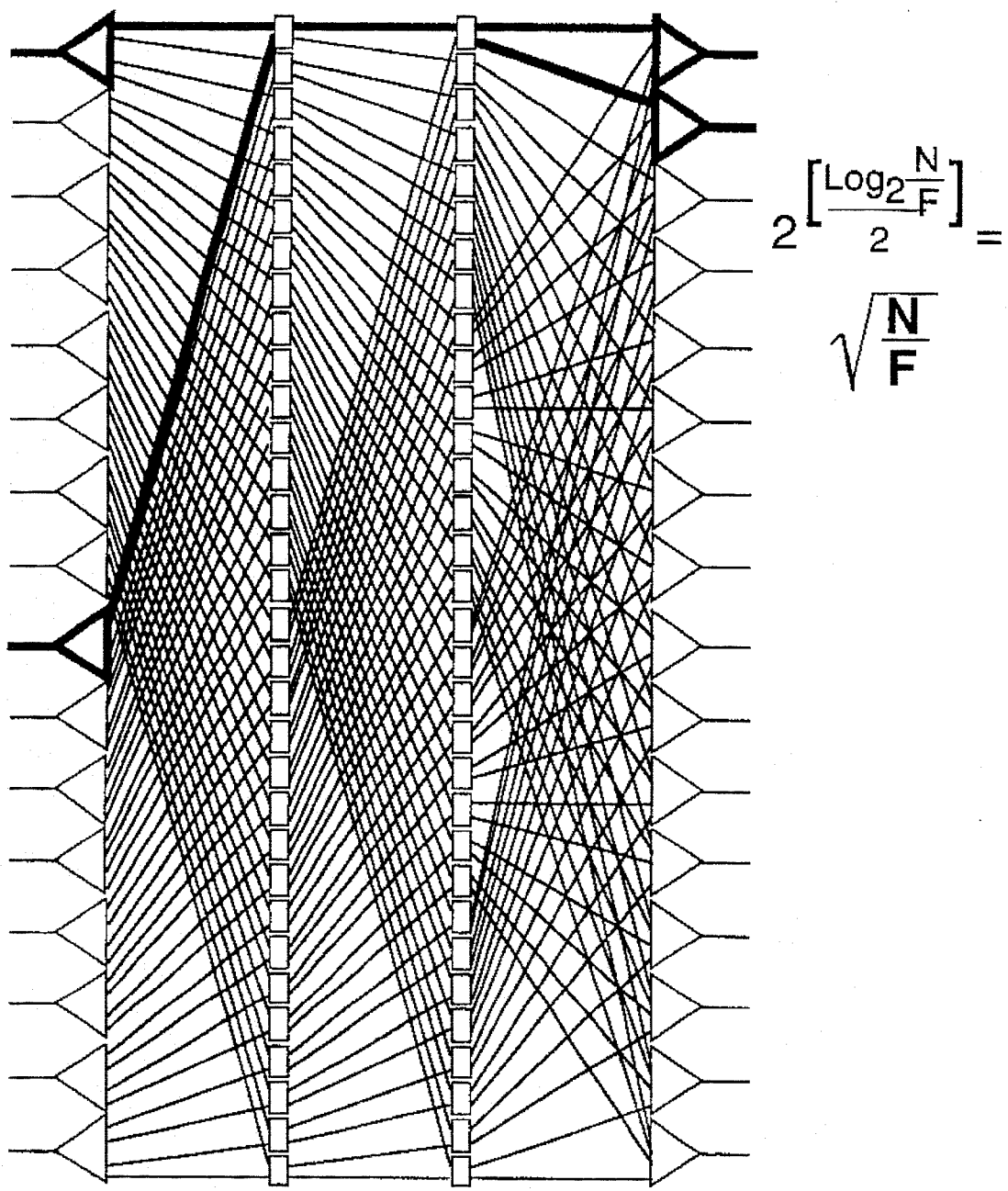

FIG. 60 is a representation of the worst-case bandwidth for a standard [16,16,4] routing network in accordance with the present invention; $O(2^{Log\lceil N/F\rceil/2})$ packets must traverse each link for the transpose permutation (shown in bold).

Figure 61:
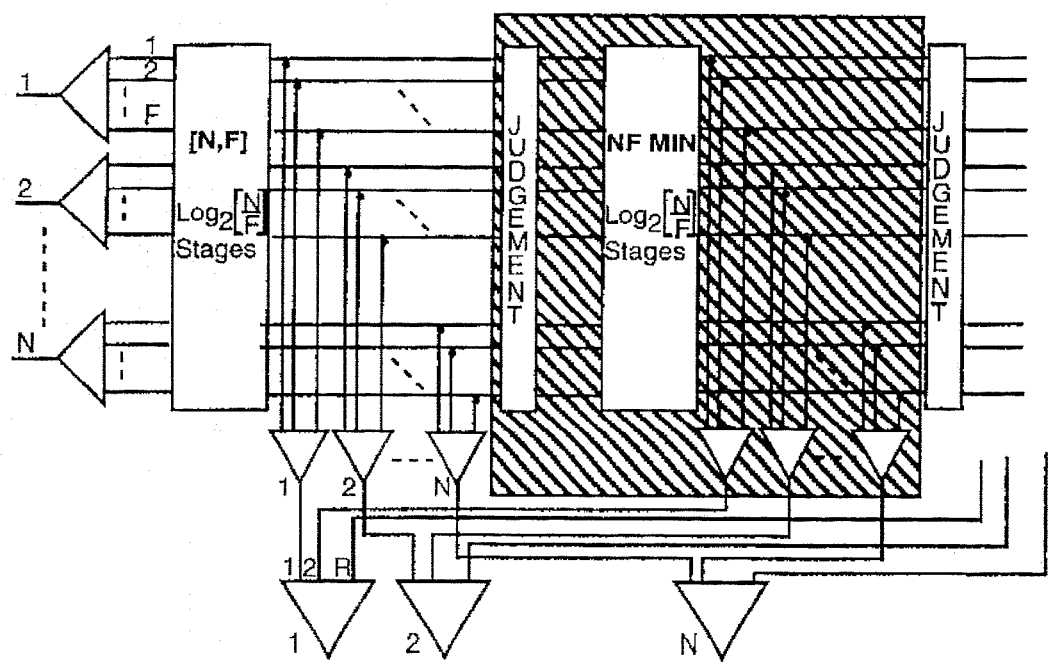

FIG. 61 shows the architecture of the [N,M,F], N=M, network of the present invention replicated R times; R-1 copies of the basic [N,M,F] network (shaded region) are cascaded back-to-back.

Figure 62:
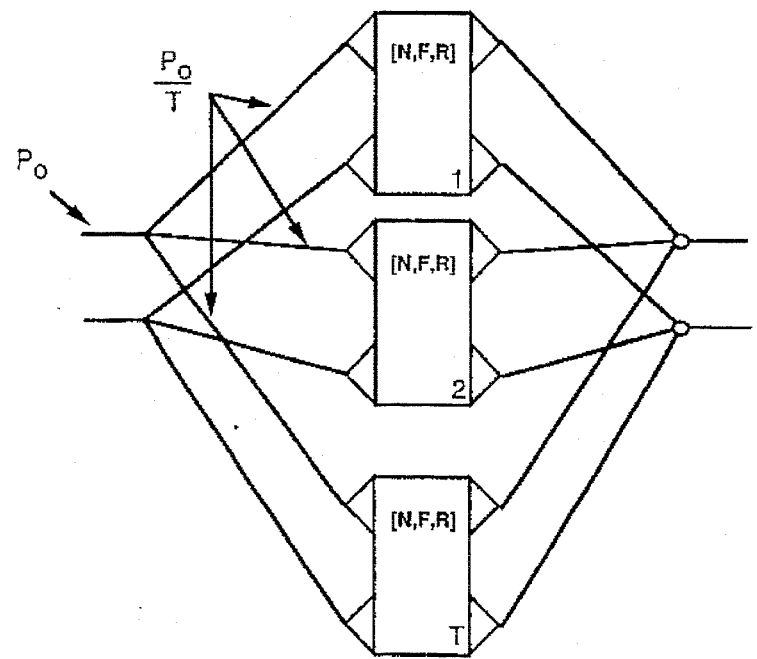

FIG. 62 shows the architecture of the [N,M,F,T,R], N=M, network of the present invention where T-1 copies of the basic [N,M,F,R] network (shaded region) are placed in parallel.

Figure 63:
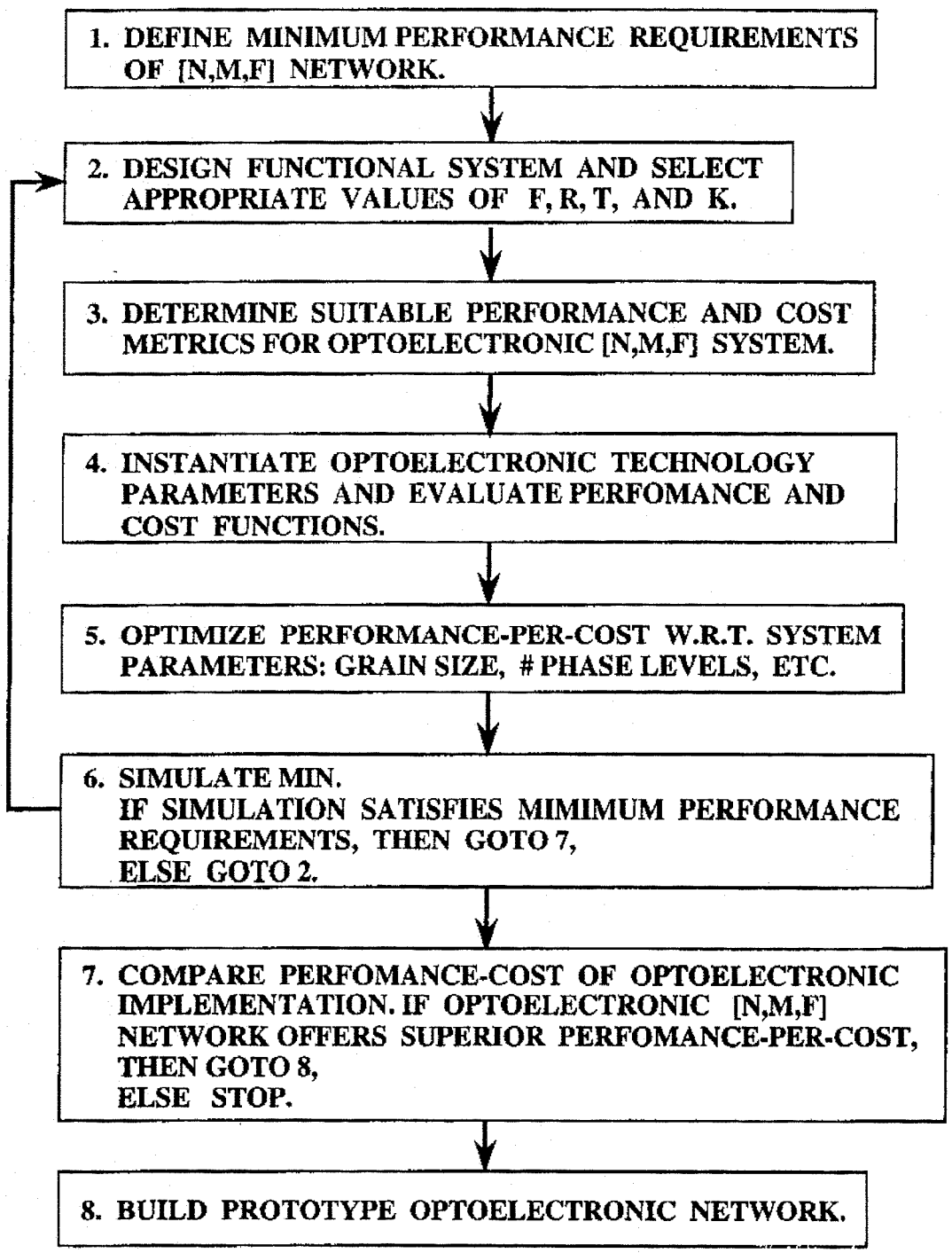

FIG. 63 shows the design methodology of the present invention for optoelectronic [N,M,F,K,R,T] networks.

Figure 64:
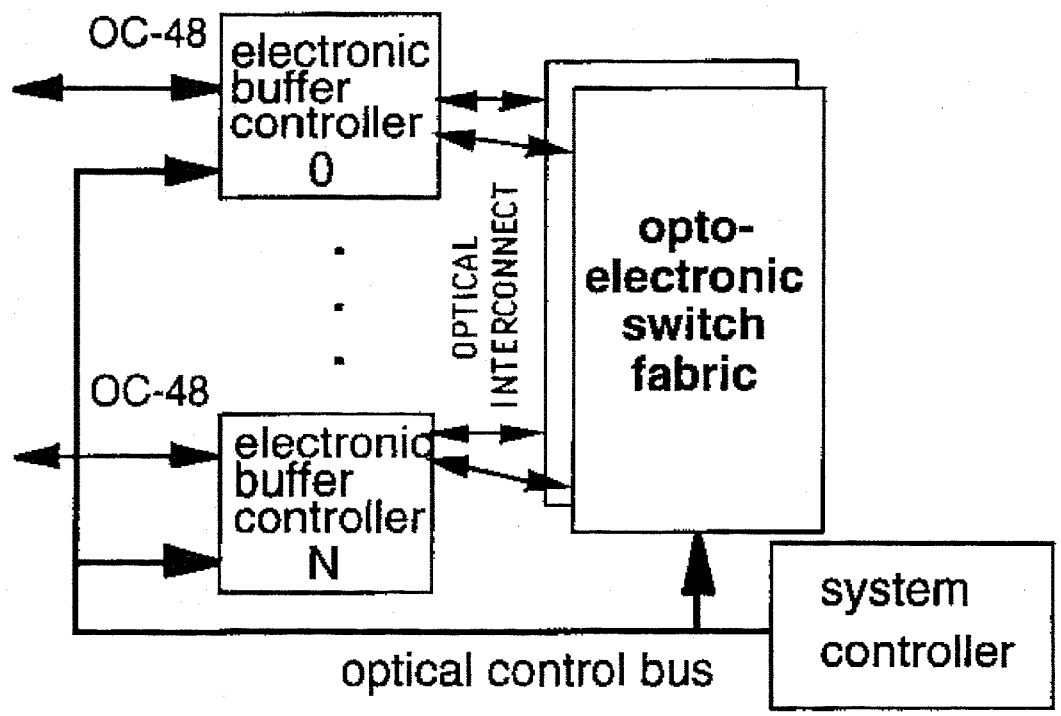

FIG. 64 shows an optoelectronic switching network where nodes—e.g. processors, memories, or specialized devices—are attached to the switch fabric via line interface controllers, and also a system controller.

Figure 65:
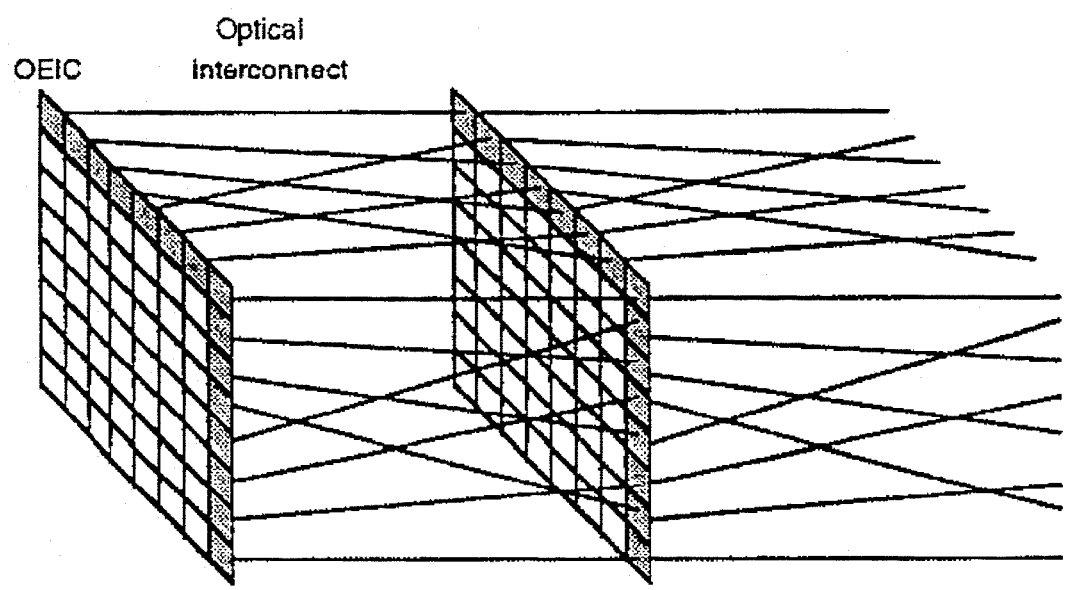

FIG. 65 is a diagrammatic representation of two cascaded optoelectronic modules each incorporating a 2-D array of optoelectronic nodes, the modules being connected in tandem by a 2-D shuffle free-space optical links, the module being usable to construct the MIN of the present invention.

Figure 66:
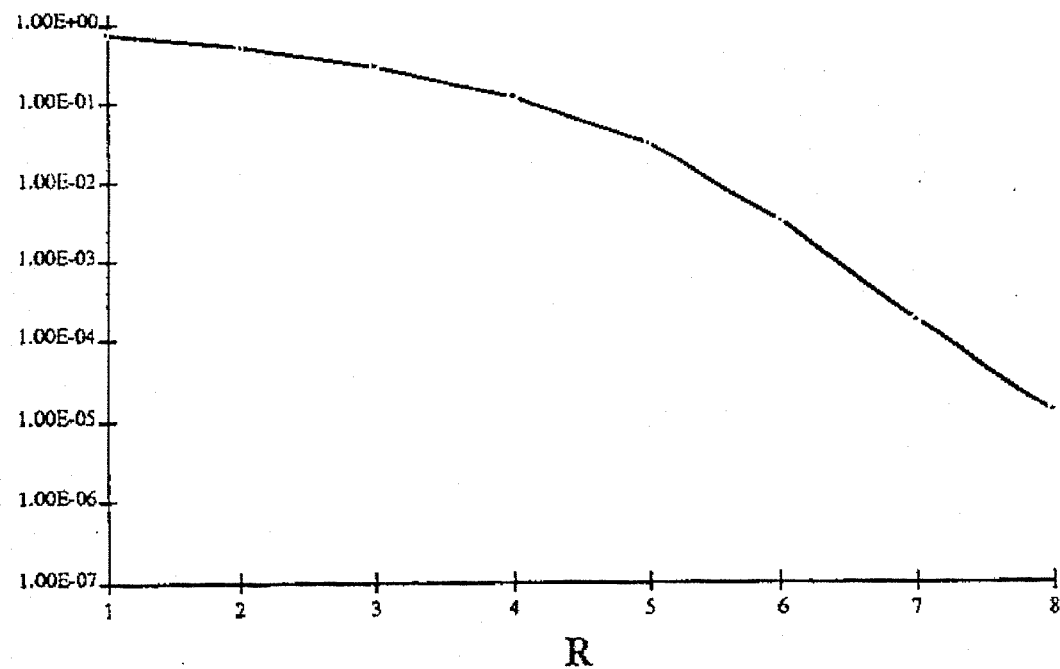

FIG. 66 is a graph showing packet (or cell) loss rates under uniform traffic for an N=1024 port Banyan network; the vertical axis being the packet (or cell) loss rate while the horizontal axis is the number R of Banyan networks in tandem.

Figure 67:
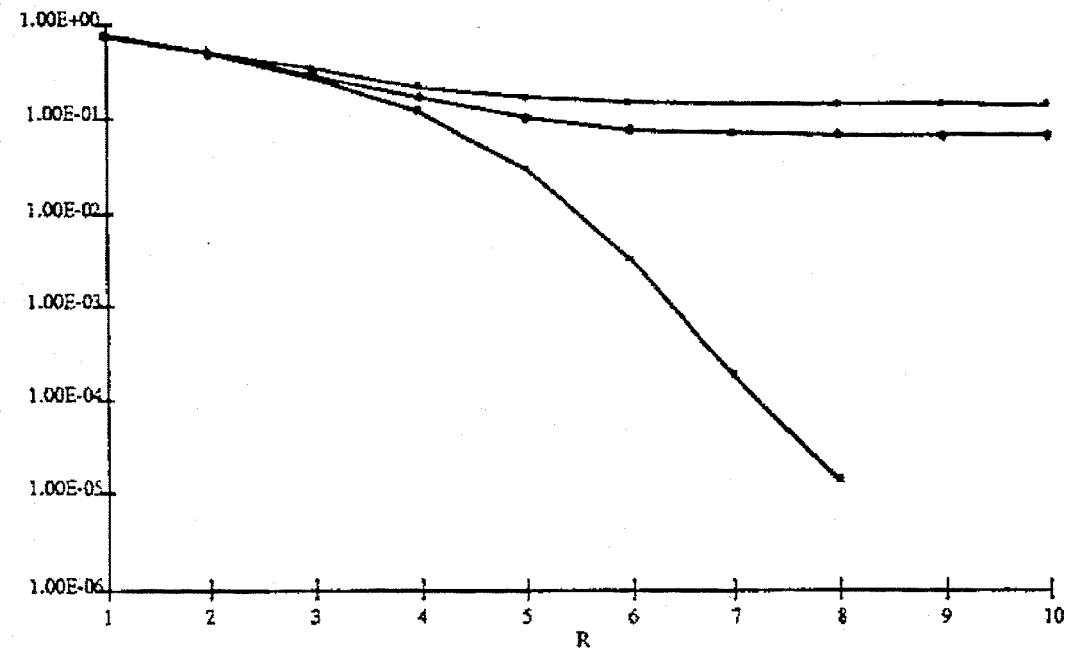

FIG. 67 is a graph of packet (or cell) loss rates under "hot-spot" traffic for an N=1024 port Banyan network; the two topmost curves show the packet (or cell) loss rate with 5% and 10% "hot spot" traffic while the lower curve shows the packet (or cell) loss rate for uniform traffic and is included as a reference.

Figure 68A:
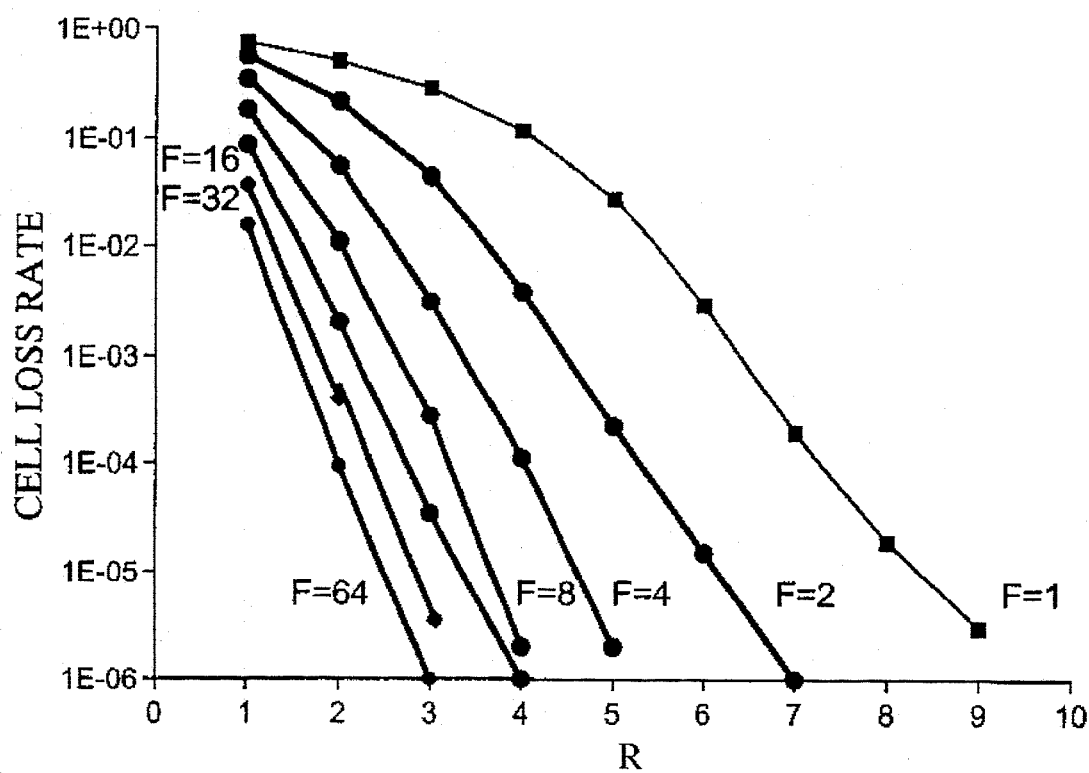
Figure 68B:
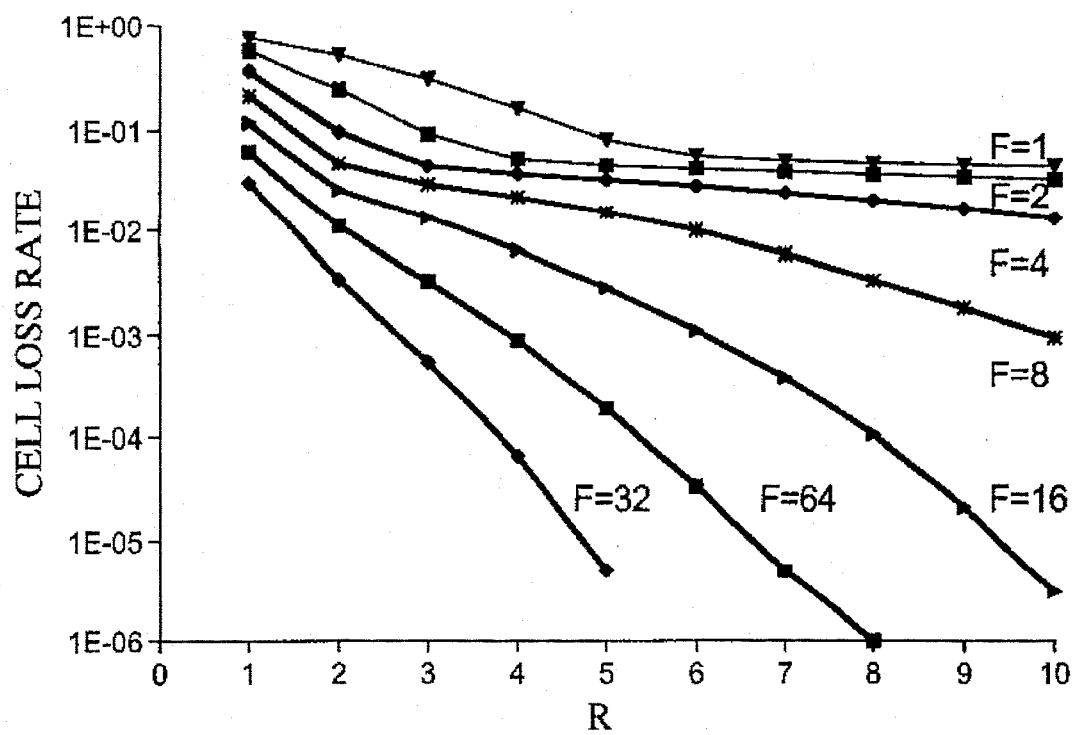

FIG. 68, consisting of FIG. 68a and FIG. 68b, is a graph showing the packet (or cell) loss rate for fanout F and replication R for different [N,M,F,R], N=M, networks of the present invention; note that arbitrarily low packet (cell) loss rates, e.g., 1×10$_{-6}$ can be achieved with different configurations of fanout F and replications R.

DESCRIPTION OF THE PREFERRED EMBODIMENT

1. Organization of the Description of the Preferred Embodiment Section With Reference to the Teachings of the Several Inventions Section 2 discusses the new class of networks, known as [N,M,F] networks, or Stretch networks, in accordance with the present invention. A cost-performance tradeoff between optical and electrical interconnects in an [N,M,F] network of the present invention is presented in Section 3.

The cascading of multiple copies of the new networks serially back-to-back is taught in section 4 in conjunction with FIG. 61. The connection of multiple copies of the new networks in parallel is taught in section 4.5 in conjunction with FIG. 62.

The particular concentrator circuit useful in the new networks is taught in section 4.3 in conjunction with FIG. 53

The "Smart" network of the present invention is taught in Sections 5 and 6, and first shown in FIG. 69b. The parallel combination of a Stretch network communicating information point-to-point and a Smart network simultaneously communicating synchronization information point-to-point and multipoint is also discussed in sections 5 and 6, and is shown in FIG. 73.

2. [N,M,F] Networks

This section 2. discusses the new class of networks, known as Stretch Networks, in accordance with the present invention. The basic, rudimentary, parameterization of a Stretch network is as a unipath [N,M,F] network. N is the number of logical input channels to the network, M is the number of output channels and F being the fanning parameter.

The [N,M,F] network is a unipath network that allows a continuous tradeoff between the fanout per layer and the number of layers in the network. [N,M,F] networks include, as special cases, a fully connected, single layer, crosspoint switch (or crossbar) and a shared interconnect, multistage interconnection network with Log N stages. By incorporating appropriate functionality into the fanout and fanin stages, the networks can be applied to a variety of computational problems in neurocomputing, parallel processing, and broadband switching. This section 2 presents the abstract architecture of the [N,M,F] network. Subsection 2.1 explains the [N,M,F] network design, and subsection 2.2 discusses applications of the network. The remaining major sections present specific [N,M,F] system designs for switching networks (sections 3 and 4 of the Description of the Preferred Embodiment section of this specification), using free-space optoelectronic technology.

2.1 [N,M,F] Network Architecture

2.1.1 Background

Consider the problem of connecting a set of N input ports to a set of M output ports. This relatively innocuous issue has tremendous significance for the fields of parallel processing, broadband switching, and neurocomputing. For instance, one of the most important features in a parallel processing system is the communications subsystem, linking processors, memory units and input/output controllers. The interconnection network plays a vital role in the communication, computation and storage operations of the parallel processing system, and is often the limiting factor in determining the system's performance and the cost. The interconnection subsystem also plays a crucial role in telecommunication systems; it is responsible for communicating voice, video and other types of data between the input and output ports at high throughput. For artificial neural computing paradigms, the processing and interconnection functions are, in fact, combined. The processing functions are distributed among a large number of simple, highly interconnected units representing the input and output ports of the network.

Figures 1A, 1B:
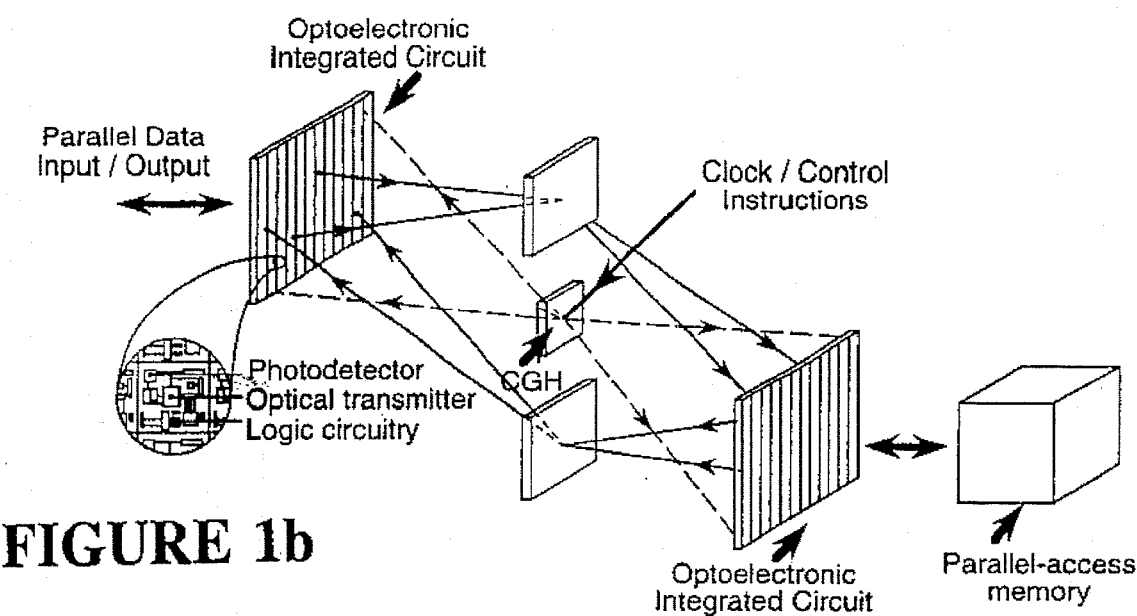
FIG. 1 consisting of FIG. 1a and FIG. 1b, shows a generic model of an optoelectronic system.
Figure 2:
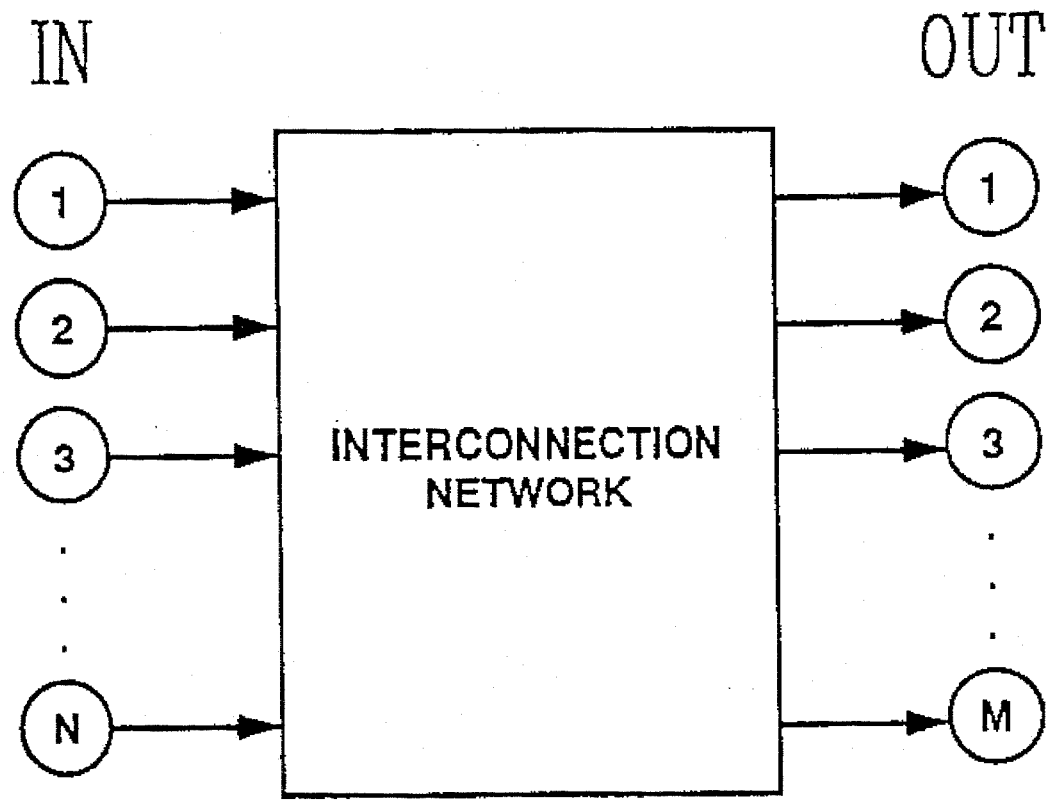
FIG. 2 shows an interconnection network linking N input ports to M output ports.

An interconnection network as shown in FIG. 2 is formally defined as a system of switches and links that connect N inputs to M outputs. See A. L. Decegama, *Parallel Processing Architectures and VLSI hardware: Volume 1* Prentice Hall, 1989. Research in interconnection networks for parallel processing and telecommunications has an old and rich history. The simplest type of interconnection network is an interconnection bus. See for example, H. S.

Figure 3:
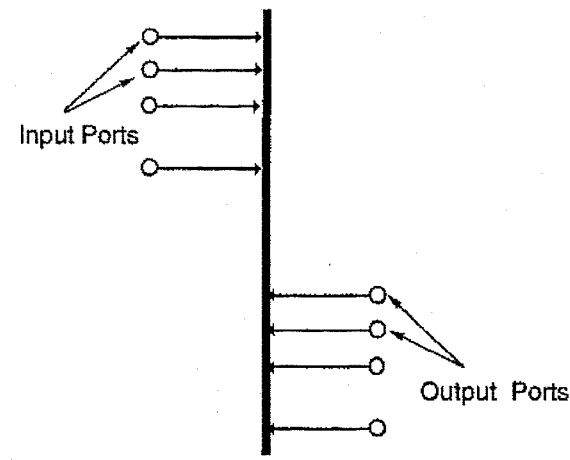
FIG. 3 shows a bus interconnection network where all input and output ports share a common set of high-speed communication channels.
Figure 4:
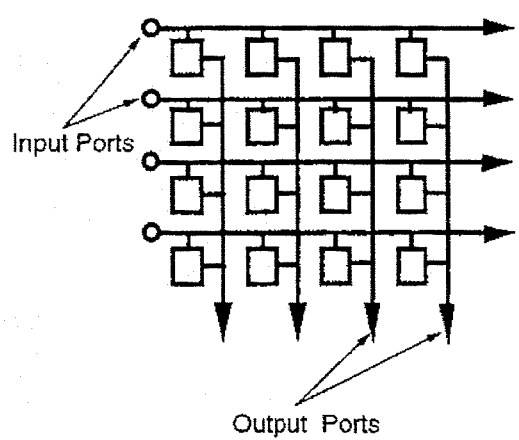
FIGS. 4 and 5 respectively show a crossbar and full space-division switch, both of which networks provide a dedicated channel from each input to each output in a single stage.
Figure 5:
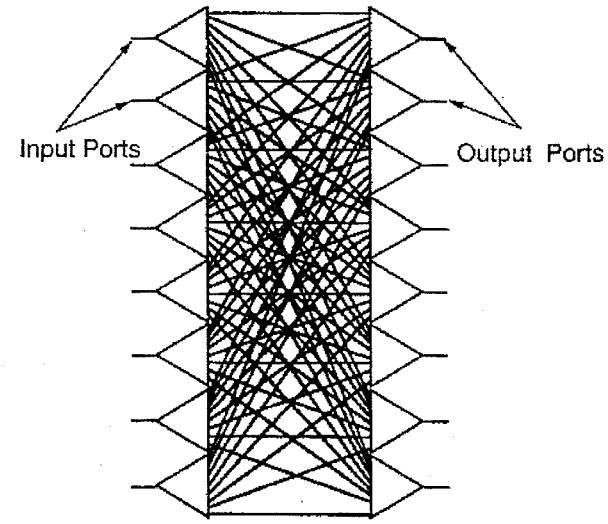

Stone, *High Performance Computer Architecture*, Addison-Wesley, 1987. All input and output ports are connected to a common set of high-speed communication channels that comprise the bus. See FIG. 3. A bus-oriented network is an efficient choice for 10–20 input channels. As the number of input channels grows, performance begins to degrade due to contention for the shared communication resource. At the other extreme, is an N×M crossbar or space-division switch. These networks provide a dedicated channel from each input to each output in a single stage. See FIGS. 4 and 5. Such networks quickly become prohibitive in cost as the number of nodes is increased, since NM crosspoint switches are needed.

Figure 6:
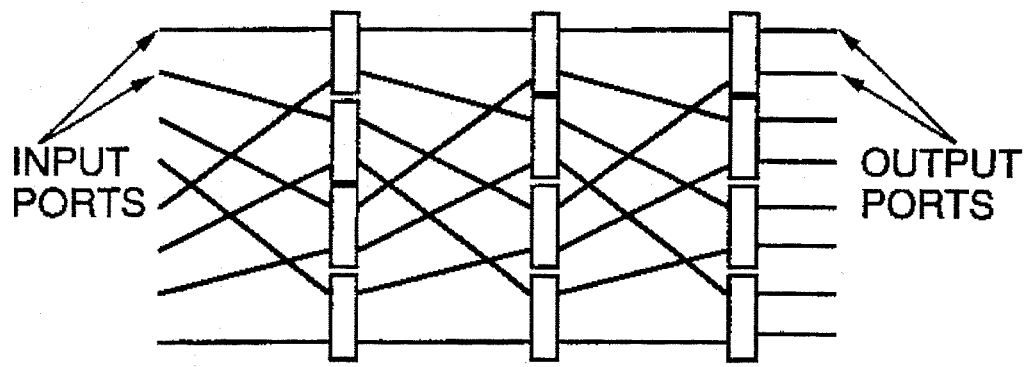
FIG. 6 shows a multistage interconnection network (MIN) where multiple stages of switching elements and links provide a full-access capability.

A more scalable method of providing high bandwidth communication at a reduced cost is to use a Multistage Interconnection Network (MIN). See, for example, H. J. Siegel, *Interconnection Networks for Large-scale Parallel Processing*, $2^{nd}$ ed. McGraw Hill, (New York), 1990. A MIN achieves interconnection between input and output ports using multiple stages of simple switches and global, one-to-one connections between stages. Each switch and link contributes to multiple input/output paths through the network; a specific connection is achieved by setting the states of the switches. Banyan networks were introduced as a broad class of MINs that provide a unique path from each input port to every output port. See L. R. Goke and G. J. Lipovski, "Banyan networks for partitioning multiprocessor systems," *Proc. $1^{st}$ Ann. Symp. Computer Arch.*, IEEE Press, pp. 21–28, 1973. The simplest form of a Banyan network, with the fewest number of crosspoint switches, uses $Log_2 N$ stages of N/2 2-input 2-output (2×2) switches to achieve the full access property between N input/output ports. See FIG. 6. Inputs to a 2×2 switch are either passed straight through or switched (exchanged). This network is also known as the omega network. See L. R. Goke and G. J. Lipovski, "Banyan networks for partitioning multiprocessor systems," *Proc. $1^{st}$ Ann. Symp. Computer Arch.*, IEEE Press, pp. 21–28, 1973. It uses the perfect-shuffle interconnection between stages. See H. S. Stone, "Parallel processing with the perfect shuffle," *IEEE Trans Comput.*, vol. C-20, pp. 81–89, 1971. There are a number of topologically-equivalent networks that use different interconnection patterns between stages; these include the omega, the modified data-manipulator (see T. Feng, "Data manipulating functions in parallel processors and their implementations," *IEEE Trans. Comput.*, vol. C-23, pp. 309–318, 1974), the flip (See K. E. Batcher, "The flip network in STARAN," *Proc. 1976 Intl. Conf. Parallel Processing*, pp. 65–71, 1976), the indirect binary n-cube (See M. C. Pease, III, "The indirect binary n-cube microprocessor array," *IEEE Trans. Comput.*, vol. C-26, pp. 458–473, 1977), the baseline (See J. Patel, "Performance of processor-memory interconnections for multiprocessors," *IEEE Trans. Comput.*, vol. C-30, pp 771–780, 1981), and regular SW-banyan networks (see Goke and Lipovski, supra). These networks are isomorphic, in that one may be obtained from the other via a simple permutation of the switches and associated links. See C. L. Wu . . . All these network designs economize on the number of switches used (O(N Log N)). However, they face a common problem. Because connections are multiplexed to a large extent, many permutations cannot be achieved. This leads to certain input-output paths being blocked, which results in significantly lower performance than that of the crossbar.

Figure 7:
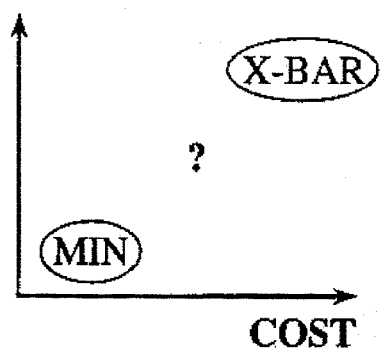
FIGS. 7 and 8 are diagrams illustrating the motivation to provide a performance-cost tradeoff between a crossbar network and a multistage interconnection network, alternatively restated as a tradeoff between the bisection width of the network versus the number of stages.
Figure 8:
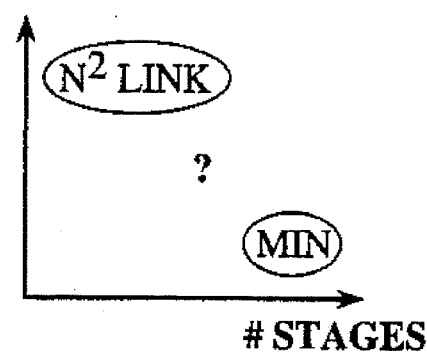
Figure 9:
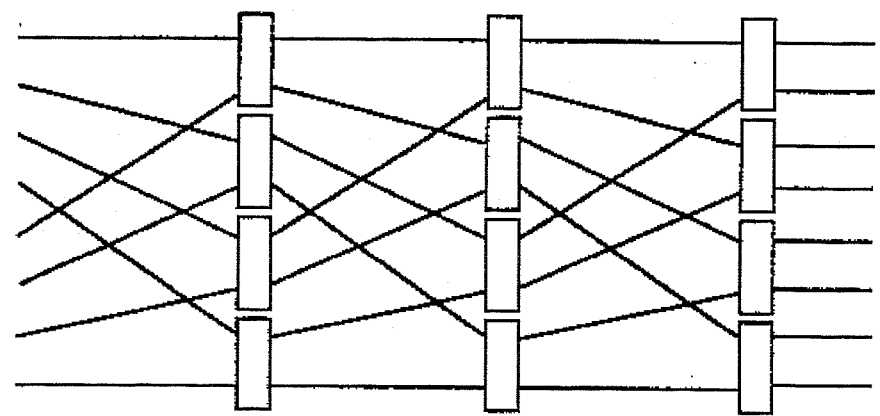
FIG. 9 shows an [8,8,1] interconnection network with 2×2 switches; the [N,N,F] network of the present invention reducing to this normal and degenerate form of MIN when N=M, and F=1.
Figure 10:
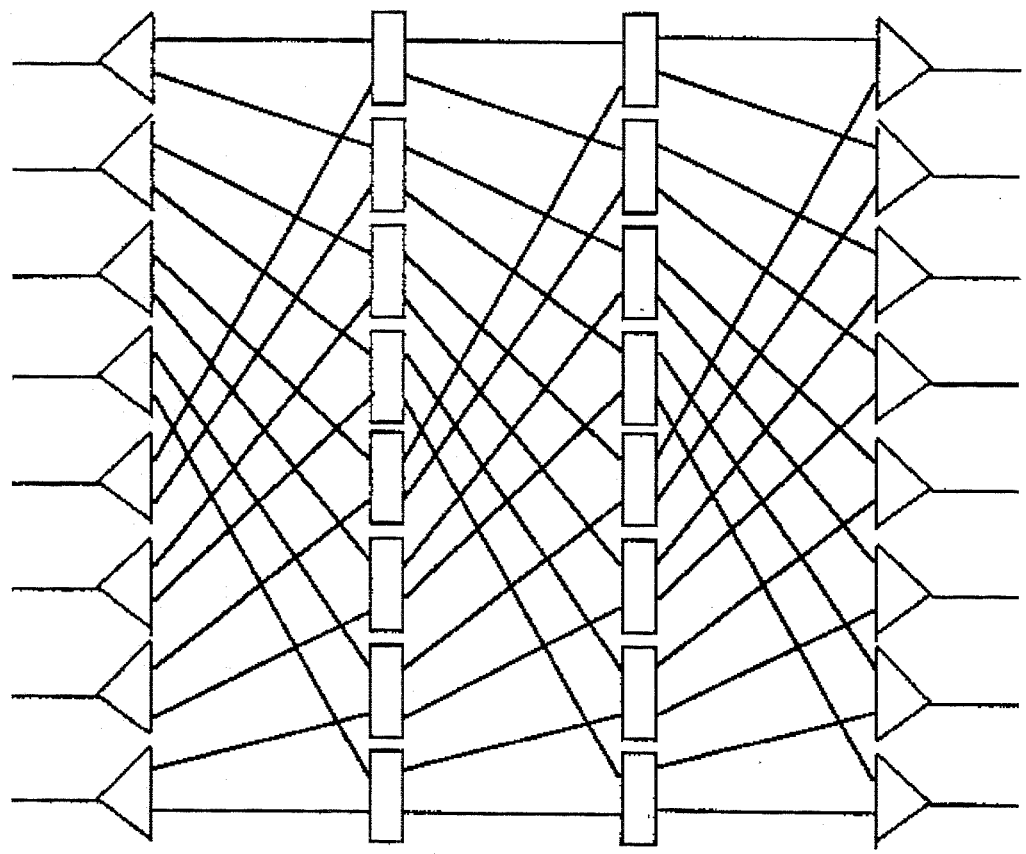
FIG. 10 shows an [8,8,2] interconnection network with 2×2 switches; an [N,N,F] network having $Log_2(N/F)$ stages of 2×2 switching elements.
Figure 11:
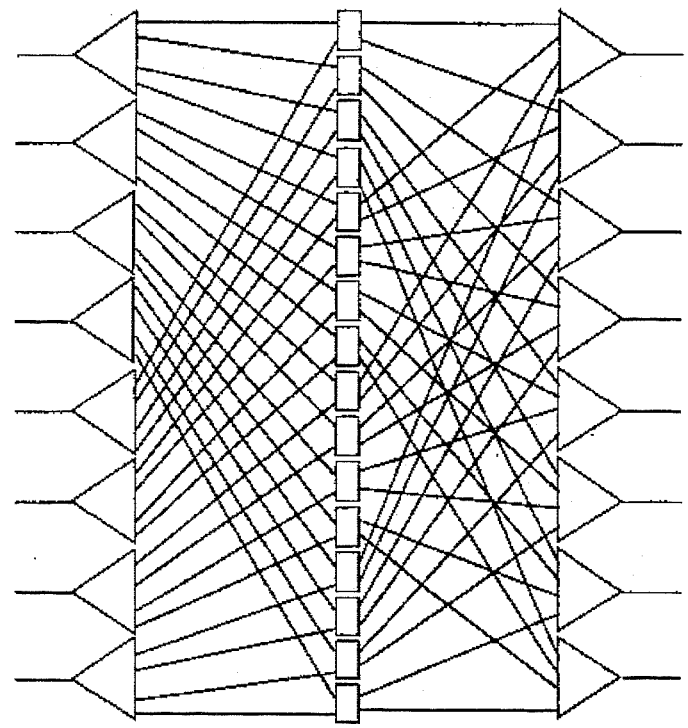
FIG. 11 shows an [8,8,4] interconnection network with 2×2 switches; such an [N,N,N/2] network is strictly non-blocking and can achieve arbitrary permutations of the inputs.
Figure 12:
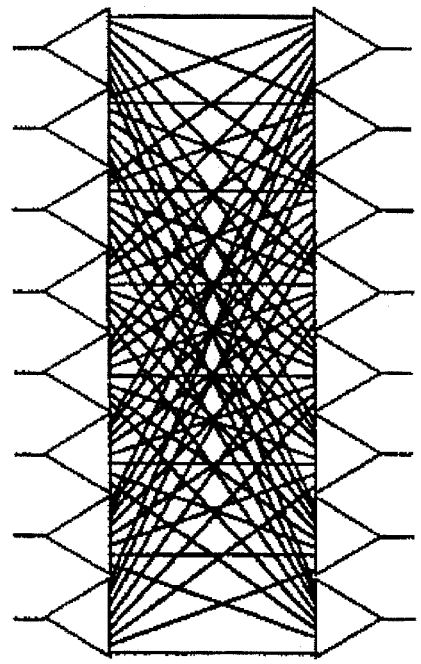
FIG. 12 shows an [8,8,8] interconnection network; an [N,M,M] network is equivalent to a full space-division switch or crossbar.

The question one may pose is whether there exists a class of networks that provide a tradeoff between the crossbar and the simple MIN. See FIG. 7. A general class of Banyan networks known as Delta networks enables $A^n$ inputs to be connected to $B^n$ outputs in n stages using smaller A×B crossbars; the resulting network has fewer crosspoints than an An×$B^n$ crossbar. See J. Patel, "Performance of processor-memory interconnections for multiprocessors," *IEEE Trans. Comput.*, vol C-30, pp 771–780, 1981. A larger class of networks called generalized shuffle networks (GSNs), which includes Delta networks as special cases, allows N inputs to be connected to M outputs by decomposing N and M into the factors $n_1, n_2, \ldots, n_r$ and $m_1, m_2, \ldots, m_r$ and using r stages of $n_i \times m_i$ crossbars. See L. Bhuyan and D. Agrawal, "Generalized Shuffle Networks," *IEEE Transactions on Computers*, vol. C-32, no. 12, pp. 133–142, December 1983. Both these designs seek to improve the performance of the simple MIN by using larger crossbar switches between stages. Unfortunately, these intermediate crossbar switches must be made quite large to achieve reasonable performance, which can be a burden on the hardware. In fact, as shown in section. 4, the worst-case performance of these networks is no better than the simple 2×2 MIN structure. Other solutions are needed. To find another solution, the question must first be reworded: can Banyan networks be designed to provide a tradeoff between the number of switching stages in the network (length) versus the bisection width of the network. See FIG. 8. The answer is an emphatic yes. The [N,M,F] networks described in this section 2 were designed to provide such a tradeoff without requiring large crossbar switches between stages.

2.1.2 [N,M,F] Network Design

An [N,M,F] network is a network with N logical inputs, M logical outputs, fanout $F_o$ and fanin Fi. See T. Cloonan, G. Richards, F. McCormick, and A. Lentine, "Architectural considerations for an optical Extended Generalized Shuffle network based on 2-modules," *Technical Dig. OSA Top. Meet. on Photonic Switch.*, (Salt Lake City), March 1991; also A. Krishnamoorthy and F. Kiamilev, "Shuffle-based interconnection networks," *University of California at San Diego Internal Report* (unpublished), October 1991.

The network consist of a fanout stage, a number of switching stages, and a fan-in stage. Fanout is defined as the number of physical channels connected to each logical channel or input (and vice-versa for fanin). The fanning F is defined as the maximum of $F_o$ and $F_i$, i.e. $F=max(F_o, F_i)$. Each of the N logical inputs enters a fanout stage where the input is connected to $F_o$ physical channels. Depending on the application, the fanout stage may be a one-to-$F_o$ tree-based demultiplexer, a one-to-$F_o$ broadcast, or can include some type of logical processing with either of the previous options. Between the fanout and fanin stages are $Log_K$ [max(N,M)/F] stages of switching elements having $NF_o/K$ K×K switches per stage. The basic building block of the switching stages is the K×K self-contained switching element. In it's simplest form (K=2), each switch is a 2×2 element with two inputs and two outputs. The function of the switch is to route input data entering on the left to one or both outputs on the right, depending on the application. In general, a K×K switch provides interconnection between its K input ports and its K output ports, and can be recursively constructed using 2×2 switches when K is a power of 2 (see section 3, subsection 3.3 for a detailed explanation). At the output are the fanin stages, which generally combine the $F_i$ signals in a tree-based configuration with the ability to perform processing on the data at they are fanned-in. These networks can be tailored to a number of applications and technologies by choosing the appropriate values of the parameters and performing the necessary computation at the fanout, switching, and fanin stages.

Recently, a new class of switching networks, known as extended generalized shuffle network, have been proposed. Extended generalized shuffle (EGS) networks are a broad class of circuit-switched multistage interconnection networks (MINs) that include strictly non-blocking, crossbar-type networks as well as networks that use smaller K×K switches.

These networks can be viewed as extensions to GSNs that include the facility to fan-out and fan-in at the input and output stages, respectively, of the interconnection network. An arbitrary number of intermediate stages are used to perform the switching and routing functions with the possibility of multiple paths between input and output ports. The [N,M,F] networks described below are similar to the EGS networks in that they use the fanout and fanin sections, but are different in that they are unipath (Banyan) networks. Thus, there is a strict relationship between the number of switching stages, the fanning parameter, and the number of input/output ports. In contrast to EGS networks, (that use passive broadcast) [N,M,F] networks use the fanout sections to perform the switching and routing functions. Furthermore, the [N,M,F] networks provide interconnection combined with computation by incorporating appropriate logic into the fanout and fanin stages.

The basic [N,M,F] network, depicted in FIGS. 9–12 with N=M, provides a means of trading the depth of the network (i.e. number of layers) for the width of the network (i.e. number of physical channels). All [N,M,F] networks maintain the full-access property, i.e. a path exists between any two input and output ports. When the fanning F is equal to N, a single stage crossbar-type switch is obtained. As the fanning F is decreased (a thinner but longer network), the total number of switches and links is decreased and the degree of multiplexing per physical channel is increased, resulting in the hardware resources being shared between several input/ output paths. When F=1, the [N,M,1] network is a traditional GSN.

Figure 13:
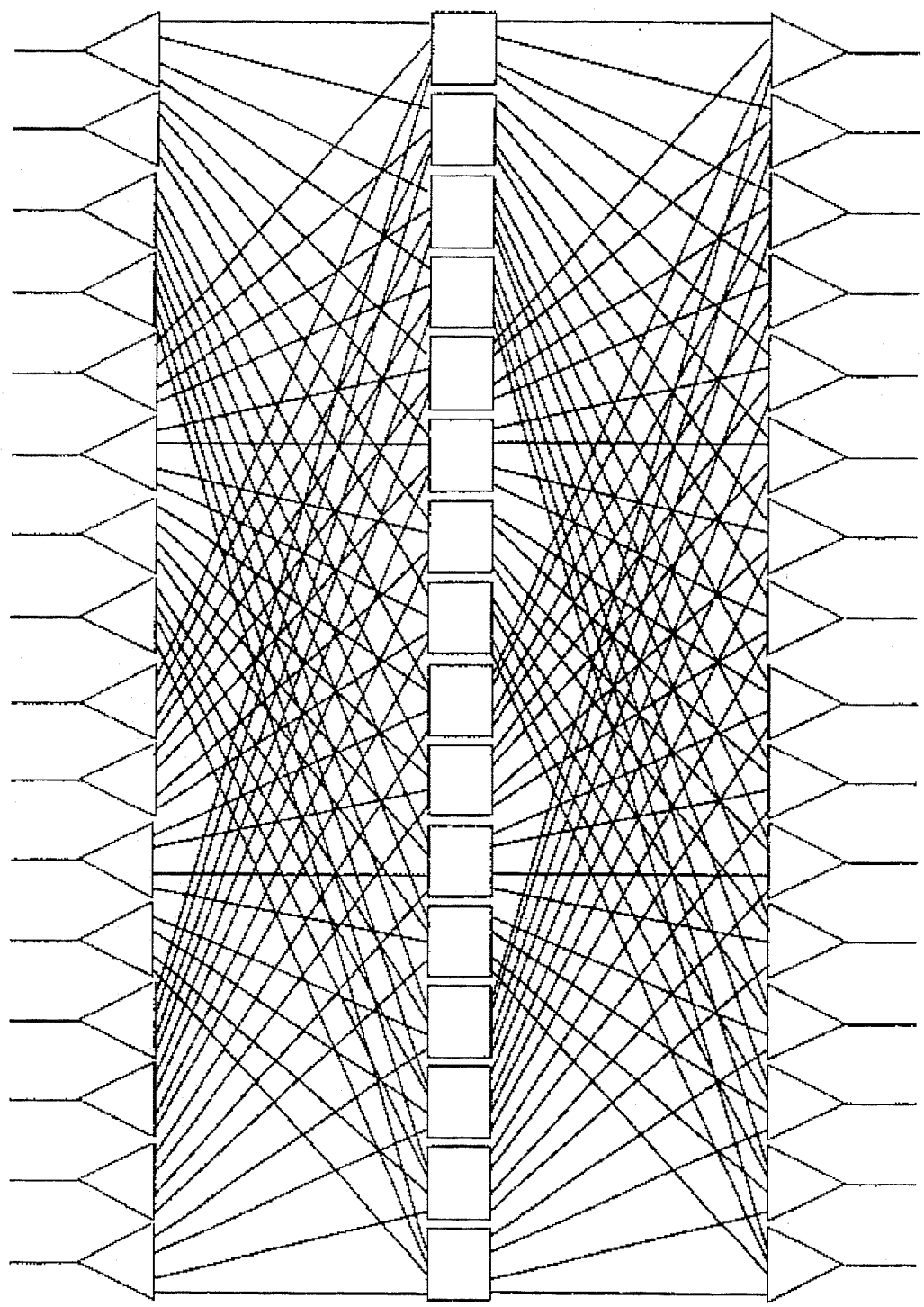
FIG. 13 shows a [16,16,4] interconnection network with 4×4 switches; an [N,N,F] network with K×K switches requires $Log_K(N/F)$ stages of K×K switching elements.
Figure 14:
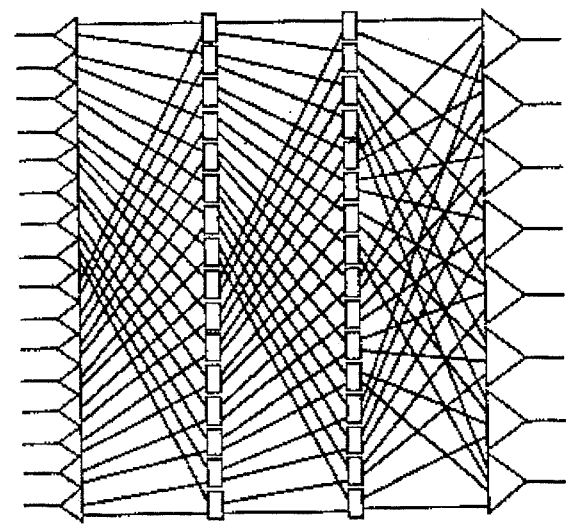
FIG. 14 shows a [16,8,4] interconnection network with $F_o=2$, $F_i=4$, and 2×2 switches; F is defined as $max[F_o,F_i]$ and an [N,M,F] network uses $Log_2(max[N,M]/F)$ stages of switches.
Figure 15:
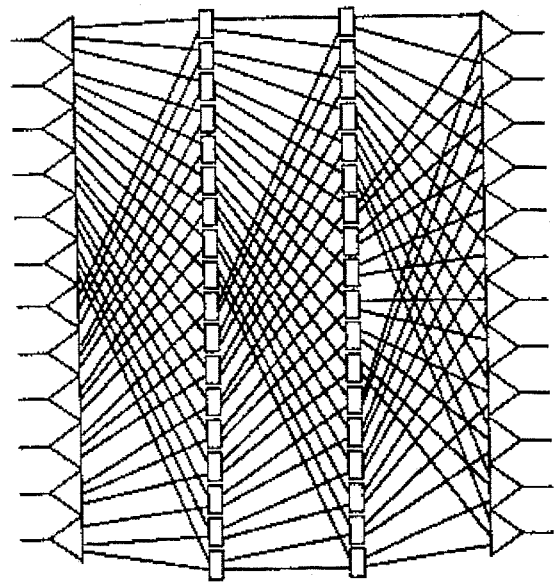
FIG. 15 shows an [12,12,3] interconnection network using 2×2 switches; [N,M,F] networks are valid for all N,M,F, and K such that $Log_K[max[N,M]/F]$ is a non-negative integer.

In this manner, the fanning parameter F and switch-size K of an [N,M,F] network can be chosen according to application and/or technology requirements. For instance, the network can be built using simple 2-input, 2-output (2×2) switches as shown in FIGS. 9–12. By increasing the switch complexity to say 4×4 switches, it is possible to reduce the number of interconnection layers needed, independent of the N, M, and F network parameters. See FIG. 13. Section 3 describes how the switch size K can be optimized for free-space optoelectronic technology. In general, the fanout parameter $F_o$, and the fanin parameter $F_i$, need not be equal, but must satisfy the condition that $N^oF_o=M^oF_i$. See FIG. 14. Another useful feature of the [N,M,F] networks is that in certain cases, the network can support applications where the fanout $F_o$, the fanin $F_i$, and the number of logical I/O channels are not powers of two. See FIG. 15.

The method of constructing an [N,M,F] network is similar to the procedure for constructing Delta networks (see J. Patel, supra), and can be accomplished with $\text{Log}_K[\text{max}(N,M)/F_1$ switching stages with $NF_o/K$ switches per stage. There is considerable freedom in the choice of connection patterns used between stages. For technological reasons, (see section 3) this specification will emphasize networks that use the perfect-shuffle interconnection between stages. Thus, a K-shuffle can be used at each stage of the network, except the last where an F-shuffle is used. Reference FIGS. 9–15. A K-shuffle of an integer X is formally defined as:

$$S_K(X) = KX \bmod (M-1) \quad \text{for } 0 \leq X \leq M-1 \quad (2.1)$$
$$= X \quad \text{for } X = M-1$$

The K-shuffle [12] is a generalization of the perfect-shuffle or 2-shuffle permutation (see H. S. Stone, supra), and can be described as follows: Given a set of N cards, divide the set into K equal piles of N/K cards each. Pick the first card from each pile to form a new first pile of cards. Repeat this process with the second cards of each pile to form a new second pile of cards, the third cards of each pile to form a new third pile of cards, and so on. Stack the new piles on top of each other with the first new pile on top and the last new pile on the bottom, to obtain a new deck of cards.

Thus, [N,M,F] networks are a class of Banyan networks with the following restrictions:

$$i) \ N \cdot F_o = M \cdot F_i \quad (2.2)$$

$$ii) \ \text{Log}_K \left[ \frac{\max(N,M)}{\max(F_o,F_i)} \right] = \text{Non-negative Integer} \quad (2.3)$$

The construction of the networks proceeds as follows:

1. Begin with N input ports each having a fanout tree to $F_o$ channels, and M output ports each having a fanin tree from $F_i$ channels.

Figure 16A:
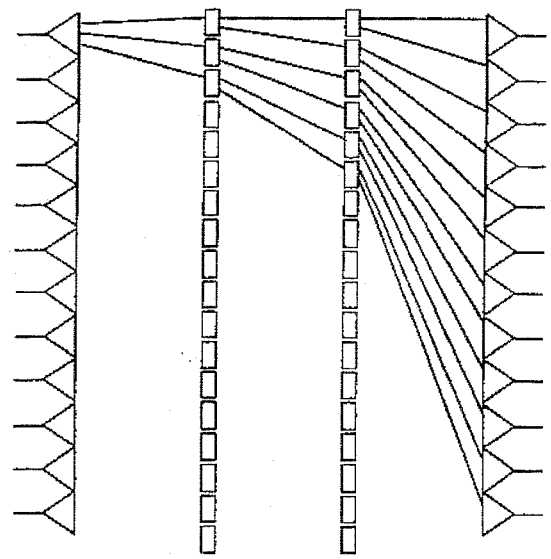
FIGS. 16, consisting of FIGS. 16a through 16c, shows the construction of a [12,12,3] interconnection network with 2×2 switches; a K-shuffle is used in all stages except the last, where an F-shuffle is used.
Figure 16B:
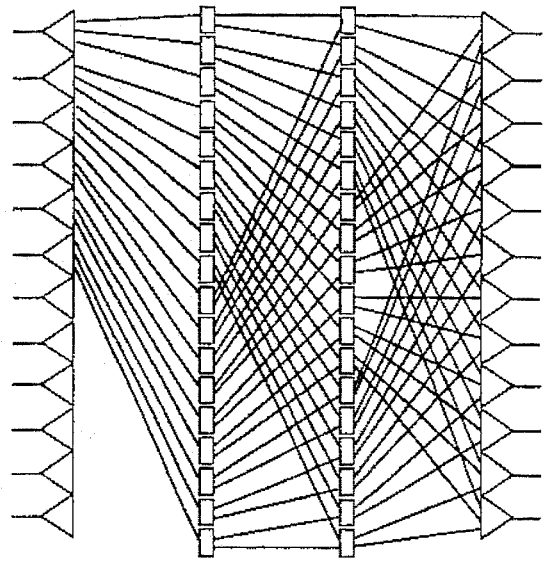
Figure 16C:
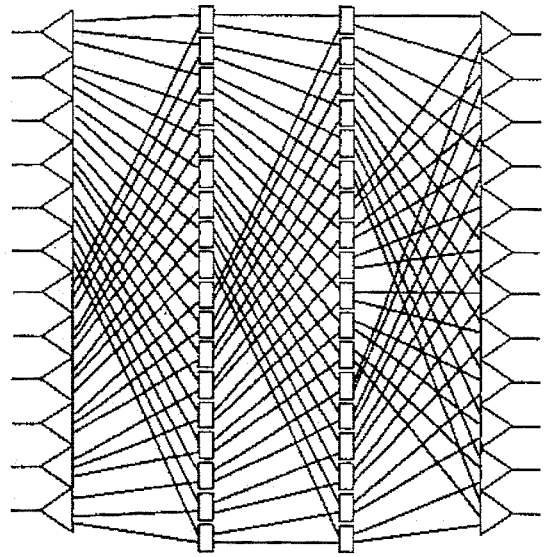

2. Build a demultiplexer tree to connect the first input to each of the M fanin trees at the output, using the fanout tree and additional stages of K×K switching elements. This can be accomplished with $\text{Log}_K[\text{max}(N,M)/F_1$ switching stages. FIGS. 16a–16c illustrate the procedure for a network with N=M=12 and $F_o=F_i=F=3$.

3. For each additional input superimpose an additional demultiplexer tree on the partially constructed network. See FIGS. 16b and 16c. Existing links may be used as part of the new tree, and additional links and switches may be added when necessary. The criteria that must be followed is that all inputs to a particular K×K switch in switching stages must originate from the same $i^{th}$ output from the K×K switches in the previous stage, where $0 \leq i \leq K-1$. For instance, when K=2, then both inputs to the K×K switch must originate from either the upper terminals or the lower terminals of switches in the previous stage. If the K×K switch is in the first switching stage, then all inputs to the switch must originate from the same $i^{th}$ output of the fanout modules, where $0 \leq i \leq F_o-1$.

This procedure also guarantees that there is a unique, constant delay path from each input to every output. Theorem: In an [N,M,F] network, there is a unique, constant delay path from each network input port to every network output port. Proof: The total number of connections to the output ports from any input port is given by the fanout of the first stage multiplied by the number of connections due to the switching stages:

$$F_o \cdot K^{\frac{\max(N,M)}{F}} = F_o \cdot \left[ \frac{\max(N,M)}{\max F_o, F_i} \right] \quad (2.4)$$

Recall that $N^oF_o=M^oF_i$. From equation 2.4 it follows that there are M connections to the output ports from each input port. But, the construction of the network ensured that there was at least one path from each input port to every output port. Hence, there is a unique path from each input port to every output port. The constant delay property follows from examining the network. All paths starting at an input port traverse the fanout stage, $\text{Log}_K[\text{max}(N,M)/F_1$ switching stages, and the fanin stage to reach an output.

For large-scale implementations, the [N,M,F] networks are particularly well suited to optoelectronic technologies. As discussed in the Background of the Invention section of this specification, the advantages of optoelectronic technologies become more apparent as N becomes large; very high bandwidth optoelectronic interconnection networks will become feasible when advanced transmitter-on-silicon technologies become available. In this case, the specific amount of optics and electronics can be optimized. A useful feature of the [N,M,F] networks is that they allow electronic interconnects to be traded for optical interconnects (via the switch size K), without affecting system functionality. This enables the system designer not only to optimize the performance and cost of the network architecture via the network parameters, but also to quantify the performance-cost tradeoffs between optical and electronic interconnects within the system, and thus to determine the appropriate level at which optical interconnects should be introduced in order to obtain an optimized system. An interesting general result of a study for optoelectronic switching networks, presented in section 3, is that an optimized optoelectronic interconnection network will be neither all-optical nor all-electronic, but will use several hundred electronic transistors for each optical input/output device.

2.2 Application-Specific [N,M,F] Networks

The [N,M,F] network is essentially a unipath network that allows a continuous tradeoff between a crossbar and a traditional MIN in terms of fan-out and fan-in versus number of stages. The [N,M,F] network provides the architectural framework for a number of parallel and distributed processing applications. By using fanout and fanin stages with the appropriate functionality, the networks can implement a generalized matrix-vector processing system with applications in artificial intelligence, fuzzy logic, and artificial neural networks. The full-access and constant-delay properties of the network can be used to implement a fast, packet-switched interconnection network suitable for broadband switching and multiprocessor systems. Furthermore, by choosing the appropriate values of $F_o$, $F_i$, and K, the networks can be optimized to the specific technology.

2.2.1 [N,M,F] Matrix-Vector Processors

This basic [N,M,F] network idea has potential application in many fields besides switching networks, such as artificial intelligence, fuzzy logic, and artificial neural networks, where fully connected crossbar type hardware is usually assumed. These applications generally require a multiplication of an input vector with a matrix, and the global summation of the partial products to produce an output vector; i.e. a matrix-vector multiplication. If the input ports of the network represent the components $x_j$ of the input vector, and likewise if the output ports represent the components $y_i$ of the output vector, then the matrix-vector multiplication is written as:

$$y_i = \sum_{j=1}^{N} W_{ij} \otimes x_{ij} \quad 0 \leq i \leq M-1 \quad (2.5)$$

where $W_{ij}$ is the M×N matrix of weights or connections between the input and output ports. It is evident that the matrix-vector (or sum-of-products) model can be considered to be a fully connected [N,M,M] system, in that each input is connected to all outputs in a single stage using distinct weighted connections. The interconnection (an possibly weighing) function is performed in the fanout and switching stages. The summation and weighing functions are completed at the fanin stages. If the fanin stage uses a tree-based structure, further processing can be performed during the fan-in process. A generalized optoelectronic matrix-vector architecture that implements equation 2.5, and its application to a optoelectronic neural system is possible. See G. C. Marsden, A. V. Krishnamoorthy, S. C. Esener, and S. H. Lee, "Dual-Scale Topology Optoelectronic Processor," *Optics Letters*, vol. 16, no. 24, pp. 1970–1972, December 1991; also A. V. Krishnamoorthy, J. Ford, G. Marsden, G. Yayla, S. Esener, "D-STOP: Comparative Analysis and Technological Feasibility," *Proc. OSA topical meeting on optical computing*, (Salt Lake City), pp. 244–247, March 1991.

Note that the operation between the matrix elements $W_{ij}$ and the input vector elements is typically a multiplication operation, but can be generalized to other Boolean operations. An [N,I,1] network that uses XNOR operations at the fanin stage to achieve a content addressable or associative memory is presented is possible. See U.S. patent application Ser. No. 07/788,403 filed Oct. 31, 1991, for an OPTOELECTRONIC ASSOCIATIVE MEMORY USING PARALLEL-READOUT OPTICAL DISK STORAGE TO inventors including the same A. Khrishnamoorthy who is a co-inventor of the invention of the present application.

The [N,M,F] networks can also be tailored to provide the necessary connection matrix at a reduced cost, by choosing the fanning F appropriate to the specific application. The resulting network has only F physical connections per row of the N×M matrix, but allows the remaining connections to be multiplexed on these physical connections by appropriately setting the intermediate switches. A limited-interconnect, parallel matrix-vector processor using such connections may be applied to artificial neural computing.

2.2.2 [N,M,F] Switching Networks

The [N,M,F] networks described in section A, use a varying number of inputs (N), outputs (M), fanout ($F_o$), and fanin ($F_i$). Recall that an [N,M,F] network provides a unique, constant delay path from each input port to each output port. This feature makes the [N,M,F] networks well suited to implement a self-routing, packet switched network that is compatible with well known packet-switched multistage interconnection network system designs. In a self routing [N,N,F] switching networks, input data packets are given a destination address tag denoting the desired output port for the particular packet, and switch settings are determined at the individual switches based on the tags of the input packets. The destination tag has the form:

$$K_F (D_{Log_K[N/F]-1} \ldots D_0)_K \quad (2.6)$$

where $(X)_K$ denotes that X is a radix-K number. The first radix-F number determines the destination link of the packet at the fanout stage. The $Log_K[N/F]$ radix-K numbers uniquely determine the destination links of the packet in each of the $Log_K[N/F]$ switching stages.

There are two other parameters that can be used to provide multiple paths between each logical input/output port, and tolerance to faults in the [N,M,F] switching network, respectively. See both prior references to A. Krishnamoorthy and F. Kiamilev, supra, and also A. Krishnamoorthy, F. Kiamilev, and S. Esener, "A new class of packet-switched extended-generalized shuffle networks," *Technical Digest OSA Annual Meeting '92*, (Albuquerque), p. 199, September 1992.

The first is the replication factor R, which gives the number of [N,M,F] networks that are cascaded back-to-back, so that the unsuccessfully-routed packets, if any, can be routed to intermediate destinations and then routed to the correct destination by the subsequent network (see section 4). The second is the tolerance factor T, which gives the number of [N,M,F] networks running in parallel, so that a fault in a particular switch or link in a network can be circumvented by routing the packet through one of the alternate networks. The common feature of all [N,M,F,R,T] switching networks, no matter what values of N, F, R, or T are chosen, is that each stage of the network uses the simple perfect-shuffle interconnection, or any of the topologically-equivalent connection patterns, the choice being dictated solely by technology cost considerations. Thus, these networks are well suited to implementation for a variety of technologies, including VLSI, Optoelectronic, and Photonic technologies, by choosing appropriate values of F, R, and T, and choosing the appropriate interconnection topology and switch size K. Sections 3 and 4 discuss these issues at greater length, and presents a detailed system design and analysis for an [N,N,F] free-space optoelectronic switching network.

3. Application of [N,M,F] Networks to Optoelectronic Switching Networks: Grain Size Considerations This section 3 investigates, at the system level, the performance-cost tradeoff between optical and electronic interconnects in an optoelectronic interconnection network. The specific system considered is a packet-switched, free-space optoelectronic shuffle-exchange multistage interconnection network (MIN). System bandwidth is used as the performance measure, while system area, system power, and system volume constitute the cost measures. A detailed design and analysis of a 2-D optoelectronic shuffle-exchange routing network with variable grain-size K is presented. The shuffle-exchange routing network described in this section 3 is an example of an [N,M,F] network with M=N, and F=1. The architecture allows the conventional 2×2 switches or grains to be generalized to larger K×K grain-sizes by replacing optical interconnects with electronic wires without affecting the functionality of the system. Thus the system consists of $Log_K N$ optoelectronic stages interconnected with free-space K-shuffles. When K=N, the MIN consists of a single electronic stage, with optical input/output. The system design uses an efficient 2-D VLSI layout and a single diffractive optical element between stages to provide the 2-D K-shuffle interconnection. Results indicate that there is an optimum range of grain-sizes that provide the best performance per cost. For the specific VLSI/GaAs MQW technology and system architecture considered, grain sizes larger than 256×256 result in reduced performance, while grain sizes smaller than 16×16 have high cost. For a network with 4096 channels, the useful range of grain-sizes corresponds to approximately 250–400 electronic transistors per optical I/O channel. The effect of varying certain technology parameters such as the number of hologram phase levels, the modulator driving voltage, the minimum detectable power, VLSI minimum feature size etc. on the optimum grain-size system is studied. For instance, results show that using four phase levels for the interconnection hologram is a good compromise for the cost functions mentioned above. As VLSI minimum feature sizes decrease, the optimum grain-size increases; whereas if optical interconnect performance in terms of the detector power or modulator driving voltage requirements improve, the optimum grain-size can be reduced. Section A provides a brief introduction and motivation for the study. In section B the relevant performance and cost metrics are defined. In section C packet-switched MIN architectures are reviewed and the functional design of the system is presented. In section D a 2-D optoelectronic shuffle-exchange network with variable grain-size is described. The architecture allows optical interconnects to be replaced with electronic wires without affecting the functionality of the system. Section E presents the main results of the paper vis-a-vis grain-size optimization. The effect of varying certain technology parameters such as the number of hologram phase levels, the modulator driving voltage, the minimum detectable power, etc. on system performance and cost are examined in section F. A summary and conclusions constitute section G. In this section 3 the discussion is limited to optoelectronic [N,N,1] networks where free-space optics is used solely for communication and all switching operations are performed electronically. The extension to networks with arbitrary fanning F is discussed in section 4.

3.1 Introduction

One of the most important features in a parallel processing system is the communications subsystem, linking processors, memories and input/output controllers. Interconnection between the input and output nodes is often the limiting factor in determining the performance and the cost of the parallel processing system. The interconnection subsystem also plays a crucial role in the field of telecommunications, where voice and video signals must be routed between input and output nodes at high throughput. As discussed in section 2, a scalable method of providing high bandwidth communication between the input and output ports is to use a Multistage Interconnection Network (MIN). See A. L. Decegama, *Parallel Processing Architectures and VLSI hardware: Volume* 1 Prentice Hall, 1989; also H. J. Siegel, *Interconnection Networks for Large-scale Parallel Processing*, $2^{nd}$ ed. McGraw Hill, (New York), 1990.

Several methods of implementing MINs have previously been investigated. These include electronic VLSI-based MINs (see W. Marcus and J. Hickey, "A CMOS batcher and banyan set for B-ISDN," in *Proc. Intl. Solid State Circuits Conf.,* IEEE Press, pp. 32–33, 1990; S. C. Knauer, A. Huang, and J. H. O'Neill, "Self-routing switching network," in *CMOS VLSI Design,* N. Weste and K. Eshragian, ed., chap. 9, Addison-Wesley, 1988; and J. Hickey and W. Marcus, "Implementation of a high-speed ATM packet switch using CMOS VLSI," in *Proc, Intl. Switching Symp.,* IEEE Press, pp. 75–84, 1990), free-space optoelectronic MINs (see H. S. Hinton, "Architectural considerations for photonic switching networks," *IEEE J-SAC,* vol. 6, no. 7, pp. 1209–1226, 1988; and F. Kiamilev, P. Marchand, A. V. Krishnamoorthy, S. Esener and S. H. Lee, "Performance comparison between optoelectronic and VLSI multistage interconnection networks," *IEEE/OSA J. Lightwave Tech.,* vol. 9, no. 12, pp. 1674–1692, 1991), and all optical MINs (see M. Murdocca and T. J. Cloonan, "The design of an all optical digital switch," *Appl. Opt.,* vol. 13, pp. 2505–2517, 1989). Results from a related study comparing the performance characteristics of VLSI and optoelectronic MINs show that free-space optoelectronic technology offers the potential to build MINs with higher bandwidths and more compact packages than possible with VLSI technology. See F. Kiamilev, et al., supra. In this section 3, the performance-cost tradeoff between optical and electronic interconnects in an optoelectronic MIN is investigated at the system level.

The main objectives of this analysis are as follows.

First, suitable metrics for the analysis of optoelectronic systems, and optoelectronic MINs in particular, must be determined. The purpose is to develop a methodology that will enable a system architect to analyze his system quantitatively by choosing an appropriate set of performance and cost metrics and to optimize them with respect to the given technology.

Second, optoelectronic multistage interconnection networks with variable grain-size must be designed and analyzed. The question is simply: at what level should one introduce optical technology in order to obtain an optimized optoelectronic interconnection network? Previous comparisons between optical and electronic interconnects at the component level, have suggested that optical interconnects have an energy advantage over electrical interconnects beyond a certain break-even line length. See M. R. Feldman, S. C. Esener, C. C. Guest, and S. H. Lee, "Comparison between electrical and free-space optical interconnects based on power and speed considerations," *Appl Opt.*, vol 27, no. 9, pp. 1742–1751, May 1988; also R. K. Kostuk, J. W. Goodman, and L. Hesselink, "Optical imaging applied to microelectronic chip-to-chip interconnections," Appl. Opt., vol 24, no 17, pp 2851–2858, September 1985. This study examines the question at the system level for a class of MIN architectures, based on both performance and cost metrics. The approach taken here is to first perform a detailed design and analysis of a specific optoelectronic MIN system. The system allows optical interconnects to be traded-in for electronic interconnects by changing the grain size (or switch size) K, without affecting the functionality of the network. The cost functions are then minimized with respect to K to obtain a MIN design optimized from technological considerations alone.

Third, how component characteristics affect overall system performance must be evaluated. The quantitative results mentioned above are dependent on certain simplifying assumptions about the system and certain assumptions regarding state-of-the art technologies. Since both electronic and optical technologies are continuously evolving, it is useful to determine which technology parameters are crucial to system performance and cost, and how they affect the tradeoff between optical and electronic system components. This may also enable the system architect to identify the critical optoelectronic technologies that will have the most profound effects on the performance and cost of future optoelectronic systems.

Fourth, alternative architectural choices/grain designs for higher performance must be investigated. The purpose is to investigate alternate system architectures and grain designs to reduce packet contention in the network and therefore increase system bandwidth. In this case, it is useful to examine where these systems lie on the performance-cost curves and how they compare to fully electronic systems.

The specific system considered is a synchronous packet-switched, optoelectronic shuffle-exchange multistage interconnection network.

3.2 Definitions of Performance and Cost Metrics

In order to quantify and optimize the performance of an optoelectronic system, one must choose appropriate cost and performance metrics. The cost and performance metrics that have been chosen for this paper are:

1) System footprint area. The system footprint area is taken as the area of the largest planar surface in the 3-D optoelectronic system.

2) System volume. The system volume is taken as the volume occupied by the 3-D optoelectronic system.

3) System power. The system power consumption is defined as the sum of the power dissipated by optoelectronic devices (modulators and detectors) and electronic devices, power dissipated in driving electrical interconnect, and the total optical power supplied to the modulators to drive the optical interconnect.

4) System bandwidth. The network bandwidth is defined as the expected number of network access requests accepted per unit time. The network bandwidth is a product of the system clock speed, network size, and the probability that an arbitrary request will be accepted by the network. The system clock speed is determined by the speed of the electronic and optoelectronic devices, and the delay of the electrical and optical interconnects.

3.3 Multistage Interconnection Networks

This section 3.3 provides a general review of multistage interconnection network architectures and a description of the specific architecture used in the analysis. Note that this section provides only the functional design of the network; implementation details (e.g. using grain-size concept to vary the ratio of optics and electronics) are described in later sections.

3.3.1 Review of Multistage Interconnection Network Architectures

Figure 17:
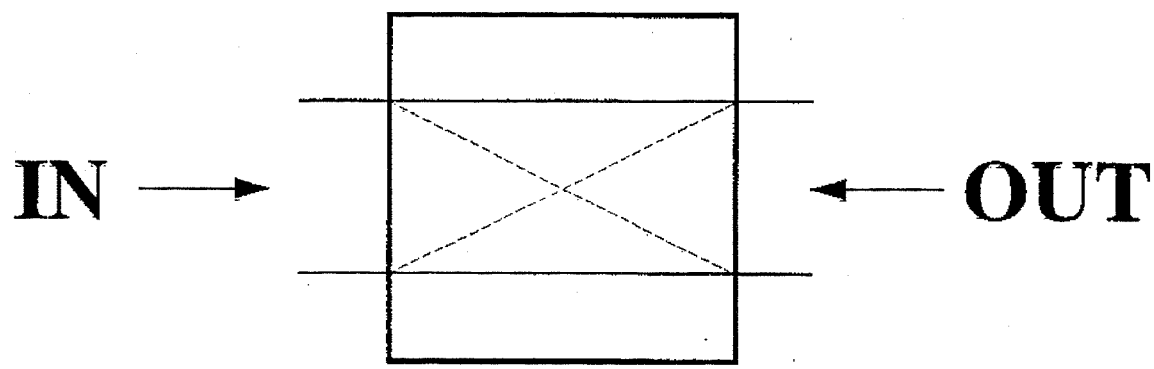
FIG. 17 shows that a 2×2 "bypass-exchange" switching element is the basic building block of a MIN; inputs are either passed straight through or switched (exchanged).

The basic building block of a multistage interconnection network is a K×K self-contained switching element. In it's simplest form, it is a 2×2 element with two inputs and two outputs as shown in FIG. 17. The function of the switch is to route input data packets entering on the left to one or both outputs on the right. A data packet is a unit of information containing the packet header with self-identifying instructions that pertain to the units' source address, destination address and intended treatment, as well as the data message. Note that the term switching element is used instead of processing element to avoid confusion between the processors attached to the network and those used within the network.

Many variations of the basic 2×2 switching element are possible. For instance, loss of packets due to internal contention can be avoided by buffering packets entering on different inputs and destined for the same output. See D. M. Dias and J. R. Jump, "Analysis and simulation of buffered delta networks," *IEEE Trans. Comput.*, vol. C-30, pp. 273–282, 1981. The switching elements can act in different ways on the bits of the destination address, leading to different routing algorithms. See A. L. Decegama, supra. The switching elements can be larger than 2×2, which will result in improved network bandwidth if the switches are contention-free. See C. P. Kruskal and M. Snir, "The performance of multistage interconnection networks for multiprocessors," *IEEE Trans. Comput.*, vol. C-32, pp. 1091–1098, 1983. In this case, the K×K switch must be capable of realizing any 1-1 interconnection permutation between its K inputs and K outputs. See A. L. Decegama, supra. This section 3 will focus on non-buffered networks that use K×K electronic switches built from simple 2×2 switching elements. The analysis will later be extended to K×K contention-free switching elements (section 4). Throughout this study serial transmission and processing of data packets and fixed length data packets will be assumed. These assumptions lead to a simple design for the switching element requiring less than 100 transistors. Various networks can be constructed by repeating the basic switching elements in stages (rows) and interconnecting the stages. For instance, the use of irregular interconnections between stages can lead to multistage interconnection networks with a high degree of fault-tolerance and low contention. See R. Paturi, D. T. Lu, J. E. Ford, S. C. Esener, and S. H. Lee, "Parallel algorithm for expander graphs for optical computing," *App. Opt.*, vol. 30, pp. 917–927, 1991. Alternatively, a sorting network can be constructed that uses the shuffle interconnection between stages to eliminate internal contention at the cost of using more switching elements. See H. S. Stone, "Parallel processing with the perfect shuffle," *IEEE Trans. Comput.*, vol. C-20, pp. 81–89, 1971. In this paper, the focus will first be on routing networks that use regular interconnections; the analysis will later be extended to sorting networks.

There is a large class of multistage interconnection networks that are topologically equivalent (isomorphic) and have equivalent functional performance. These networks include shuffle-exchange, banyan, omega, flip, cube, baseline, and delta networks. See A. L. Decegama, supra. This paper is concerned with the analysis of optoelectronic implementations of this class of networks. Since these networks have the same functional performance, one may choose an interconnection topology well suited to optoelectronic technology such as the 2-D shuffle interconnection topology. The following section uses the banyan network to describe the routing algorithm and functional design of the network. Note that this routing algorithm and functional design apply to optoelectronic 2-D shuffle-exchange networks because of the topological equivalence between the banyan network and 2-D shuffle-exchange networks with variable grain-size. See optoelectronic multistage interconnection networks," *Applied Opt.*, vol. 31, no. 26, pp. 5480–5507, September 1992.

3.3.2 Functional System Design

Figure 18:
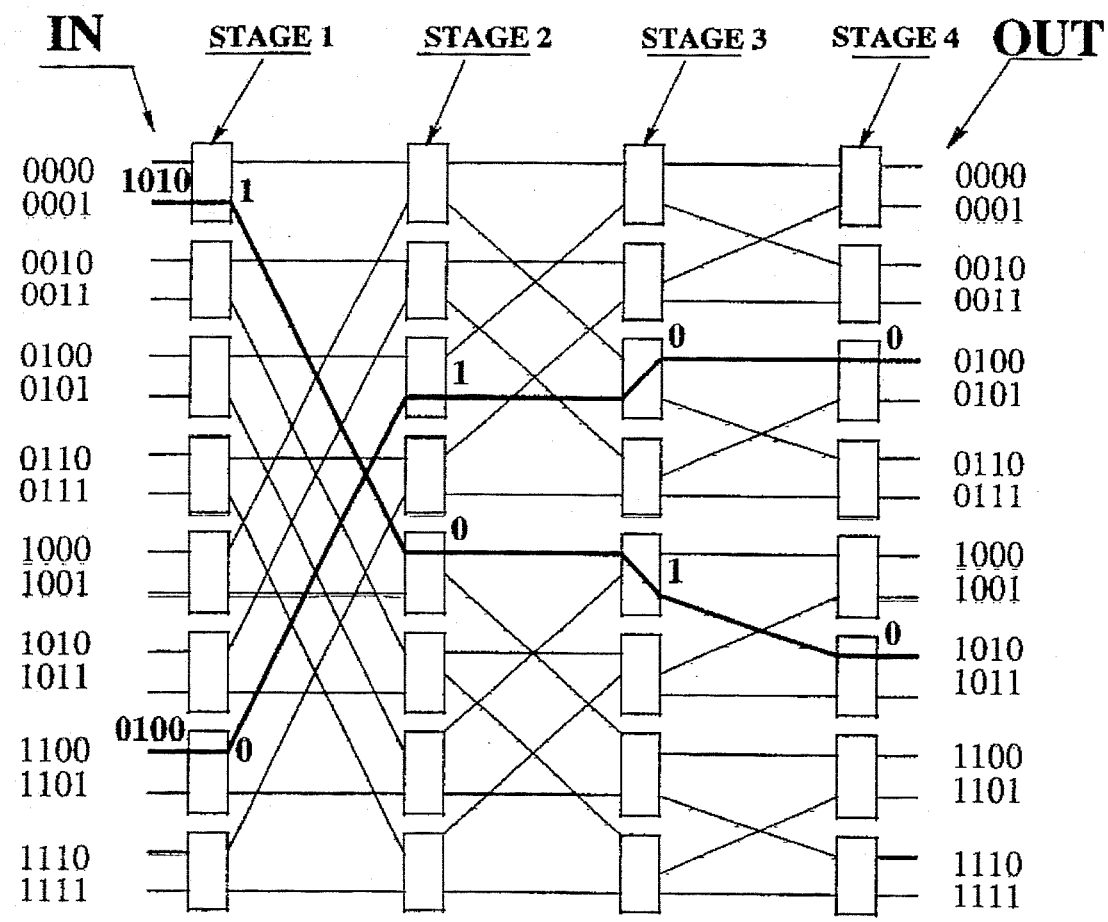
FIG. 18 shows an example of a 16×16 Banyan network using 2×2 switches where highlighted paths illustrate the destination-based routing algorithm.

This section describes the functional design for the network architecture considered in this paper. Similar designs have been previously fabricated in VLSI technology and are described elsewhere. See W. Marcus and J. Hickey, supra; S.C. Knauer, A. Huang, and J. H. O'Neill, supra; and J. Hickey and W. Marcus, supra. Here we will focus on the functional characteristics of the design relevant to this study. The network architecture we will consider here is based on the banyan interconnection topology. See A. L. Decegama, supra. An example of a 16×16 banyan network is shown in FIG. 18. A banyan network built from 2×2 switching elements supports N input and N output channels and has $Log_2N$ stages with N/2 switches per stage. The destination based routing algorithm is often used for banyan networks. See D. H. Lawrie, "Access and alignment of data in an array processor," *IEEE Trans. Comput.*, vol. C-24, pp. 1145–1155, 1975. The destination based routing algorithm is illustrated by following the progress of two packets with destination addresses of 1010 and 0100. The switch elements work on subsequent bits of the destination address in each stage, routing the packet to the upper output upon seeing a 0, and to the lower output upon seeing a "1". Regardless of the input by which the packets enter the network, the destination based routing algorithm will always route the packets to the proper destination on the output side. Although the destination based routing algorithm can be operated asynchronously, synchronous operation is assumed throughout this paper. All packets are required to enter the network at the same time. This assumption simplifies network design because asynchronous packet processing operations would necessitate enhanced functionality in each 2×2 switching element.

The network routes N serial input data streams in a packet format. All packets have equal length and enter the network at the same time. Each packet is divided into data and header sections. The data section contains a fixed length message being sent. The packet header contains the destination address where the packet must be routed. The address bits of the destination address are ordered most significant bit (MSB) to least significant bit (LSB). Preceding the MSB in the header is an activity bit, which is "1" if the packet contains an active message and "0" if the packet is empty. The format of the packet is:

$$[\text{Activity bit}] [\text{Destination address}] [\text{Data}] = AD_{LOG2N-1} \ldots D_0 R_K \ldots R \quad (3.1)$$

where A is the activity bit, D is the destination address, and R is a k-bit data message. The activity bit is the first bit of the packet to enter the network. The length of each packet is $(k+Log_2N+1)$ bits.

Figure 19:
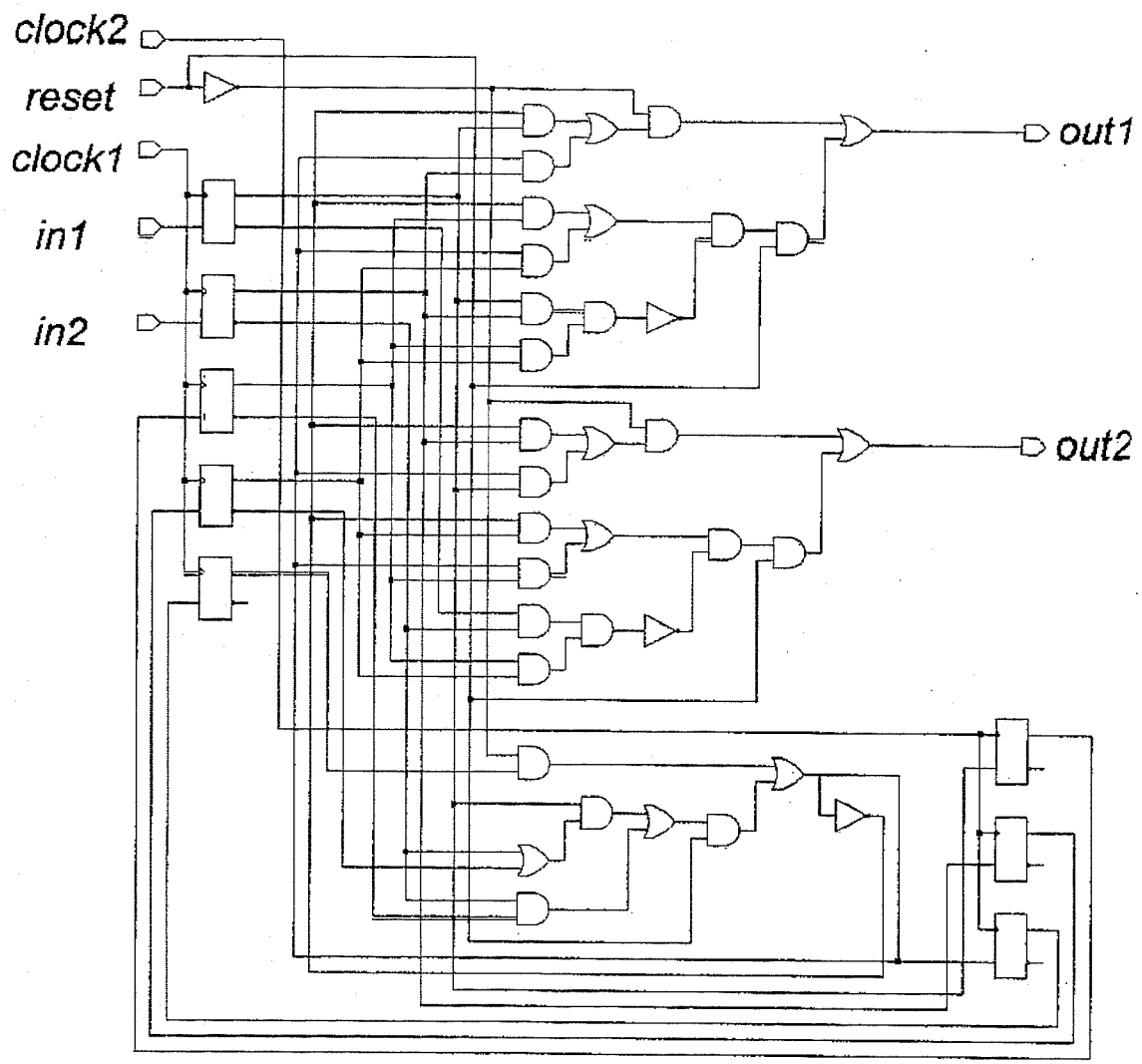
FIG. 19 shows the logic design of a preferred 2×2 bypass-exchange switching element.

An important factor in the performance and cost of the networks studied in this paper is the gate-level design of the switching element. FIG. 19 shows a functional gate-level design of the switching element used in this study, implemented with generic logic gates. Switching elements of similar functionality have previously been fabricated in CMOS VLSI technology using 70 to 150 MOS transistors. See W. Marcus and J. Hickey, supra; and S. C Knauer, A. Huang, and J. H. O'Neill Besides having two input and two output ports for routing the packets, the switching element has input port for clock and reset signals. The operation of the switching element is pipelined, so that one bit of each input packet can be processed in every clock cycle. When the first bits (e.g., the activity bits) of the input packet enter the switch, they are saved in two registers. On the next clock cycle, the MSB routing bits enter the switch and the reset signal is toggled. During this clock cycle, the switch sets itself to either pass or exchange states and outputs the saved activity bits. The decision to set the switch state is made by examining the routing bits and the saved activity bits.

The switching elements in a given stage receive identical control signals generated and broadcast by the control circuitry for that stage. Identical clock signal is broadcasted to all stages to ensure synchronous operation. When N packets first enter the network, the reset signal is toggled for the first network stage. On the next clock cycle, the reset signal is toggled for the second network stage, and so on until the last stage. After $Log_2N+1$ clock cycles, all switches are frozen in either pass or exchange state and the data section of the packets is pipelined through the network.

There is a possibility that during the transmission some packets will be dropped due to internal network contention. There are several well known methods to alleviate this problem which generally increase the switching element complexity or increase the number of network stages to reduce blocking. In section 4 two such networks are considered, as well a novel technique of increasing the fanout of the network, and their performance and cost as compared with the basic design is analyzed.

3.4 Optoelectronic 2-D Shuffle Based MIN

This section describes how the architecture of the previous section can be mapped onto optoelectronic hardware in a manner that allows one to vary the ratio of optics and electronics in the system. In the following, a detailed description of an optoelectronic implementation of the 2-D shuffle interconnection network with variable grain-size is presented. Section 1 describes the 2-D shuffle interconnection topology and the modified destination based algorithm used for the optoelectronic MIN. Section 2 presents the assumptions behind the optoelectronic model, and section 3 describes the optoelectronic chip layout and the optical system. Section 4 is dedicated to the derivations of the performance and cost measures defined in section B, as a function of the network size, the grain-size and the relevant technology parameters.

3.4.1 2-D Shuffle-Exchange Based OE-MIN Architecture for K×K Grain

While planar VLSI technology lends itself to modular implementations of existing one-dimensional network topologies, the three-dimensional nature of free-space optically interconnected MINs allows the use of more efficient network topologies. Optoelectronic network implementations interconnect 2-D arrays of switching elements and thus are naturally suited to a 2-D interconnection topology. The 2-D shuffle-exchange network has previously been suggested as a viable approach to the implementation of optoelectronic interconnection networks. See A. Lohman, G. Stucke, and W. Stork, "Optical perfect shuffle," *Appl. Opt.*, vol. 25, pp. 1530–1531, 1986; also S. H. Lin, T. F. Krille, and J. F. Walkup, "2-D optical multistage interconnection networks," in *Digital Optical Computing, SPIE Proceedings*, vol. 752, pp. 209–216, 1987. The advantage of the shuffle-exchange network over other networks such as the butterfly or crossover lies in the fact that the interconnection patterns of all stages of the network are identical. See Siegel. supra; also J. Jahns and M. J. Murdocca, "Crossover networks and their optical implementation," *Appl. Opt.*, vol. 27, no. 15, pp. 3155–3160, 1988. This leads to simpler fabrication since the optical interconnection elements are be identical at each stage.

Figure 20:
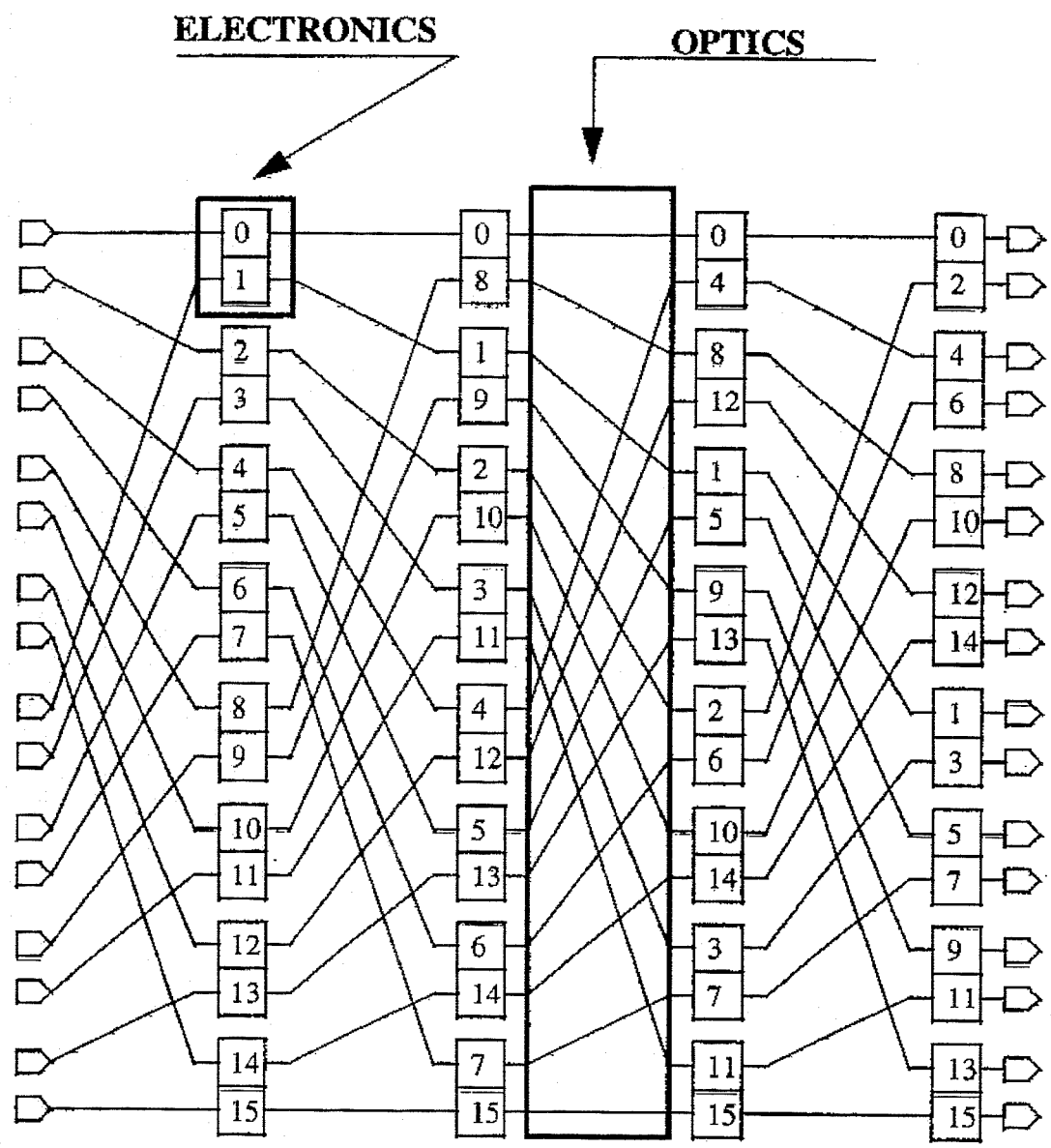
FIG. 20 shows a 16×16 optoelectronic shuffle-exchange network with grain size K=2.
Figure 21:
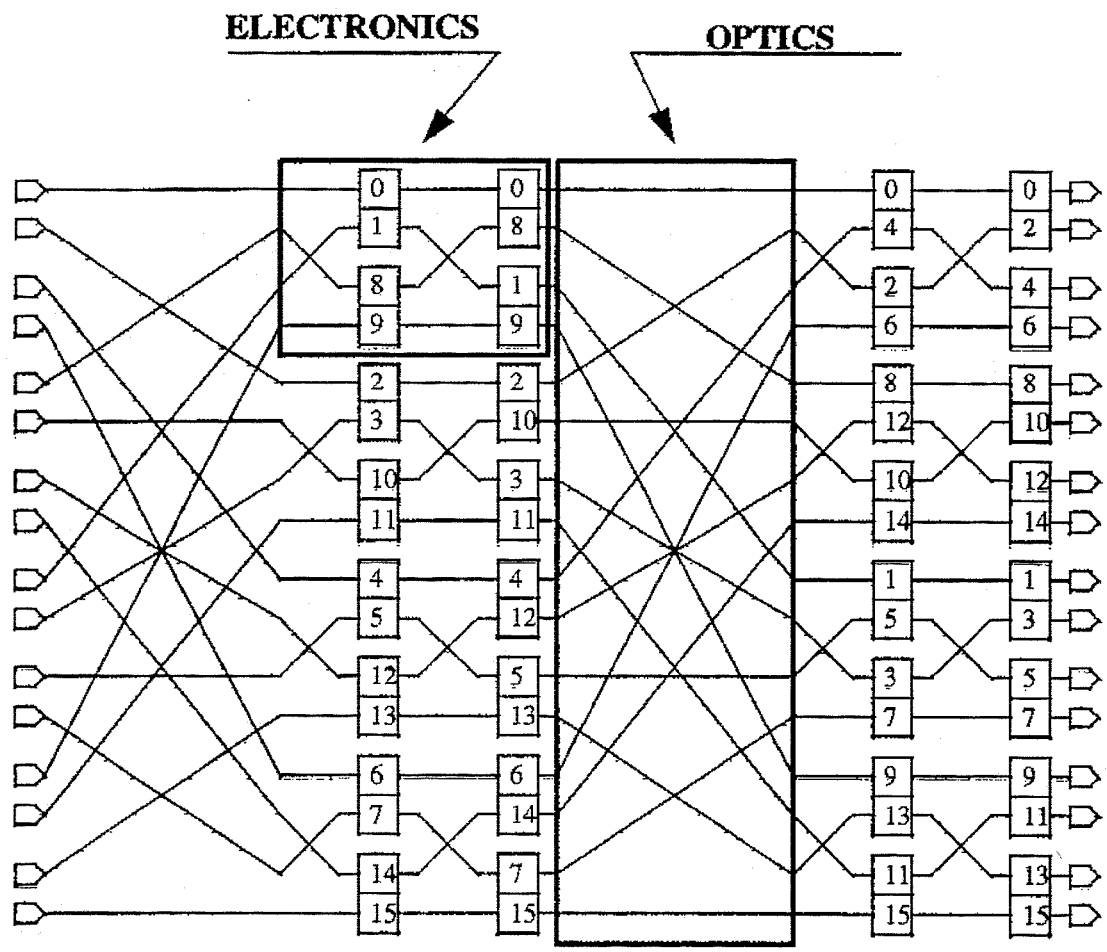
FIG. 21 shows a 16×16 optoelectronic shuffle-exchange network with grain size K=4.

The 2-D shuffle network with grain-size K is functionally equivalent to the banyan network that was described earlier. See A. Krishnamoorthy, P. Marchand, F. Kiamilev, and S. Esener, supra. Each stage of the 2-D shuffle network is made up of smaller K×K shuffle networks built from the basic 2×2 banyan switching element. Each stage provides N input and N output channels using N/K smaller K×K shuffle networks. The total number of stages in the 2-D shuffle with grain-size K is $\text{Log}_K N$. These stages are connected using a K-shuffle; the interconnection topology depends on the value of K being used. In the optoelectronic implementation of this system, the smaller K×K shuffles are implemented electronically with N/K such shuffles per plane. See FIGS. 20 and 21. The $\text{Log}_K N$ planes are optically interconnected to form the 2-D shuffle network with grain-size K. In practice the last optical shuffle used for data alignment can be omitted so that only $\text{Log}_K N-1$ optical K-shuffles are needed. With this design, one can vary the ratio of optics and electronics in the system by changing the K parameter. With K set equal to N, there is only one plane containing a large N×N electronic shuffle network. This case represents an electronic network that uses optics for I/O only. On the other hand, for K=4, the design uses $\text{Log}_4 N$ stages where each stage contains small 4×4 electronic shuffles. In this case, optical interconnects are used extensively in the network. When K=√N, the resulting optoelectronic network has only one stage of optical interconnections. It should be noted that N and K are restricted to integer powers of 4 to simplify the design and analysis of the system. In general one can extend this analysis to other values of K. See J. Patel, "Performance of processor-memory interconnections for multiprocessors," *IEEE Trans Comput.*, vol. C- 30, pp. 771–780, 1981.

The next concern is the physical implementation of the 2-D shuffle-exchange network with variable grain-size. The interconnection function achieved by one stage of the optoelectronic 2-D shuffle-exchange network with a grain-size of K is equivalent to simultaneous 1-D K-shuffles along the vertical and horizontal directions. This function achieves the desired permutation but also inverts the input pattern in the output plane. This is due to the optical system implementation (imaging system) that imposes the image inversion. This transformation can be represented as:

$$a_{(i,j)} \rightarrow a\left(\left(\sqrt{N} - i\sqrt{K} - \left[\frac{i\sqrt{K}}{\sqrt{N}}\right] - 1\right), \left(\sqrt{N} - j\sqrt{K} - \left[\frac{j\sqrt{K}}{\sqrt{N}}\right] - 1\right)\right)_{\text{mod}\sqrt{N}} \quad (3.2)$$

where N is the number of communication channels and i,j=0 to √N −1, and where $\hat{I}X^o$ represents the largest integer less than or equal to X.

Figure 22:
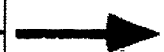
FIG. 22 shows a mapping of the interconnection achieved with one stage of a 2-D shuffle for network size N=64 and grain size K=4.
Figures 24A, 24B:
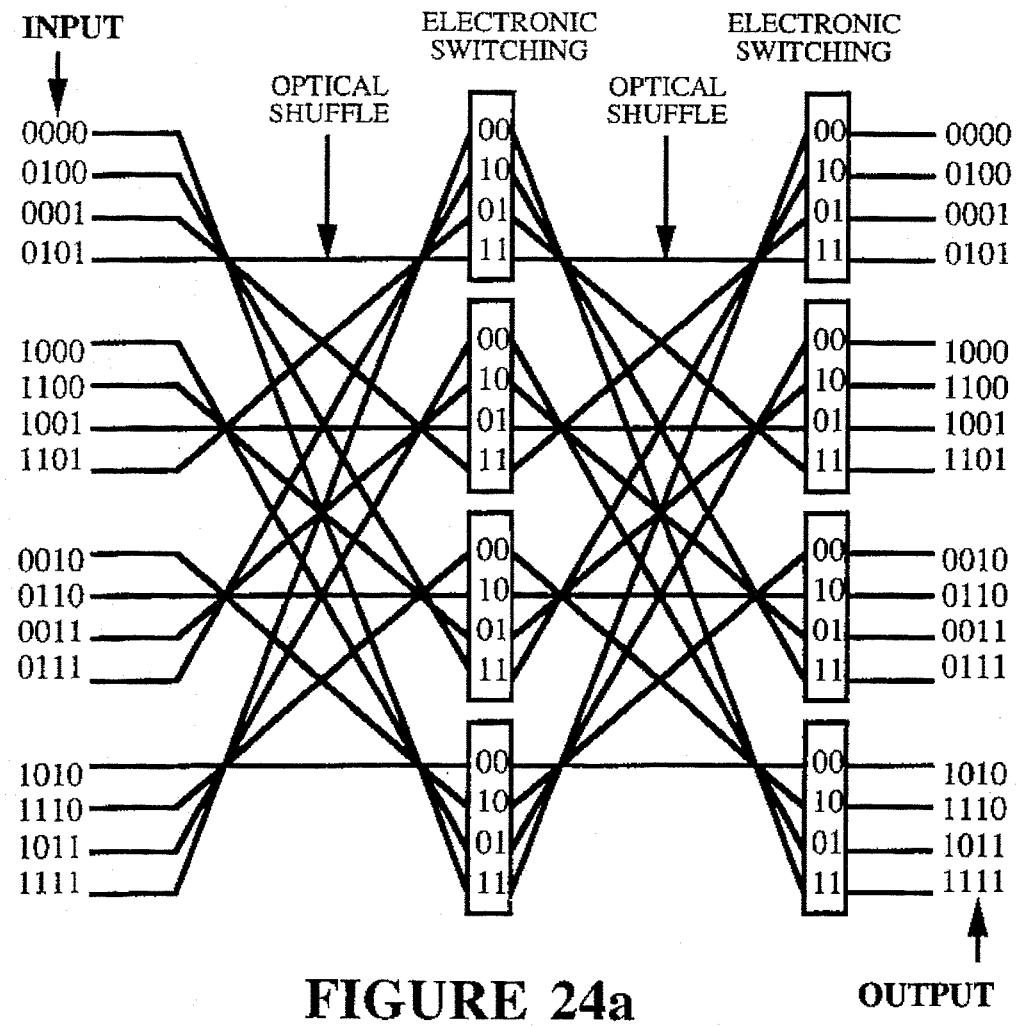
FIG. 24, consisting of FIG. 24a and FIG. 24b, shows an example of a 16×16 2-D shuffle-exchange network with K=4 where highlighted paths illustrate the 2-D destination-based routing algorithm.

As an example, consider the case of a 2-D shuffle-exchange network with a grain-size K=4. FIG. 22 shows the interconnection function achieved by one stage of this particular network. For this network, each electronic switch has 4 inputs and 4 outputs. In FIGS. 23a and 23b a simplified representation of one switch with 4 modulators, 4 detectors and local electronic circuitry is shown. Using this type of switch, N/K=N/4 switches per stage and $\text{Log}_K(N)=\text{Log}_4(N)$ stages of switching elements are required to implement the network. FIG. 23b shows the schematic representation of the switch and its 1-D equivalent. Using this 1D representation of the switch, the 2-D shuffle-exchange network can be modeled as shown in FIG. 24. This representation shows a 16-channel network with 4 switches per stage and $\text{Log}_4(16)=2$ stages. For an N channel network, m address bits, $m=\text{Log}_2(N)$ address bits are required to specify the destination address. Half of these bits represent the X address while the other half represent the Y address. The destination address of any incoming packet is then defined by the following binary sequence: $(X_1, X_2 \ldots X_{m/2}, Y_1, Y_2 \ldots Y_{m/x})$. $X_1$ and $Y_1$, the most significant bits of the destination address, define which output of the first stage electronic switches will be used by the incoming data. $X_2$ and $Y_2$ define the output of the second stage switches, while $X_{m/2}$ and $Y_{m/2}$ define the switch outputs of the network's last stage. Since the optical implementation inverts the patterns after each optical shuffle, the destination address bits must be alternately flipped, beginning with the most significant bits. Hence, the address bit pairs $X_1, Y_1$, $X_3, Y_3$, . . . will be inverted. FIG. 24 shows an example of this routing algorithm for a network with N=16 channels. Data input to the network at address $X_1 X_2 Y_1 Y_2 = 0100$ (4) is routed to the output address $X_1 X_2 Y_1 Y_2 = 0111$ (7). The control bits of the electronic switch in the first stage are then and those of the second stage are $X_2 Y_2 32 11$.

In summary, the 2-D shuffle with variable grain-size allows one to vary the ratio of electronics and optics in the interconnection network design, without changing its functionality. Thus the behavior of the performance and cost functions as the grain-size K varies, is dependent solely on technological considerations.

3.4.2 Optoelectronic Technology Assumptions

Before describing the optoelectronic implementation, the assumptions behind the optoelectronic technology model used in this paper are reviewed. The model assumes that detectors and modulators are integrated with VLSI circuitry and are interconnected using free-space optical interconnections. See W. Dobblelaere, D. Huang, M. S. Unlu, and H. Morkoc, "AlGaAs/GaAs multiple quantum well reflection modulators grown on Si substrates," *Appl. Phys. Lett.*, vol. 55, pp. 94–96, 1988. The VLSI model used in this analysis is based on CMOS technology with two layers of metal interconnect. See Table 1 in FIG. 25 for a summary of the symbols used in this section 3.5.1. The following assumptions are made:

1. All electronic switching elements are identical in shape, size and functionality; each having K bit-serial inputs and K bit-serial outputs.

2. The function of the electronic K×K switching element is performed by a K×K shuffle-exchange network built out of 2×2 bypass-exchange electronic switches. A total of K/2 $Log_2 K$ 2×2 switches are used in a K×K grain. Each 2×2 electronic bypass-exchange switch is implemented using M electronic transistors; each transistor occupies an area of $A_o l_e^2$ where $i_e^2$ is the minimum feature size of the CMOS technology. The 2×2 bypass-exchange switch can operate at a maximum speed of $f_{pe}$.

3. Each K×K switching element is implemented using ½ K M $Log_2$ K electronic devices (i.e. transistors), K modulators and K detectors and the required electrical interconnections for a K×K shuffle.

4. All interconnections within a switching element are implemented using two layers of metal interconnect; one layer providing all horizontal paths and the other for all vertical paths.

5. At most two wires can cross each other at any point in the plane.

6. Parallel wires must be at least $Wl_e$ apart, where W is called the wire pitch.

7. No repeaters are used for wires within a switching element. The resulting wire delay expression is given by:

$$T_{90\%} = 2.3 \left( \frac{1}{2} R_0 C_{int} L_{max} + \frac{1}{2} R_0 C_0 + R_{int} L_0 L_{max} \right) + R_{int} C_{int} L_{max}^2 \qquad (3.3)$$

where $T_{90\%}$ is the rise time of the wire, $R_0$ is the on-resistance of the driver transistor, $R_{int}$ and $C_{int}$ are the respective resistance and capacitance per unit length of the wire, and $C_0$ is the input capacitance of the transistor that forms the load. See H. B. Bakoglu, *Circuits, Interconnections and Packaging for VLSI*, Addison Wesley, 1990.

8. The K×K switching elements in a given stage are arranged in square 2-D array with the modulators and the detectors being uniformly and evenly distributed in the plane. The center to center spacing between two neighboring modulators (detectors) is defined as D and the modulator width is defined as d. See FIG. 26.

9. The 2-D shuffle optical interconnection between two successive stages of the network is implemented by means of a simple imaging system using diffractive elements as described in section 3. The diffractive elements are multi-level phase Holographic Optical Elements (HOE), where F is the number of phase levels, and are fabricated via electron-beam lithography with a minimum feature size defined as $d_{mfs}$ (typically 0.5 µm). See K. S. Urquhart, S. H. Lee, C. C. Guest, M. R. Feldman, and H. Farhoosh, "Computer-Aided Design of Computer Generated Holograms for Electron Beam Fabrication," Appl. Opt.,vol 28, pp 3387, 1989; also K. S. Urquhart, H. Farhoosh, and S. H. Lee, "Diffractive lenses utilizing cylindrical fresnel zone plates," *SPIE Proceedings*, vol. 1211, pp. 184–190, 1990.

10. GaAs MQW transmission mode modulators are assumed. See D. A. B. Miller, "Optoelectronic applications of quantum wells," *Optics and Photonics news*, vol. 1, no. 10, pp. 7–20, 1990. The modulator and its driving circuit are modeled as a driver-capacitor circuit. A cascaded driver circuit is used. See H. B. Bakoglu, supra. The modulator area is defined as $A_{mod}$ and the driver circuit area, $A_{md}$, is given by:

$$A_{md} = 4 A_o \left( \frac{C_M}{C_o} - 1 \right) \lambda_e^2 \qquad (3.4)$$

where $C_m$ and $C_o$ are modulator and minimum sized invertor capacitances respectively. The modulator and its driver circuit power consumption ($P_{mod}$ and $P_{md}$ respectively) are given by:

$$P_{mod} = K_L C_M V_m^2 f \qquad (3.5)$$

$$P_{md} = K_L (C_m - C_o) V_m^2 f \qquad (3.6)$$

where f is the system clock speed, $V_m$ is the modulator operating voltage, and $K_L$ is the duty cycle. The delay of the driver-capacitor circuit is given by:

11. Silicon-based detectors are assumed. To maximize the speed $$T_{50\%} = 0.7 R_o C_o \ln \left( \frac{C_m}{C_o} \right) \qquad (3.7)$$

and to minimize the optical power requirements, an amplifier circuit is used. The detector area is defined as $A_{det}$ and the amplifier circuit area, $A_{da}$, is estimated to be:

$$A_{da} = 20 A_o \lambda_e^2 \qquad (3.8)$$

The detector amplifier circuit power consumption are estimated to be:

$$P_{da} = I_{diff} V \qquad (3.9)$$

where $I_{diff}$ is the differential amplifier bias current and V is the CMOS operating voltage. At 100 Mhz clock speed and 20 mm detector size, the incident optical power ($P_{det}$) is assumed to be 40 Mw. See A. Dickinson and M. E. Prise, "Free-space optical interconnection scheme," *Appl. Opt.*, vol. 29, pp. 2001–2005, 1990.

12. To simplify the analysis, we limit it to the network fabric. The overhead of generating and distributing clock, control, and power signals is ignored in the model.

3.4.3 Chip Layout and Optical System for 2-D Shuffle-based Grain

For a system with grain-size of K, each stage of the network contains N/K K×K optoelectronic grains (electronic switching elements with K optical inputs and K optical outputs) arranged in a square 2-D array with the modulators and the detectors being uniformly distributed in the plane. See FIG. 26. Each K× grain contains a K×K electronic shuffle-exchange network built using $Log_2$ K stages of K/2 2×2 electronic bypass-exchange switches described in section C. FIGS. 27–29 show how an ordinary shuffle-exchange network layout is transformed into a 2-D layout suitable for the optoelectronic system design. FIG. 27 begins with a familiar shuffle-exchange network for N=16. Next, in FIG. 28, each 2×2 bypass-exchange switch is partitioned into 2 half-switches. Each half-switch now accepts one input from previous stage and one input from its neighbor half-switch on the same stage. Each half-switch also produces one output for the next stage and one output for its neighbor half-switch in this same stage. Next, the half-switches are labeled such that the label of the half-switch in stage i is the same as the label of the half-switch it is connected to in the previous stage. Using this strategy, th % labelling of the first stage of half-switches is arbitrary; this sets the labels for the half-switches in all the following stages. The key idea for the 2-D layout of the shuffle network is to physically group together half-switches that have the same label. This concept allows the shuffle network to be efficiently laid-out in two-dimensions. See FIG. 29. In the 2-D shuffle layout, $Log_2$ K switches are grouped together and K groups of these switches are arranged in the plane to form a K×K grain. The shuffle interconnections of the 1-D shuffle become local interconnects for the 2-D layout and the exchange interconnections become the global interconnects. The global interconnects are essentially equivalent to the 2-D hypercube layout which has been used as an efficient VLSI layout topology for hypercube computers. See W. J. Dally, *A VLSI Architecture for Concurrent Data Structures*, Kluwer Academic, 1987. The area, power consumption and speed of this shuffle layout will be analyzed in the following section. To simplify the analysis, square arrays are assumed; this restricts K to be a power of 4. In practice th % layout can be easily modified to allow K to be any power of 2.

To calculate the area of the layout, the area of one group is calculated and then multiplied by the number of groups, K. Each group contains one modulator and one detector, their associated driver and amplifier circuits, $Log_2$ K half-switches, and the wiring bay area for global interconnections between the groups. In order to maintain uniform modulator and detector spacing, the area of the largest group must be found. This will determine the area of all K groups. Each group contains a fixed amount of logic circuitry and optoelectronic devices. This area ($A_{logic}$) is given by:

$$A_{logic} = A_o \left( \frac{M}{2} \right) \log_2 K \lambda_e^2 + A_{mod} + A_{det} + A_{md} + A_{da} \quad (3.10)$$

From work in VLSI complexity theory, it is known that any layout of a K×K shuffle-type network that is partitioned into two equal parts will have O(K) wires crossing the boundary. See C. D. Thompson .... This is because the shuffle network has O(K) bisection width. The 2-D layout is no exception to this rule; a cut in the middle of the layout has K wires crossing it. As illustrated in FIG. 29, the middle row (or column) needs K tracks for global wires. Each group needs $\sqrt{K}$ horizontal and $\sqrt{K}$ vertical individual wiring tracks for global interconnects in order to obtain uniform modulator and detector spacing for all groups within the grain. It should be noted that some additional local wiring is needed within each group to connect the logic to the global wires, but their contribution to the area of the group is small and can be neglected. The area of each group is then:

$$A_{group} = (\sqrt{A_{logic}} + \sqrt{K} \, W \lambda_e)^2 \quad (3.11)$$

where W is the wire pitch (in $l_e$ units) and K is the grain-size. The area of the grain is simply K times the above expression. Since there are N/K groups in each plane the total OEIC chip area for a network with N channels and grain-size of K is given as N times the area of one group. Another important parameter for optical system is the modulator spacing. This is given as the square root of the group area:

$$A_{group} = \sqrt{A_{logic}} + \sqrt{K} \, W \lambda_e = \quad (3.12)$$

$$\sqrt{A_o \left( \frac{M}{2} \right) \log_2 K \lambda_e^2 + A_{mod} + A_{det} + A_{md} + A_{da}} + \sqrt{K}$$

In order to evaluate the speed limit of this layout, the longest wire in the grain must be determined. The longest wire in the 2-D layout will traverse exactly half of the grain as seen from the layout in FIG. 29. The basic idea is that a normal shuffle interconnection layout requires longest wires to traverse half the length of a stage, or K/4 switching elements. Similarly, the 2-D layout partitions the network in two dimensions using only horizontal and vertical wiring, and requires the longest horizontal or vertical wire to traverse half the length of the K×K switch, or $\sqrt{K}$ switches. The longest wire length is then:

$$L_{max} = \frac{1}{2} \sqrt{K} \, \Delta \quad (3.13)$$

Assuming minimum pitch metal wires and 2× drivers, the global wire will support a clock speed of up to (equation 5.3):

$$F_{max} = \frac{1}{2.3 \left( \frac{1}{2} R_0 C_{int} L_{max} + \frac{1}{2} R_0 C_0 + R_{int} C_0 L_{max} \right) + R_{int} C_{int} L_{max}^2} \quad (3.14)$$

The power consumption of the grain is given as the sum of electrical switch power, power for global electrical interconnects within the grain and the power required for optoelectronic devices and their supporting circuitry. The following equation describes the power of the electronic switches and optoelectronic devices:

$$P_{pe} = K \left[ P_{da} + (P_{mod} + P_{md}) + F K_{pe} \log_2 K \left( \frac{M}{2} \right) C_0 V^2 \right] \quad (3.15)$$

where f is the system clock speed, and $K_{pe}$ is the fraction of the devices in the switching element that simultaneously switch during a clock cycle, The power required for the electrical interconnect depends on the total length of the electrical wires used in the grain. Since each group has wires 1,2,4 ... $\sqrt{K}/2$ groups away from it in both vertical and horizontal direction, the electrical interconnect power for the grain will be:

$$P_{int} = C_{int} V^2 F K_L \left( 1 + 2 + 4 + \ldots + \frac{\sqrt{K}}{2} \right) 2\Delta K \quad (3.16)$$

which can be simplified to:

$$P_{int} = K F K_L C_{int} (\sqrt{K} - 1) V^2 \quad (3.17)$$

Then the total power budget for the grain is given as the sum of the above:

$$P_{grain} = P_{int} + P_{pe} \quad (3.18)$$

In order to quantify the performance and cost of the 2-D layout, it is useful to compare it with conventional VLSI shuffle layouts. See F. Kiamilev, P. Marchand, A. V. Krishnamoorthy, S. Esener. supra. FIG. 30 shows the clock speed of the two different layouts as a function of the switch size K. In both cases, as K increases, the electronic delay within a grain becomes sufficiently large to necessitate a reduction of the clock speed of the system. This causes a drop in the network bandwidth. It can be seen that the 2-D layout outperforms a conventional VLSI layout for identical technology assumptions. These assumptions are listed in table 2 of FIG. 31. Since the drop in clock speed for the 2-D layout occurs less quickly than in conventional layouts. FIG. 32 shows that the 2-D shuffle layout area growth is slower than that of conventional layouts. The advantages of this 2-D layout arise from the distribution of the network input/output ports in two dimensions, in contrast to conventional layouts that use only one dimension for inputs and outputs. It should be stressed that the conventional layout of the shuffle is well suited to planar electronic chips because the I/O ports are placed on the periphery of the chip. On the other hand, the 2-D shuffle layout is well suited to optoelectronics because the I/O ports are uniformly distributed on the chip plane.

FIG. 30 shows that, for the assumed design parameters, the 2-D shuffle layout clock speed begins to reduce at a network size of about 512. In general, this critical point will be strongly dependent on the device count of the 2×2 bypass-and-exchange switch. FIG. 33 illustrates that increasing the device count has the effect of reducing this critical point.

3.4.4 Optical System for 2-D Shuffle

Several optical implementations of 1-D and 2-D shuffle-exchange networks have been proposed in the past. See A. Lohman, G. Stucke, and W. Stork, supra; S. H Lin, T. F. Krille, and J. F. Walkup, supra; and A. Lohmann, "What classical optics can do for the digital optical computer," *Appl. Opt.*, vol. 25, pp. 1543–1549, 1986. These can be classified into three categories: 1. filtering systems. See G. Lohman and A. Lohmann, "Optical interconnection network utilizing diffraction gratings," *Opt. Eng.*, vol 27, pp. 893–900, 1988; also Q. W. Song and F. T. Yu, "Generalized perfect shuffle using optical spatial filtering," *Appl. Opt.*, vol 27, pp 1222–1223, 1988. 2. Interferometric systems. See K. Brenner and A. Huang, "*Optical implementations of the perfect shuffle interconnection,*" Appl Opt., vol 27, pp 135–137, 1988. 3. Imaging systems. See C. Stirk, R. A. Athale, and M. W. Haney, "Folded perfect shuffle optical processor," *Appl. Opt.*, vol. 27, pp. 202–203, 1988; A. Sawchuk and I. Glaser, "Geometries for optical implementations of the perfect shuffle," in *Optical Computing '88, SPIE Proceedings*, vol. 963, pp. 270–282, 1988; M. W. Haney and J. J. Levy, "Low loss free-space perfect shuffle network," in *Proc. Optical Computing* 1990, p. 85 (Kobe, Japan), 1990; and M. W. Haney, "Optoelectronic shuffle exchange network for multiprocessing architectures," in *Technical Digest OSA Annual Meeting*, Paper TuX5, (Boston, USA), 1990.

Each of these systems has its own particular advantages and disadvantages. A common characteristic of all is the trade-off between light efficiency and system complexity. In this study an imaging system is chosen because it has the lowest system complexity, using only one plane of optical elements for achieving the interconnection, and also because it is well suited to implementation using HOEs. See G. J. Swanson, "Binary optics technology: the theory and design of multi-level diffractive optical elements," *DARPA Technical report*, vol. 854, 1989.

3.4.5 Optical System Derivations

The optical system for N=4096, K=16 is shown in FIG. 34. Since a 2-D shuffle is a separable transformation along the X and Y axes, FIG. 34 only shows a one-dimensional representation of the 2-D shuffle. The actual system will consist of K=16 off-axis lenses ($\sqrt{K}$=4 lenses shown in 1-D by the position of their centers A,B,A',B') achieving a 1 to $\sqrt{K}$ imaging transformation The system therefore satisfies the following relations:

$$d_2 = \sqrt{K}\, d_1 \qquad (3.19a)$$

$$f = \frac{\sqrt{K}}{1+\sqrt{K}}\, d_1 \qquad (3.19b)$$

where f is the focal length of the lenses, $d_1$ and $d_2$ are the distances from the input plane to the optical element and from the optical element to the output plane respectively.

In order to achieve the desired transformation, the lens centers must be separated by a distance $D_c$ (see FIG. 34), which can easily be derived using simple geometric (similar triangles) relations:

$$\Delta_c = \left[\frac{\sqrt{N}-1}{\sqrt{K}+1}\right]\Delta \qquad (3.20)$$

where D is the center to center spacing between two modulators/detectors. The positions $(x_i, y_j)$ of the center of the K lenses are then:

$$(x_i, y_i) = \left(\pm(2i+1)\frac{\Delta_c}{2}, \pm(2j+1)\frac{\Delta_c}{2}\right) \qquad (3.21)$$

$$\text{with } i, j, = 0, \ldots \left(\frac{\sqrt{K}}{2}\right)$$

Since the aperture of the inner lenses of the system are limited because of their neighbors (see FIG. 34), the aperture of all lenses of the system will be fixed to be:

$$D_i = \frac{\sqrt{N}}{\sqrt{K}}\Delta \qquad (3.22)$$

where $D_i$ represents the aperture of one lenslet. It is then possible to calculate $D_T$, the total optical aperture, which is equal to the chip width:

$$D_T = \sqrt{N}\,\Delta \qquad (3.23)$$

Each one of the lenses used in the system is a diffractive lens. Therefore its f/# satisfies the following relation:

$$d_{mfs} = \frac{\lambda}{\Phi}\sqrt{1+(2f/\#)^2} \qquad (3.24)$$

where $\Phi$ is the number of phase levels of the diffractive lens, $d_{mfs}$ is its minimum feature size and $\lambda$ is the wavelength. For $\Phi \geq 4$, this expression can be approximated to:

$$f/\# = \frac{\Phi\, d_{mfs}}{2\lambda} \qquad (3.25)$$

Of all the lenses of the diffractive optical element achieving the 2-D shuffle, the 4 outer edge lenses will have the most stringent fabrication requirements since they are the most off-center. The following derivations for the system length, footprint area and volume will therefore be based on these 4 lenses. Using similar triangle relations, it is possible to calculate the distance d from the center of the outer lenses to the edge of the optical element to be:

$$d = \left[\frac{(\sqrt{N}-1)}{(\sqrt{K}+1)} + \frac{1}{2}\right]\Delta \qquad (3.26)$$

The effective diameter $D_{\text{eff}}$ of the lenses will then be:

$$D_{\text{eff}} = 2d = \left[ \frac{(2\sqrt{N} + \sqrt{K} - 1)}{(\sqrt{K} + 1)} \right] \Delta \quad (3.27)$$

The focal length of these lenses can then be calculated:

$$f = f/\# \, D_{\text{eff}} = \left[ \frac{(2\sqrt{N} + \sqrt{K} - 1)}{(\sqrt{K} + 1)} \right] \Delta \frac{\Phi d_{mfs}}{2\lambda} \quad (3.28)$$

Finally the length of the system can be derived:

$$L = d_1 + d_2 = \frac{1 + \sqrt{K}}{\sqrt{K}} (2\sqrt{N} + \sqrt{K} - 1) \Delta \frac{\Phi d_{mfs}}{\lambda} \quad (3.29)$$

These equations characterize the geometrical behavior of the optical system, assuring that the lenses perform the desired shuffle transformation. Note that problems related to aberrations are not treated in this paper and can be studied independently. For instance, it can be shown that aberrations in a 2-D shuffle optical system (with N=16,384 and K=4) using a single plane of diffractive optical elements can be virtually eliminated using code V to design aspheric holographic optical elements. The optical system described above is advantageous in terms of complexity and alignment since only a single plane of optical elements is required to interconnect two optoelectronic chips and also because the chips and the optical elements have the same size. The K lenslets of this optical element have the same apertures and focal lengths and are placed symmetrically to the optical axis of the system.

As illustrated in FIGS. 35 and 36, this lens system does not achieve 100% light efficiency. This is because the light sources of one given sector in the input plane illuminate several lenses in the diffractive optical element plane in addition to the dedicated lens of that sector, creating unwanted images (spots) in the output plane. These unwanted images are not a direct source of crosstalk since they lie outside the chip area in the output plane. The utilization of diffractive optics in the system causes some of the incident light to be scattered, thereby affecting the Signal-to-Noise Ratio (SNR) of the system. The SNR will increase with the number of phase levels used in the diffractive optical element.

It is then possible to calculate the worst-case efficiency ($\eta_{wc}$) of this lens system by calculating a simple area ratio. FIG. 36 shows that $\eta_{wc}$ can be approximated by the ratio of the amount of light emitted by an edge modulator and captured by its dedicated lens to the total area illuminated by this modulator. This efficiency can then be expressed as:

$$\eta_{wc} = \frac{(D/2 + \Delta/2)^2}{D^2} = \frac{1}{4}\left(1 + \frac{\Delta}{D}\right)^2 \quad (3.30)$$

where D is the cross-section of the light cone angle emitting from a modulator. If $\theta$ is the source divergence angle, then:

$$D = 2 d_1 \tan \theta = 2 \frac{\sqrt{N}}{\sqrt{K}} \Delta \frac{\Phi d_{mfs}}{\delta} \quad (3.31)$$

where $\delta$ is the width of a modulator. The worst-case efficiency can be rewritten as:

$$\eta_{wc} = \frac{1}{4}\left(1 + \frac{\delta \sqrt{K}}{2\sqrt{N} \, \Phi d_{mfs}}\right)^2 \quad (3.32)$$

The actual worst-case efficiency of the optical system ($\eta_o$) is equal to the previously calculated efficiency multiplied by the diffraction efficiency of the diffractive element ($\eta_d = \text{sinc}^2(1/\Phi)$ where $\Phi$ is the number of phase levels of the diffractive element):

$$\eta_o = \eta_{wc} \eta_d = \frac{1}{4}\left(1 + \frac{\delta \sqrt{K}}{2\sqrt{N} \, \Phi d_{mfs}}\right)^2 \text{sinc}^2\left(\frac{1}{\Phi}\right) \quad (3.33)$$

The worst-case light efficiency of this system is therefore dependent on the size of the network and on the grain-size. It also depends on technological parameters and constants such as the f/# of the diffractive lenses and the size and spacing of the modulators

3.4.6 Resolution Issues and Optical Efficiency

An important factor in the design of the system is the respective sizes of the modulators and detectors on the optoelectronic chip. Due to the non-uniform illumination of the different lenses of the diffractive element by the modulators in the input plane, all the spots created in the output plane will not have the same size. It turns out that the large spots will be the images of the edge modulators, corresponding to the lowest optics efficiency (equations For one of the edge modulators, the relation to the corresponding output detector given by:

$$\delta \approx \frac{\lambda}{\sin\left[\tan^{-1}\left(\frac{2\lambda \sqrt{K}}{\delta_{det}}\right)\right]} = \lambda \sqrt{1 + \frac{\delta_{det}^2}{4\lambda^2 K}} \quad (3.34)$$

where $\delta_{det}$ is the detector size and $\delta$ is the modulator size. Hence, it is possible to calculate the optimal modulator/detector sizes of the optoelectronic chip from equation 3.37.

For large grain-sizes (K≥16), it may become impractical to implement the system since the required detector sizes become very large. For example, when K=256 and 5 μm wide modulators are used, the required detector size is 80 μm; this is highly impractical from area, speed, and power considerations. One way of maintaining constant modulator and detector sizes is to add to the system an additional plane of diffractive elements whose function is to focus the spot created by the shuffle-exchange imaging optics onto the detector. One of these focusing lenslets is placed in front of each detector. In the following sections, it is assumed that such a plane of lenslets is added to the system.

addition of these lenslets has no significant effect on the efficiency and the length of the system. Therefore, the effects of these lenslets on the cost functions derived in will be neglected.

3.4.7 Optical System Constraint

The optical system as described previously is designed to exactly resolve the detector size in the output plane. To ensure that the relation between modulator and detector size (equation 3.34) is preserved and therefore that the output spots do not overfill the detectors, the optical system must satisfy the following constraint: the light cone angle emitted by one of the modulators and defined by its divergence angle $\theta$ should not overfill the aperture of a single lenslet. This constraint can be expressed as:

$$\frac{D}{2} \leq D_i - \frac{\Delta}{2} \quad (3.35)$$

where D is the cross-section of the emitted light cone angle. Using equations and 5.31 for $D_i$ and D, equation 3.35 can be rewritten as:

$$\sqrt{\frac{N}{K}} \ \frac{\Phi d_{mfs}}{\delta} \leq \sqrt{\frac{N}{K}} - \frac{1}{2} \quad (3.36)$$

which in turn simplifies to:

$$\delta \geq \frac{\Phi d_{mfs}}{1 - \frac{1}{2}\sqrt{\frac{K}{N}}} \quad (3.37)$$

This relation places a lower bound on the modulator size of the system. When used in conjunction with equation 3.34, the optimum modulator and detector sizes required to implement an (N,K) shuffle-exchange system using diffractive elements ($\Phi$, $d_{mfs}$) can be derived.

3.4.8 Performance and Cost Functions

3.4.8.1 Area Model

It has been shown previously that the width of one stage of the 2-D shuffle-exchange network is $D_T$ (equation 3.23 and its length is L (equation 3.29 Then the footprint area ($A_{FP}$) of the whole network is given by:

$$A_{FP} = D_T L = \quad (3.38)$$

$$\frac{1+\sqrt{K}}{\sqrt{K}} \ (2N + \sqrt{N} \ (\sqrt{K} - 1)) \Delta^2 \frac{\Phi d_{mfs}}{2\lambda} \ [Log_K(N) - 1]$$

where $Log_K(N)-1$ is the number of optical stages of the system.

3.4.8.2 Volume Model

An additional performance metric of an optoelectronic MIN is its volume The volume of the entire network is equal to its foot print area ($A_{FP}$) multiplied by its height ($D_T$):

$$V = D_T A_{FP} = \quad (3.39)$$

$$\frac{1+\sqrt{K}}{\sqrt{K}} \ (2N^{3/2} + N(\sqrt{K} - 1)) \Delta^3 \frac{\Phi d_{mfs}}{2\lambda} \ [Log_K(N) - 1]$$

3.4.8.3 Speed Model

The clock speed of the K×K switching element is given by $f_{max}$ (see equation 3.14 The detector is assumed to operate at the speed of the switching elements (by supplying it with enough optical power). The modulator is assumed to operate at the speed of the switching element (by using a driver circuit). The free-space signal propagation delay is assumed to be negligible compared to other system delays. Then the clock speed (f) of the optoelectronic network is:

$$f = f_{pc} \quad (3.40)$$

For small K, and $$f = f_{max} = \quad (3.41)$$

$$\frac{1}{2.3\left(\frac{1}{2} R_0 C_{int} L_{max} + \frac{1}{2} R_0 C_0 + R_{int} C_0 L_{max}\right) + R_{int} C_{int} L_{max}^2}$$

For large K. As the grain-size K is increased, f initially remains constant and then begins to slow down as the delay due to the internal electronic lines of the switching element becomes the dominant factor. The clock speed (f) should not be confused with the fanning parameter (F) of the [N,M,F] networks.

3.4.8.4 Bandwidth Model

The bandwidth of the network is the expected number of network requests accepted per unit time. Network bandwidth is defined as the product of system clock speed, network size (N), and probability that an arbitrary request will be accepted by the network ($P_a$). When two packets are routed to the same output of the 2×2 switching element, it is assumed that one randomly chosen packet is dropped. Destination addresses for the packets are generated independently, with uniform probability P. Under these assumptions, it can be shown that the average bandwidth of the 2-D shuffle-exchange network for 2×2 grain, for large values of N, is given by:

$$BW_2 = fNP_a \approx fN \frac{4}{Log_2 N} \quad (3.42)$$

where f is the network speed and $P_a \approx 4/Log_2 N$. It should be noted that the worst case bandwidth can be as low as O($\sqrt{N}$), and the worst case includes important permutations of bit reversal and matrix transpose. The formula given in is also valid for MINs with K×K grain since each K×K grain is built using simple 2×2 switching elements. In chapter VI the bandwidth equation will be extended to networks with contention-free K×K switches and fanning F.

3.4.8.5 Power Model

The power consumption of the optoelectronic system is the sum of the input optical power, the power consumed by electronic switching elements, the power consumed by the modulators and their driver circuits, and the power consumed by the detectors and their amplifier circuits. There are $Log_K N$ stages of optoelectronic switching elements in the network, each stage having N/K K×K switching elements. Thus, the total electrical power consumption of the system is given by the product of the number of switching elements by their power consumption ($P_{grain}$):

$$P_e = \frac{N}{K} \log_K(N) P_{grain} \quad (3.43)$$

The minimum detectable power for a detector operating at speed f is defined as $P_{det}$. The efficiency of the optical interconnect ($\eta_o$) has been derived. The efficiency of the modulator is defined as $\eta_{mod}$ and the detector efficiency is defined as $\eta_{det}$. In a given stage. N detectors must be powered on every clock cycle, and the optical power for $Log_K N$ stages is:

$$P_o = \frac{P_{det}}{\eta_o \eta_{mod} \eta_{det}} N \log_K(N) \quad (3.44)$$

The total power for the optoelectronic system is then given by:

$$P = P_e + P_o \quad (3.45)$$

On-chip Power Density Model

The optoelectronic gain area is given by the product of the group area (equation 3.11 and the number of groups in a grain. The on-chip power density (D) is then given by the ratio of a grain electrical power consumption ($P_{grain}$) plus the optical power absorbed by this grain ($P_{abs}$) to the grain area ($A_{grain}$) as described in equation 3.49. The optical power absorbed ($P_{abs}$) by a gain includes the absorption from all modulators and detectors. On a given clock cycle, some of the modulators are in the off-state and therefore absorb all the power that was supplied ($P_{abs}$(mod off)) while some are in the the on-state therefore absorbing only a portion of the supplied power ($P_{abs}$(mod on)). On the other hand, all the detectors receiving a signal will absorb it ($P_{abs}$(det)). In the following it is assumed that half of the modulators are on and half of them are off at a given time.

$$P_{abs} = P_{abs}(\text{mod off}) + P_{abs}(\text{mod on}) + P_{abs}(\text{det}) \quad (3.46)$$

The minimum detectable power per detector is $P_{det}$ and the mount of power brought to each modulator is thus $P_{det}/(\eta_{mod}\eta_o\eta_{det})$. Equation 3.49 can then be rewritten as:

$$P_{abs} = \frac{K}{2} \frac{P_{det}}{\eta_{mod}\eta_o\eta_{det}} + \frac{K}{2} \frac{P_{det}(1-\eta_{mod})}{\eta_{mod}\eta_o\eta_{det}} + \frac{K}{2} \frac{P_{det}}{\eta_{det}} \quad (3.47)$$

Equation 3.47 can then be rewritten as:

$$P_{abs} = \frac{K}{2} \frac{P_{det}}{\eta_{mod}\eta_o\eta_{det}} [2 + \eta_{mod}(\eta_o - 1)] \quad (3.48)$$

Thus, the on chip power density can be expressed as:

$$D = \frac{P_{grain} + P_{abs}}{A_{grain}} \quad (3.49)$$

3.5 Optimization of Grain Size

In this section the main results of the grain-size optimization are presented. The network bandwidth is given by equation 5.41, while the network area, volume, and power are given by equations 5.38, 5.39, and 5.44 respectively. In order to evaluate the performance and cost functions, the technological constants must be defined. 1.2 μm CMOS technology is assumed for the VLSI chip layout; the relevant constants were given in table 5.2 of FIG. 31. The optoelectronic constants are now given in Table 3 of FIG. 37. The assumption is that GaAs MQW modulators are integrated with silicon detectors and CMOS circuitry. A hybrid approach is presently required in order to combine GaAs modulators with silicon, although active investigation is underway to fabricate both technologies on a single substrate. See W. Dobblelaere, D. Huang, M. S. Unlu, and H. Morkoc, supra. All graphs presented in the following sections are only valid for integer powers of 4, but may be extended to all integer powers of 2.

3.5.1 Bandwidth Optimization

Figure 38A:
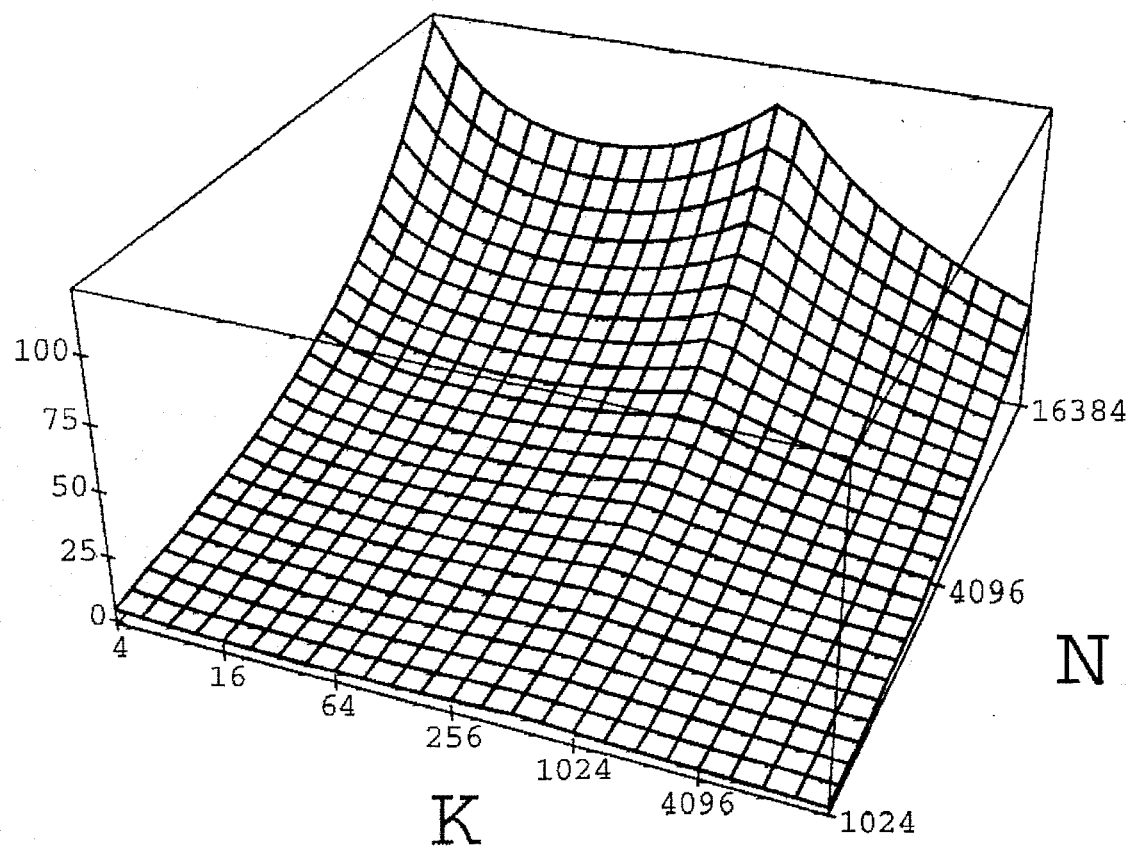

The performance metric used in this paper is system bandwidth, given by equation 5.41. FIG. 38a shows the system bandwidth as a function of network size N, and grain-size K. The specific values for N=4096 are presented in table 5.4. The cutoff for large K is due to the restriction that K≦N. The case where K=N represents an optoelectronic MIN where optics is used only for data I/O (see section 4). Notice that system bandwidth increases as the network size increases, but is independent of K for small values of K. However, as K increases beyond 256, the electronic delay within a grain becomes sufficiently large to necessitate a reduction of the clock speed of the system (see section 4.3). This causes a drop in the network bandwidth. From a performance point of view, FIG. 38a shows that any grain-size less than 256 is acceptable for maximum bandwidth. The choice of appropriate grain-size will thus depend on the relative cost of optical interconnections versus electronic interconnections within the system.

3.5.2 Power Optimization

Figure 38B:
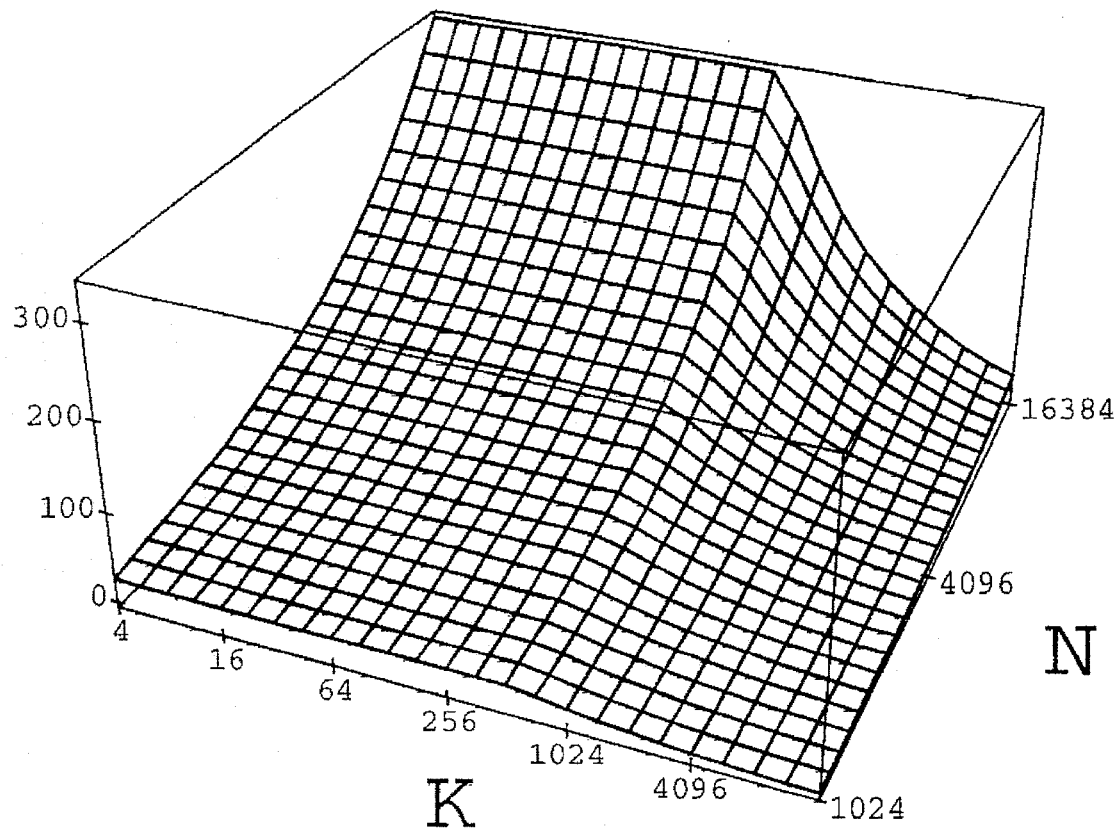

The system power, given by equation 5.44, is shown in FIG. 38b as a function of N and K. Specific values for N=4096 are also presented in table 5.4. For system power, there is a clear optimum range of values for K. A small grain-size (more optical interconnects) results in too many energy-inefficient conversions from optical signals to electronic signals, and back. As the grain-size increases from 4 to 16, there is a considerable reduction in the system power. This suggests that conventional 2×2 switches are not power efficient for optoelectronic MINs. On the other hand, too large a grain results in large electrical power dissipation due to the charging and discharging of the wires within the grains. From a power consumption point of view, the optimal range of grain-sizes lie between 16 and 256. For N=4096, K=64, note that the optimized system uses a √N-shuffle and a single stage of optical interconnections.

3.5.3 Area Optimization

Figure 38C:
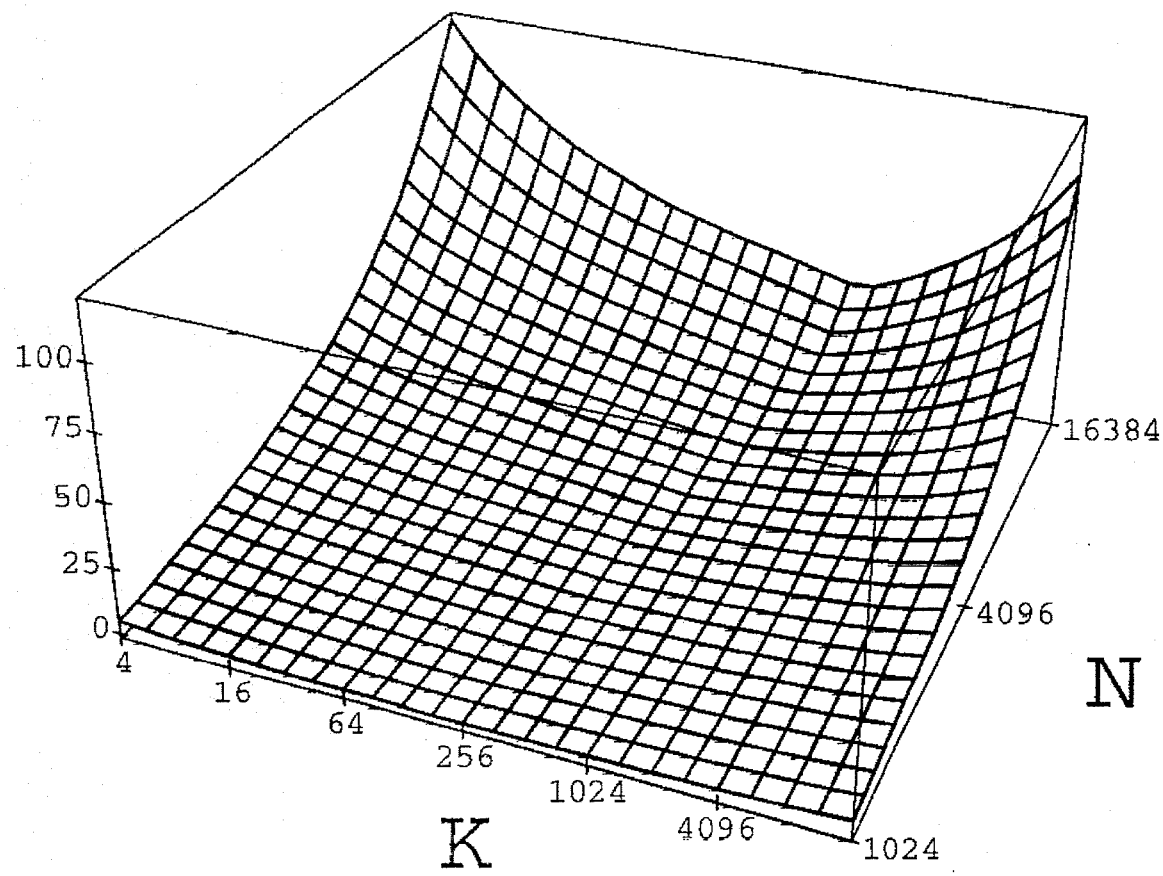

The footprint area of the system, given by equation 5.38, is shown in FIG. 38c as a function of N and K. The footprint area is the area of the largest planar surface of the network. The footprint area of the system is always greater than the sum of the active chip areas of all the stages. This is due to the system configuration used and also because the length of the optical system is always greater than twice its width. The latter fact arises from the minimum f# of the optical components and the magnification needed in the optical system. Hence, the system footprint area decreases as K increases because fewer optical stages are used. This favors large grain systems. However the active chip width and thus the active chip area increases with K, since large grains require more switches and wiring. The optimal grain-size from area considerations therefore depends on the choice of area metric and the specific packaging configuration used. For the system under consideration, a grain-size of 16 or 64 offers a reasonable compromise.

3.5.4 Volume Optimization

Figure 38D:
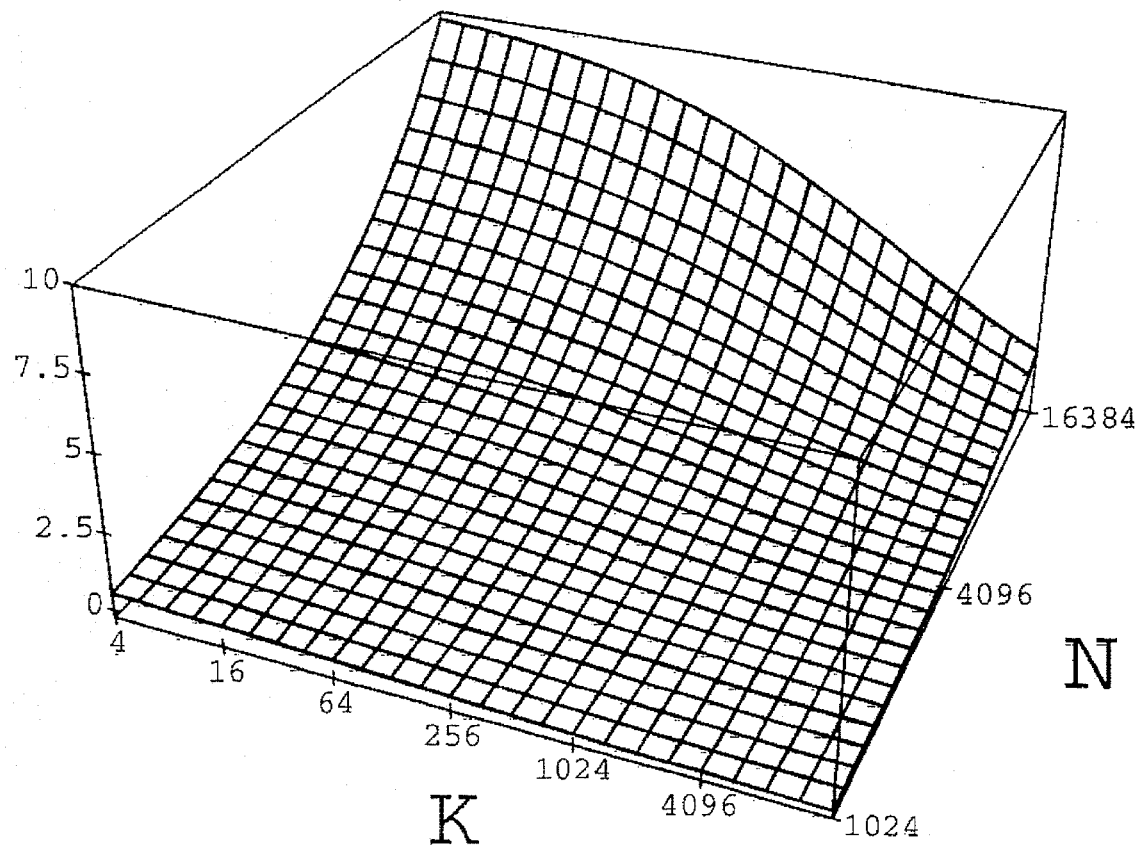

The volume of the system, given by equation 5.39, is shown in FIG. 38d as a function of N and K. The area and volume per stage increases with K due to the larger switch size a.d modulator spacing Δ. But, in this case, the major factor in the system volume is the number of optical stages $\text{Log}_K N-1$, which reduces as $1/\text{Log}_2 K$ with increasing K. This factor dominates, and consequently the volume of the system decreases monotonically with increasing K for the grain-sizes considered. Note that the observed scaling behavior of the area and volume is due to the fact that the modulator spacing Δ grows slowly with K for the 2-D shuffle layout when K is small (equation 5.12).

3.5.5 Scaling Limits

In addition to the cost functions mentioned above, there are several practical concerns regarding system feasibility that influence the choice of grain-size. For instance, the required electrical and optical power per stage, shown in FIGS. 39a and 39b, are one such concern. The electrical power per stage increases with K (for K≦256), while the optical power per stage decreases monotonically with K. The active chip area and the hologram area (FIG. 39c) are also important cost factors that limit the ability of the system to be scaled. For the system under consideration, the optical aperture is equal to the width of the chip. Power dissipation is another concern. Care must be taken not to exceed the capability of the cooling mechanism to dissipate the heat generated on-chip. FIG. 39d graphs power dissipation as a function of N and K; a grain-size of 16 or 64 results in a power dissipation within the heat-sinking capabilities of conventional air cooling methods.

3.5.6 Performance/Cost

From the preceding sections one may argue that the range $16 \leq K \leq 256$, provides the best compromise between system performance and system cost regardless of system size. This can be seen explicitly by graphing the system bandwidth/power as in FIG. 40a and the system bandwidth/area as in FIG. 40b. The case when K=64 corresponds to approximately 400 transistors per optical I/O channel. See Table 4 of FIG. 41.

3.6 Technology Parameter Variations

In this section, the effect of varying certain technological parameters on system performance is investigated. The purpose is to identify the critical technologies that have profound effects on system performance and cost, to optimize the system design w)th respect to these parameters where possible, and to examine the effect of changes in VLSI and optoelectronic device characteristics on the optimum grain-size determined in section E.

3.6.1 Number of CGH Phase-levels

The choice of the number of phase levels of the hologram has noticeable effects on the system cost measures. The required optical power per stage is shown in FIG. 42a as a function of the grain-size and the number of hologram phase-levels F. One can see a rapid decrease in optical power per stage (and thus the total system power) when F is increased from two to four phase levels. This is because the diffraction efficiency of the CGH $h_d$ increases with F as $sinc^2$ (1/F). Note that the optical power per stage increases slightly when the number of phase levels is changed from eight to sixteen. This is because the optical efficiency of imaging system $h_{wc}$ decreases as F increases (equation 5.32, section D) because all the light from the modulators is not captured by the appropriate lenses. The two factors $h_d$ and $h_{wc}$ compete, and as a result the minimum optical power per stage is obtained when using four or eight phase levels.

The system area, shown in FIG. 42b, increases linearly with the number of phase levels because the f/# of the optics also grows linearly with F. System volume follows the same behavior. A low number of phase levels is therefore preferable from area/volume considerations. F=4 offers a good compromise in terms of the power, area, and volume cost functions.

3.6.2 Modulator Driving Voltage

The assumption so far was that the modulator driving voltage was equal to the electrical power supply voltage. However, it is possible that higher modulator driving voltages are required for MQW modulators (see, for example, A. L. Lentine, F. B. McCormick, R. A. Novotny, L. M. F. Chirovsky, L. A. D'Asaro, R. F. Kopf, J. M. Kuo, and G. D. Boyd, "A 2K bit array of symmetric self-electro-optic effect devices," *IEEE Phot. Tech. Lett.*, vol 2, pp. 51–53, 1990) or for other modulator technologies, such as Si/PLZT (see, for example, T. H. Lin, A. Ersen, J. H. Wang, S. Dasgupta, S. Esener, and S. H. Lee, "Two-dimensional spatial light modulators fabricated in Si/PLZT," *Appl. Opt.*, vol. 29, pp. 1595–1603, 1990.) A higher modulator driving voltage increases the power consumption and the power density of the system, leaving the other parameters unaffected. FIG. 43a shows the scaling of system bandwidth/power for N=4096, as a function of the grain-size and the modulator driving voltage. As the modulator driving voltage increases, the performance/cost of the system reduces and the optimum grain-size increases, favoring a larger grain-size (hence fewer stages, and less optical interconnects).

3.6.3 Minimum Detectable Power

The grain-size optimization of section E was based on the assumption that a minimum detectable power of 40 µW was needed. This value may change for different systems and applications due to noise considerations and bit error rate requirements. FIG. 43b shows the behavior of the system bandwidth/power for N=4096, as a function of the grain-size and the minimum detector power. As the detector power increases, the optimum grain-size rapidly increases. Thus, for small grain-sizes, it is important to have low detector powers. For $K \geq 256$, the contribution of optical power to the system power budget is low, and the effect of increased detector powers is less noticeable.

3.6.4 Scaling of Minimum Electronic Feature Size

As minimum feature sizes for electronic devices scale down, an increased number of devices per unit area can be achieved and the power consumption per device can be reduced. The performance of the electronic interconnects will remain essentially unchanged when all dimensions are scaled down linearly. To examine the effect of VLSI scaling, the bandwidth/power and bandwidth/area versus grain-size for N=4096, are shown in FIGS. 43c and 43d respectively, for $l_e$=1.2 µm and for $l_e$=0.8 µm. FIGS. 43c and 43d show that a smaller minimum feature size improves the performance/cost of the system and also increases the optimum grain-size. The sharper peak in performance/cost for $l_e$=0.8 µm also indicates that grain-size optimization becomes more important as device power consumption improves.

3.7 Summary and Conclusions

This section 4 has attempted to quantify the performance-cost tradeoffs between optical and electronic interconnects in an optoelectronic multistage interconnection network (MIN). To this end, a detailed design and analysis of a synchronous, packet-switched optoelectronic MIN with variable grain-size K was presented. The design uses silicon VLSI, GaAs MQW modulators, and a single diffractive optical element to perform the free-space 2-D K-shuffle. The performance of the MIN was measured in terms of system bandwidth and the cost was measured in terms of the power consumption, footprint area and volume of the system. This method of analysis can be extended to other systems and technologies by the appropriate choice of the performance and cost metrics.

The 2-D shuffle-based MIN allows the electronic interconnects within the system to be replaced by optical interconnects via the grain-size parameter K, without affecting the functionality of the system. This permits the optics-versus-electronics issue to be examined by tuning the grain-size of the system. Results suggest that free-space architectures using conventional 2×2 and 4×4 switches are not cost effective solutions for the given system and technology assumptions. Grain sizes of $16 \leq K \leq 256$ offer the lowest cost and highest performance. For a network with 4096 channels, this corresponds to approximately 250–400 electronic transistors per modulator/detector pair. This result is specific to the particular interconnection system and technology considered, and is also due to the new 2-D electronic layout of the switching elements.

The effect of varying certain technological parameters were examined in order to study how individual component behavior influence system performance and cost, and to study how changes in VLSI and optoelectronic device characteristics influence the optimum grain-size. These include the number of hologram phase levels, the modulator driving voltage, the minimum detectable power, and the minimum electronic feature size. It was found that the use of a large number of phase levels does not minimize system power, even though the hologram efficiency is maximized. The choice of four hologram phase levels provides a good compromise for the power, area, and volume cost functions. Increasing the minimum detector power or the modulator driving voltage results in an increased optimum grain-size. Based on these results, it is apparent that to achieve an efficient optoelectronic system that uses a very low number of devices per optical I/O, the following requirements must be met: (a) faster and more sensitive detectors, (b) faster and lower energy transmitters, and (c) more efficient optical interconnects. However, trends in VLSI scaling (e. g. reduction in feature size) tend to increase the optimal grain-size. One may thus expect that optimized optoelectronic MINs will continue to combine both global optical interconnects with a substantial degree of local electronic interconnection and processing.

4. Application to Optoelectronic Switching Networks: Architectural Considerations Section 3 addressed the question whether optoelectronic MINs offer superior performance to VLSI MINs, and determined the optimum level of optical interconnects in an optoelectronic switching network. In this section, several architectural modifications to the switching network described in section 3 are investigated. These include networks with K×K contention-free switches, Batcher-Banyan networks, and a new class of networks known as [N,N,F] switching networks. The purpose is to quantify the performance and cost of these architectures and, if possible, to identify high-performance MIN architectures that are best suited to free-space optoelectronic technology. Results indicate that the [N,N,F] networks provide a broad range of performance-cost alternatives and offer superior performance-per-cost to purely electronic MINs and to existing optoelectronic architectures. Section A considers an optoelectronic MIN with a sorting grain that reduces the probability of network blocking by using a contention-free switch. Section B describes the combination of a sorting network and a routing network that achieves a non-blocking optoelectronic MIN. Section C discusses the [N,N,F] switching network. Section D provides a comparative analysis of the various optoelectronic system architectures based on the performance and cost metrics derived in section 3. Section E discusses modifications to the basic [N,M,F] network that provide tolerance to faults and very low packet loss probabilities. A summary and conclusions constitute section F.

4.1 MIN With Sorting K×K Grain

The basic grain-size study of section 3 assumed that each K×K switch within the routing network was functionally equivalent to a MIN built with 2×2 switches. The probability that an arbitrary request would be accepted by the network, and therefore the bandwidth, was independent of the grain size K. Instead, one can design each switch in the network to be contention-free, i.e. each switch has fully non-blocking (crossbar) capability. We define a network built using contention-free switches as a K×K MIN (not to be confused with the grain size K). A K×K MIN has $Log_K N$ stages of K-input/K-output, contention-free switches. In the limit, when K=N, a non-blocking crossbar network is obtained.

The bandwidth of the network is proportional to the number of data packets accepted per unit time. Network bandwidth, as defined in the previous section 3, is the product of system clock speed, network size (N), and probability that an arbitrary packet will be accepted by the network ($P_a$). The random traffic assumption is assumed; destination addresses for the packets are generated independently, with uniform probability P. When two packets are routed to the same output of the 2×2 switching element, it is assumed that one randomly chosen packet is dropped. When this phenomenon occurs inside the network (as opposed to the output stage) it is referred to internal link contention or internal blocking. Crossbars or other non-blocking networks eliminate internal link contention and in general have higher bandwidths than standard blocking networks such as the Delta network or the generalized shuffle network (see section 2). However, even crossbar networks do not achieve 100% packet acceptance with random traffic. This is because several input packets may request the same destination port. This phenomenon is referred to as output port blocking, and is common to all un-buffered Banyan networks. The standard shuffle-exchange or Omega network suffers from both types of blocking. When P=1, the average bandwidth of the 2-D shuffle-exchange network for 2×2 grain, for large values of N, is given by:

$$BW_2 = fNP_a \approx fN \frac{4}{(Log_2 N)} \quad (4.1)$$

where f is the network speed and $P_a \approx 4/Log_2 N$. See P. Kruskal and M. Snir, "Performance of multistage interconnection networks for multiprocessors," *IEEE Trans. Comput.*, vol. C-32, pp. 1091–1098, 1983. Recall that the formula given in (4.1) is also valid for MINs with larger grain sizes when each K×K grain is built using simple 2×2 switching elements (see section 3).

The bandwidth for a K×K MIN is higher. Packet loss due to internal link contention is reduced because each K×K switch is contention-free. One method of achieving this is to build a full-sorter into each switch using $Log_2 K(Log_2 K - 1)$ stages of shuffles. See H. S. Stone, "Parallel processing with the perfect shuffle," *IEEE Trans. Comput.*, vol. C-20, pp. 81–89, 1971. In the limit, when K=N, a Batcher-Banyan self-routing network is obtained (see section B). For this architecture, the network bandwidth increases with the switch size K. FIG. 44 shows the behavior of the probability of acceptance versus network size, for various values of K. The simulation results are based on a recurrence relation for $P_a$ at a particular stage of the network (see section C). For fully-loaded routing networks (P=1) with $Log_K N$ stages of K×K contention-free switches, $P_a$ for large N can be approximated as:

$$P_a \approx \frac{2K}{(K-1) Log_K N} \quad (4.2)$$

(See H. P. Stone, supra.) If each input node creates a packet, then the bandwidth is $NP_a$. Note that the asymptotic bandwidth-per-processor decreases logarithmically with network size (N). In FIG. 44 the effect of output port blocking for a crossbar is clearly evident.

4.2 A Sorting MIN

Another method of increasing the bandwidth of the network is to use a sorting MIN such as a Batcher-Banyan MIN. See S. Knauer, A. Huang, and J. O'Neill, "Self-routing switching network," in *CMOS VLSI Design*, N. Weste and K. Eshragian, ed., chap. 9, Addison-Wesley, 1988. This architecture combines a front-end sorting network with a routing MIN. When the destination addresses of the input packets of the routing MIN are ordered relative to one another, the network can achieve fully non-blocking (crossbar) capability with constant latency. The sorting network, based on the Bitonic sorting algorithm, can be built using $O(Log^2 N)$ stages of shuffles and can provide sorted packets to the routing MIN. The routing MIN then uses the destination-based routing algorithm described in section, subsection 3.4. Thus, the Batcher-Banyan network removes internal link contention and achieves the performance of a crossbar. See FIG. 44. The optoelectronic implementation of the sorting MIN uses $Log_2 N$ copies of the basic routing MIN with grain-size K, where each grain is composed of 2×2 compare-exchange switching elements. In this case, the last optical stage used for data alignment must be reintroduced for each of the $Log_2 N$ MINs in order to cascade them together.

4.3 [N,M,F] Switching Networks

The design and construction of the [N,M,F] network was explained in section 2. The basic principle is to provide a tradeoff between the standard MIN and the crossbar in terms of the bisection width of the network and the number of stages. When F=1, the common shuffle-exchange routing network (Omega network) is obtained. As the fanout F is increased, packet loss due to internal link contention is reduced. At the limit, when F=M, the [N,M,M] network becomes a crossbar or full space division switch. [N,M,F] networks also provide the facility for output buffering, which can be used to reduce the effect of output port blocking. In fact, we shall see that a blocking network with fanout F<M, and a constant number of buffers per output port can achieve superior performance to a crossbar network under random traffic, using less hardware resources.

The [N,N,F] MIN has three components: the fanout stage, the switching stages, and the fanin stage. There are N fanout modules with fanout of F each, N fanin modules with fanin of F each, and $Log_K[N/F]$ switching stages with NF/K K×K switches each. In the following, we will assume that 2×2 switches are used in all the switching stages of the network. The fanout module or fanout 'tree' can be implemented using $Log_K F$ stages of K×K switches. When K=2, the fanout tree uses $Log_2 F$ stages of the 2×2 switch described in section 3, subsection 3.3. Only one of the input ports of each switch are connected to the switch outputs from the previous level. See FIG. 45. The analysis will also assume that each input packet is sent to only one output port. Thus, each fanout module routes the incoming packet to one of the F links at the output of the module. Note that the [N,N,F] network can be readily extended to provide "multicast" functions, by providing the 2×2 switches the ability to copy an incoming packet onto both output lines.

The mapping of the [N,N,1] network onto free-space optoelectronic technology was described in section 3. This can be extended to fanning F by noting that the fanout stage can use the same 2-D layout of the switches described in section 3, subsection 3.4; only one of F possible outputs at each fanout module in the fanout stage carries a live packet. For the fanin stage, there are two possible implementations. In the first method, when more than one packet enters a fan-in module, only one of the packets survive, and the others are "dropped". In the second case, the packets are 'buffered' at the output ports to obtain a higher effective bandwidth. In the following, we derive the probability of acceptance ($P_a$) of an [N,N,F] network for both these cases.

The analysis is based on the method presented in F. T. Leighton, supra, and J. Patel, infra. For any unipath network operating under the random traffic assumption, $P_a$ can be determined by recursively calculating the probability $P_i$ that some packet is directed to a particular output at the $i^{th}$ stage:

$$P_i = 1 - \left(1 - \frac{P_{i-1}}{K}\right)^K \quad (4.3)$$

where $P_{i-1}/K$ is the probability that a packet exists at a particular input of stage i–1 and is directed to the particular output at stage i. See J. Patel, "Performance of processor-memory interconnections for multiprocessors," *IEEE Trans. Comput.*, vol. C-30, pp. 771–780, 1981. For a standard routing network, $P_a$ is given by equation 4.3 evaluated at the last stage of the network (i=$Log_K N$).

Assuming that each input has a packet with probability of P directed to the output ports with uniform distribution, the probability that a packet is directed to a particular output of fanout module is P/F. See FIG. 46.

Define a new variable $P_F$=P/F. The switching stages contain switching stages of 2×2 switching elements. The analysis method is to develop a recurrence relation for $P_a$ at stage i of the MIN, and to apply the recurrence N/F times. Define P(i) to be the probability of acceptance in stage i with P(0)=P. Then $$P(0) = P_F = P/F \quad (4.4)$$

$$P(1) = 1 - \left(1 - \frac{P(0)}{2}\right)^2 \quad (4.5a)$$

$$P(2) = 1 - \left(1 - \frac{P(1)}{1}\right)^2 \quad (4.5b)$$

$$P(i) = 1 - \left(1 - \frac{P(i-1)}{2}\right)^2 \quad (4.5c)$$

where i=$Log_2$ (N/F) gives us the result after the last switching $$i = Log_2\left(\frac{N}{F}\right) \quad (4.5c1)$$

stage before the fanin stage. Define $P_M$ as the probability of an active packet on one of NF channels afterstages of the MIN. At $$Log_2 = \left(\frac{N}{F}\right) \quad (4.5c2)$$

this point, the first F channels are fanned-in to produce the first output channel, the second F channels fanned-in to produce the second output, and so on. Note that the architecture and routing algorithm ensures that all the live packets on the first F channels of the NF-wide switching stage before the fanin stage have the first output channel as their destination. Packets that are blocked by the switching stages have their activity bit set to zero, denoting them to be "dropped" or dead packets.

Case I: Un-buffered Fan-in Module

The simplest choice for the architecture of the fanin module is to use a fanning tree as shown in FIG. 45, but in reverse. The module accepts a single packet in any one time slot. If there is more than one active packet on the inputs of a K×K switch, one is accepted and the others are dropped; no buffers are used. See FIG. 47. The switches are designed so that a live packet entering the switch will always be routed to the upper output link. If two live packets enter the switch, then one will be chosen at random to exit the upper output. This type of single-accepting fanin module is useful for "permutation" traffic, that is when no two inputs send packets to the same destination. For random traffic, as shown below, the probability of acceptance of the network is limited by output port blocking.

Here the assumption is that only one packet per cycle can be accepted by each of the N fanin modules. The F inputs to the module will be fanned-in to create 1 output. Consider a single fanin module as shown in FIG. 48. The probability that none of the packets are headed to the output of this module is $(1-P_M)^F$. Hence the probability that at least 1 packet is headed to this output is given by:

$$P_a = 1-(1-P_M)^F \quad (4.6)$$

Equation 4.5c and equation 4.6 give a recursive expression for the probability of acceptance of an [N,N,F] network with unbuffered fanin modules. This is plotted in FIG. 49 for various values of F. As F is increased, $P_a$ initially increases due to reduced internal link contention, but then starts to level off, asymptotically approaching the performance of a crossbar or full space-division switch. In this regime, the packet loss probability of the [N,N,F] network is dominated by output port blocking and not by internal link contention.

The asymptotic value for the probability of acceptance can be determined by finding an approximate solution to equation 4.5c as N grows large. In C. P. Kruskal and M. Snir, supra, and F. T. Leighton, *Intro. Parallel Algorithms and Architectures: Arrays, Trees, Hypercubes*, Morgan-Kauffman, (San Mateo, USA), section 4.3, 1992, it is shown that P(i) in equation 4.5c can be approximated as:

$$P(i) \approx \frac{4}{i+\frac{4}{P(0)}} \quad (4.7)$$

Substituting for P(0) from equation 4.4, we have:

$$P(i) \approx \frac{4}{i+\frac{4}{P/F}} = \frac{4}{i+\frac{4F}{P}} \quad (4.8)$$

The asymptotic expression for $P_M$ follows by setting:

$$P[i=\log_2(N/F)] = P_M = \frac{4}{\log_2\left(\frac{N}{F}\right)+\frac{4F}{P}} \quad (4.9)$$

Finally, substituting for $P_M$ in equation 4.6 we obtain:

$$P(i) \approx \frac{4}{i+\frac{4}{P/F}} = \frac{4}{i+\frac{4F}{P}} \quad (4.10)$$

If all inputs have packets initially, then P=1 and, $$P[i=\log_2(N/F)] = P_M \approx \frac{4}{\log_2\left(\frac{N}{F}\right)+\frac{4F}{P}} \quad (4.11)$$

which reduces to equation 4.1 when F=1. The asymptotic expression for N=4096 are within 5% of the simulation values shown in FIG. 49.

Case II: Buffered Fan-in Module

In many instances, the performance of the [N,N,F] network can be improved by recognizing that the transmission bandwidth of each output channel can be much greater than the usable bandwidth of a link inside the network. This is particularly true for telecommunications applications, where high bandwidth optical fibers are used to transmit the outgoing packets. In such instances, up to F incoming packets can be buffered at each fanin module. The input nodes of each multiple-accepting fanin module are responsible for determining which of the arriving packets are alive, and sending the live packets to the output buffers. The buffered packets are then multiplexed onto the corresponding output link to obtain a higher effective network bandwidth. See FIG. 50a. One of the advantages of the [N,M,F] networks is that they remove any need for buffers within the network by allowing the buffers to be placed at the output nodes of the fanin tree, effectively outside the switching fabric. This allows significant hardware savings over traditional buffered MIN designs that use up to four packet buffers per switch. For instance, a typical shift-register type packet buffer uses four MOS devices per stored bit. Assuming a packet size of a hundred bits, this results in 1600 devices per 2×2 switch for storage alone. See F. T. Leighton, *Intro. Parallel Algorithms and Architectures: Arrays, Trees, Hypercubes*, Morgan-Kauffman, (San Mateo, USA), section 4.3, 1992. In contrast, the nominal 2×2 switch for the [N,M,F] network uses only 260 MOS devices.

The packet loss probability of the [N,N,F] network under uniform traffic is significantly improved when multiple-accepting fanin modules are used. The expected number of live packets before the fanin stage, $E_M$, is given by:

$$E_M = P_M \cdot NF \quad (4.12)$$

where $P_M$ is the probability of an active packet on one of the NF channels after the $\log_2(N/F)$ switching stages of the MIN. Each of these live packets is captured by the appropriate multiple-accepting fanin module and routed. The expected number of un-routed or dropped packets, D, is then:

$$D = P \cdot N - E_M = P \cdot N - P_M \cdot NF \quad (4.13)$$

The probability of an un-routed packet can be obtained by dividing both sides of equation 4.13 by the total number of expected packets PN. FIG. 51 shows the percentage of routed traffic versus network size for several [N,N,F] networks with multiple-accepting modules. The corresponding graphs for the K×K MINs and the crossbar network are included for comparison. FIG. 52 shows a graph of the percentage of routed traffic of an [4096,4096,F] network with single-accepting and multiple-accepting modules, versus the fanout F. As shown in the graph of FIG. 52, the inclusion of buffers into the fanout module greatly improves packet loss under uniform traffic by reducing the effect of output port blocking.

So far we have assumed that there are F buffers per fanin module. As the fanning is increased beyond 30, the network again becomes limited by internal link contention, and this large number of buffers is unnecessary. The number of buffers at each output port can be reduced if each fanin module is provided the ability to accept up to P packets (P≦F), from any of its F inputs. See FIG. 50b. The module must effectively "concentrate" the F incoming packets to P outputs, discarding all dead packets, and ensuring that the live packets are placed on the output lines in sequence: the first packet on the line 1, the second packet on line 2, and so on, until all live packets have been placed or until all P output lines have packets. Such a fanin module design can result in significant hardware savings, without sacrificing performance. In fact, it can be shown that a network with a constant number of buffers per output port, independent of network size, can reduce the effect of output port blocking to a arbitrarily low value. For example, using 8 buffers, and an appropriate fanin module that allows the F inputs to share the buffers, the probability of packet loss due to output port contention is less than $10^{-5}$ for any network size N. See Y. S. Yeh, M. G. Hluchyj, and A. S. Acampora, "The knockout switch: a simple modular architecture for high-performance packet switching," *IEEE Journal Selected Areas Communication*, vol. SAC-5, no. 8, pp. 1274–1282, October 1987.

FIG. 53 shows the design of the concentrator fanin module for P=F=16. The design is an improved version of the concentrator switch described by Y. S. Yeh, M. G. Hluchyj, and A. S. Acampora, supra, in that it uses the fewest switching elements and is well suited to a two-dimensional layout. Each fanin module has F inputs and P outputs, where $P \leq F$. The switching elements are again designed so that the upper output links have priority for live packets. The tree-based design has $\log_2 F$ layers with a recursive structure shown by the bold boxes; each box has the property that any L live packets entering the box will exit the box on the first L lines. The total number of switching elements per box in layer L ($N_L$) is:

$$N_L = 2 \cdot N_{L-1} + \frac{2^L}{4} \quad L = 2, 3, \ldots, \log_2 P$$

with $N_1 = 1$. Also the number of boxes in layer L ($B_L$) is:

$$B_L = \frac{F}{2^L} \quad (4.15)$$

When P<F output buffers are used, then the number of switches can be further reduced. For instance in FIG. 53, when only two output lines of the concentrator fanin module are buffered (P=2), all the shaded boxes can be removed. In this case, only two packets per time slot will exit the module. In general, for P output buffers, the total number of switches per fanin module ($N_P$) is given by $$N_P = \sum_{L=1}^{\log_2 P + 1} (B_L \cdot N_L) + (\log_2 F - \log_2 P - 1) \cdot N_{\log_2 P + 1} \quad (4.16)$$

The resulting [N,N,F] network uses O(NP) output buffers compared to O(N Log N) buffers for a traditional buffered MIN. The P buffers can be placed at the output of each fanin module, outside the switching fabric, along with multiplexing circuitry if needed. In this manner, the [N,M,F] switching network provides a scalable network architecture; the switch size K, the connectivity F, and the number of output buffers P can be set to reduce the effects of internal link contention and output port blocking to acceptable levels.

The buffered [N,N,F] network also uses less hardware resources than traditional non-blocking networks. The total number of switches in an [N,N,F] network includes all switches in fanout stage, the switching stages and the concentrator fanin stage. FIG. 54 shows the total number of switches versus network size, for [N,N,F] networks with F=1, 2, and 4. The corresponding curves for a crossbar network, a K×K MIN with K=64, and a Batcher-Banyan network are also shown for comparison. Another useful measure is the number of network stages, or the network "delay". This represents the number of switches encountered in a path from input to output. The "delays" of the various networks are shown in FIG. 55; the [N,N,F] network has a much lower delay than the other architectures for large N. Note that the true physical delay through the network will include the gate delays through the switches as well as the interconnect delay between stages. See FIG. 55.

In summary, [N,N,F] packet-switched networks are an efficient class of interconnection networks that can be tailored to the specific application requirements and to the implementation technology. In the next section, we examine the performance-per-cost of free-space optoelectronic [N,N,F] networks based on the metrics defined in section 3, and compare them to the K×K MIN and the Batcher-Banyan network.

4.4 Performance/Cost Analysis

In the previous sections, several multistage interconnection network architectures have been described. Section 3 detailed how such MINs could be mapped efficiently onto free-space optoelectronic technology. Section C discussed the performance (i.e. bandwidth) of these networks versus system size. In this section, the performance-cost behavior of optoelectronic implementations of these network architectures are examined. Four distinct systems are considered: the basic optoelectronic routing MIN with F=1, the optoelectronic routing MIN with K×K sorting grain (K=4,16,64), the optoelectronic Batcher-Banyan sorting MIN, and the [N,N,F] network (F=2,3,4,8,16).

The various shuffle-based optoelectronic MIN architectures so far considered, offer a range of performance/cost alternatives. This can be seen explicitly in FIGS. 56–58, where the system bandwidth of each system is plotted versus its system cost for N=4096. For all the optoelectronic MINs, it is assumed that an optimized grain size of K=16 is used as far as possible (see section 3). The lower right corner of the graph corresponds to the highest performance/cost ratio, and upper left corner corresponds to the lowest.

FIG. 56 shows the power-bandwidth relation for the four systems. The optoelectronic routing MIN (F=1) has low power requirements, but also has low bandwidth. The optoelectronic routing K×K MINs offer a range of performance-cost alternatives; performance increases by about 70% as K increases from 4 to 64 but the larger switches require more power. The optoelectronic sorting network offers high performance but has an even larger power requirement. As discussed previously, the bandwidth of the K×K MINs and the Batcher-Banyan network saturate due to output port blocking. The [N,M,F] networks provide a range of choices with higher performance and lower power requirements than the other networks. From FIG. 56, F=4, and F=16 provide the best performance-per-cost solutions.

The plot of system bandwidth versus footprint area for N=4096, is given is FIG. 57, where footprint area is defined as the area of the largest planar surface of the 3-D optoelectronic system. The optoelectronic routing MIN (optimized for grain size) is a low-cost solution with moderate bandwidth. The [N,N,F] networks with variable fanout F, provide an efficient tradeoff between the network performance and cost; F=4 and F=8 are prudent choices for the specific technology considered. The results for system volume versus bandwidth follow similar trends. See FIG. 58. The volume growth of the K×K MINs and the Batcher-Banyan network follow the same scaling curve as the [N,N,F] networks for small F (F≤4). [N,N,F] networks with F≥16 provide higher bandwidths, but have considerably higher volumes.

From the performance-cost scaling behavior shown in FIGS. 56–58, we conclude that [N,N,F] networks are high-performance, cost-effective optoelectronic packet-switching architectures. For practical applications, user bandwidth requirements and technology considerations can be used determine the appropriate fanout and grain-size K. It should be noted that all the optoelectronic systems offer higher bandwidths than VLSI switching fabrics. For a network with $N \geq 256$ channels, the delay of the long wires within an electronic network limits the maximum clock speed of the system, which results in a reduction of the network bandwidth. See F. Kiamilev, P. Marchand, A. Krishnamoorthy, S. Esener and S. H. Lee, "Performance comparison between optoelectronic and VLSI multistage interconnection networks," *IEEE/OSA J. Lightwave Tech.*, vol 9, no. 12, pp. 1674–1692, 1991.

4.5 [N,M,F,R,T] Switching Networks

The [N,N,F] networks described above are a class of space-division, self-routing, interconnection networks with output buffering capability. As shown in section 4.3, the probability of acceptance of the network approaches unity for sufficiently large F and P, even when the network is fully loaded. The result assumed a random traffic distribution, where the requested output port for a packet was uniformly chosen among all output ports, independently for all packets. In certain situations, this assumption may not be valid; traffic patterns that exhibit dependencies in the distribution of requested output ports may occur. In these situations, the bandwidth is generally lower than the case for uniform traffic. In fact, the worst-case bandwidth of a routing MIN can be as low as $O(\sqrt{N})$, for specific worst-case permutations. See F. T. Leighton, supra; also H. J. Siegel, *Interconnection Networks for Large-scale Parallel Processing*, $2^{nd}$ ed. MacGraw Hill, (New York), 1990. This is depicted in FIG. 59a, for a standard [16,16,1] routing network. The worst case bandwidth occurs for permutations such as bit reversal or transpose, that require $O(2^{Log[N]/2}) = O(\sqrt{N})$ packets to pass through a link in the middle of the network. The same is true for K×K MINs, where $O(\sqrt{N})$ packets must pass through a link in the middle of the network. See FIG. 59b. In contrast, the worst-case bandwidth of the [N,N,F] networks improves with F. A link in the middle of the network has to accommodate $O(2^{Log[N/F]/2})$ packets for worst-case permutations; this results in a worst-case bandwidth of $O\sqrt{(NF)}$. See FIG. 60.

One method of improving the bandwidth for both random and worst-case traffic is to use multiple [N,N,F] networks back-to-back. See F. A. Tobagi, T. Kwok, and F. M. Chiussi, "Architecture, performance, and implementation of the tandem banyan fast packet switch," *IEEE Journal Selected Areas Communication*, vol. 9, no. 8, pp. 1173–1193, October 1987. FIG. 61 shows the architecture of the [N,N,F] network replicated R times. The basic idea is to use the first network to route a certain fraction of the packets. Packets that are blocked due to link contention in the first network are designated as mis-routed or "zombie" packets, and are routed by the subsequent networks. Each network has a lower probability of blocking than the previous one because the load is reduced. Note that the replicated [N,N,F,R] network is no longer a Banyan network, because multiple paths exist between each input and output port. After the switching stages of each [N,N,F] network the data on each link are split into two copies. One set enters a concentrator fanin stage, where successfully routed packets exit the network. The other set of packets enter a "judgement" stage, where the copies of all the live (successfully routed) packets are killed, and the blocked zombie packets are brought back to life and sent to the next [N,N,F] network. Each switch in the [N,N,F,R] network is designed to randomly permute two incoming zombie packets onto its output links. For worst-case permutation problems, the first few networks have the effect of randomizing the packets, effectively reducing a worst-case permutation into an average one.

Another limitation of all unipath [N,N,F] networks is that the loss of a switching element or link due to hardware faults results in certain input/output nodes being unable to communicate with each other. The replicated [N,N,F,R] network alleviates this problem to a certain extent by providing multiple paths between each input/output port. However, when fault are present, live packets have to be routed around the faulty switches. This incurs a loss of bandwidth and additional complexity to each switch, and prevents the use of the simple destination-based routing algorithm. An alternate design uses T copies of the [N,N,F,R] network in parallel. See FIG. 62. Paths through a faulty switch in one network are designated as unusable, and the packet is routed through another network. When only a small number of faults are present, the load is shared among the T networks, resulting in high bandwidth operation. As the number faults increase, the performance of the [N,N,F,R,T] network approaches that of the [N,N,F,R,1] network. For constant T, at least $\Omega(NF)$ faults, and at most $O(F R N Log N)$ faults can be tolerated without causing packet loss, assuming the fanout and fanin stages are fault-free.

4.6 Summary and Conclusions

In this section 4, several architectural variations of the basic shuffle-exchange routing MIN of section 3 were investigated. These include a MIN with sorting (contention-free) K×K grains, a Batcher-Banyan sorting MIN, and the new class of [N,N,F] interconnection networks. The motivation was to find architectures that achieve higher bandwidths than the basic shuffle-exchange routing MIN, and that are well suited to implementation using free-space optoelectronic technology. The K×K MINs and the Batcher-Banyan network improve bandwidth by reducing packet loss due to internal link contention. The [N,N,F] networks also reduce the effect of output port blocking by allowing buffers to be placed at the output ports of the network. The performance and cost of optoelectronic implementations of the various networks were quantified. Results indicate that optoelectronic [N,N,F] interconnection networks offer a range of performance/cost alternatives; they offer superior performance to the other architectures even when low values of fanout F and a constant number of buffers per output port are used.

Next, methods of achieving low packet-loss probabilities and tolerance to faults with the [N,N,F] network were examined. This was accomplished via the introduction of two new parameters, R and T, denoting the replication and tolerance parameters, respectively. The replication of the network allows unsuccessful packets to be routed to intermediate random destinations, and then routed to the correct destination using the second, third, or $R^{th}$ network. The tolerance parameter T, represents the number of vertical replications of the network, which provide alternate paths through the network in case of hardware faults. By tuning the F, R, T parameters, and the switch size K, a system architect may thus tailor the architecture of the network to suit the application and the implementation technology.

The networks considered in this section assume that each input packet is destined for only one output port. By allowing each switch in the fanout stage to copy an input packet onto both its output lines, multicast operation can be achieved. Also, by enhancing the functionality of each 2×2 switch, certain packets or groups of packets can be given priority over others. Both these services are useful for broadband switching applications. Finally, the analysis and system design presented in this section can be extended to the general [N,M,F] network where the number of input and output ports are not the same (i.e. N≠M).

5. Modular Architecture for Smart Pixel Switching Networks

Multistage interconnection networks based on the perfect shuffle topology, such as the network of the present invention, are often suggested as candidates for large scale multiprocessor and broadband communication networks. The perfect shuffle interconnection requires global communication links that extend across the entire system and have a large number of wire crossovers. These constraints prohibit a scalable electronic implementation both within a VLSI chip and at the MCM or board levels. See F. Kiamilev, P. Marchand, A. V. Krishnamoorthy, S. Esener and S. H. Lee, Performance comparison between optoelectronic and VLSI multistage interconnection networks, IEEE Journal of Lightwave Technology, Vol. 9, No. 12, pp. 1674–1692, Dec. 1991; also F. Kiamilev, et.al., "Optically interconnected MCMs for gigabit ATM switches," in Proc. SPIE Conf. 1849 on Optoelectronic Interconnects (OE/LASE'93), paper 1849-23, (1993).

This section 5. presents the architecture of a scalable hardware module for building multistage interconnection networks. To achieve a scalable implementation, the design uses free space optical interconnects for global communication links and electronic VLSI technology for local communication links and switching elements (e.g. smart pixel approach). The approach is to engineer a network with the desired functionality, cost and performance characteristics using generic hardware modules. In this section, various applications are examined and their implementation using the proposed method is described.

5.1 Specific Background

Revolutionary changes in the field of networking are occurring. It has become increasingly evident that existing time division switches are inadequate for handling the bandwidth requirements of the emerging asynchronous transfer mode (ATM) for integrated services digital network (ISDN) standards and distributed computer networking. This fact together with the huge increases in point-to-point communication capabilities provided by the incorporation of gigabit optical fibers and portable wireless communication devices, imply that new technologies are needed to provide ultra high bandwidth switching capability being sought in the near future. A challenge is to efficiently implement switches with large number of physical ports (1K–10K ports) operating at gigabit data rates (1–10 Gbps/port) and having 1 to 10 terabits/second aggregate bandwidth capacities. The network of the present invention meets these requirements with an (i) appropriate choice of technology and (ii) judicious choice of associated network parameters. The flexibility of the network of the present invention optimizes this relationship in a way that networks of the prior art do not.

The experimental switch activities of telecommunications vendors is currently focused (for the most part) on electronic switch systems providing small numbers of ports (typically 16–64) operating at 155 and 622 Mbps each. Some Japanese telecommunication vendors have demonstrated switches operating at 1.8 Gbps and 2.5 Gbps implemented with GaAs Ics and advanced MCM packaging technologies. See N. Yamanaka, S. Kikuchi, and T. Takada, "A 1.8-Gb/s GaAs optoelectronic universal switch LSI with monolithically integrated photodetector and laser driver," IEEE J. of Lightwave Tech., Vol. 8, No. 8, pp. 1162–1166 (1992); Y. Iseki, F. Shimizu, and T. Sudo, "Multichip module technology using AlN substrate for 2-Gbit/s high-speed switching module," in Proc. 42th Electronic Components and Technology Conf., pp. 973–978 (1992); and Y. Doi, H. Yamada, S. Sasaki, "An ATM switch hardware technology using multichip packaging," in Proc. 42th Electronic Components and Technology Conf., pp. 984–990 (1992).

All these systems are typically based on the crossbar, shared memory, or shared medium (e.g. bus and ring) switch architectures. While these architectures are adequate for today's networking applications, scaling them to meet future switching demands will present a formidable challenge.

There are substantial engineering tradeoffs to take into consideration when deciding on a switch architecture that has to scale to over 1000 physical ports and operate at gigabit port data rates. Physical packaging issues become very important. Technologies, architectures and systems which have worked well for a 64 port switch operating at 155 Mbps are often impractical for a 1000 port switch operating at 1 Gbps. For example, both the interconnect and circuit complexity of a crossbar switch with N input/output ports architecture grows as $O(N^2)$, making it impractical for network sizes of 1000 and above. Likewise, both shared memory and shared medium architectures suffer from a performance degradation as the number of channels is increased.

On the other hand, in the past decade much interest has been generated in the use of self-routing multistage networks as the basis for high-performance packet networks for telecommunications in the form of ATM switches and massively parallel computing platforms in the form of internal networks. The basic appeal of multistage interconnection networks lies in their implicit simplicity and their scalability to large number of ports. Unfortunately, the scalability potential of electronic implementations of these networks is often overshadowed by physical packaging constraints in the form of limited chip pin-outs, connector limitations on PCB's, and for high-speed systems, signal integrity and latency characteristics.

Free-space optical interconnects can greatly enhance the scalability and performance of multistage networks. See, for example, the related paper Kiamilev, et al. 1993, supra. The related paper describes an optically interconnected MCM implementation of a multistage network and compares it with state-of-the-art electrical MCMs. This section is concerned with the architectural design of an optoelectronic hardware module that can be used a generic building block of multistage networks with various functionality, performance, cost, and scalability requirements. This module can be efficiently implemented with various proposed optoelectronic packaging schemes as described in the related paper Kiamilev, et al. 1993, supra, and also in A. Krishnamoorthy, P. Marchand, F. Kiamilev, and S. Esener, "Grain-size considerations for optoelectronic multistage interconnection networks", Appl. Opt., Vol. 31 #26, 5480–5507 (1992).

This section 5 is further organized as follows: in section 5.2 the requirements of various network applications are reviewed. Section 5.3 describes the architecture of a generic optoelectronic hardware module in accordance with the present invention. Section 5.4 applies the module to implement the familiar tandem-banyan network. Sections 5.5 and 5.6 introduce two new network architectures for distributed computing that can be efficiently built with our hardware module. Section 5.7 provides conclusions.

5.2 Application Requirements

Focusing on switching networks for computer applications—such as the emerging ATM local-area networks for workstations and interconnection networks for linking the processors in a parallel computer—FIG. 64 shows an optoelectronic switching network configuration where network nodes (e.g. processors, memories, or specialized devices) are attached to the switch fabric via buffer controllers. Incoming data traffic is broken up into fixed size packets (e.g. 53 bytes for the ATM standard). Each packet, otherwise known as a cell, contains a small header section with control information used by the switch fabric to route the cell and a data section containing the payload (e.g. ATM uses 5 byte header and 48 byte payload). Buffer controllers provide external I/O interface, cell buffering and contention resolution functions. The system controller is used for higher level functions such as network management and testing. The switch fabric routes cells between input and output ports.

Focusing particularly on the switch fabric (e.g. interconnection network) portion of a switching network, the cell traffic through the switch fabric can be divided in two categories: communication traffic and synchronization traffic. Synchronization traffic coordinates parallel processing performed by the computational devices attached to the network. Communication traffic is used to transfer data between devices attached to the network. Typical communication traffic consists of one-to-one and one-to-many (e.g. multicast or broadcast) data traffic. In one-to-one traffic, cells are send from a source port to a single destination port. In multicast traffic, a source port simultaneously sends the same cell to many destination ports.

Performance considerations for switch fabrics include cell blocking, guaranteed cell delivery, latency and cell priority. Two types of blocking can occur in switch fabrics: internal link blocking and output link blocking. Internal link blocking occurs for networks that cannot support all possible interconnections (e.g. perfect shuffle). Output port blocking is unavoidable in self-routing switch fabrics because several input ports can simultaneously send a cell to the same output port. Typically, networks are engineered to allow small amounts of blocking (e.g. $\leq 10^9$ for a given distribution of incoming traffic (e.g. uniform, community of interest, bursty, etc.). Guaranteed cell delivery is critical for multimedia applications that require a sustained bandwidth to be maintained between the network devices at any time during the connection. Latency becomes important when the network is used as a distributed computer, whereby lower latency allows higher parallelism. Cell priority allows traffic with higher priority to have precedence over traffic with lower priority (e.g. high priority traffic is delivered first) when link blocking occurs. Typically, networks are engineered to meet performance requirements specified by the application and cost limitations.

Synchronization traffic occurs in distributed applications where a software program is partitioned into a set of cooperating processes that run concurrently on different processors and communicate using message-passing over the interconnection network. To illustrate synchronization traffic, consider a parallel implementation of a loop with M iterations, followed by a sequential code portion. We can have M processors executing the M iterations of the loop in parallel, but the sequential portion of the code has to wait until all M processors are finished. In a shared memory computer, this type of synchronization is implemented by having each processor increment a shared memory variable. The processor containing the serial code checks the variable to decide when it can execute. The problem arises when all the processors finish and send M messages to increment the same shared variable. Since the interconnection network has only one output port to the memory containing the shared variable, the updates must be done serially, creating a performance bottleneck. This phenomenon is called the synchronization bottleneck (or MSYPS limit). See M. Dubois, C. Scheurich, and F. Briggs, Synchronization, coherence, and event ordering in multiprocessors, IEEE Computer 21 (February 1988).

One approach to eliminating the synchronization bottleneck is not to parallelize the code that requires extensive use of synchronization operations. This approach cannot be used in distributed computing, because synchronization operations are inherent in these systems and are used for parallel resource scheduling and allocation. Thus a method of efficiently performing synchronization has to be implemented in the network hardware to allow high-performance distributed computing. Typically, the choice of synchronization operations that are implemented in hardware is application specific.

5.3 Generic Hardware Module

FIG. 65 shows the architecture of a generic optoelectronic hardware module in accordance with the present invention. The module consists of stages of switching elements interconnected using the perfect shuffle interconnection topology. Cells enter the switching elements in a particular stage bit- and frame-aligned. Each switching element receives two incoming cells, examines the information contained in their cell headers, and routes them to the appropriate output port. It has been shown that a large shuffle networks can be decomposed into many smaller shuffle network interconnected with the shuffle topology. See S. C. Knauer, J. H. O'Neill, and A. Huang, "Self-routing switching network," in Principles of CMOS VLSI Design, N. Weste and K. Eshraghian, ed., (Addison-Wesley 1988).

The design of the present invention uses this idea to partition the system, implementing small electronic shuffles within a single chip (e.g. smart pixel) and using free-space optical interconnects to link the smaller shuffles. The detailed optoelectronic system design of this module was previously described, and will not be repeated herein. See also the references Kiamilev, et al., (1993), supra and Doi, et al., supra.

5.4 Local Area Network

The tandem-banyan network architecture has been previously developed for electronic implementation. Optoelectronic implementation of this architecture is attractive because optoelectronics permit the building of larger tandem-banyan networks, and the operation of these networks at higher data rates, than is possible with electronics. The [N,M,F] network of the present invention reduces to a tandem-banyan network when F=1. The basic idea behind this network is to repeat routing the cells through a banyan network and after each routing attempt, remove cells that have been successfully routed. It has been shown that the probability of cell blocking in the switch fabric can be made arbitrarily small by increasing the number of tandem networks (for example, 14 banyan networks in tandem guarantee a cell loss rate below 10-6 for uniform traffic).

FIG. 66 shows the cell loss rate (defined as the probability of a cell being misrouted due to internal link blocking) for a 1024 port tandem banyan network as a function of the number of banyans in tandem (R). It can be seen that the cell loss rate can be made arbitrarily small by increasing R. For example, for R=8, the cell loss rate is near $10^{-5}$ and the number of stages is 80. Assuming that each banyan stage has a latency of 3 clock cycles (e.g. 1 cycle for the activity bit, 1 cycle for the priority bit, and 1 cycle for the routing bit), then the worst case latency of an R=8 tandem banyan network is 240 clock cycles. On the other hand the best case latency is 30 clock cycles. The average latency is 90 clock cycles (or 3 banyans in tandem) as determined by computer simulation.

A major shortcoming of the tandem banyan network is its inability to handle "hot-spot" traffic. FIG. 67 shows curves for cell loss rate of a 1024 tandem banyan network where 5% and 10% of all incoming cells are directed to a single output port while the remaining cells are uniformly distributed. It can be seen that the cell loss rate with "hot spot" traffic is much higher than the cell loss rate with uniform traffic (superimposed on the same plot). In fact, the "hot-spot" cell loss rate saturates near $10^{-1}$ even as R is increased to 10. The stretch network of the present invention provides superior performance and performance-per-cost that the previously described tandem-banyan network for both point-to-point and "hot-spot" traffic. FIG. 68a shows the cell loss rate for the stretch [N,M,F,R] Network for a network size N=1029, for various values of F and R. The larger the fanout F, the wider the network, and the higher the performance of the network. This is offset by an increased cost due to an increased number of switching elements and connections. Note that an arbitrarily low cell loss rate (e.g. $10^{-5}$) can be achieved with various network configurations. FIG. 68b shows corresponding cell loss rates for the "hot-spot" traffic. Note that for networks with F≧3, arbitrarily low cell rates can be achieved for the 5% and 10% "hot-spot" traffic; these low cell loss rates could not have been achieved using the tandem banyan network.

The Stretch network of the present invention is also amenable to an optoelectronic implementation because it consists of stages of switching elements interconnected using the perfect shuffle interconnection topology. This network provides one-to-one communication and cell priority services (e.g. higher priority cells have lower latency). It is well suited for local area computer networks, because latency (especially for high priority cells) is low. A detailed description of the related tandem-banyan design and performance can be found in F. A. Tobagi, T. Kwok, F. M. Chiussi, "Architecture, performance, and implementation of the tandem banyan fast packet switch," IEEE J. on Sel. Areas in Communications 9, 1173–1193 (1991).

5.5 Wide Area Network for Distributed Computing

The previous section 5.4 having described how the optoelectronic hardware module of the present invention can implement an existing switch fabric (e.g. tandem-banyan), attention is now turned to the design of a new switch fabric, called the "smart network", in accordance with the present invention. This smart network is specifically aimed at wide area distributed computing. The smart network architecture is markedly different from previously proposed designs because it has been developed specifically for optoelectronic technology. The following subsections to this section 5.5 present here a detailed description of the smart network architecture.

5.5.1 Synchronization Operations

The smart network of the present invention provides hardware acceleration for three basic types of synchronization operations. The functionality and application of these operations is the subject of this section.

The fanin operation allows packets that are sent to the same destination output port to be combined inside the interconnection network such that only one result packet is delivered at the output. This operation is useful in distributed computing because many parallel algorithms depend on barrier synchronization which requires that all the processors involved in the computation send a completion status message to a specific processor to determine whether a solution has been found. If the fanin operation is not implemented in the network hardware, then packets sent to the same output port are delivered sequentially because a network output port can only accept one packet at a time. Thus when a large number of packets are sent to the same output port, a serious performance bottleneck occurs. In order to combine the packets, we need to specify the function that is to be performed on their data contents when they are combined. Functions useful for synchronization purposes are AND, OR, MAX and MIN.

The fanout (broadcast) operation allows one network user to simultaneously broadcast a packet to many output ports. The broadcast operation can also be used in barrier synchronization, when the designated control processor needs to broadcast a control message to all the processors involved in the computation. When this operation is not implemented in the network hardware, the broadcast has to be performed sequentially because a network input port can accept at most one packet at a time. For large distributed programs, the sequential nature of this process can lead to a serious performance bottleneck. It is important to point out that the fanout operation described here is user-initiated. See A. Huang, "The relationship between STARLITE, a wideband digital switch, and optics," in Proc ICC'86, Toronto, Canada, 1725–1729 (June 1986).

The system works in a manner analogous to the postal system, where users wishing to receive the broadcast message send a self-addressed envelope to the post office, and the postal system copies the contents of the broadcast message into their envelope and returns it to them.

The partial sum operation allows the implementation of the fetch-and-add synchronization operation which has been found useful for many application in distributed computing. See A. Gottlieb, B. D. Lubachevsky, and L. Rudolph, "Basic techniques for the efficient coordination of very large numbers of cooperating sequential processors," ACM Trans. on Prog. Lang. and Systems 5, 164–189 (April 1983). The basic idea behind this operation is that the processors send a packet containing their number into the network and receive a packet that contains the partial sum of the numbers. A detailed description of the fetch-and-add operation and its usage can be found in A. Gottlieb, R. Grishman, C. Cryskal, K. McAuliffe, L. Rudolph, and M. Snir, "The NYU ultracomputer—designing an MIMD shared memory parallel computer", IEEE Trans. on computers C-32, 75–89, (February 1983). As in the case of other synchronization operations, without the ability to perform partial sum inside the network, the use of fetch-and-add operations would create a performance bottleneck especially when large number of processors are involved.

5.5.2 Related Networks

A shuffle-based multistage interconnection network architecture has previously been modified to support synchronization operations and reduce internal blocking in the New York University ultracomputer project. See A. Gottlieb, R. Grishman, C. Cryskal, K. McAuliffe, L. Rudolph, and M. Snir, "The NYU ultracomputer-designing an MIMD shared memory parallel computer", IEEE Trans. on computers C-32, 75–89, (February 1983).

The basic idea behind this architecture is to use a bi-directional shuffle-exchange interconnection network with complex processing elements that implement the necessary logic for synchronization operations and provide packet buffering in case of internal contention. Although this design is well suited to VLSI implementation, it is not efficient with optoelectronic technology. As was shown in Krishnamoorthy, et al. supra, the use of large switching elements within an optoelectronic interconnection network leads to low system performance/cost. In addition, this network architecture is still internally blocking so that only a fraction of the incoming traffic can be successfully routed in large networks. These limitations are overcome by optoelectronic implementation of the network architecture of the present invention.

7. Overall Summary and Conclusions

7.1 Grand Summary of the Presentation

This specification has presented the design, analysis, optimization, and implementation of application-specific optoelectronic networks from a systems viewpoint. The major advances in the art realized by the present invention can be summarized as follows:

First, a new class of space-division [N,M,F] networks that allows a tradeoff between a crossbar and a multistage network in terms of bisection bandwidth versus number of layers was taught in this specification.

Next, a reference was made to the design, analysis, and experimental evaluation of a novel optoelectronic [N,1,1] content-addressable memory system that achieves associative recall on optically loaded 2-dimensional images from an optical disk. This is taught in the co-pending patent application U.S. Ser. No. 07/785,408 filed Oct. 31, 1991, for an OPTOELECTRONIC ASSOCIATIVE MEMORY USING PARALLEL-READOUT OPTICAL DISK STORAGE to selfsame inventor Ashok V. Krishnamoorthy who is a co-inventor of the present application and also to Philippe J. Marchand, Gokce Yayla and Sadik C. Esener.

Next, the design, analysis, and implementation of a novel optoelectronic [N,M,F] neural system that uses free-space optical interconnects with silicon-VLSI-based hybrid optoelectronic circuits has taught in this specification.

Next, the design, analysis, and optimization of a novel self routing, packet-switched [N,N,F] optoelectronic network with variable grain size K, and fanning F that provides superior performance-per-cost to existing network designs was taught in this specification.

7.2 Detail Summary of the Teaching

This specification discussed the growing demand for parallel, high bandwidth, interconnection systems. Then in this specification a new class of space-division interconnection networks, known as [N,M,F] networks was set forth. N is the number of logical input channels to the network, M is the number of output channels, and F is the fanning parameter. The [N,M,F] network is essentially a unipath network that allows a continuous tradeoff between the fanout per layer and the number of layers in the network.

[N,M,F] networks include, as special cases, a fully connected, single layer, crosspoint switch (or crossbar) and a shared interconnect, multistage interconnection network with Log N stages. That the present [N,M,F] network should fall out, at the extremes of its parameterization, to be identical to known networks does not make the [N,M,F] network less of an invention: would not an interconnection strategy purporting to be optimal over broad ranges, and/or at various parameters, also be expected to be optimal, and thus identical to known optimal solutions, at extreme parameters? The importance of the [N,M,F] network of the present invention is not that it reduces to certain known forms of network interconnection in certain degenerate case but that, in the real world of connecting vast numbers of devices with finite hardware resource operating in finite time, the [N,M,F] networks of the present invention prove to be a wholly new form of network interconnection, and one that may be proved to be very effective compared to previous forms.

By incorporating appropriate functionality into the fanout and fanin stages, the networks can be applied to a variety of computational problems in neurocomputing, parallel processing, and broadband switching. Furthermore, by choosing the appropriate values of the network parameters, such as the fanout $F_o$, fanin $F_i$, and switch size K, the networks can be optimized to a specific technology. The methodology in accordance with the present invention for the design of optoelectronic [N,M,F] networks is diagrammed in FIG. 63.

The design of a high-capacity, high-performance associative memory using an optical disk modified for parallel readout and a custom-designed silicon integrated circuit is discussed in aforementioned co-pending U.S. patent application Ser. No.: 07/785,408 filed Oct. 31, 1991, for an OPTOELECTRONIC ASSOCIATIVE MEMORY USING PARALLEL-READOUT OPTICAL DISK STORAGE to selfsame inventor Ashok V. Krishnamoorthy who is a co-inventor of the present application and also to Philippe J. Marchand, Gokce Yayla and Sadik C. Esener. The design is based on the [N,M,F] architecture with M=F=1. The system achieves associative recall on 2-D bit-plane oriented storage media. When used in conjunction with a standard 5.25" optical disk modified for parallel output, the associative memory system can provide a usable capacity of at least 250 Mbit and a maximum processing speed of over $10^{11}$ bit-operations/second. The system can also be dynamically reconfigured to search for images of different sizes. The system does not impose an upper limit on the number of images that may be searched, enabling the storage capacity to be increased using additional memory disks in a jukebox fashion. The disk capacity can be traded in for increased contrast ratio, enabling the storage efficiency parameter $\beta$ to be chosen according to application and system requirements. Finally, the system has the advantage that no addressing is required for the stored images. The system's performance and behavior were evaluated on the basis of experimental results on the motionless-head parallel readout optical disk system, logic simulations of the optoelectronic chip, and a software emulation of the overall system.

Similarly, this specification did not discuss the design of a scalable 3-D optoelectronic neural system that uses free-space optical interconnects with silicon-VLSI-based hybrid optoelectronic circuits. That design is the subject of the aforementioned U.S. patent application Ser. No.: 07/846277 filed: Mar. 2, 1992 for a DUAL-SCALE TOPOLOGY OPTOELECTRONIC MATRIX ALGEBRAIC PROCESSING SYSTEM to the selfsame inventor Ashok V. Krishnamoorthy who is a co-inventor of the present application, and also to Gary C. Marsden, Joseph E. Ford and Sadik C. Esener. The related design is based on the [N,M,F] architecture with an arbitrary number of inputs N, outputs M, and fanning F. The hardware architecture provides an arbitrary level of connectivity between neurons, flexible functionality neurons and synapses, accurate electronic fan-in with low signal skew, and biologically inspired dendritic-type fan-in processing capability in a compact layout. The optoelectronic neural system uses a hardware-efficient combination of pulse-width modulating optical neurons and pulse amplitude modulating electronic synapses. Analog storage techniques together with switched-capacitor circuits provide high linear dynamic range neuron and synapse modules ($\geq$7-bit synapse precision) in a relatively low area. The system achieves efficient, high density holographic optical interconnection ($\geq 10^4$ interconnections/cm$^2$), limited only by the synapse circuit area and not by the resolution of the optical system, the power dissipation of the detector units, or by the power dissipation of the optical sources/modulators. The design minimizes the number of required light transmitters, allowing the silicon Ics and the light modulators to be fabricated separately, and later bonded face-to-face using available hybrid packaging techniques.

At the module level, the optoelectronic system outperforms a fully electronic multi-chip implementation in terms of delay and power dissipation. Based on the experimental demonstration of the optical system and simulations of the circuit performance, a neural system with up to $10^6$ synapses (1,000 fully connected neurons) seems feasible in the near-term using state-of-the-art computer generated holograms, flip-chip bonding techniques, and multi-chip carriers. The main limitation on the maximum possible size of the network comes from optical input power considerations. This storage capacity can be further augmented by using parallel accessed optical memories. Based on this estimate, a system throughput of up to $10^{12}$ interconnects/s (depending on neuron output precision requirements) is possible. A small-scale 64-synapse prototype module of the optoelectronic neural system was fabricated, tested, and applied to a simple classification problem. The system was tested at $3.2 \times 10^7$ interconnects/s and has a maximum sustained operation rate of $6.4 \times 10^8$ interconnects/s limited by the input optical power. A modification of the architecture that allows an efficient parallel implementation of error back-propagation learning was presented. Finally, an optoelectronic system concept for limited interconnect neural systems that allow connection multiplexing and receptive fields of arbitrary sizes was proposed.

Section 3 of this specification presented a detailed design and analysis of a synchronous, packet-switched optoelectronic multistage interconnection network (MIN) with variable grain-size K. The design uses silicon VLSI, GaAs MQW modulators, and a single diffractive optical element to perform the free-space 2-D K-shuffle. The 2-D shuffle-based design allows the electronic interconnects within the system to be replaced by optical interconnects via the grain-Size parameter K, without affecting the functionality of the system. This enabled the performance-cost tradeoffs between optical and electronic interconnects in the system to be quantified. The performance of the MIN was measured in terms of system bandwidth and the cost was measured in terms of the power consumption, footprint area and system volume. Results suggest that free-space architectures using conventional 2×2 and 4×4 switches are not cost effective solutions for the given system and technology assumptions. Grain sizes of $16 \leq K \leq 256$ offer the lowest cost and highest performance. For a network with 4096 channels, this corresponds to approximately 250–400 electronic transistors per modulator/detector pair. This result is specific to the particular interconnection system and technology considered, and is also due to the new 2-D electronic layout of the switching elements.

Next in this specification, the effect of varying certain technological parameters were examined in order to study how individual component behavior influence system performance and cost, and to study how changes in VLSI and optoelectronic device characteristics influence the optimum grain-size. These include the number of hologram phase levels, the modulator driving voltage, the minimum detectable power, and the minimum electronic feature size. It was found that the use of a large number of phase levels does not minimize system power, even though the hologram efficiency is maximized. The choice of four hologram phase levels provides a good compromise for the power, area, and volume cost functions. Reducing the minimum detector power or the modulator driving voltage can result in a reduction of the optimum grain-size. However, trends in VLSI scaling (e.g. reduction in feature size) tend to increase the optimal grain-size. Therefore, it is expected that an optimized optoelectronic MIN will continue to combine global optical interconnects with a substantial degree of local electronic interconnection and processing.

Section 4 of this specification presented several architectural variations of the basic shuffle-exchange routing MIN of section 3. These variations included a MIN with sorting (contention-free) K×K grains, a Batcher-Banyan sorting MIN, and the new class of [N,N,F] interconnection networks. The purpose was to identify architectures that achieve higher bandwidths than the basic shuffle-exchange routing MIN, and that were well suited to implementation using free-space optoelectronic technology. The design of an [N,N,F] packet-switched network with variable fanout was presented; the design is fully compatible with the 2-D optoelectronic K-shuffle system presented in section 3. The [N,N,F] network improves performance by reducing packet loss due to internal link contention. In addition, the [N,N,F] networks can be designed to reduce the effect of output port blocking by allowing buffers to be placed at the output ports of the network. The performance and cost of optoelectronic implementations of the various networks were quantified. Results indicate that optoelectronic [N,N,F] interconnection networks offer a wide range of performance/cost alternatives, with superior performance to the other optoelectronic network architectures. Finally, methods of achieving low packet-loss probabilities, tolerance to faults, and multicast operations with the [N,N,F] network were detailed.

Section 5 of this specification presented the architecture of scalable hardware module for building multi stage interconnection networks for effectively and efficiently handling both point to point communication traffic as well as synchronization traffic. The approach was to engineer a network with the desired functionality, cost and performance characteristics using generic hardware modules for a number of applications.

7.3 Future Directions in Application of the [N,M,F] Networks of the Present Invention The objective of the present invention as stated in the Summary of the Invention section of this specification, was to describe how free-space optoelectronic technology can be used to achieve high-performance networks for neurocomputing, parallel processing, and broadband switching applications. The intention, of course, was that these systems would eventually be implemented; indeed, that they could be readily implemented. The work described in this specification has concentrated on the design and optimization of such networks. To ensure that the systems were susceptible of being scaled, care was taken to ensure that the appropriate architectural and technological issues had been considered. Preliminary results on experimental prototypes helped to demonstrate the viability of the systems. Nevertheless, the ultimate (and perhaps the only relevant) proof of a high-performance system is the high-performance system. Before the optoelectronic networks described in this specification can be built on a large scale, more effort in terms of system development is required. For instance, work is needed in optimizing system performance by improving optical power losses due to spot-array generation and unwanted reflections, improving hologram efficiency by using more phase levels, reducing off-axis aberration effects, reducing system dimensions, etc. System packaging considerations such as alignment tolerances, mechanical and thermal stability, etc. must also be examined.

The companion issue is one of utility. When the systems are built, it is essential that they find widespread use. It should be noted that the highest performance system is not necessarily the most useful or sought after. In fact, the tradeoff between high-performance, special-purpose and lower performance, general-purpose systems is a universal one. This issue is compounded with the fact that the metrics used in quantifying and comparing the relative performance of systems are often immaterial to the end user. In this specification care was taken to provide a general and flexible architectural framework for a parallel network, and to allow the functionality of the processing elements to be tailored to the application requirements. The examples considered were chosen to highlight the advantages of both the architecture and the implementation technology. In the long run, the success of the networks described here, will be dependent on further innovation and enterprise in terms of finding useful applications.

In accordance with the preceding explanation, variations and adaptations of the [N,M,F] interconnection networks in accordance with the present invention will suggest themselves to a practitioner of the digital architectural and circuit design arts, and to practitioners of optoelectronics.

For example, an architecture where R-1 copies of the basic [N,M,F] network are cascaded back-to-back, forming an [N,M,F,R] network, has already been shown in FIG. 61. For example, an architecture where T-1 copies of the basic [N,M,F,R] network are placed in parallel has already been shown in FIG. 62. Mere alterations in the parameterization, or the replication, of the [N,M,F] network of the present invention do not alter its essential nature. Indeed, this specification teaches that the [N,M,F] network should be optimized on requirements (see FIG. 63).

In accordance with these and other possible variations and adaptations of the present invention, the scope of the invention should be determined in accordance with the following claims, only, and not solely in accordance with that embodiment within which the invention has been taught.

What is claimed is:

1. An [N,M,F] multistage interconnection network where N is the number of logical input channels to the network, M is the number of output channels, and F is the fanning parameter, the multistage interconnection network comprising:

a fanout stage having N fanout modules with fanout of $F_o$ each, $F_o$ greater than one and $F_o$ less than M, each fanout module routing a packet received on a corresponding one of the N input channels to a one of its $F_o$ output channels;

$\log_K[N/F]$ switching stages, $\log_K[N/F]$ being an integer, with each stage having NF/K K×K switches, each switch of a first switching stage routing packets received on its K input lines from K of the fanout modules, and each switch of stages subsequent to the first routing packets received on its K input lines from K of the switches of the previous switching stage, to its K output lines based on $\log_K$ bits of routing information contained in each packet; and a fanin stage having M fanin modules with fanin of $F_i$ each, $F_i$ greater than one and $F_i$ less than N, each fanin module concentrating packets received on its $F_i$ input lines from $F_i$ switches of the final switching stage into P packets output on a corresponding one of the M output channels;

wherein F is the maximum of $F_o$ and $F_i$; and wherein $2 \leq F_i \leq N-1$.

2. The [N,M,F] multistage interconnection network according to claim 1 wherein N times $F_o$ equals M times $F_i$.

3. The [N,M,F] multistage interconnection network according to claim 2 wherein the $\log_K[N/F]$ switching stages comprise:

$\log_2[N/F]$ switching stages;
   and wherein each of the $\log_2[N/F]$ switching stages comprises:

NF/2 2×2 switches.

4. The [N,M,F] multistage interconnection network according to claim 1 wherein each fanout module of the fanout stage comprises:

a tree having $\text{Log}_K F$ stages of K×K switches.

5. The [N,M,F] multistage interconnection network according to claim 4 wherein each K×K switch of the tree comprises:

a 2×2 switch.

6. The [N,M,F] multistage interconnection network according to claim 1 wherein each fanin module of the fanin stage comprises:

a tree having $\text{Log}_K F$ stages of K×K switches.

7. The [N,M,F] multistage interconnection network according to claim 6 wherein each K×K switch of the tree comprises:

a 2×2 switch.

8. The [N,M,F] multistage interconnection network according to claim 7 wherein each 2×2 switch of the tree comprises:

a buffer.

9. The [N,M,F] multistage interconnection network according to claim 1 wherein each fanin module of the fanin stage comprises:

a concentrator concentrating P input packets received on P of the $F_i$ input lines onto P output lines; and a buffer for buffering packets upon the P concentrator output lines, and demultiplexing these packets onto a one of the M output channels.

10. An R series-replicated [N,M,F] multistage interconnection network for connecting N input channels to M output channels, the [N,M,F,R] network comprising:

a fanout stage for routing live, meaning carrying useful information to be routed, and also dead, meaning carrying no presently useful information, input packets received on N input channels according to routing information contained in each packet;

a first network switching stage for routing as is best possible all live packets received from the fanout stage towards their intended destinations while changing the code identification of packets that are unroutable due to contention to be zombie, meaning unsuccessfully-routed, packets;

a first minor fanin stage, receiving all packets from the first network switching stage, for concentrating and passing on all successfully routed live packets while ignoring dead and zombie packets;

at least one repetition of plural stages consisting of a judgement stage, also receiving in parallel with the first minor fanin stage all packets from the first network switching stage, for re-identifying zombie packets to be live packets, for re-identifying live packets to be dead packets, and for maintaining dead packets as dead packets;

a successive next network switching stage for routing as is best possible all live packets received from the judgement stage towards their intended destinations while changing the code identification of packets that are unroutable due to contention to be zombie, meaning unsuccessfully-routed, packets; and a minor fanin stage associated with each successive network switching stage, receiving all packets from the associated network switching stage, for concentrating and passing on all successfully routed live packets while ignoring dead and zombie packets; and a major fanin stage for concentrating live packets received from all minor fanin stages onto the M output channels.

11. The [N,M,F,R] multistage interconnection network according to claim 10 wherein the fanout stage is routing packets received on the N input channels to associated ones of N replications of $F_o$ output lines according to $\log_2 F_o$ bits of routing information contained in each packet.

12. The [N,M,F,R] multistage interconnection network according to claim 11 wherein the first network switching stage is routing by another, additional, $\log_2(M/F_o)$ bits of information contained in each packet all live packets received from the fanout stage on the $N \times F_o$ lines towards their destinations as best as is possible in consideration of conflicts.

13. The [N,M,F,R] multistage interconnection network a according to claim 12 wherein the first network switching stage comprises:

$\log_K[N/F]$ switching stages, $\log_K[N/F]$ being an integer, with each switching stage having NF/K K×K switches, each switch in a first such switching stage serving to route packets received on its K input lines from K of the fanout modules, and each switch of any stages subsequent to the first switching stage serving to route packets received on its K input lines from K of the switches of the previous switching stage, onto its K output lines;

all routing in all switches of all stages being based on the $\log_2(M/F_o)$ bits of information and transpiring in $\log_K(M/F_o)$ steps, each step using a $\log_2 K$ bits of the total $\log_2(M/F_o)$ bits of routing information, onto $N \times F_o$ lines.

14. The [N,M,F,R] multistage interconnection network according to claim 11 wherein the first minor fanin stage is receiving the packets from the first network switching stage on the $N \times F_o$ lines, partitioned now as $M \times F_i$ input lines where N times $F_o$ equals M times $F_i$, and is concentrating all successfully routed live packets onto M lines.

15. The [N,M,F,R] multistage interconnection network according to claim 13 wherein, in the at least one repetition of the plural stages, the judgement stage is receiving all packets from the first network switching stage on the $N \times F_o$ lines, and is passing all packets on $N \times F_o$ lines;

the successive next network switching stage is routing by the same $\log_2(M/F_o)$ bits of information in $\log_K(M/F_o)$ steps, each step using $\log_2 K$ bits of routing information, onto $N \times F_o$ lines; and the minor fanin stage is receiving the packets from the associated network switching stage on the $N \times F_o$ lines, partitioned now as $M \times F_i$ input lines where N times $F_o$ equals M times $F_i$, and is concentrating all successfully routed live packets onto M lines.

16. The [N,M,F,R] multistage interconnection network according to claim 15 wherein the major fanin stage is concentrating live packets received from R minor fanin stages on R×M lines onto the M output channels.

17. R series-replications of a [N,M,F] multistage interconnection network, the [N,M,F,R] network comprising:

a fanout stage having N fanout modules with fanout of $F_o$ each, $F_o$ greater than one and $F_o$ less than M, each fanout module routing a packet received on a corresponding one of the N input channels to a one of its $F_o$ output channels each fanout module routing an input packet received on its input channel to one of $F_o$ output lines according to $\log_2 F_o$ bits of routing information contained in the packet regardless of whether the packet is also code-identified either as live or as dead, meaning inactive and carrying no useful information, wherein the fanout stage receives in total up to N packets code-identified as live, meaning carrying useful information, and receives all remaining packets code-identified as dead, and routes all packets;

R sub-networks each having $\log_K[N/F]$ switching stages, F being the maximum of $F_o$ and $F_i$, $\log_K[N/F]$ being an integer, with each stage having NF/K K×K switches, each switch of a first switching stage routing packets received on its K input lines from K of the fanout modules, and each switch of stages subsequent to the first routing packets received on its K input lines from K of the switches of the previous switching stage, to its K output lines based on $\log_K$ bits of routing information contained in each packet, the first switching stage of a first of the R sub-networks receiving the live and dead packets of the fanout stage, the first switching stages of subsequent ones of the R sub-networks other than the first sub-network receiving re-identified packets of the previous sub-network, each switching stage for routing as is best possible all live packets to their
intended destinations while changing the code
identification of packets that are unroutable due to
contention at the K×K switches to be zombie,
meaning unsuccessfully-routed, packets,
for sending zombie packets to arbitrary outputs other
than those used by the live packets, and
for passing dead packets to any available output,
wherein all live packets are routed, all zombie packets are sent, and all dead packets are passed,
a splitting stage, receiving all output packets from a
final switching stage, for transferring all received
packets to two destinations, and, in all sub-networks
other than the first,
a judgement stage, receiving all packets from the
splitting stage of the previous sub-network as a first
destination thereof, for re-identifying zombie packets to be live packets, for re-identifying live packets
to be dead packets, and for maintaining dead packets
as dead packets, and for transferring all packets as
the re-identified packets:
a minor fanin stage
having M minor-fanin modules with fanin of $F_i$ each,
$1<F_i<N$, $2 \leq F_i \leq N-1$,
receiving all packets from the splitting stage of the
previous sub-network as a second destination
thereof,
wherein N times $F_o$ equals M times $F_i$,
each minor-fanin module concentrating live ones of
all packets received into up to P live output
packets, $0 \leq P \leq F_i$;
each minor-fanin module outputting $F_i$ packets of
which up to P packets are live:
a major fanin stage
having M major-fanin modules with fanin of R each,
each major-fanin module receiving all $F_i$ output packets
from each associated minor-fanin module of the
fanin stages of all R sub-networks,
each major-fanin module concentrating live ones of the
R×$F_i$ received packets into up to R×P live output
packets, $0 \leq R \times P \leq N$, output on a corresponding one
of the M output channels.

18. The [N,M,F,R] multistage interconnection network
according to claim 17 wherein each of the $\log_K[N/F]$ switching stages of each of the R sub-networks comprises:
NF/K K×K switches.

19. The [N,M,F,R] multistage interconnection network
according to claim 18 wherein each of the $\log_K[N/F]$ switching stages of each of the R sub-networks comprises:
NF/2 2×2 switches.

20. The [N,M,F,R] multistage interconnection network
according to claim 19 wherein each of the NF/2 2×2
switches of each of the $\log_K[N/F]$ switching stages of each
of the R sub-networks
is routing as between two live packets one live packet to
its intended destination but changing the code identification of other live packet that is unroutable due to
contention at the 2×2 switches to be a zombie packet,
is routing as between two zombie packets one zombie
packet to randomly to one of two outputs of the switch
while routing the other zombie packet to the remaining
one of two outputs of the switch, and
is performing no useful routing as between two dead
packets.

21. The [N,M,F,R] multistage interconnection network
according to claim 17 extended to T parallel-replicated
[N,M,F,R] multistage interconnection networks, the [N,M,F,R,T] multistage interconnection network comprising:
an input means
for receiving on each of N input channels a packet that
is live or dead,
for making T copies of the packet received on each
input channel, and then
IF a received packet on a one channel is live THEN
maintaining only an arbitrary one of the T live copies
to be live and setting all remaining copies to be dead;
and
IF a received packet on a one channel is dead THEN
maintaining all copies to be dead; and
T tandem-parallel [N,M,F,R,T] multistage interconnection networks connected in parallel each
for receiving packets, up to N of which are live, from
the input means on its N input channels,
for routing live packets to M output lines as best as is
possible considering contention; and
an output means
for concentrating live packets received from each of the
T tandem-parallel [N,M,F,R,T] multistage interconnection networks onto N output channels.

22. The [N,M,F,R] multistage interconnection network
according to claim 17 extended to T parallel-replicated
[N,M,F,R] multistage interconnection networks, the [N,M,F,R,T] multistage interconnection network comprising:
an input means
for receiving on each of N input channels a packet that
is live or dead,
for making T copies of the packet received on each
input channel, and then
IF a received packet on a one channel is live THEN
maintaining an arbitrary number of the T copies to be
live and setting all remaining copies to be dead; and
IF a received packet on a one channel is dead THEN
maintaining all copies to be dead; and
T tandem-parallel [N,M,F,R,T] multistage interconnection networks connected in parallel each
for receiving packets, up to N of which are live, from
the input means on its N input channels,
for routing live packets to M output lines as best as is
possible considering contention; and
an output means
for concentrating live packets received from each of the
T tandem-parallel [N,M,F,R,T] multistage interconnection networks onto N output channels.

23. A concentrator usable in a packet-switched communications network for concentrating F input packets, of
which at most P packets are live meaning carrying useful
information to be routed and of which (F–P) packets are
dead meaning carrying no presently useful information,
received on F input channels, $P \leq N \leq F$, to P output channels
so that the P live packets as are distributed anywhere among
the F input channels are distributed to an uppermost P
among N output channels, the concentrator comprising:
a plurality of hierarchically-series-connected concentrating stages each of which functions to
operate on all F input packets received on F input
channels
to concentrate all F packets onto P output channels so
that P live ones of said packets are distributed to a
upper P of N total output channels,
wherein said ordered distribution is called concentrating,
the plurality of hierarchically-series-connected concentrating stages comprising:

an integer F/2 of first-stage 2×2 concentrator switches each receiving packets on an associated two of the N input lines and concentrating these packets onto two output lines;

an integer F/4 of second-stage 4×4 concentrator switches, each of which comprises
- two, an upper and a lower, 2×2 concentrator switches connected in parallel, for receiving, in order from uppermost to lowermost, the (i) the upper, first, output line of a first, relatively more uppermost, previous 2×2 concentrator switch, (ii) the upper, first, output line of a second, relatively more lowermost, previous 2×2 concentrator switch, (iii) the lower, second, output line of said first previous 2×2 concentrator switch, and (iv) the lower, second, output line of said second previous 2×2 concentrator switch, plus
- an additional, final, 2×2 concentrator switch connected for concentrating packets received from the lower output line of the upper 2×2 concentrator switch and the upper output line of the upper 2×2 concentrator switch;
- wherein four signal lines communicating concentrated packets from the second-stage 4×4 concentrator switch are ordered from uppermost to lowermost as (i) the upper, first, output line of the upper 2×2 concentrator switch, (ii) the upper and the lower, the first and the second, output lines of the final 2×2 switch, and (iii) the lower, second, output line of the lower 2×2 concentrator switch;

an integer F/8 of third-stage 8×8 concentrator switches each of which comprises
- two, an upper and a lower, 4×4 concentrator switches connected in parallel, for receiving, in order from uppermost to lowermost, the (i) the upper, first, output line of a first, relatively more uppermost, previous 4×4 concentrator switch, (ii) the upper, first, output line of a second, relatively more lowermost, previous 4×4 concentrator switch, (iii) the second output line of said first previous 4×4 concentrator switch, (iv) the second output line of said second previous 4×4 concentrator switch, (v) the third output line of said first previous 4×4 concentrator switch, (vi) the third output line of said second previous 4×4 concentrator switch, (vii) the lower, fourth, output line of said first previous 4×4 concentrator switch, and (viii) the lower, fourth, output line of said second previous 4×4 concentrator switch, plus
- two additional, final, 2×2 concentrator switches connected for parallel, for concentrating, in uppermost to lowermost order of their combined four input lines, packets received from (i) the third output line of the upper 4×4 concentrator switch, (ii) the upper, first, output line of the lower 4×4 concentrator switch, (iii) the lower, fourth, output line of the upper 4×4 concentrator switch, and, finally, (iv) the second output line of the lower 4×4 concentrator switch;

and further stages of identical organization until the output lines of a final-stage concentrator switch equal in number the F output channels;

wherein the P active packets as are distributed anywhere among the F input channels are distributed to uppermost P of N output channels.

24. The concentrator according to claim 23 abbreviated and condensed for concentrating P packets received on F input channels where P≦N<F, the abbreviated concentrator comprising:

only so much of each and every of the plurality of hierarchically-series-connected concentrating stages as permits the final-stage concentrator switches to have only P output lines, which P output lines serve as the P output channels and on which P output lines appear the P live packets.

25. The concentrator according to claim 23 abbreviated and condensed for concentrating P packets received on F input channels where P≦N<F, the abbreviated concentrator comprising:

the plurality of hierarchically-series-connected concentrating stages abbreviated and condensed so as to include
- all of first-stage, and of subsequent stage, concentrator switches up to and including the 2N×2N concentrator stage; and
- F/2N 2N×2N concentrator switches in all remaining stages, including the final-stage, subsequent to the final F×F concentrator stage.

* * * * *